US010507527B2

(12) United States Patent
Romano et al.

(10) Patent No.: US 10,507,527 B2
(45) Date of Patent: Dec. 17, 2019

(54) GAS FLOW IN THREE-DIMENSIONAL PRINTING

(71) Applicant: Velo3D, Inc., Campbell, CA (US)

(72) Inventors: Richard Joseph Romano, San Jose, CA (US); Joe Tralongo, Santa Clara, CA (US); Benyamin Buller, Cupertino, CA (US); Alexander Brudny, San Jose, CA (US)

(73) Assignee: Velo3D, Inc., Campbell, CA (US)

( * ) Notice: Subject to any disclaimer, the term of this patent is extended or adjusted under 35 U.S.C. 154(b) by 0 days.

(21) Appl. No.: 15/803,686

(22) Filed: Nov. 3, 2017

(65) Prior Publication Data

US 2018/0126649 A1 May 10, 2018

Related U.S. Application Data

(60) Provisional application No. 62/418,601, filed on Nov. 7, 2016, provisional application No. 62/477,631, filed
(Continued)

(51) Int. Cl.
*B22F 3/105* (2006.01)
*B29C 64/153* (2017.01)
(Continued)

(52) U.S. Cl.
CPC ............. *B22F 3/1055* (2013.01); *B08B 5/04* (2013.01); *B08B 15/02* (2013.01); *B29C 64/153* (2017.08); *B29C 64/245* (2017.08); *B29C 64/25* (2017.08); *B29C 64/35* (2017.08); *B29C 64/371* (2017.08); *B01D 46/0012* (2013.01); *B22F 2003/1056* (2013.01); *B22F 2003/1057* (2013.01); *B22F 2003/1059* (2013.01); *B22F 2201/00* (2013.01); *B22F 2999/00* (2013.01); *B29C 64/268* (2017.08); *B33Y 10/00* (2014.12);
(Continued)

(58) Field of Classification Search
CPC ..................................................... B22F 3/1055
See application file for complete search history.

(56) References Cited

U.S. PATENT DOCUMENTS

| 430,047 A | 6/1890 | Tylee |
| 3,790,787 A | 2/1974 | Geller |

(Continued)

FOREIGN PATENT DOCUMENTS

| CN | 101835554 A | 9/2010 |
| CN | 102076456 A | 5/2011 |

(Continued)

OTHER PUBLICATIONS

Barriobero-Vila et al. Inducing Stable α + β Microstructures during Selective Laser Melting of Ti—6Al—4V Using Intensified Intrinsic Heat Treatments. Materials (Basel). Mar. 2017; 10(3): 268.
(Continued)

*Primary Examiner* — Larry W Thrower
(74) *Attorney, Agent, or Firm* — Ronit Buller; Wilson Sonsini Goodrich and Rosati

(57) ABSTRACT

The present disclosure provides three-dimensional (3D) printing processes, apparatuses, software, and systems for controlling and/or treating gas borne debris in an atmosphere of a 3D printer.

24 Claims, 39 Drawing Sheets

Related U.S. Application Data on Mar. 28, 2017, provisional application No. 62/489,239, filed on Apr. 24, 2017, provisional application No. 62/549,868, filed on Aug. 24, 2017.

(51) Int. Cl.

| | | |
|---|---|---|
| *B29C 64/245* | (2017.01) | |
| *B29C 64/35* | (2017.01) | |
| *B29C 64/25* | (2017.01) | |
| *B08B 5/04* | (2006.01) | |
| *B29C 64/371* | (2017.01) | |
| *B08B 15/02* | (2006.01) | |
| *B33Y 10/00* | (2015.01) | |
| *B33Y 40/00* | (2015.01) | |
| *B33Y 30/00* | (2015.01) | |
| *B29C 64/268* | (2017.01) | |
| *B01D 46/00* | (2006.01) | |
| *B33Y 50/02* | (2015.01) | |

(52) U.S. Cl.
CPC .............. *B33Y 30/00* (2014.12); *B33Y 40/00* (2014.12); *B33Y 50/02* (2014.12); *Y02P 10/295* (2015.11)

(56) References Cited

U.S. PATENT DOCUMENTS

| | | |
|---|---|---|
| 3,864,809 A | 2/1975 | Donachie |
| 4,177,087 A | 12/1979 | Hills et al. |
| 4,323,756 A | 4/1982 | Brown et al. |
| 4,359,622 A | 11/1982 | Dostoomian et al. |
| 4,823,158 A | 4/1989 | Casey et al. |
| 4,863,538 A | 9/1989 | Deckard |
| 4,927,582 A | 5/1990 | Bryson |
| 4,938,816 A | 7/1990 | Beaman et al. |
| 4,961,154 A | 10/1990 | Pomerantz et al. |
| 4,962,988 A | 10/1990 | Swann |
| 5,088,047 A | 2/1992 | Bynum |
| 5,127,037 A | 6/1992 | Bynum |
| 5,155,321 A | 10/1992 | Grube et al. |
| 5,156,697 A | 10/1992 | Bourell et al. |
| 5,162,660 A | 11/1992 | Popil |
| 5,202,837 A | 4/1993 | Coe et al. |
| 5,203,944 A | 4/1993 | Prinz et al. |
| 5,204,055 A | 4/1993 | Sachs et al. |
| 5,208,431 A | 5/1993 | Uchiyama et al. |
| 5,252,264 A | 10/1993 | Forderhase et al. |
| 5,255,057 A | 10/1993 | Stelter et al. |
| 5,286,573 A | 2/1994 | Prinz et al. |
| 5,296,062 A | 3/1994 | Bourell et al. |
| 5,303,141 A | 4/1994 | Batchelder et al. |
| 5,342,919 A | 8/1994 | Dickens, Jr. et al. |
| 5,352,405 A | 10/1994 | Beaman et al. |
| 5,354,414 A | 10/1994 | Feygin |
| 5,387,380 A | 2/1995 | Cima et al. |
| 5,393,482 A | 2/1995 | Benda et al. |
| 5,396,333 A | 3/1995 | Aleshin et al. |
| 5,430,666 A | 7/1995 | Deangelis et al. |
| 5,460,758 A | 10/1995 | Langer et al. |
| 5,508,489 A | 4/1996 | Benda et al. |
| 5,527,877 A | 6/1996 | Dickens, Jr. et al. |
| 5,534,104 A | 7/1996 | Langer et al. |
| 5,536,467 A | 7/1996 | Reichle et al. |
| 5,582,876 A | 12/1996 | Langer et al. |
| 5,593,531 A | 1/1997 | Penn |
| 5,594,652 A | 1/1997 | Penn et al. |
| 5,647,931 A | 7/1997 | Retallick et al. |
| 5,648,450 A | 7/1997 | Dickens, Jr. et al. |
| 5,658,412 A | 8/1997 | Retallick et al. |
| 5,665,401 A | 9/1997 | Serbin et al. |
| 5,730,925 A | 3/1998 | Mattes et al. |
| 5,733,497 A | 3/1998 | McAlea et al. |
| 5,745,834 A | 4/1998 | Bampton et al. |
| 5,749,041 A | 5/1998 | Lakshminarayan et al. |
| 5,753,171 A | 5/1998 | Serbin et al. |
| 5,753,274 A | 5/1998 | Wilkening et al. |
| 5,786,562 A | 7/1998 | Larson |
| 5,818,718 A | 10/1998 | Thomas et al. |
| 5,821,475 A | 10/1998 | Morehead et al. |
| 5,824,259 A | 10/1998 | Allanic et al. |
| 5,832,415 A | 11/1998 | Wilkening et al. |
| 5,859,786 A | 1/1999 | Klein |
| 5,876,550 A | 3/1999 | Feygin et al. |
| 5,876,767 A | 3/1999 | Mattes et al. |
| 5,904,890 A | 5/1999 | Lohner et al. |
| 5,908,569 A | 6/1999 | Wilkening et al. |
| 5,932,059 A | 8/1999 | Langer et al. |
| 5,951,864 A | 9/1999 | Hazrati et al. |
| 6,042,774 A | 3/2000 | Wilkening et al. |
| 6,066,285 A | 5/2000 | Kumar |
| 6,085,122 A | 7/2000 | Manning |
| 6,106,659 A | 8/2000 | Spence et al. |
| 6,126,276 A | 10/2000 | Davis et al. |
| 6,136,257 A | 10/2000 | Graf et al. |
| 6,143,378 A | 11/2000 | Harwell et al. |
| 6,151,345 A | 11/2000 | Gray |
| 6,169,605 B1 | 1/2001 | Penn et al. |
| 6,175,422 B1 | 1/2001 | Penn et al. |
| 6,206,672 B1 | 3/2001 | Grenda |
| 6,207,097 B1 | 3/2001 | Iverson |
| 6,215,093 B1 | 4/2001 | Meiners et al. |
| 6,251,488 B1 | 6/2001 | Miller et al. |
| 6,261,077 B1 | 7/2001 | Bishop et al. |
| 6,268,584 B1 | 7/2001 | Keicher et al. |
| 6,336,480 B2 | 1/2002 | Gaylo et al. |
| 6,337,459 B1 | 1/2002 | Terwijn et al. |
| 6,376,148 B1 | 4/2002 | Liu et al. |
| 6,391,251 B1 | 5/2002 | Keicher et al. |
| 6,401,001 B1 | 6/2002 | Jang et al. |
| 6,483,596 B1 | 11/2002 | Philippi et al. |
| 6,492,651 B2 | 12/2002 | Kerekes |
| 6,531,086 B1 | 3/2003 | Larsson |
| 6,554,600 B1 | 4/2003 | Hofmann et al. |
| 6,583,379 B1 | 6/2003 | Meiners et al. |
| 6,636,676 B1 | 10/2003 | Renn |
| 6,656,409 B1 | 12/2003 | Keicher et al. |
| 6,656,410 B2 | 12/2003 | Hull et al. |
| 6,672,343 B1 | 1/2004 | Perret et al. |
| 6,682,688 B1 | 1/2004 | Higashi et al. |
| 6,688,886 B2 | 2/2004 | Hughes et al. |
| 6,722,872 B1 | 4/2004 | Swanson et al. |
| 6,767,499 B1 | 7/2004 | Hory et al. |
| 6,811,744 B2 | 11/2004 | Keicher et al. |
| 6,814,823 B1 | 11/2004 | White |
| 6,815,636 B2 | 11/2004 | Chung et al. |
| 6,823,124 B1 | 11/2004 | Renn et al. |
| 6,824,714 B1 | 11/2004 | Tuerck et al. |
| 6,861,613 B1 | 3/2005 | Meiners et al. |
| 6,905,645 B2 | 6/2005 | Iskra |
| 6,930,278 B1 | 8/2005 | Chung et al. |
| 6,932,935 B1 | 8/2005 | Oberhofer et al. |
| 6,945,638 B2 | 9/2005 | Teung et al. |
| 6,949,216 B2 | 9/2005 | Brice et al. |
| 6,955,023 B2 | 10/2005 | Rotheroe |
| 6,963,338 B1 | 11/2005 | Bachelder et al. |
| 6,986,654 B2 | 1/2006 | Imiolek et al. |
| 6,989,115 B2 | 1/2006 | Russell et al. |
| 6,994,894 B2 | 2/2006 | Hofmeister |
| 7,008,209 B2 | 3/2006 | Iskra et al. |
| 7,027,887 B2 | 4/2006 | Gaylo et al. |
| 7,045,015 B2 | 5/2006 | Renn et al. |
| 7,047,098 B2 | 5/2006 | Lindemann et al. |
| 7,073,442 B2 | 7/2006 | Fedor et al. |
| 7,084,370 B2 | 8/2006 | Hagemeister et al. |
| 7,108,894 B2 | 9/2006 | Renn |
| 7,149,596 B2 | 12/2006 | Berger et al. |
| 7,153,463 B2 | 12/2006 | Leuterer et al. |
| 7,229,272 B2 | 6/2007 | Leuterer et al. |
| 7,241,415 B2 | 7/2007 | Khoshnevis |
| 7,261,542 B2 | 8/2007 | Hickerson et al. |
| 7,261,550 B2 | 8/2007 | Herzog |
| 7,270,844 B2 | 9/2007 | Renn |
| 7,294,366 B2 | 11/2007 | Renn et al. |

(56) References Cited

U.S. PATENT DOCUMENTS

| | | |
|---|---|---|
| 7,296,599 B2 | 11/2007 | Cox et al. |
| 7,326,377 B2 | 2/2008 | Adams |
| 7,419,632 B2 | 9/2008 | Keller |
| 7,435,368 B2 | 10/2008 | Davidson et al. |
| 7,452,500 B2 | 11/2008 | Uckelmann |
| 7,454,262 B2 | 11/2008 | Larsson |
| 7,485,345 B2 | 2/2009 | Renn et al. |
| 7,515,986 B2 | 4/2009 | Huskamp |
| 7,521,652 B2 | 4/2009 | Chung et al. |
| 7,537,722 B2 | 5/2009 | Andersson et al. |
| 7,540,738 B2 | 6/2009 | Larsson et al. |
| 7,604,768 B2 | 10/2009 | Kritchman |
| 7,615,179 B2 | 11/2009 | Dumond et al. |
| 7,628,600 B2 | 12/2009 | Perret |
| 7,635,825 B2 | 12/2009 | Larsson |
| 7,639,267 B1 | 12/2009 | Desimone et al. |
| 7,658,163 B2 | 2/2010 | Renn et al. |
| 7,661,948 B2 | 2/2010 | Perret et al. |
| 7,665,979 B2 | 2/2010 | Heugel |
| 7,674,107 B2 | 3/2010 | Perret et al. |
| 7,674,671 B2 | 3/2010 | Renn et al. |
| 7,686,605 B2 | 3/2010 | Perret et al. |
| 7,704,432 B2 | 4/2010 | Dumond et al. |
| 7,713,048 B2 | 5/2010 | Perret et al. |
| 7,713,454 B2 | 5/2010 | Larsson |
| 7,740,683 B2 | 6/2010 | Thorsson et al. |
| 7,741,578 B2 | 6/2010 | Adams et al. |
| 7,789,037 B2 | 9/2010 | Teulet et al. |
| 7,799,253 B2 | 9/2010 | Hochsmann et al. |
| 7,820,241 B2 | 10/2010 | Perret et al. |
| 7,833,465 B2 | 11/2010 | Larsson |
| 7,837,458 B2 | 11/2010 | Perret et al. |
| 7,847,212 B2 | 12/2010 | Renz et al. |
| 7,850,885 B2 | 12/2010 | Philippi et al. |
| 7,863,544 B2 | 1/2011 | Serruys et al. |
| 7,871,551 B2 | 1/2011 | Wallgren et al. |
| 7,879,394 B1 | 2/2011 | Keicher et al. |
| 7,891,095 B2 | 2/2011 | Jonsson et al. |
| 7,901,604 B2 | 3/2011 | Oberhofer et al. |
| 7,931,462 B2 | 4/2011 | Mattes |
| 7,936,352 B2 | 5/2011 | Baran et al. |
| 7,938,079 B2 | 5/2011 | King et al. |
| 7,938,341 B2 | 5/2011 | Renn et al. |
| 7,946,840 B2 | 5/2011 | Perret et al. |
| 7,976,302 B2 | 7/2011 | Halder et al. |
| 7,987,813 B2 | 8/2011 | Renn et al. |
| 7,991,465 B2 | 8/2011 | Bartic et al. |
| 8,025,831 B2 | 9/2011 | Kong et al. |
| 8,031,384 B2 | 10/2011 | Perret et al. |
| 8,034,279 B2 | 10/2011 | Dimter et al. |
| 8,048,359 B2 | 11/2011 | Wang et al. |
| 8,073,315 B2 | 12/2011 | Philippi |
| 8,075,814 B2 | 12/2011 | Fruth et al. |
| 8,083,513 B2 | 12/2011 | Montero-Escuder et al. |
| 8,110,247 B2 | 2/2012 | Renn et al. |
| 8,124,192 B2 | 2/2012 | Paasche et al. |
| 8,132,744 B2 | 3/2012 | Renn et al. |
| 8,137,739 B2 | 3/2012 | Philippi et al. |
| 8,172,562 B2 | 5/2012 | Mattes |
| 8,186,414 B2 | 5/2012 | Furlong et al. |
| 8,186,990 B2 | 5/2012 | Perret et al. |
| 8,187,521 B2 | 5/2012 | Larsson et al. |
| 8,187,522 B2 | 5/2012 | Higashi et al. |
| 8,249,480 B2 | 8/2012 | Aslam et al. |
| 8,260,447 B2 | 9/2012 | Mattes et al. |
| 8,272,579 B2 | 9/2012 | King et al. |
| 8,299,208 B2 | 10/2012 | Muller et al. |
| 8,303,886 B2 | 11/2012 | Philippi |
| 8,308,466 B2 | 11/2012 | Ackelid et al. |
| 8,313,087 B2 | 11/2012 | Hesse et al. |
| 8,317,508 B2 | 11/2012 | Bokodi et al. |
| 8,366,432 B2 | 2/2013 | Perret et al. |
| 8,414,281 B2 | 4/2013 | Schleiss et al. |
| 8,455,051 B2 | 6/2013 | Renn et al. |
| 8,488,994 B2 | 7/2013 | Hanson et al. |
| 8,501,075 B2 | 8/2013 | Philippi et al. |
| 8,502,107 B2 | 8/2013 | Uckelmann |
| 8,524,142 B2 | 9/2013 | Uckelmann et al. |
| 8,525,071 B2 | 9/2013 | Leuterer |
| 8,556,981 B2 | 10/2013 | Jones et al. |
| 8,570,534 B1 | 10/2013 | Loewgren |
| 8,590,157 B2 | 11/2013 | Kruth et al. |
| 8,640,975 B2 | 2/2014 | King |
| 8,658,078 B2 | 2/2014 | Weidinger et al. |
| 8,705,144 B2 | 4/2014 | Gullentops et al. |
| 8,710,144 B2 | 4/2014 | Hesse et al. |
| 8,728,387 B2 | 5/2014 | Jones et al. |
| 8,734,694 B2 | 5/2014 | Perret et al. |
| 8,753,105 B2 | 6/2014 | Scott |
| 8,784,720 B2 | 7/2014 | Oberhofer et al. |
| 8,784,721 B2 | 7/2014 | Philippi et al. |
| 8,794,263 B2 | 8/2014 | Scott et al. |
| 8,796,146 B2 | 8/2014 | Renn et al. |
| 8,803,073 B2 | 8/2014 | Philippi |
| 8,845,319 B2 | 9/2014 | Oberhofer et al. |
| 8,884,186 B2 | 11/2014 | Uckelmann et al. |
| 8,887,658 B2 | 11/2014 | Essien et al. |
| 8,895,893 B2 | 11/2014 | Perret et al. |
| 8,906,216 B2 | 12/2014 | Detor et al. |
| 8,915,620 B2 | 12/2014 | Vaes et al. |
| 8,945,456 B2 | 2/2015 | Zenere et al. |
| 8,967,990 B2 | 3/2015 | Weidinger et al. |
| 8,968,625 B2 | 3/2015 | Tan |
| 8,994,592 B2 | 3/2015 | Scott et al. |
| 9,011,982 B2 | 4/2015 | Muller et al. |
| 9,037,068 B2 | 5/2015 | Kojima |
| 9,064,671 B2 | 6/2015 | Ljungblad et al. |
| 9,073,265 B2 | 7/2015 | Snis |
| 9,079,248 B2 | 7/2015 | Ackelid |
| 9,114,478 B2 | 8/2015 | Scott et al. |
| 9,114,652 B1 | 8/2015 | Wayman |
| 9,117,039 B1 | 8/2015 | Mosterman et al. |
| 9,126,167 B2 | 9/2015 | Ljungblad |
| 9,162,393 B2 | 10/2015 | Ackelid |
| 9,162,394 B2 | 10/2015 | Ackelid |
| 9,192,054 B2 | 11/2015 | King et al. |
| 9,205,691 B1 | 12/2015 | Jones et al. |
| 9,221,100 B2 | 12/2015 | Schwarze et al. |
| 9,233,507 B2 | 1/2016 | Bibas |
| 9,254,535 B2 | 2/2016 | Buller et al. |
| 9,272,369 B2 | 3/2016 | Bruck et al. |
| 9,308,583 B2 | 4/2016 | El-Dasher et al. |
| 9,314,972 B2 | 4/2016 | Green |
| 9,327,450 B2 | 5/2016 | Hein et al. |
| 9,327,451 B2 | 5/2016 | Teulet |
| 9,346,127 B2 | 5/2016 | Buller et al. |
| 9,366,422 B2 | 6/2016 | McClure et al. |
| 9,380,304 B1 | 6/2016 | Chang et al. |
| 9,399,256 B2 | 7/2016 | Buller et al. |
| 9,403,235 B2 | 8/2016 | Buller et al. |
| 9,415,443 B2 | 8/2016 | Ljungblad et al. |
| 9,486,878 B2 | 11/2016 | Buller et al. |
| 9,498,921 B2 | 11/2016 | Teulet et al. |
| 9,505,057 B2 | 11/2016 | Nordkvist et al. |
| 9,522,426 B2 | 12/2016 | Das et al. |
| 9,527,246 B2 | 12/2016 | Wiesner et al. |
| 9,533,452 B2 | 1/2017 | Guenster et al. |
| 9,550,207 B2 | 1/2017 | Ackelid et al. |
| 9,573,193 B2 | 2/2017 | Buller et al. |
| 9,573,225 B2 | 2/2017 | Buller et al. |
| 9,586,290 B2 | 3/2017 | Buller et al. |
| 9,592,554 B2 | 3/2017 | Abe et al. |
| 9,662,840 B1 | 5/2017 | Buller et al. |
| 9,676,145 B2 | 6/2017 | Buller et al. |
| 9,700,908 B2 | 7/2017 | Baker et al. |
| 9,757,760 B2 | 9/2017 | Halder et al. |
| 9,827,717 B2 | 11/2017 | Huang et al. |
| 9,835,568 B2 | 12/2017 | Woods et al. |
| 9,886,526 B2 | 2/2018 | Huang et al. |
| 9,919,360 B2 | 3/2018 | Buller et al. |
| 9,919,476 B2 | 3/2018 | Paternoster et al. |
| 10,035,188 B2 | 7/2018 | Weilhammer et al. |
| 10,035,304 B2 | 7/2018 | Reinarz et al. |
| 10,112,236 B2 | 10/2018 | Schlick et al. |

(56) References Cited

U.S. PATENT DOCUMENTS

| | | |
|---|---|---|
| 2002/0017509 A1 | 2/2002 | Ishide et al. |
| 2002/0020945 A1 | 2/2002 | Cho et al. |
| 2002/0041818 A1 | 4/2002 | Abe et al. |
| 2002/0079601 A1 | 6/2002 | Russell et al. |
| 2002/0090410 A1 | 7/2002 | Tochimoto et al. |
| 2002/0104973 A1 | 8/2002 | Kerekes |
| 2002/0145213 A1 | 10/2002 | Liu et al. |
| 2002/0152002 A1 | 10/2002 | Lindemann et al. |
| 2002/0158054 A1 | 10/2002 | Manetsberger et al. |
| 2002/0195747 A1 | 12/2002 | Hull et al. |
| 2003/0201255 A1 | 10/2003 | Manetsberger et al. |
| 2003/0222066 A1 | 12/2003 | Low et al. |
| 2003/0232512 A1 | 12/2003 | Dickinson et al. |
| 2004/0003738 A1 | 1/2004 | Imiolek et al. |
| 2004/0003741 A1 | 1/2004 | Iskra et al. |
| 2004/0004303 A1 | 1/2004 | Iskra |
| 2004/0004653 A1 | 1/2004 | Pryor et al. |
| 2004/0005182 A1 | 1/2004 | Gaylo et al. |
| 2004/0026807 A1 | 2/2004 | Andersson et al. |
| 2004/0045941 A1 | 3/2004 | Herzog et al. |
| 2004/0056022 A1 | 3/2004 | Meiners et al. |
| 2004/0061260 A1 | 4/2004 | Heugel |
| 2004/0084814 A1 | 5/2004 | Boyd et al. |
| 2004/0094728 A1 | 5/2004 | Herzog et al. |
| 2004/0099996 A1 | 5/2004 | Herzog |
| 2004/0118309 A1 | 6/2004 | Fedor et al. |
| 2004/0173946 A1 | 9/2004 | Pfeifer et al. |
| 2004/0179808 A1 | 9/2004 | Renn |
| 2004/0197493 A1 | 10/2004 | Renn et al. |
| 2004/0204785 A1 | 10/2004 | Richardson |
| 2004/0217095 A1 | 11/2004 | Herzog |
| 2004/0222549 A1 | 11/2004 | Sano et al. |
| 2004/0228004 A1 | 11/2004 | Sercel et al. |
| 2004/0262261 A1 | 12/2004 | Fink et al. |
| 2005/0035285 A1 | 2/2005 | Tan et al. |
| 2005/0116391 A1 | 6/2005 | Lindemann et al. |
| 2005/0133527 A1 | 6/2005 | Dullea et al. |
| 2005/0142024 A1 | 6/2005 | Herzog |
| 2005/0156991 A1 | 7/2005 | Renn |
| 2005/0163917 A1 | 7/2005 | Renn |
| 2005/0186716 A1 | 8/2005 | Kasumi |
| 2005/0207901 A1 | 9/2005 | Klobucar et al. |
| 2005/0258570 A1 | 11/2005 | Kong et al. |
| 2005/0278933 A1 | 12/2005 | Macke, Jr. et al. |
| 2005/0287031 A1 | 12/2005 | Macke, Jr. et al. |
| 2006/0003095 A1 | 1/2006 | Bullen et al. |
| 2006/0019232 A1 | 1/2006 | Fischer et al. |
| 2006/0054079 A1 | 3/2006 | Withey et al. |
| 2006/0111807 A1 | 5/2006 | Gothait et al. |
| 2006/0118532 A1 | 6/2006 | Chung et al. |
| 2006/0156978 A1 | 7/2006 | Lipson et al. |
| 2006/0181700 A1 | 8/2006 | Andrews et al. |
| 2006/0187326 A1 | 8/2006 | Spencer et al. |
| 2006/0192322 A1 | 8/2006 | Abe et al. |
| 2006/0208396 A1 | 9/2006 | Abe et al. |
| 2006/0214335 A1 | 9/2006 | Cox et al. |
| 2006/0228248 A1 | 10/2006 | Larsson |
| 2006/0228897 A1 | 10/2006 | Timans et al. |
| 2006/0249485 A1 | 11/2006 | Partanen et al. |
| 2006/0280866 A1 | 12/2006 | Marquez et al. |
| 2007/0001342 A1 | 1/2007 | Oberhofer et al. |
| 2007/0003656 A1 | 1/2007 | Labossiere et al. |
| 2007/0019028 A1 | 1/2007 | Renn et al. |
| 2007/0023977 A1 | 2/2007 | Braun et al. |
| 2007/0035069 A1 | 2/2007 | Wust et al. |
| 2007/0051704 A1 | 3/2007 | Husmann et al. |
| 2007/0052836 A1 | 3/2007 | Yamada et al. |
| 2007/0057412 A1 | 3/2007 | Weiskopf et al. |
| 2007/0122562 A1 | 5/2007 | Adams |
| 2007/0142914 A1 | 6/2007 | Jones et al. |
| 2007/0154634 A1 | 7/2007 | Renn |
| 2007/0175875 A1 | 8/2007 | Uckelmann et al. |
| 2007/0183918 A1 | 8/2007 | Monsheimer et al. |
| 2007/0196561 A1 | 8/2007 | Philippi et al. |
| 2007/0241482 A1 | 10/2007 | Giller et al. |
| 2007/0290409 A1 | 12/2007 | Brice et al. |
| 2008/0006334 A1 | 1/2008 | Davidson et al. |
| 2008/0013299 A1 | 1/2008 | Renn |
| 2008/0014457 A1 | 1/2008 | Gennaro et al. |
| 2008/0026338 A1 | 1/2008 | Cinader et al. |
| 2008/0060330 A1 | 3/2008 | Davidson et al. |
| 2008/0131540 A1 | 6/2008 | Perret et al. |
| 2008/0138515 A1 | 6/2008 | Williams |
| 2008/0151951 A1 | 6/2008 | Elliott et al. |
| 2008/0204748 A1 | 8/2008 | Nomaru et al. |
| 2008/0206460 A1 | 8/2008 | Rhoades et al. |
| 2008/0208268 A1 | 8/2008 | Bartic et al. |
| 2009/0004380 A1 | 1/2009 | Hochsmann et al. |
| 2009/0017220 A1 | 1/2009 | Muller et al. |
| 2009/0025638 A1 | 1/2009 | Inoue |
| 2009/0035411 A1 | 2/2009 | Seibert et al. |
| 2009/0039570 A1 | 2/2009 | Clark |
| 2009/0042050 A1 | 2/2009 | Matteazzi et al. |
| 2009/0045553 A1 | 2/2009 | Weidinger et al. |
| 2009/0047165 A1 | 2/2009 | Syvanen et al. |
| 2009/0061077 A1 | 3/2009 | King et al. |
| 2009/0090298 A1 | 4/2009 | King et al. |
| 2009/0114151 A1 | 5/2009 | Renn et al. |
| 2009/0152771 A1 | 6/2009 | Philippi et al. |
| 2009/0206065 A1 | 8/2009 | Kruth et al. |
| 2009/0206522 A1 | 8/2009 | Hein et al. |
| 2009/0257672 A1 | 10/2009 | Sullender et al. |
| 2009/0314391 A1 | 12/2009 | Crump et al. |
| 2010/0006228 A1 | 1/2010 | Abe et al. |
| 2010/0044547 A1 | 2/2010 | Higashi et al. |
| 2010/0125356 A1 | 5/2010 | Shkolnik et al. |
| 2010/0140550 A1 | 6/2010 | Keller et al. |
| 2010/0163405 A1 | 7/2010 | Ackelid |
| 2010/0173096 A1 | 7/2010 | Kritchman et al. |
| 2010/0174392 A1 | 7/2010 | Fink et al. |
| 2010/0215856 A1 | 8/2010 | Kritchman |
| 2010/0233012 A1 | 9/2010 | Higashi et al. |
| 2010/0242843 A1 | 9/2010 | Peretti et al. |
| 2010/0305743 A1 | 12/2010 | Larsson |
| 2011/0029093 A1 | 2/2011 | Bojarski et al. |
| 2011/0042031 A1 | 2/2011 | Furlong et al. |
| 2011/0046916 A1 | 2/2011 | Yu et al. |
| 2011/0052927 A1 | 3/2011 | Martinoni et al. |
| 2011/0106290 A1 | 5/2011 | Hoevel et al. |
| 2011/0123383 A1 | 5/2011 | Fuwa et al. |
| 2011/0133367 A1 | 6/2011 | Weidinger et al. |
| 2011/0135840 A1 | 6/2011 | Doye et al. |
| 2011/0165339 A1 | 7/2011 | Skoglund et al. |
| 2011/0165340 A1 | 7/2011 | Baumann |
| 2011/0168091 A1 | 7/2011 | Baumann et al. |
| 2011/0187713 A1 | 8/2011 | Pershing et al. |
| 2011/0190904 A1 | 8/2011 | Lechmann et al. |
| 2011/0221100 A1 | 9/2011 | Wesselky et al. |
| 2011/0223349 A1 | 9/2011 | Scott |
| 2011/0259862 A1 | 10/2011 | Scott et al. |
| 2011/0278773 A1 | 11/2011 | Bokodi et al. |
| 2011/0287185 A1 | 11/2011 | Felstead et al. |
| 2011/0293771 A1 | 12/2011 | Oberhofer et al. |
| 2012/0000893 A1 | 1/2012 | Broude et al. |
| 2012/0010741 A1 | 1/2012 | Hull et al. |
| 2012/0013710 A1 | 1/2012 | Ehrlich et al. |
| 2012/0052145 A1 | 3/2012 | Chen et al. |
| 2012/0090734 A1 | 4/2012 | Heinlein |
| 2012/0100031 A1 | 4/2012 | Ljungblad et al. |
| 2012/0106150 A1 | 5/2012 | Vaes et al. |
| 2012/0107496 A1 | 5/2012 | Thoma |
| 2012/0119399 A1 | 5/2012 | Fruth |
| 2012/0126457 A1 | 5/2012 | Abe et al. |
| 2012/0130525 A1 | 5/2012 | Tsai et al. |
| 2012/0133928 A1 | 5/2012 | Urano et al. |
| 2012/0134386 A1 | 5/2012 | Bender et al. |
| 2012/0139166 A1 | 6/2012 | Abe et al. |
| 2012/0145806 A1 | 6/2012 | Yang |
| 2012/0155606 A1 | 6/2012 | Simon et al. |
| 2012/0164322 A1 | 6/2012 | Teulet |
| 2012/0186779 A1 | 7/2012 | Tan et al. |
| 2012/0211926 A1 | 8/2012 | Larsson et al. |
| 2012/0213615 A1 | 8/2012 | Sakaue |
| 2012/0223059 A1 | 9/2012 | Ackelid |

(56) References Cited

U.S. PATENT DOCUMENTS

| | | |
|---|---|---|
| 2012/0228492 A1 | 9/2012 | Franzen |
| 2012/0228807 A1 | 9/2012 | Teulet |
| 2012/0231175 A1 | 9/2012 | Tan |
| 2012/0231576 A1 | 9/2012 | King et al. |
| 2012/0234671 A1 | 9/2012 | Ackelid |
| 2012/0235548 A1 | 9/2012 | Cordes et al. |
| 2012/0251378 A1 | 10/2012 | Abe et al. |
| 2012/0267347 A1 | 10/2012 | Arjakine et al. |
| 2012/0308781 A1 | 12/2012 | Abe et al. |
| 2012/0318777 A1 | 12/2012 | Kwok et al. |
| 2013/0016400 A1 | 1/2013 | Yamashita |
| 2013/0064706 A1 | 3/2013 | Schwarze et al. |
| 2013/0080866 A1 | 3/2013 | Ogilvie et al. |
| 2013/0089642 A1 | 4/2013 | Lipson et al. |
| 2013/0093866 A1 | 4/2013 | Ohlhues et al. |
| 2013/0101746 A1 | 4/2013 | Keremes et al. |
| 2013/0112672 A1 | 5/2013 | Keremes et al. |
| 2013/0134637 A1 | 5/2013 | Wiesner et al. |
| 2013/0162643 A1 | 6/2013 | Cardle |
| 2013/0168902 A1 | 7/2013 | Herzog et al. |
| 2013/0171019 A1 | 7/2013 | Gessler et al. |
| 2013/0180959 A1 | 7/2013 | Weston et al. |
| 2013/0186558 A1 | 7/2013 | Comb et al. |
| 2013/0228302 A1 | 9/2013 | Rickenbacher et al. |
| 2013/0256953 A1 | 10/2013 | Teulet |
| 2013/0270750 A1 | 10/2013 | Green |
| 2013/0272746 A1 | 10/2013 | Hanson et al. |
| 2013/0277891 A1 | 10/2013 | Teulet |
| 2013/0280547 A1 | 10/2013 | Brandl et al. |
| 2013/0300035 A1 | 11/2013 | Snis |
| 2013/0300286 A1 | 11/2013 | Ljungblad et al. |
| 2013/0312928 A1 | 11/2013 | Mercelis et al. |
| 2013/0329098 A1 | 12/2013 | Lim et al. |
| 2013/0330470 A1 | 12/2013 | Gersch et al. |
| 2014/0034626 A1 | 2/2014 | Illston |
| 2014/0035182 A1 | 2/2014 | Boyer et al. |
| 2014/0049964 A1 | 2/2014 | McClure et al. |
| 2014/0065194 A1 | 3/2014 | Yoo et al. |
| 2014/0086654 A1 | 3/2014 | Kojima |
| 2014/0086780 A1 | 3/2014 | Miller et al. |
| 2014/0123458 A1 | 5/2014 | Fearon et al. |
| 2014/0150992 A1 | 6/2014 | Koontz et al. |
| 2014/0154088 A1 | 6/2014 | Etter et al. |
| 2014/0157579 A1 | 6/2014 | Chhabra et al. |
| 2014/0163717 A1 | 6/2014 | Das et al. |
| 2014/0176127 A1 | 6/2014 | Kogej et al. |
| 2014/0251481 A1 | 9/2014 | Kroll et al. |
| 2014/0252687 A1 | 9/2014 | El-Dasher et al. |
| 2014/0265045 A1 | 9/2014 | Cullen et al. |
| 2014/0271221 A1 | 9/2014 | Soucy et al. |
| 2014/0271328 A1 | 9/2014 | Burris et al. |
| 2014/0287080 A1 | 9/2014 | Scott et al. |
| 2014/0288890 A1 | 9/2014 | Khainson et al. |
| 2014/0301883 A1 | 10/2014 | Wiesner et al. |
| 2014/0314609 A1 | 10/2014 | Ljungblad et al. |
| 2014/0314964 A1 | 10/2014 | Ackelid |
| 2014/0329953 A1 | 11/2014 | Paternoster |
| 2014/0332507 A1 | 11/2014 | Fockele et al. |
| 2014/0335313 A1 | 11/2014 | Chou et al. |
| 2014/0348691 A1 | 11/2014 | Ljungblad et al. |
| 2014/0348692 A1 | 11/2014 | Bessac et al. |
| 2014/0348969 A1 | 11/2014 | Scott |
| 2014/0361464 A1 | 12/2014 | Holcomb |
| 2014/0363585 A1 | 12/2014 | Pialot et al. |
| 2014/0370323 A1 | 12/2014 | Ackelid |
| 2014/0377117 A1 | 12/2014 | Herrmann et al. |
| 2015/0004046 A1 | 1/2015 | Graham et al. |
| 2015/0014281 A1 | 1/2015 | Trimmer et al. |
| 2015/0017013 A1 | 1/2015 | Tozzi et al. |
| 2015/0021815 A1 | 1/2015 | Albrecht et al. |
| 2015/0021832 A1 | 1/2015 | Yerazunis et al. |
| 2015/0034606 A1 | 2/2015 | Blackmore |
| 2015/0037599 A1 | 2/2015 | Blackmore |
| 2015/0048528 A1 | 2/2015 | Barton |
| 2015/0049082 A1 | 2/2015 | Coffey et al. |
| 2015/0050463 A1 | 2/2015 | Nakano et al. |
| 2015/0054191 A1 | 2/2015 | Ljungblad |
| 2015/0060042 A1 | 3/2015 | Shilpiekandula et al. |
| 2015/0061170 A1 | 3/2015 | Engel et al. |
| 2015/0061195 A1 | 3/2015 | Defelice et al. |
| 2015/0064047 A1 | 3/2015 | Hyde et al. |
| 2015/0071809 A1 | 3/2015 | Nordkvist et al. |
| 2015/0076739 A1 | 3/2015 | Batchelder |
| 2015/0084240 A1 | 3/2015 | Shuck et al. |
| 2015/0088295 A1 | 3/2015 | Hellestam |
| 2015/0091200 A1 | 4/2015 | Mech et al. |
| 2015/0093720 A1 | 4/2015 | Beeby et al. |
| 2015/0097307 A1 | 4/2015 | Batchelder et al. |
| 2015/0097308 A1 | 4/2015 | Batchelder et al. |
| 2015/0110910 A1 | 4/2015 | Hartmann et al. |
| 2015/0115490 A1 | 4/2015 | Reinarz |
| 2015/0139849 A1 | 5/2015 | Pialot, Jr. et al. |
| 2015/0142153 A1 | 5/2015 | Chun et al. |
| 2015/0145169 A1 | 5/2015 | Liu et al. |
| 2015/0158249 A1 | 6/2015 | Goto |
| 2015/0165525 A1 | 6/2015 | Jonasson |
| 2015/0165545 A1 | 6/2015 | Goehler et al. |
| 2015/0165681 A1 | 6/2015 | Fish et al. |
| 2015/0165684 A1 | 6/2015 | Deane et al. |
| 2015/0174658 A1 | 6/2015 | Ljungblad |
| 2015/0174822 A1 | 6/2015 | Huang et al. |
| 2015/0178286 A1 | 6/2015 | Dhollander et al. |
| 2015/0185454 A1 | 7/2015 | Kalkbrenner et al. |
| 2015/0198052 A1 | 7/2015 | Pavlov et al. |
| 2015/0210013 A1 | 7/2015 | Teulet |
| 2015/0246485 A1 | 9/2015 | Guenster et al. |
| 2015/0251355 A1 | 9/2015 | Rehme |
| 2015/0268099 A1 | 9/2015 | Craig et al. |
| 2015/0283610 A1 | 10/2015 | Ljungblad et al. |
| 2015/0283611 A1 | 10/2015 | Takezawa et al. |
| 2015/0283613 A1 | 10/2015 | Backlund et al. |
| 2015/0298211 A1 | 10/2015 | Abe et al. |
| 2015/0298397 A1 | 10/2015 | Chen et al. |
| 2015/0306667 A1 | 10/2015 | Yao |
| 2015/0306820 A1 | 10/2015 | Colin et al. |
| 2015/0321422 A1 | 11/2015 | Boyer |
| 2015/0328839 A1 | 11/2015 | Willis et al. |
| 2015/0331402 A1 | 11/2015 | Lin et al. |
| 2015/0336330 A1 | 11/2015 | Herzog |
| 2015/0367415 A1 | 12/2015 | Buller et al. |
| 2015/0367416 A1 | 12/2015 | Buller et al. |
| 2015/0367418 A1 | 12/2015 | Buller et al. |
| 2015/0367419 A1 | 12/2015 | Buller et al. |
| 2015/0367447 A1 | 12/2015 | Buller et al. |
| 2015/0367453 A1 | 12/2015 | Herzog |
| 2015/0367574 A1 | 12/2015 | Araie et al. |
| 2015/0375456 A1 | 12/2015 | Cheverton et al. |
| 2016/0001401 A1 | 1/2016 | Dimter et al. |
| 2016/0022336 A1 | 1/2016 | Bateman |
| 2016/0026337 A1 | 1/2016 | Wassvik et al. |
| 2016/0026889 A1 | 1/2016 | Parkhomenko et al. |
| 2016/0059310 A1 | 3/2016 | Junker et al. |
| 2016/0059352 A1 | 3/2016 | Sparks et al. |
| 2016/0067740 A1 | 3/2016 | Voris et al. |
| 2016/0067779 A1 | 3/2016 | Dautova et al. |
| 2016/0082666 A1 | 3/2016 | De Pena et al. |
| 2016/0082668 A1 | 3/2016 | Perret et al. |
| 2016/0107263 A1 | 4/2016 | Koerber |
| 2016/0114431 A1 | 4/2016 | Cheverton et al. |
| 2016/0114432 A1 | 4/2016 | Ferrar et al. |
| 2016/0114531 A1 | 4/2016 | Chuang et al. |
| 2016/0114535 A1 | 4/2016 | Kritchman et al. |
| 2016/0121399 A1 | 5/2016 | Buller et al. |
| 2016/0121548 A1 | 5/2016 | Nauka et al. |
| 2016/0129502 A1 | 5/2016 | Varetti |
| 2016/0129631 A1 | 5/2016 | Chen et al. |
| 2016/0136730 A1 | 5/2016 | McMurtry et al. |
| 2016/0136896 A1 | 5/2016 | Wighton |
| 2016/0144574 A1 | 5/2016 | Eilken et al. |
| 2016/0151860 A1 | 6/2016 | Engeli et al. |
| 2016/0154906 A1 | 6/2016 | Schmidt et al. |
| 2016/0159010 A1 | 6/2016 | Perez et al. |
| 2016/0179064 A1 | 6/2016 | Arthur et al. |
| 2016/0185048 A1 | 6/2016 | Dave et al. |

(56) References Cited

U.S. PATENT DOCUMENTS

| | | |
|---|---|---|
| 2016/0193696 A1 | 7/2016 | McFarland et al. |
| 2016/0193785 A1 | 7/2016 | Bell et al. |
| 2016/0193790 A1 | 7/2016 | Shuck et al. |
| 2016/0207109 A1 | 7/2016 | Buller et al. |
| 2016/0214175 A1 | 7/2016 | Nordstrom |
| 2016/0228987 A1 | 8/2016 | Baudimont et al. |
| 2016/0236279 A1 | 8/2016 | Ashton et al. |
| 2016/0236414 A1 | 8/2016 | Reese et al. |
| 2016/0236419 A1 | 8/2016 | Griffin et al. |
| 2016/0241885 A1 | 8/2016 | Ström et al. |
| 2016/0246908 A1 | 8/2016 | Komzsik |
| 2016/0250717 A1 | 9/2016 | Kruger et al. |
| 2016/0258045 A1 | 9/2016 | Carter, Jr. et al. |
| 2016/0271698 A1 | 9/2016 | Schmidt |
| 2016/0271884 A1 | 9/2016 | Herzog |
| 2016/0279706 A1 | 9/2016 | Domrose et al. |
| 2016/0284123 A1 | 9/2016 | Hare et al. |
| 2016/0288254 A1 | 10/2016 | Pettit et al. |
| 2016/0297006 A1 | 10/2016 | Buller et al. |
| 2016/0297007 A1 | 10/2016 | Buller et al. |
| 2016/0299996 A1 | 10/2016 | Huang |
| 2016/0300356 A1 | 10/2016 | Kitamura et al. |
| 2016/0303687 A1 | 10/2016 | Ljungblad |
| 2016/0311025 A1 | 10/2016 | Kaneko |
| 2016/0318129 A1 | 11/2016 | Hu et al. |
| 2016/0320236 A1 | 11/2016 | Fortin et al. |
| 2016/0320771 A1 | 11/2016 | Huang |
| 2016/0321384 A1 | 11/2016 | Pal et al. |
| 2016/0326880 A1 | 11/2016 | Slavens et al. |
| 2016/0332384 A1 | 11/2016 | De Pena et al. |
| 2016/0339639 A1 | 11/2016 | Chivel |
| 2016/0361874 A1 | 12/2016 | Park et al. |
| 2017/0001371 A1 | 1/2017 | Sobue et al. |
| 2017/0001379 A1 | 1/2017 | Long |
| 2017/0014902 A1 | 1/2017 | Tanaka et al. |
| 2017/0021420 A1 | 1/2017 | Buller et al. |
| 2017/0021455 A1 | 1/2017 | Dallarosa et al. |
| 2017/0036404 A1 | 2/2017 | Rengers et al. |
| 2017/0066052 A1 | 3/2017 | Abe et al. |
| 2017/0066084 A1 | 3/2017 | Ladewig et al. |
| 2017/0087769 A1* | 3/2017 | Cao et al. ........... B29C 67/0066 |
| 2017/0090461 A1 | 3/2017 | Chong et al. |
| 2017/0102689 A1 | 4/2017 | Khajepour et al. |
| 2017/0106603 A1 | 4/2017 | Pobihun |
| 2017/0123222 A1 | 5/2017 | Demuth et al. |
| 2017/0129052 A1 | 5/2017 | Buller et al. |
| 2017/0136574 A1 | 5/2017 | Zenzinger et al. |
| 2017/0136703 A1 | 5/2017 | Hayes et al. |
| 2017/0144254 A1 | 5/2017 | Buller et al. |
| 2017/0144374 A1 | 5/2017 | Ono et al. |
| 2017/0144874 A1 | 5/2017 | Huebinger et al. |
| 2017/0145586 A1 | 5/2017 | Xiao |
| 2017/0157845 A1 | 6/2017 | Bihari et al. |
| 2017/0165751 A1 | 6/2017 | Buller et al. |
| 2017/0165752 A1 | 6/2017 | Buller et al. |
| 2017/0165753 A1 | 6/2017 | Buller et al. |
| 2017/0165754 A1 | 6/2017 | Buller et al. |
| 2017/0165792 A1 | 6/2017 | Buller et al. |
| 2017/0189963 A1 | 7/2017 | Buller et al. |
| 2017/0216917 A1 | 8/2017 | Zhang et al. |
| 2017/0217095 A1 | 8/2017 | Buller et al. |
| 2017/0225198 A1 | 8/2017 | Nevarez et al. |
| 2017/0232515 A1 | 8/2017 | Demuth et al. |
| 2017/0239719 A1 | 8/2017 | Buller et al. |
| 2017/0239720 A1 | 8/2017 | Levin et al. |
| 2017/0239721 A1 | 8/2017 | Buller et al. |
| 2017/0239752 A1 | 8/2017 | Buller et al. |
| 2017/0239891 A1 | 8/2017 | Buller et al. |
| 2017/0239892 A1 | 8/2017 | Buller et al. |
| 2017/0246810 A1 | 8/2017 | Gold |
| 2017/0252975 A1 | 9/2017 | Park et al. |
| 2017/0259337 A1 | 9/2017 | Furukawa |
| 2017/0259502 A1 | 9/2017 | Chapiro et al. |
| 2017/0259504 A1 | 9/2017 | Lin et al. |
| 2017/0266878 A1 | 9/2017 | Furukawa |
| 2017/0266887 A1 | 9/2017 | Roviaro et al. |
| 2017/0274589 A1 | 9/2017 | Wu et al. |
| 2017/0282245 A1 | 10/2017 | Yasuda et al. |
| 2017/0282294 A1 | 10/2017 | Uchida |
| 2017/0291372 A1 | 10/2017 | Milshtein et al. |
| 2017/0297110 A1 | 10/2017 | Echigo et al. |
| 2017/0304894 A1 | 10/2017 | Buller |
| 2017/0304944 A1 | 10/2017 | Symeonidis et al. |
| 2017/0305140 A1 | 10/2017 | Wüst |
| 2017/0320265 A1 | 11/2017 | Baumann et al. |
| 2017/0333994 A1 | 11/2017 | Schmitt et al. |
| 2017/0334024 A1 | 11/2017 | Buller et al. |
| 2017/0341143 A1 | 11/2017 | Abe et al. |
| 2017/0341183 A1 | 11/2017 | Buller et al. |
| 2017/0341299 A1 | 11/2017 | Kniola et al. |
| 2017/0341307 A1 | 11/2017 | Vilajosana et al. |
| 2017/0348771 A1 | 12/2017 | Kawada et al. |
| 2017/0355146 A1 | 12/2017 | Buller et al. |
| 2017/0355147 A1 | 12/2017 | Buller et al. |
| 2018/0001553 A1 | 1/2018 | Buller et al. |
| 2018/0001556 A1 | 1/2018 | Buller et al. |
| 2018/0001557 A1 | 1/2018 | Buller et al. |
| 2018/0015670 A1 | 1/2018 | Gu et al. |
| 2018/0021855 A1 | 1/2018 | De Lajudie et al. |
| 2018/0093416 A1 | 4/2018 | Prexler et al. |
| 2018/0099454 A1 | 4/2018 | Hümmeler et al. |
| 2018/0104892 A1 | 4/2018 | Herzog et al. |
| 2018/0111320 A1 | 4/2018 | Zhao et al. |
| 2018/0126629 A1 | 5/2018 | Staal et al. |
| 2018/0133635 A1 | 5/2018 | Hofmann et al. |
| 2018/0178286 A1 | 6/2018 | Martin et al. |
| 2018/0185915 A1 | 7/2018 | Beauchamp |
| 2018/0185961 A1 | 7/2018 | Meidani et al. |
| 2018/0186079 A1 | 7/2018 | Vilajosana et al. |
| 2018/0207721 A1 | 7/2018 | Schlick et al. |
| 2018/0236550 A1 | 8/2018 | Herzog et al. |
| 2018/0244034 A1 | 8/2018 | Sutcliffe et al. |
| 2018/0250744 A1 | 9/2018 | Symeonidis et al. |
| 2018/0250745 A1 | 9/2018 | Spink et al. |
| 2018/0250746 A1 | 9/2018 | Symeonidis et al. |
| 2018/0250771 A1 | 9/2018 | Brown et al. |
| 2018/0250772 A1 | 9/2018 | Symeonidis et al. |
| 2018/0250773 A1 | 9/2018 | Symeonidis et al. |
| 2018/0250774 A1 | 9/2018 | Symeonidis et al. |
| 2018/0250775 A1 | 9/2018 | Spink et al. |
| 2018/0281067 A1 | 10/2018 | Small et al. |
| 2018/0281236 A1 | 10/2018 | Elgar et al. |
| 2018/0281237 A1 | 10/2018 | Frechman et al. |
| 2018/0281282 A1 | 10/2018 | Elgar et al. |
| 2018/0281283 A1 | 10/2018 | Frechman et al. |
| 2018/0281284 A1 | 10/2018 | Elgar et al. |
| 2018/0319150 A1 | 11/2018 | Buller et al. |
| 2019/0022944 A1 | 1/2019 | Döhler et al. |

FOREIGN PATENT DOCUMENTS

| | | |
|---|---|---|
| CN | 103392153 A | 11/2013 |
| CN | 103561891 A | 2/2014 |
| CN | 103611934 A | 3/2014 |
| CN | 103612393 A | 3/2014 |
| CN | 103629198 A | 3/2014 |
| CN | 103676588 A | 3/2014 |
| CN | 105904729 A | 8/2016 |
| CN | 105921747 A | 9/2016 |
| DE | 19939616 A1 | 3/2001 |
| DE | 102004061836 A1 | 7/2006 |
| DE | 102007029142 A1 | 1/2009 |
| DE | 102009036153 A1 | 2/2011 |
| DE | 102010048335 A1 | 4/2012 |
| DE | 202013009787 U1 | 12/2013 |
| DE | 102013208651 A1 | 11/2014 |
| DE | 102014000022 A1 | 7/2015 |
| DE | 102014204528 A1 | 9/2015 |
| EP | 0296818 B1 | 4/1993 |
| EP | 1466718 A2 | 10/2004 |
| EP | 1622086 B1 | 9/2008 |
| EP | 1992709 A1 | 11/2008 |
| EP | 2277687 A1 | 1/2011 |
| EP | 2361704 A1 | 8/2011 |

(56) References Cited

FOREIGN PATENT DOCUMENTS

| | | |
|---|---|---|
| EP | 2522446 A1 | 11/2012 |
| EP | 2583773 A2 | 4/2013 |
| EP | 2620241 A1 | 7/2013 |
| EP | 2789413 A1 | 10/2014 |
| EP | 2832473 A1 | 2/2015 |
| EP | 2832474 A1 | 2/2015 |
| EP | 2873751 A1 | 5/2015 |
| EP | 2992942 A1 | 3/2016 |
| EP | 3127635 A1 | 2/2017 |
| EP | 3208077 A1 | 8/2017 |
| EP | 3263316 A1 | 1/2018 |
| JP | 2001009921 A | 1/2001 |
| JP | 2003502184 A | 1/2003 |
| JP | 2003245981 A | 9/2003 |
| JP | 2004143581 A | 5/2004 |
| JP | 2006150977 A | 6/2006 |
| JP | 2008291318 A | 12/2008 |
| JP | 2008302607 A | 12/2008 |
| JP | 2009001900 A | 1/2009 |
| JP | 2009512579 A | 3/2009 |
| JP | 2012502178 A | 1/2012 |
| JP | 2012213971 A | 11/2012 |
| JP | 2014227587 A | 12/2014 |
| KR | 20160059726 A | 5/2016 |
| KR | 20160076708 A | 7/2016 |
| NO | 317085 B1 | 8/2004 |
| SE | 524467 C2 | 8/2004 |
| WO | WO-9208592 A1 | 5/1992 |
| WO | WO-9511100 A1 | 4/1995 |
| WO | WO-9711837 A1 | 4/1997 |
| WO | WO-9828124 A2 | 7/1998 |
| WO | WO-9933641 A1 | 7/1999 |
| WO | WO-0102160 A1 | 1/2001 |
| WO | WO-0177988 A2 | 10/2001 |
| WO | WO-2004037469 A1 | 5/2004 |
| WO | WO-2006066939 A1 | 6/2006 |
| WO | WO-2008028443 A2 | 3/2008 |
| WO | WO-2008049384 A1 | 5/2008 |
| WO | WO-2008064620 A1 | 6/2008 |
| WO | WO-2008067496 A2 | 6/2008 |
| WO | WO-2008074287 A1 | 6/2008 |
| WO | WO-2008096105 A1 | 8/2008 |
| WO | WO-2008128502 A2 | 10/2008 |
| WO | WO-2009015619 A2 | 2/2009 |
| WO | WO-2009096750 A1 | 8/2009 |
| WO | WO-2010026396 A2 | 3/2010 |
| WO | WO-2013092997 A1 | 6/2013 |
| WO | WO-2013160188 A1 | 10/2013 |
| WO | WO-2013167903 A1 | 11/2013 |
| WO | WO-2013178825 A2 | 12/2013 |
| WO | WO-2013179017 A1 | 12/2013 |
| WO | WO-2013189473 A1 | 12/2013 |
| WO | WO-2014023657 A1 | 2/2014 |
| WO | WO-2014042970 A1 | 3/2014 |
| WO | WO-2014044589 A1 | 3/2014 |
| WO | WO-2014049159 A1 | 4/2014 |
| WO | WO-2014083292 A1 | 6/2014 |
| WO | WO-2014118783 A1 | 8/2014 |
| WO | WO-2014120991 A1 | 8/2014 |
| WO | WO-2014135136 A1 | 9/2014 |
| WO | WO-2014144255 A2 | 9/2014 |
| WO | WO-2014144482 A1 | 9/2014 |
| WO | WO-2014144630 A1 | 9/2014 |
| WO | WO-2014193406 A1 | 12/2014 |
| WO | WO-2015023612 A2 | 2/2015 |
| WO | WO-2015025171 A2 | 2/2015 |
| WO | WO-2015034362 A1 | 3/2015 |
| WO | WO-2015040433 A2 | 3/2015 |
| WO | WO-2015053946 A1 | 4/2015 |
| WO | WO-2015082677 A1 | 6/2015 |
| WO | WO-2015176709 A1 | 11/2015 |
| WO | WO-2015196149 A1 | 12/2015 |
| WO | WO-2016026852 A1 | 2/2016 |
| WO | WO-2016026853 A1 | 2/2016 |
| WO | WO-2016055523 A1 | 4/2016 |
| WO | WO-2016075025 A1 | 5/2016 |
| WO | WO-2016075026 A1 | 5/2016 |
| WO | WO-2016077250 A1 | 5/2016 |
| WO | WO-2016094827 A1 | 6/2016 |
| WO | WO-2016113253 A1 | 7/2016 |
| WO | WO-2016169768 A1 | 10/2016 |
| WO | WO-2016196223 A1 | 12/2016 |
| WO | WO-2016196382 A1 | 12/2016 |
| WO | WO-2017011456 A1 | 1/2017 |
| WO | WO-2017015217 A2 | 1/2017 |
| WO | WO-2017054842 A1 | 4/2017 |
| WO | WO-2017079091 A1 | 5/2017 |
| WO | WO-2017100695 A1 | 6/2017 |
| WO | WO-2017143077 A1 | 8/2017 |
| WO | WO-2017179001 A1 | 10/2017 |
| WO | WO-2018005439 | 1/2018 |
| WO | WO-2018064349 A1 | 4/2018 |
| WO | WO-2018075741 A1 | 4/2018 |
| WO | WO-2018106586 A1 | 6/2018 |
| WO | WO-2018128695 A2 | 7/2018 |
| WO | WO-2018129089 A1 | 7/2018 |
| WO | WO-2018160807 A1 | 9/2018 |
| WO | WO-2018183396 A1 | 10/2018 |

OTHER PUBLICATIONS

Bayerlein et al. Validation of modeling assumptions for the buildup simulation of laser beam melting on the basis of the residual stress distribution. Proceedings of ECCOMAS Congress 2016: VII European Congress on Computational Methods in Applied Sciences and Engineering. Crete Island, Greece, Jun. 5, 2016-Jun. 10, 2016. 11 pages.
Bonnet, M. Advances in the Design of Pneumatic Conveyors. International Chemical Engineering, vol. 25, No. 3, Jul. 1985, pp. 387-405.
Co-pending U.S. Appl. No. 16/030,795, filed Jul. 9, 2018.
Co-pending U.S. Appl. No. 16/031,896, filed Jul. 10, 2018.
DE Dietrich Process Systems, Inc. Powder Pump™. Product Brochure. Created Jul. 3, 2012. 2 pages.
Gordon et al. Single-pixel phase-corrected fiber bundle endomicroscopy with lensless focussing capability. J Lightwave Technol. Author manuscript; available in PMC Jun. 6, 2016. Published in final edited form as: J Lightwave Technol. Aug. 15, 2015; 33(16): 3419-3425.
PCT/US2017/064474 International Search Report and Written Opinion dated Apr. 30, 2018.
PCT/US2018/012250 International Search Report and Written Opinion dated Apr. 30, 2018.
RP Photonics Consulting GmbH. Definition of "Optical Intensity". Encyclopedia of Laser Physics and Technology. Jun. 2012. 3 pages. URL:<https://www.rp-photonics.com/optical_intensity.html>.
U.S. Appl. No. 15/339,712 Notice of Allowance dated Jul. 10, 2018.
U.S. Appl. No. 15/339,712 Notice of Allowance dated Jun. 18, 2018.
U.S. Appl. No. 15/339,712 Notice of Allowance dated May 23, 2018.
U.S. Appl. No. 15/339,712 Office Action dated Jan. 10, 2018.
U.S. Appl. No. 15/374,442 Office Action dated May 21, 2018.
U.S. Appl. No. 15/435,090 Office Action dated May 18, 2018.
U.S. Appl. No. 15/614,979 Office Action dated Jun. 8, 2018.
U.S. Appl. No. 15/615,004 Office Action dated Jun. 8, 2018.
U.S. Appl. No. 15/634,228 Office Action dated Jun. 14, 2018.
U.S. Appl. No. 15/634,727 Office Action dated May 25, 2018.
U.S. Appl. No. 15/719,084 Office Action dated Jul. 12, 2018.
U.S. Appl. No. 15/830,470 Office Action dated Jul. 5, 2018.
U.S. Appl. No. 15/870,561 Office Action dated Jun. 15, 2018.
U.S. Appl. No. 15/893,523 Notice of Allowance dated Jun. 15, 2018.
U.S. Appl. No. 15/893,523 Notice of Allowance dated May 7, 2018.
U.S. Appl. No. 15/909,784 Office Action dated Jul. 13, 2018.
U.S. Appl. No. 15/909,826 Office Action dated May 2, 2018.
Xu et al. In situ tailoring microstructure in additively manufactured Ti—6Al—4V for superior mechanical performance. Acta Materialia. vol. 125, Feb. 15, 2017, pp. 390-400.
Co-pending U.S. Appl. No. 16/125,644, filed Sep. 7, 2018.

(56) References Cited

OTHER PUBLICATIONS

Co-pending U.S. Appl. No. 16/137,295, filed Sep. 20, 2018.
EP15809160.3 European Search Report dated Aug. 7, 2018.
EP15866668.5 European Search Report dated Aug. 7, 2018.
Kant et al. An integrated FEM-ANN model for laser bending process with inverse estimation of absorptivity. Mechanics of Advanced Materials and Modern Processes. Dec. 2015, 1:6.
PCT/US2017/060035 International Search Report and Written Opinion dated Jul. 20, 2018.
PCT/US2018/020406 International Search Report and Written Opinion dated Jun. 28, 2018.
PCT/US2018/024667 International Search Report and Written Opinion dated Jul. 17, 2018.
Bondhus. Crystals, grains, and cooling. Web article. Copyright © 2009 Bondhus Corp. First published Feb. 10, 2005. Accessed Jul. 13, 2016. Printed on Jul. 30, 2018. 1 page. URL:< http://bondhus.com/metallurgy/body-3.htm>.
U.S. Appl. No. 15/374,535 Notice of Allowance dated Sep. 24, 2018.
U.S. Appl. No. 15/374,616 Office Action dated Aug. 15, 2018.
U.S. Appl. No. 15/399,186 Notice of Allowance dated Sep. 17, 2018.
U.S. Appl. No. 15/435,065 Office Action dated Aug. 16, 2018.
U.S. Appl. No. 15/435,078 Office Action dated Aug. 16, 2018.
U.S. Appl. No. 15/634,267 Office Action dated Sep. 6, 2018.
U.S. Appl. No. 15/634,727 Office Action dated Sep. 20, 2018.
U.S. Appl. No. 15/719,133 Office Action dated Sep. 24, 2018.
U.S. Appl. No. 15/803,688 Office Action dated Sep. 20, 2018.
U.S. Appl. No. 15/830,421 Office Action dated Jul. 26, 2018.
U.S. Appl. No. 15/853,700 Office Action dated Sep. 11, 2018.
U.S. Appl. No. 15/861,548 Office Action dated Sep. 6, 2018.
U.S. Appl. No. 15/861,553 Office Action dated Aug. 7, 2018.
U.S. Appl. No. 15/871,763 Notice of Allowance dated Aug. 15, 2018.
U.S. Appl. No. 15/871,763 Notice of Allowance dated Sep. 17, 2018.
U.S. Appl. No. 15/886,544 Office Action dated Aug. 27, 2018.
U.S. Appl. No. 15/909,406 Office Action dated Aug. 27, 2018.
U.S. Appl. No. 15/909,806 Office Action dated Aug. 13, 2018.
U.S. Appl. No. 15/909,809 Office Action dated Aug. 10, 2018.
U.S. Appl. No. 15/909,826 Notice of Allowance dated Aug. 30, 2018.
U.S. Appl. No. 15/937,778 Office Action dated Sep. 21, 2018.
U.S. Appl. No. 15/937,790 Office Action dated Sep. 25, 2018.
U.S. Appl. No. 15/937,812 Office Action dated Sep. 7, 2018.
U.S. Appl. No. 15/435,110 Notice of Allowance dated Sep. 25, 2018.
Bremen et al. Selective Laser Melting. Laser Technik Journal. vol. 9, No. 2, Apr. 2012. 6 pages.
Calvert, Jack G. Glossary of Atmospheric Chemistry Terms (Recommendations 1990). Pure & Appl. Chem., vol. 62, No. 11, Jan. 1, 1990, pp. 2167-2219.
Co-pending U.S. Appl. No. 16/177,090, filed Oct. 31, 2018.
Co-pending U.S. Appl. No. 16/183,557, filed Nov. 7, 2018.
Co-pending U.S. Appl. No. 16/195,810, filed Nov. 19, 2018.
Das et al. Producing metal parts with selective laser sintering/hot isostatic pressing. JOM; Dec. 1998, vol. 50, Issue 12, pp. 17-20.
*Formlabs* v. *DWS*. Civil Action filed on Jun. 29, 2018 in the United States Court for the Eastern District of Virginia. Case No. 1:18-cv-00810-CMH-IDD. 13 pages.
IUPAC. "Inert gas". IUPAC Compendium of Chemical Terminology. Published Feb. 24, 2014.<http://goldbook.iupac.org/html/l/103027.html.
U.S. Appl. No. 15/374,442 Notice of Allowance dated Oct. 3, 2018.
U.S. Appl. No. 15/490,219 Office Action dated Oct. 12, 2018.
U.S. Appl. No. 15/614,979 Office Action dated Nov. 5, 2018.
U.S. Appl. No. 15/615,004 Office Action dated Oct. 30, 2018.
U.S. Appl. No. 15/634,228 Notice of Allowance dated Nov. 5, 2018.
U.S. Appl. No. 15/634,666 Office Action dated Oct. 18, 2018.
U.S. Appl. No. 15/719,229 Office Action dated Oct. 5, 2018.
U.S. Appl. No. 15/788,495 Office Action dated Oct. 3, 2018.
U.S. Appl. No. 15/830,421 Office Action dated Nov. 13, 2018.
U.S. Appl. No. 15/855,744 Office Action dated Nov. 19, 2018.
U.S. Appl. No. 15/861,553 Office Action dated Dec. 14, 2018.
U.S. Appl. No. 15/870,561 Office Action dated Nov. 19, 2018.
U.S. Appl. No. 15/871,763 Notice of Allowance dated Nov. 5, 2018.
U.S. Appl. No. 15/909,388 Office Action dated Dec. 14, 2018.
U.S. Appl. No. 15/937,798 Office Action dated Oct. 26, 2018.
U.S. Appl. No. 15/937,817 Office Action dated Nov. 23, 2018.
Ryan et al. Fabrication methods of porous metals for use in orthopaedic applications. Biomaterials. May 2006; vol. 27, Issue 13, pp. 2651-2670.
Anusci, Victor. Aerosint Is Developing the First Commercial Multi-powder SLS 3D Printer. 3D Printing Media Network. Web. Published Jan. 28, 2018. 4 pages. URL:<https://www.3dprintingmedia.network/aerosint-multi-powder-sls-3d-printer/>.
Arnet, et al. Extending Laser Bending for the Generation of Convex Shapes. Proc. Instn. Mech. Engrs., vol. 209, pp. 433-442.
Ashby, Mike. Teach Yourself: Phase Diagrams and Phase Transformations. 5th Edition, Mar. 2009, Cambridge. 55 pages.
Co-pending U.S. Appl. No. 15/808,434, filed Nov. 9, 2017.
Co-pending U.S. Appl. No. 15/808,777, filed Nov. 9, 2017.
Co-pending U.S. Appl. No. 15/855,744, filed Dec. 27, 2017.
Co-pending U.S. Appl. No. 15/871,763, filed Jan. 15, 2018.
Co-pending U.S. Appl. No. 15/886,544, filed Feb. 1, 2018.
Co-pending U.S. Appl. No. 15/893,523, filed Feb. 9, 2018.
David et al. Welding: Solidification and microstructure. The Journal of the Minerals, Metals & Materials Society (TMS). Jun. 2003, vol. 55, Issue 6, pp. 14-20.
Doxygen. CGAL 4.11.1—Kinetic Data Structures. User Manual. Web. Published Apr. 8, 2006. 4 pages. URL:<https://doc.cgal.org/latest/Manual/how_to_cite_cgal.html>.
Gaudin, Sharon. Researcher works to make 3D-printed metals stronger, customizable. Oct. 2014. Accessed online on Mar. 22, 2018. 4 pages. URL:<https://www.computerworld.com/article/2838780/researcher-works-to-make-3d-printed-materials-stronger-customizable.html>.
Geiger, et al. The Mechanisms of Laser Forming. Annals of the CIRP, vol. 42, Jan. 1993, pp. 301-304.
Gibson, et al. Additive Manufacturing Technologies. Springer 2010. 472 pages.
Gibson, et al. Additive Manufacturing Technologies, Springer 2010, ISBN978-1-4419-1119-3 (Print 978-1-4419-1120-9 (Online). Published: Dec. 14, 2009. 472 pages. pp. 27-31, 98-99, 264-267, 295, 382-383.
Hu, et al. Computer simulation and experimental investigation of sheet metal bending using laser beam scanning. International Journal of Machine Tools and Manufacture, 41, Mar. 2001, pp. 589-607.
Hu, et al. Experimental and numerical modeling of buckling instability of laser sheet forming. International Journal of Machine Tools & Manufacture, 42 (2002) pp. 1427-1439.
integrativemodeling.org. IMP, the Integrative Modeling Platform. Web. Published Jul. 26, 2013.1 page. URL:<https://integrativemodeling.org/>.
International Search Report and Written Opinion dated Feb. 12, 2018 for International PCT Patent Application No. PCT/US2017/057340.
International Search Report and Written Opinion dated Sep. 20, 2016 for International PCT Patent Application No. PCT/US2016/034454.
Kumar. Powder deposition and sintering for a two-powder approach to solid freeform fabrication. Department of Mechanical Engineering, University of Florida. Aug. 1998; 169-173.
Maji, et al. Finite Element Analysis and Experimental Investigations on Laser Bending of AISI304 Stainless Steel Sheet. Procedia Engineering 64 (2013) pp. 528-535.
Mumatz, et al. A Method to Eliminate Anchors/Supports from Directly Laser Melted Metal Powder Bed Processes. Aug. 2011, Additive Manufacturing Research Group, Wolfson School of Mechanical Engineering, Loughborough University, pp. 55-64.
Notice of Allowance dated Feb. 6, 2018 for U.S. Appl. No. 15/374,821.

(56) References Cited

OTHER PUBLICATIONS

Notice of Allowance dated Feb. 16, 2018 for U.S. Appl. No. 15/435,120.
Notice of Allowance dated Feb. 21, 2018 for U.S. Appl. No. 15/435,128.
Notice of Allowance dated Feb. 28, 2018 for U.S. Appl. No. 15/374,821.
Office Action dated Jan. 24, 2018 for U.S. Appl. No. 15/615,004.
Office Action dated Jan. 25, 2018 for U.S. Appl. No. 15/634,727.
Office Action dated Feb. 7, 2018 for U.S. Appl. No. 15/614,979.
Office Action dated Feb. 7, 2018 for U.S. Appl. No. 15/719,229.
Office Action dated Feb. 14, 2018 for U.S. Appl. No. 15/634,228.
Office Action dated Mar. 7, 2017 for U.S. Appl. No. 15/399,712.
Office Action dated Mar. 7, 2018 for U.S. Appl. No. 15/399,186.
Sandvik Materials Technology website. Accessed Nov. 14, 2014. http://www.smt.sandvik.com/en/products/metal-powder/additive-manufacturing/.
Shen, et al. An analytical model for estimating deformation in laser forming. Computational Materials Science, 37 (2006) pp. 593-598.
Shen, et al. Modelling of laser forming—An review. Computational Materials Science 46 (2009) pp. 834-840.
Symeonidis, Kimon. The Controlled Diffusion Solidification Process: Fundamentals and Principles. Ph.D. Thesis. Worcester Polytechnic Institute. Apr. 2009. 137 pages.
Thorlabs, Inc. Fiber Optic Reflection/Backscatter Probe Bundles. Web. Copyright 1999-2018. Printed Mar. 28, 2018. 5 pages. URL:< https://www.thorlabs.com/newgrouppage9.cfm?objectgroup_id=7794>.
U.S. Appl. No. 15/374,616 Office Action dated Mar. 26, 2018.
U.S. Appl. No. 15/374,821 Notice of Allowance dated Apr. 4, 2018.
U.S. Appl. No. 15/634,267 Office Action dated Apr. 3, 2018.
U.S. Appl. No. 15/719,133 Office Action dated Mar. 28, 2018.
U.S. Appl. No. 15/853,700 Office Action dated Apr. 6, 2018.
U.S. Appl. No. 15/871,763 Office Action dated Apr. 19, 2018.
U.S. Appl. No. 15/374,318 Notice of Allowance dated Apr. 20, 2018.
U.S. Appl. No. 15/374,535 Office Action dated Apr. 20, 2018.
U.S. Appl. No. 15/435,110 Office Action dated Apr. 19, 2018.
U.S. Appl. No. 15/855,744 Office Action dated Apr. 27, 2018.
Wang et al. Effects of thermal cycles on the microstructure evolution of Inconel 718 during selective laser melting process. Additive Manufacturing. vol. 18, Dec. 2017, pp. 1-14.
Adam, et al. Design for additive manufacturing—element transitions and aggregated structures. CIRP Journal of Manufacturing Science and Technology. Nov. 2014; 7:20-28.
Additive Manufacturing Research Group. Loughborough University. Accessed Jul. 29, 2015. 7 pages. http://www.lboro.ac.uk/research/amrg/about/the7categoriesofadditivemanufacturing/powderbedfusion/.
Arcam AB (ARCM.ST) (AMAVF). Powder Removal from 3D Structures. Posted Thursday, Apr. 23, 2015 11:23:59 AM. 4 pages. http://investorshub.advfn.com/boards/read_msg.aspx?message_id=113029094.
Arcam EBM at Sirris Belgium. Uploaded Jun. 17, 2010. 2 pages. https://www.youtube.com/watch?v=nR7EtduqVYw&list=PLD7ckJoR_kR6ua0GOMlyJlmpCKh342iLl.
Cheng, et al. Thermal Stresses Associated with Part Overhang Geometry in Electron Beam Additive Manufacturing: Process Parameter Effects. 25th Annual International Solid Freeform Fabrication Symposium—An Additive Manufacturing Conference, Austin, TX, USA. Aug. 4-6, 2014. 1076-1087.
Childs, et al. Raster scan of selective laser melting of the surface layer of a tool steel powder bed. Proc. IMechE. Jan. 26, 2005; vol. 219, Part B, pp. 379-384.
Childs, et al. Selective laser sintering (melting) of stainless and tool steel powders: experimental modelling. Proc. IMechE. 2005, Published Oct. 18, 2004; vol. 219 Part B, J. Engineering Manufacture, pp. 338-357.
Chivel, et al. On-line temperature monitoring in selective laser sintering/melting. Physics Procedia. Dec. 31, 2010; (5):515-521.
Cloots, et al. Assessing new support minimizing strategies for the additive manufacturing technology SLM. Aug. 16, 2013. sffsymposium.engr.utexas.edu/Manuscripts/2013/2013-50-Cloots.pdf. 13 pages.
Co-pending U.S. Appl. No. 15/634,666, filed Jun. 27, 2017.
Co-pending U.S. Appl. No. 15/719,084, filed Sep. 28, 2017.
Co-pending U.S. Appl. No. 15/719,133, filed Sep. 28, 2017.
Co-pending U.S. Appl. No. 15/719,229, filed Sep. 28, 2017.
Co-pending U.S. Appl. No. 15/788,364, filed Oct. 19, 2017.
Co-pending U.S. Appl. No. 15/788,418, filed Oct. 19, 2017.
Co-pending U.S. Appl. No. 15/788,463, filed Oct. 19, 2017.
Co-pending U.S. Appl. No. 15/788,495, filed Oct. 19, 2017.
Co-pending U.S. Appl. No. 15/788,532, filed Oct. 19, 2017.
Co-pending U.S. Appl. No. 15/788,568, filed Oct. 19, 2017.
Co-pending U.S. Appl. No. 15/788,662, filed Oct. 19, 2017.
Co-pending U.S. Appl. No. 15/803,675, filed Nov. 3, 2017.
Co-pending U.S. Appl. No. 15/803,683, filed Nov. 3, 2017.
Co-pending U.S. Appl. No. 15/803,688, filed Nov. 3, 2017.
Co-pending U.S. Appl. No. 15/803,692, filed Nov. 3, 2017.
Co-pending U.S. Appl. No. 15/830,421, filed Dec. 4, 2017.
Co-pending U.S. Appl. No. 15/830,470, filed Dec. 4, 2017.
Co-pending U.S. Appl. No. 15/853,700, filed Dec. 22, 2017.
Co-pending U.S. Appl. No. 15/861,544, filed Jan. 3, 2018.
Co-pending U.S. Appl. No. 15/861,548, filed Jan. 3, 2018.
Co-pending U.S. Appl. No. 15/861,553, filed Jan. 3, 2018.
Co-pending U.S. Appl. No. 15/861,561, filed Jan. 3, 2018.
Co-pending U.S. Appl. No. 15/870,561, filed Jan. 12, 2018.
Co-pending U.S. Appl. No. 15/873,832, filed Jan. 17, 2018.
Craeghs, et al. Feedback control of layerwise laser melting using optical sensors. Physics Procedia. Dec. 2010; 5:505-514.
Criales, et al. Laser material processing methods: micromachining, laser exfoliation and selective laser melting: prediction modeling of temperature field and melt pool size using finite element modeling of selective laser melting for inconel 625. Atilim University. Metal Forming Center of Excellence, Ankara, Turkey. Nov. 14, 2014. 77 pages.
Dahotre et al. Laser Fabrication and Machining of Materials. Springer. 2008. 561 pages. DOI: 10.1007/978-0-387-72344-0.
Direct Manufacturing: ARCAM. Uploaded on Jun. 6, 2011. 2 pages. https://www.youtube.com/watch?v=M_qSnjKN7f8.
EOS. Direct Metal Laser Sintering Published Aug. 22, 2012. https://www.youtube.com/watch?v=cRE-Pzl6uZA
European Search Report and Search Opinion dated Nov. 30, 2017 for European Patent Application No. EP17178143.8.
Ex Parte Quayle Action dated Apr. 19, 2017 for U.S. Appl. No. 15/374,821.
Extended European Search Report dated Jul. 7, 2017 for European Patent Application No. EP17156707.6.
Ghosh, et al. Selective Laser Sintering: A Case Study of Tungsten Carbide and Cobalt Powder Sintering by Pulsed Nd:YAG Laser. Lasers Based Manufacturing, Dec. 2014, pp. 441-458.
Gibson, et al. Additive Manufacturing Technologies, Springer 2010, Chapter 5, pp. 103-142. ISBN978-1-4419-1119-3 (Print978-1-4419-1120-9 (Online). Published: Dec. 14, 2009.
Gibson, et al. Additive Manufacturing Technologies, Springer 2015. Chapter 5, pp. 107-145. ISBN 978-1-4939-2113-3 (978-1-4939-2112-6; 978-1-4939-2113-3); DOI 10.1007/978-1-4939-2113-3. Published: Nov. 27, 2014.
Hauser, et al. Further Developments in Process Mapping and modelling in direct metal selective laser melting. Aug. 2004, 15th solid Free Form Fabrication Proceedings. Austin, Texas, pp. 448-459.
Hussein. The development of Lightweight Cellular Structures for Metal Additive Manufacturing. Nov. 2013, thesis of University of Exeter, pp. 1-228.
International Search Report and Written Opinion dated Jan. 9, 2018 for International PCT Patent Application No. PCT/US2017/054043.
International Search Report and Written Opinion dated Jan. 16, 2017 for International PCT Patent Application No. PCT/US2016/059781.
International Search Report and Written Opinion dated Feb. 14, 2017 for International PCT Patent Application No. PCT/US2016/042818.

(56) References Cited

OTHER PUBLICATIONS

International Search Report and Written Opinion dated Feb. 19, 2016 for International PCT Patent Application No. PCT/US2015/059790.
International Search Report and Written Opinion dated Apr. 5, 2017 for International PCT Patent Application No. PCT/US2016/066000.
International search report and written opinion dated Apr. 11, 2016 for PCT/US2015/065297.
International Search Report and Written Opinion dated May 18, 2017 for International PCT Patent Application No. PCT/US2017/018191.
International Search Report and Written Opinion dated Aug. 30, 2017 for International PCT Patent Application No. PCT/US2017/039422.
International search report and written opinion dated Sep. 20, 2016 for PCT/US2016/034454.
International Search Report and Written Opinion dated Oct. 18, 2016 for International PCT Patent Application No. PCT/US2016/041895.
International search report and written opinion dated Oct. 30, 2015 for PCT Application No. PCT/US2015/036802.
International search report and written opinion dated Sep. 13, 2016 for PCT Application No. US-2016034857.
Kannatey-Asibu Jr, Elijah. Principles of laser materials processing. John Wiley & Sons, 2009, Chapter 10, pp. 231-405. Published: Apr. 20, 2009.
Kannatey-Asibu Jr, Elijah. Principles of laser materials processing. John Wiley & Sons, 2009, Chapter 16, pp. 502-668. Published: Apr. 20, 2009.
Kruth, et al. Feedback control of selective laser melting. Proceedings of the 3rd International Conference on Advanced Research in Virtual and Rapid Prototyping, Leiria, Portugal, Sep. 2007. 521-527.
Kruth, et al. Selective laser melting of iron-based power. Journal of Materials Processing Technology. Nov. 2004; 149:616-622.
Kumar. Development of an electrophotographic-based layered manufacturing test bed. Project proposal. Department of Mechanical Engineering, University of Florida. 2009. http://www.cis.rit.edu/microgrants/2008/Esterman_proposal.pdf (accessed on Jun. 29, 2015).
Kumar, et al. Designing and slicing heterogenous components for rapid prototyping. Department of Mechanical Engineering, University of Florida. Aug. 2000; 428-436.
Kumar, et al. Electrophotographic Layered Manufacturing. J. Manuf. Sci. Eng 126(3), 571-576 (Sep. 7, 2004) (6 pages) doi:10.1115/1.1765146.
Kumar, et al. Electrophotographic powder deposition for freeform fabrication. Department of Mechanical Engineering, University of Florida. Aug. 1999; 647-654.
Kumar, et al. Electrophotographic printing of part and binder powders. Rapid Prototyping Journal. Jul. 2004; 10(1):7-13.
Kumar, et al. Layered Manufacturing by Electrophotographic Printing. ASME 2003 International Design Engineering Technical Conferences and Computers and Information in Engineering Conference. vol. 2: 29th Design Automation Conference, Parts A and B. Chicago, Illinois, USA, Sep. 2-6, 2003. Paper No. DETC2003/DAC-48724, pp. 205-211; 7 pages.
Kumar, et al. Solid freeform fabrication by electrophotographic printing. Department of Mechanical and Aerospace Engineering, University of Florida. Aug. 2003; 39-49.
Laser Engineered Net Shaping (LENS) 850-R system overview. System features and example application video clips. Published Jun. 3, 2012. https://www.youtube.com/watch?v=mkUVURLkxS4.
Leirvag. Additive Manufacturing for Large Products. Feb. 2013, thesis. Norwegian University of Science and Technology.
Lyckfeldt. Powder rheology of steel powders for additive manufacturing. Swerea IVF. Oct. 24, 2013.
Manfredi, et al. From Powders to Dense Metal Parts: Characterization of a Commercial AlSiMg Alloy Processed through Direct Metal Laser Sintering. Mar. 2013, Materials, vol. 6, pp. 856-869.
Manzhirov, et al. Mathematical Modeling of Additive Manufacturing Technologies. Proc. of the World Congress of Engineering 2014, vol. II. WCE 2014, Jul. 2-4, 2014, London, U.K. 6 pages.
Merriam-Webster. Definition of "reservoir". Retrieved Dec. 21, 2017. 13 pages. URL:< https://merriam-webster.com/dictionary/reservoir>.
Mertens, et al. Optimization fo scan strategies in selective laser melting of aluminum parts with downfacing areas. Journal of Manufacturing Science and Technology. Dec. 2014; 136:061012-1-7.
Morgan, et al. Experimental investigation of nanosecond pulsed Nd:YAG laser re-melted pre-placed powder beds. Rapid Prototyping Journal, Aug. 1, 2001, vol. 7 Issue: 3, pp. 159-172, doi: 10.1108/13552540110395565.
Moridi, et al. Cold spray coating: review of material systems and future perspectives. Surface engineering. Jun. 2014; 36(6):36-395.
Mumtaz, et al. A method to eliminate anchors/supports from directly laser melted metal powder bed processes. Additive Manufacturing Research Group, Wolfson School of Mechanical Engineering, Loughborough University. Reviewed Aug. 17, 2011. 10 pages.
NETFABB—Professional 5.2, User Manual, Netfabb GmbH 2014, Version: Jul. 29, 2014, Chapter 6: sections 6.1, 6.3, Chapter 7: section 7.7, Chapter 9: section 9.6.
Notice of Allowability dated Oct. 17, 2017 for U.S. Appl. No. 14/744,910.
Notice of allowance dated Jan. 5, 2017 for U.S. Appl. No. 15/085,884.
Notice of Allowance dated Jan. 12, 2018 for U.S. Appl. No. 15/435,128.
Notice of allowance dated Mar. 1, 2016 for U.S. Appl. No. 14/745,108.
Notice of Allowance dated Mar. 16, 2017 for U.S. Appl. No. 15/339,775.
Notice of Allowance dated Mar. 20, 2017 for U.S. Appl. No. 15/339,759.
Notice of allowance dated May 11, 2016 for U.S. Appl. No. 14/744,955.
Notice of allowance dated May 25, 2016 for U.S. Appl. No. 14/744,675.
Notice of allowance dated Jun. 20, 2016 for U.S. Appl. No. 14/744,675.
Notice of Allowance dated Aug. 7, 2017 for U.S. Appl. No. 14/744,910.
Notice of allowance dated Aug. 10, 2016 for U.S. Appl. No. 14/967,118.
Notice of allowance dated Sep. 6, 2016 for U.S. Appl. No. 14/745,032.
Notice of allowance dated Sep. 17, 2015 for U.S. Appl. No. 14/745,081.
Notice of allowance dated Sep. 28, 2015 for U.S. Appl. No. 14/745,081.
Notice of allowance dated Nov. 30, 2015 for U.S. Appl. No. 14/745,081.
Notice of Allowance dated Dec. 8, 2017 for U.S. Appl. No. 15/435,128.
Notice of Allowance dated Dec. 9, 2016 for U.S. Appl. No. 15/188,939.
Notice of Allowance dated Dec. 11, 2017 for U.S. Appl. No. 15/435,120.
Notice of allowance dated Dec. 14, 2015 for U.S. Appl. No. 14/745,081.
Notice of allowance dated Dec. 15, 2015 for U.S. Appl. No. 14/745,081.
Notice of Allowance (second) dated Apr. 6, 2017 for U.S. Appl. No. 15/339,759.
Office Action dated Jan. 2, 2018 for U.S. Appl. No. 15/288,251.
Office action dated Jan. 7, 2016 for U.S. Appl. No. 14/744,859.
Office action dated Jan. 11, 2016 for U.S. Appl. No. 14/745,032.
Office Action dated Feb. 7, 2017 for U.S. Appl. No. 14/744,988.
Office Action dated Feb. 8, 2017 for U.S. Appl. No. 14/744,859.
Office action dated Feb. 10, 2016 for U.S. Appl. No. 14/744,910.
Office action dated Feb. 16, 2016 for U.S. Appl. No. 14/744,955.
Office action dated Mar. 4, 2016 for U.S. Appl. No. 14/744,988.
Office Action dated Mar. 6, 2017 for U.S. Appl. No. 14/744,910.
Office action dated Mar. 7, 2017 for U.S. Appl. No. 15/339,712.
Office action dated Mar. 10, 2016 for U.S. Appl. No. 14/744,675.

(56) References Cited

OTHER PUBLICATIONS

Office Action dated Mar. 23, 2017 for U.S. Appl. No. 15/399,186.
Office Action dated Apr. 28, 2017 for U.S. Appl. No. 15/374,616.
Office Action dated Jun. 15, 2017 for U.S. Appl. No. 15/288,251.
Office action dated Jun. 29, 2016 for U.S. Appl. No. 14/744,859.
Office Action dated Jun. 29, 2017 for U.S. Appl. No. 15/435,128.
Office action dated Jul. 1, 2016 for U.S. Appl. No. 14/745,032.
Office Action dated Jul. 3, 2017 for U.S. Appl. No. 15/435,120.
Office action dated Jul. 19, 2016 for U.S. Appl. No. 15/085,884.
Office action dated Jul. 21, 2016 for U.S. Appl. No. 14/744,910.
Office Action dated Jul. 28, 2017 for U.S. Appl. No. 14/744,988.
Office Action dated Aug. 2, 2017 for U.S. Appl. No. 15/435,090.
Office Action dated Aug. 18, 2017 for U.S. Appl. No. 15/374,318.
Office action dated Aug. 25, 2016 for U.S. Appl. No. 14/744,988.
Office Action dated Aug. 25, 2017 for U.S. Appl. No. 15/339,712.
Office action dated Sep. 10, 2015 for U.S. Appl. No. 14/744,675.
Office Action dated Sep. 11, 2017 for U.S. Appl. No. 15/374,821.
Office action dated Sep. 13, 2016 for U.S. Appl. No. 15/188,939.
Office Action dated Sep. 15, 2017 for U.S. Appl. No. 15/374,616.
Office Action dated Sep. 18, 2017 for U.S. Appl. No. 15/634,228.
Office action dated Oct. 2, 2015 for U.S. Appl. No. 14/744,955.
Office Action dated Oct. 19, 2017 for U.S. Appl. No. 15/399,186.
Office action dated Nov. 1, 2016 for U.S. Appl. No. 15/085,884.
Office action dated Nov. 12, 2015 for U.S. Appl. No. 14/745,108.
Office Action dated Nov. 16, 2017 for U.S. Appl. No. 15/634,267.
Office action dated Nov. 18, 2016 for U.S. Appl. No. 15/188,939.
Office action dated Nov. 27, 2017 for U.S. Appl. No. 15/374,318.
Office Action dated Dec. 8, 2017 for U.S. Appl. No. 15/435,090.
Office Action dated Dec. 15, 2017 for U.S. Appl. No. 15/435,110.
Optomec. LENS 850R 3D Printer for Structual Metals. Optomec. YouTube—Web. Published on Jun 3, 2012. 3 pages. URL:< https://www.youtube.com/watch?v=mkUVURLkxS4>.
Papadakis, et al. Numerical computation of component shape distortion manufactured by selective laser melting. Procedia CIRP. Aug. 2014; 18:90-95.
Proto Labs. Direct Metal Laser Sintering (DMLS). Published Sep. 10, 2014. https://www.protolabs.com/additive-manufacturing/direct-metal-laser-sintering 2 pages.
Rhinehart, R.R. §2.13 Control Theory: Mode-Based Control, in Bela G. Liptak, Instrument Engineers' Handbook, vol. 2: Process Control and Optimization, 209-213 (4th ed., CRC Press (part of Taylor & Francis Group), 2006), ISBN-13: 978-0849310812.
Riecker, et al. 3D multi-material metal printing of delicate structures. EuroPM 2014—AM Technologies, http://www.ifam.fraunhofer.de/content/dam/ifam/de/documents/dd/Publikationen/2014/Euro_PM_2014_Riecker_3D%20Multi-Material_Metal_Printing_of_Delicate_Structures_EPMA.pdf (accessed on Jun. 29, 2015).
SCHOTT. TIE-19: Temperature Coefficient of the Refractive Index. Technical Information: Advanced Optics. SCHOTT AG. Jul. 2016. 10 pages.
SCHOTT. TIE-19: Temperature Coefficient of the Refractive Index. Technical Information: Advanced Optics. SCHOTT North America, Inc. Jul. 2008. 12 pages.
Scime et al. Anomaly detection and classification in a laser powder bed additive manufacturing process using a trained computer vision algorithm. Additive Manufacturing. vol. 19, Jan. 2018, pp. 114-126.
Selective Laser Sintering (SLS) Process at Loughborough University. Published May 4, 2015. 2 pages. https://www.youtube.com/watch?v=oO77VKDB89I.
Spears, et al. In-process sensing in selective laser melting (SLM) additive manufacturing. Integrating Materials and Manufacturing Innovation. Feb. 11, 2016; 5:2. DOI: 10.1186/s40192-016-0045-4.
Strano, et al. A new approach to the design and optimisation of support structures in additive manufacturing. Int J Adv Manuf Technol (2013) 66:1247-1254 DOI 10.1007/s00170-012-4403-x. Published online: Aug. 2, 2012.
Stratasys. Direct Manufacturing. Direct Metal Laser Sintering (DMLS). Published Oct. 11, 2013. https://www.stratasysdirect.com/resources/direct-metal-laser-sintering-dmls/ 7 pages.
Van Der Eijk, et al. Metal printing process: development of a new rapid manufacturing process for metal parts. Proceedings of the World PM 2004 conference held in Vienna. Oct. 17-21, 2004. 5 pages.
Wang, et al. Research on the fabricating quality optimization of the overhanging surface in SLM process. Int J Adv Manuf Technol (2013) 65:1471-1484 DOI 10.1007/s00170-012-4271-4. Published online: Jun. 16, 2012.
Wilkes, et al. Emerald Article: Additive manufacturing of ZrO2—Al2O3 ceramic components by selective laser melting. Rapid Prototyping Journal, vol. 19, Issue 1, Aug. 7, 2012.
Wright, Roger. Wire Technology, Process Engineering and Metallurgy, Ch. 19, Elsevier, 2011, pp. 279-283. Published: Nov. 17, 2010.
Xiao, et al. Numerical Simulation of Direct Metal Laser Sintering of Single-Component Powder on Top of Sintered Layers. Journal of Manufacturing Science and Engineering. vol. 130, Aug. 2008. 10 pages.
Yin. Accurately quantifying process-relevant powder properties for AMPM applications. Freeman Technology. May 2014. 39 pages
Notice of Allowance dated Jan. 12, 2018 for U.S. Appl. No. 15/435,120.
Saunders, Marc. Real-time AM monitoring opens up new process control opportunities. Web: LinkedIn. Published on Jan. 3, 2018. 12 pages. URL:<https://www.linkedin.com/pulse/real-time-am-monitoring-opens-new-process-control-marc-saunders/>.
Co-pending U.S. Appl. No. 16/245,183, filed Jan. 10, 2019.
Co-pending U.S. Appl. No. 16/248,665, filed Jan. 15, 2019.
Co-pending U.S. Appl. No. 16/253,103, filed Jan. 21, 2019.
Co-pending U.S. Appl. No. 16/291,759, filed Mar. 4, 2019.
Kopeliovich, Dmitri. Electropolishing. SubsTech: Substances & Technologies. Web Article. Dec. 14, 2013. Printed Jan. 13, 2019. 5 pages. URL:< http://www.substech.com/dokuwiki/doku.php?id=electropolishing.
Peng et al. Fast prediction of thermal distortion in metal powder bed fusion additive manufacturing: Part 1, a thermal circuit network model. Additive Manufacturing; vol. 22, Aug. 2018, pp. 852-868.
Peng et al. Fast prediction of thermal distortion in metal powder bed fusion additive manufacturing: Part 2, a quasi-static thermo-mechanical model. Additive Manufacturing; vol. 22, Aug. 2018, pp. 869-882.
U.S. Appl. No. 15/374,616 Notice of Allowance dated Feb. 26, 2019.
U.S. Appl. No. 15/374,616 Notice of Allowance dated Feb. 5, 2019.
U.S. Appl. No. 15/399,186 Notice of Allowance dated Dec. 20, 2018.
U.S. Appl. No. 15/435,078 Office Action dated Jan. 10, 2019.
U.S. Appl. No. 15/435,110 Notice of Allowance dated Dec. 20, 2018.
U.S. Appl. No. 15/479,531 Office Action dated Jan. 9, 2019.
U.S. Appl. No. 15/634,228 Notice of Allowance dated Feb. 20, 2019.
U.S. Appl. No. 15/634,267 Notice of Allowance dated Dec. 28, 2018.
U.S. Appl. No. 15/634,727 Notice of Allowance dated Feb. 7, 2019.
U.S. Appl. No. 15/719,084 Office Action dated Feb. 8, 2019.
U.S. Appl. No. 15/855,744 Notice of Allowance dated Feb. 15, 2019.
U.S. Appl. No. 15/861,544 Office Action dated Feb. 15, 2019.
U.S. Appl. No. 15/909,396 Office Action dated Jan. 17, 2019.
U.S. Appl. No. 15/909,406 Notice of Allowance dated Jan. 29, 2019.
U.S. Appl. No. 15/909,784 Office Action dated Jan. 18, 2019.
U.S. Appl. No. 15/909,806 Office Action dated Dec. 26, 2018.
U.S. Appl. No. 15/909,809 Notice of Allowance dated Feb. 14, 2019.
U.S. Appl. No. 15/909,826 Office Action dated Feb. 13, 2019.
U.S. Appl. No. 15/937,778 Office Action dated Feb. 12, 2019.
U.S. Appl. No. 15/937,790 Office Action dated Jan. 31, 2019.
U.S. Appl. No. 15/937,812 Office Action dated Feb. 7, 2019.

\* cited by examiner

1010

1020

1030

1041

1042  1040

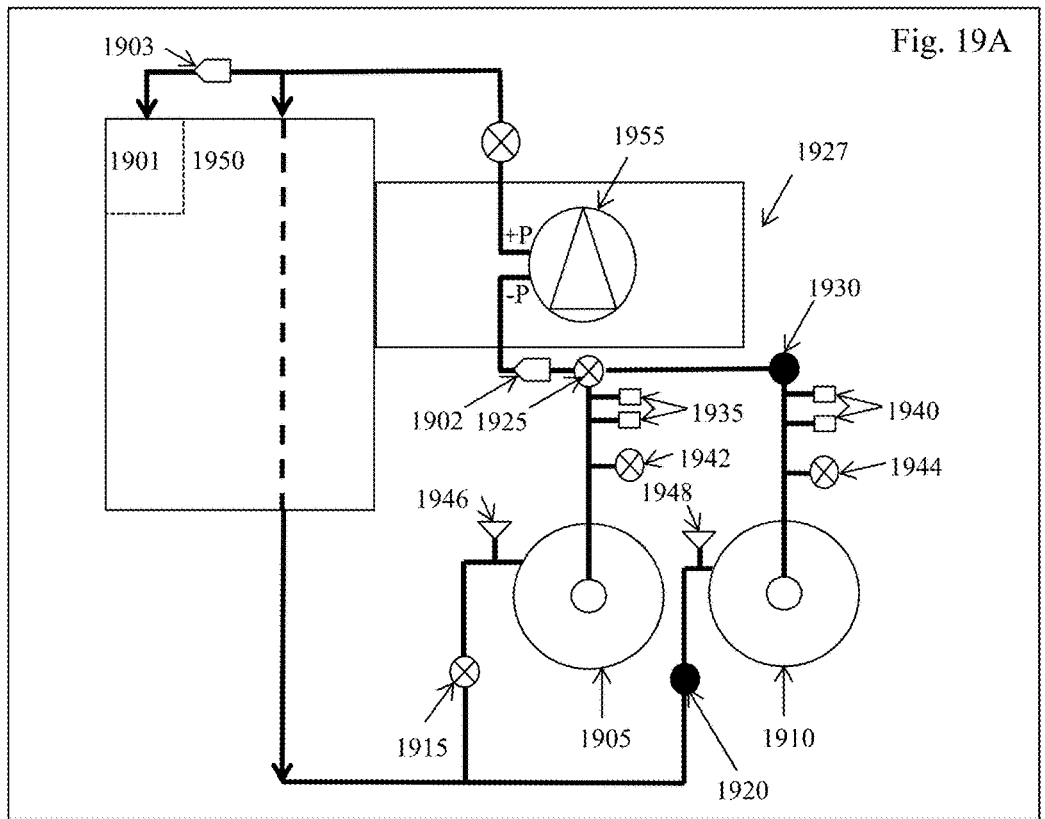
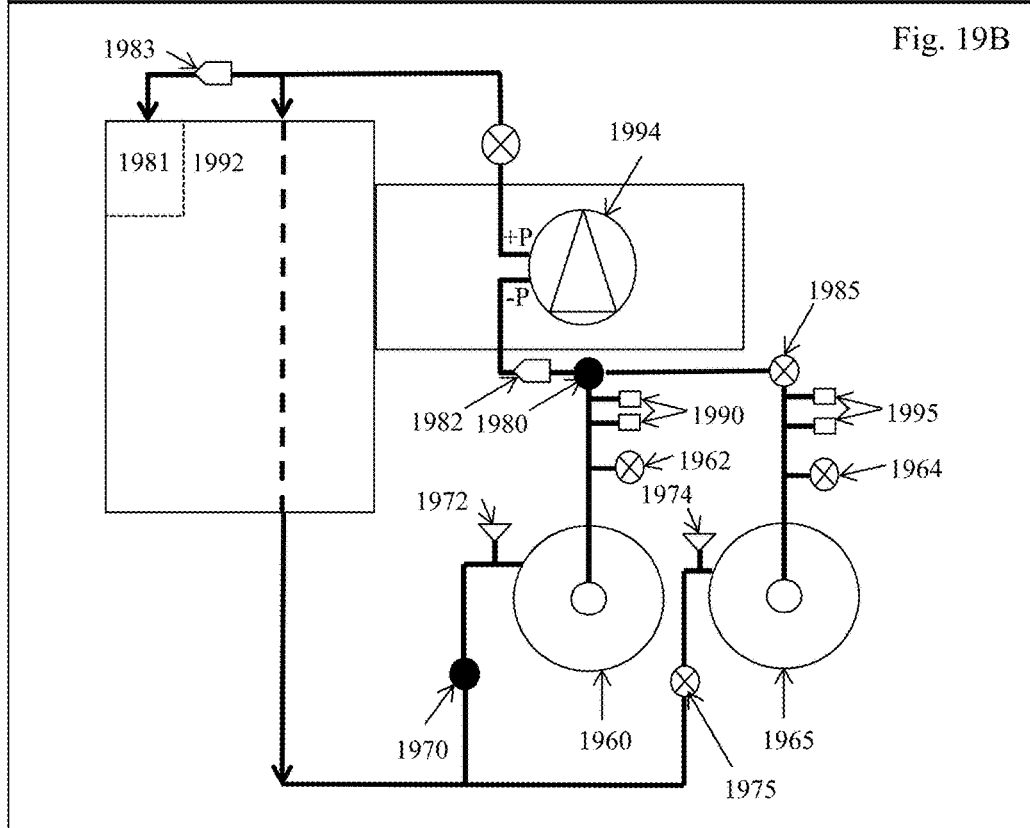

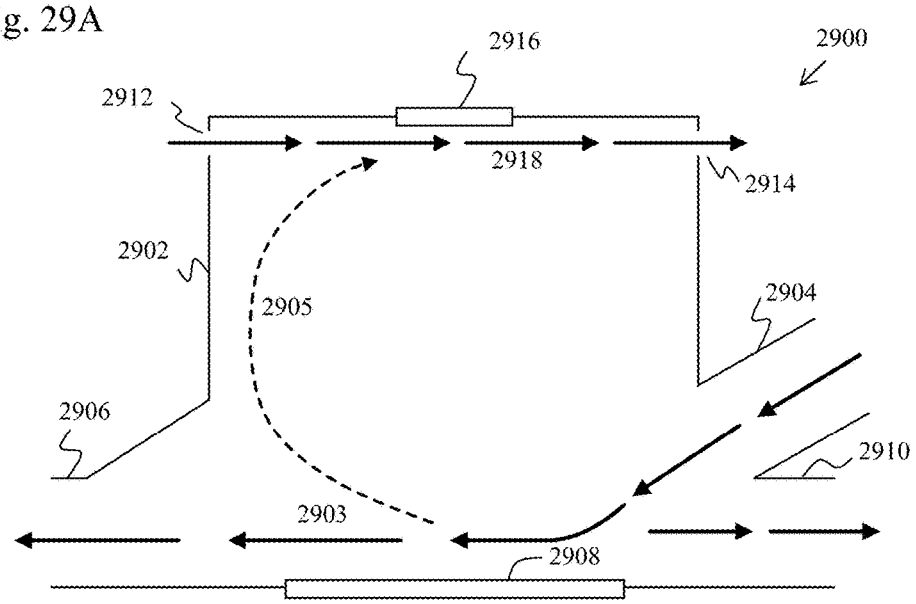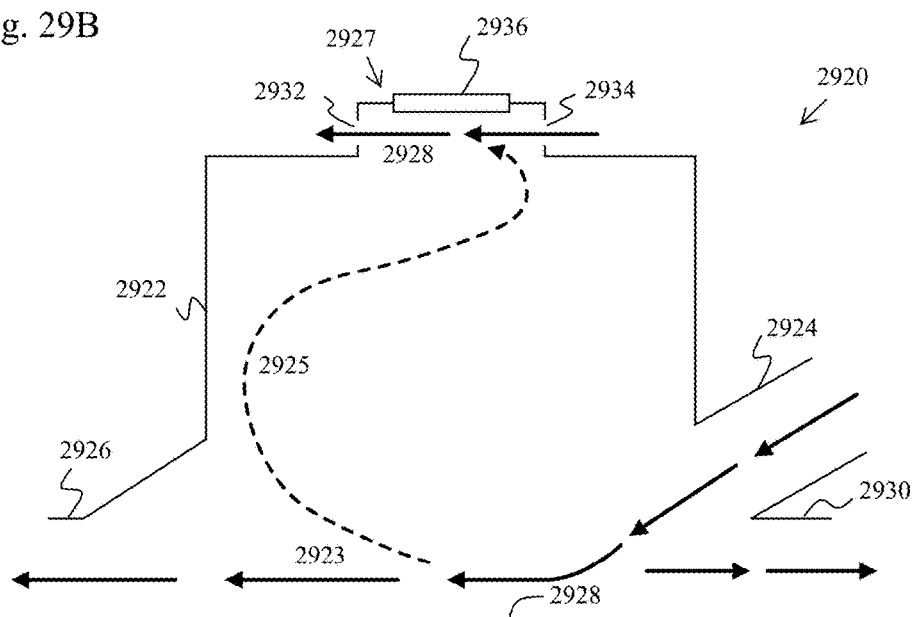

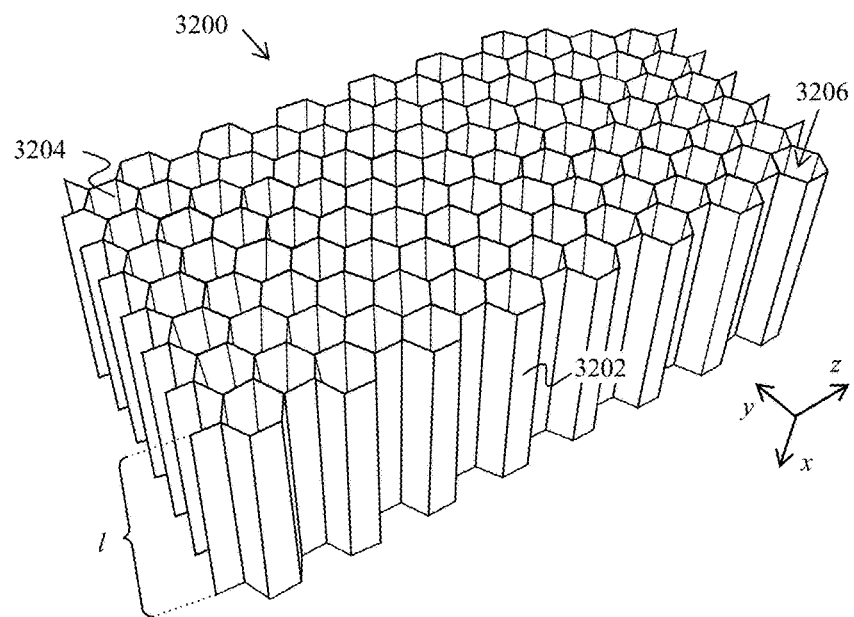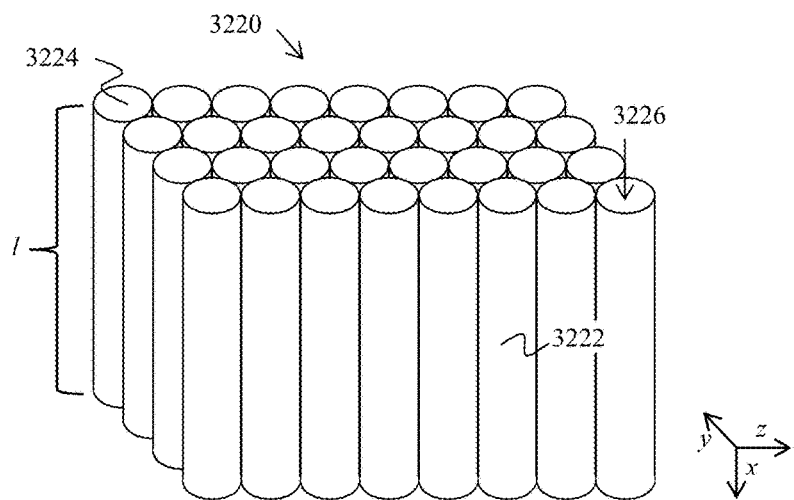

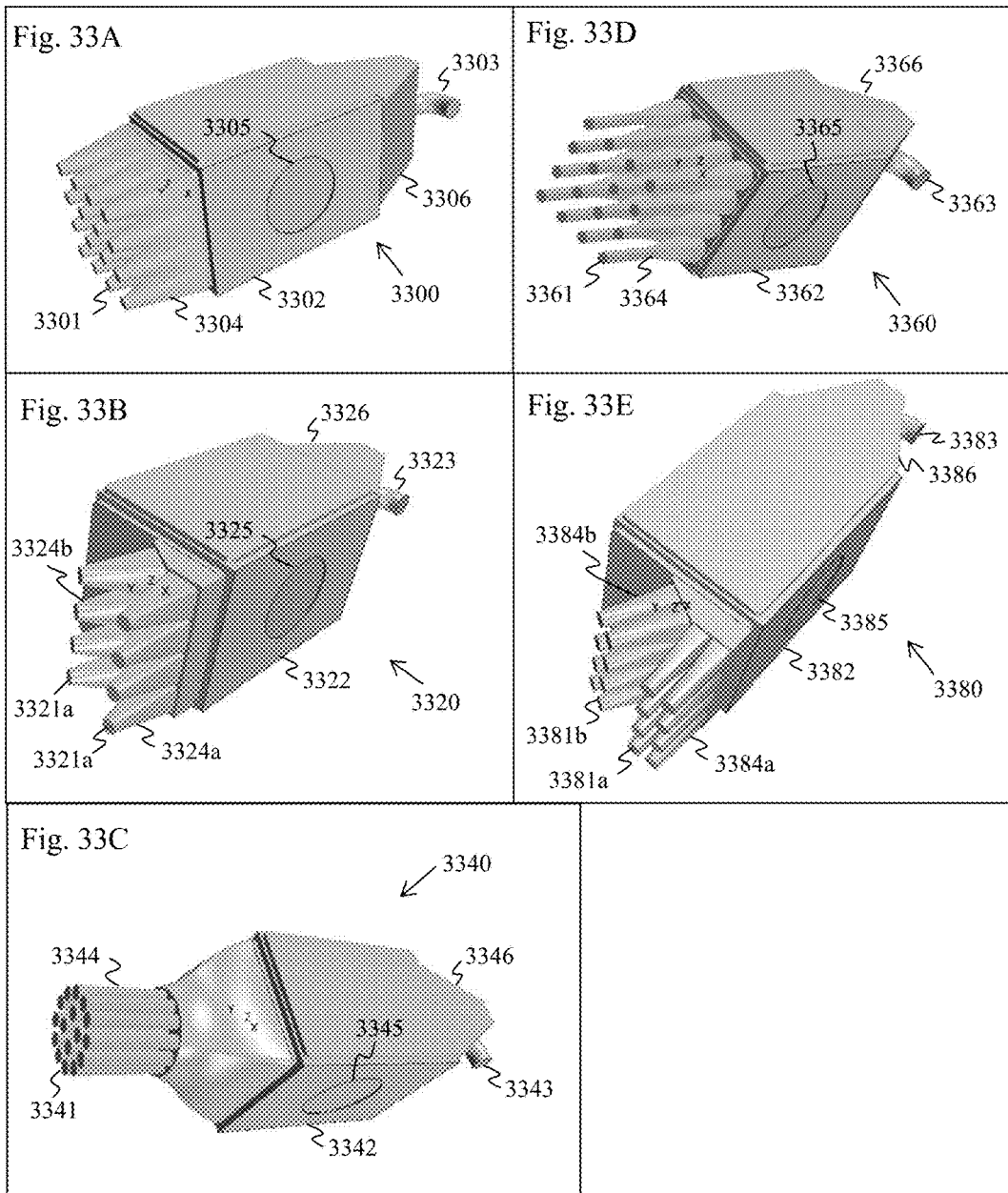

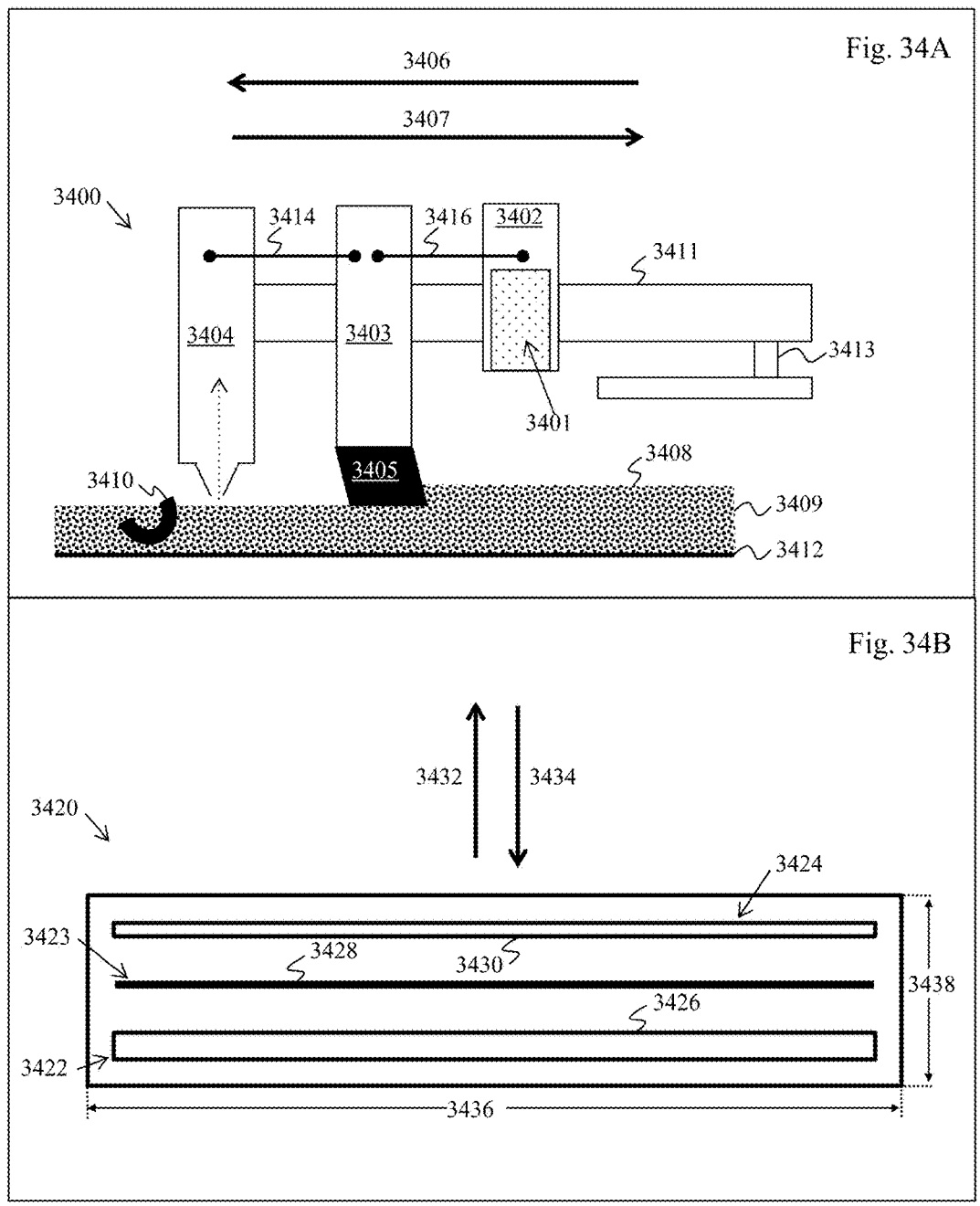

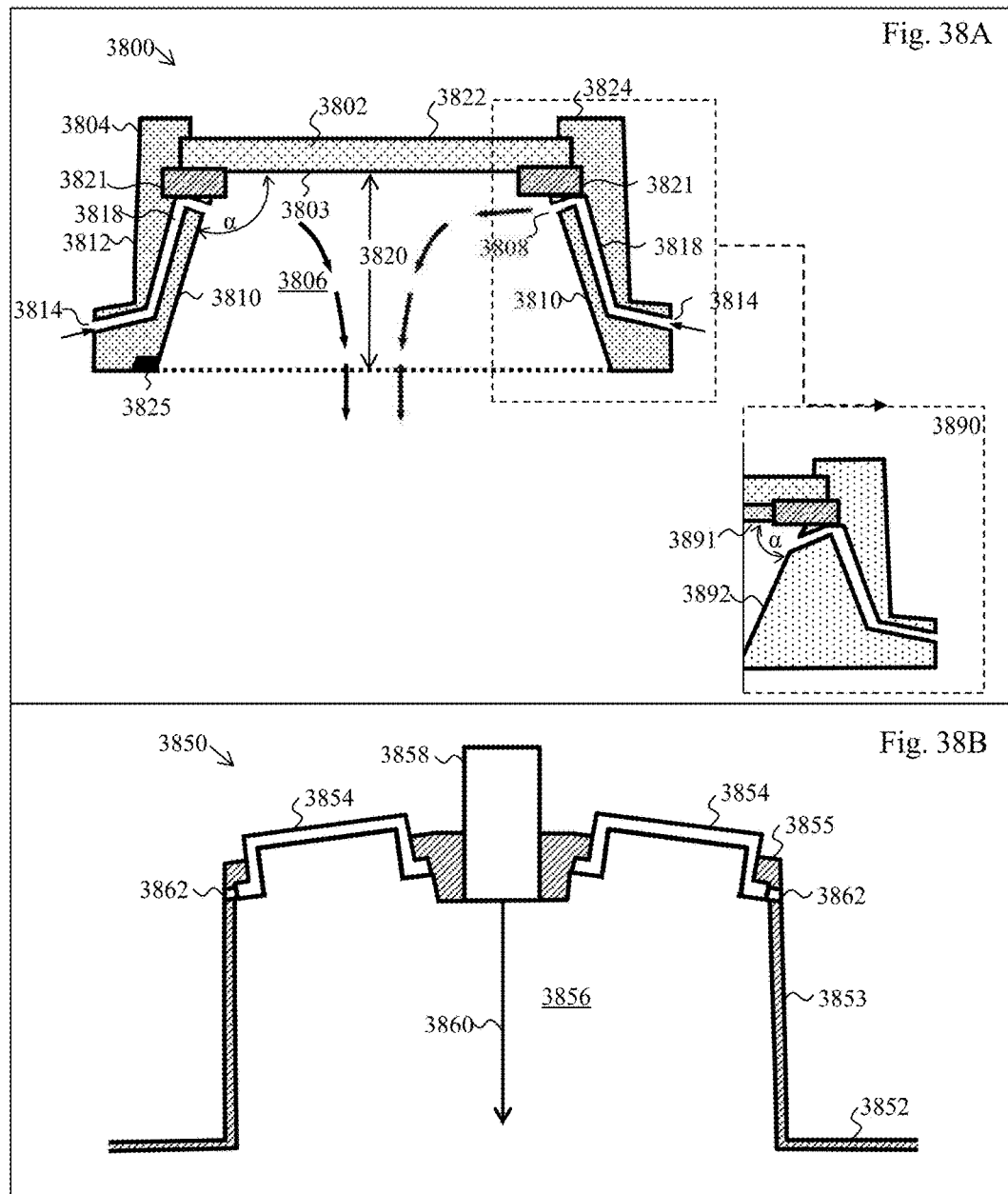

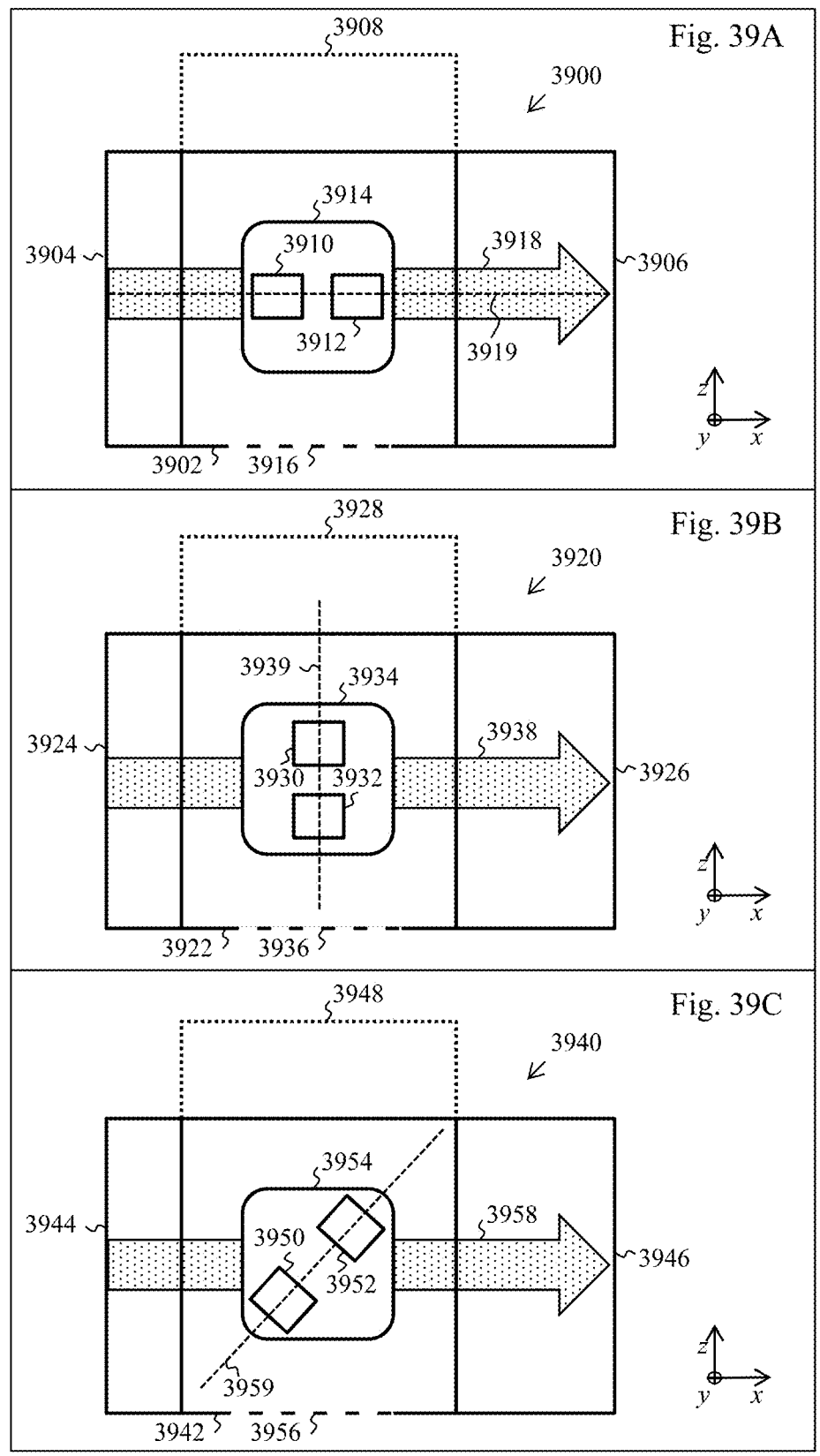

GAS FLOW IN THREE-DIMENSIONAL PRINTING

CROSS-REFERENCE

This application claims benefit of prior-filed U.S. Provisional Patent Application Ser. No. 62/418,601, filed Nov. 7, 2016, titled "GAS FLOW DURING THREE-DIMENSIONAL PRINTING," U.S. Provisional Patent Application Ser. No. 62/477,631, filed Mar. 28, 2017, titled "GAS FLOW DURING THREE-DIMENSIONAL PRINTING," U.S. Provisional Patent Application Ser. No. 62/489,239, filed Apr. 24, 2017, titled "GAS FLOW IN THREE-DIMENSIONAL PRINTING," and U.S. Provisional Patent Application Ser. No. 62/549,868, filed Aug. 24, 2017, titled "GAS FLOW IN THREE-DIMENSIONAL PRINTING," each of which is entirely incorporated herein by reference.

BACKGROUND

Three-dimensional (3D) printing (e.g., additive manufacturing) is a process for making a three-dimensional object of any shape from a design. The design may be in the form of a data source such as an electronic data source, or may be in the form of a hard copy. The hard copy may be a two-dimensional representation of a 3D object. The data source may be an electronic 3D model. 3D printing may be accomplished through an additive process in which successive layers of material are laid down one on top of another. This process may be controlled (e.g., computer controlled, manually controlled, or both). A 3D printer can be an industrial robot.

3D printing can generate custom parts. A variety of materials can be used in a 3D printing process including elemental metal, metal alloy, ceramic, elemental carbon, or polymeric material. In some 3D printing processes (e.g., additive manufacturing), a first layer of hardened material is formed (e.g., by welding powder), and thereafter successive layers of hardened material are added one by one, wherein each new layer of hardened material is added on a pre-formed layer of hardened material, until the entire designed three-dimensional structure (3D object) is layer-wise materialized.

3D models may be created with a computer aided design package, via 3D scanner, or manually. The manual modeling process of preparing geometric data for 3D computer graphics may be similar to plastic arts, such as sculpting or animating. 3D scanning is a process of analyzing and collecting digital data on the shape and appearance of a real object (e.g., real-life object). Based on this data, 3D models of the scanned object can be produced.

A number of 3D printing processes are currently available. They may differ in the manner layers are deposited to create the materialized 3D structure (e.g., hardened 3D structure). They may vary in the material or materials that are used to materialize the designed 3D object. Some methods melt, sinter, or soften material to produce the layers that form the 3D object. Examples for 3D printing methods include selective laser melting (SLM), selective laser sintering (SLS), direct metal laser sintering (DMLS) or fused deposition modeling (FDM). Other methods cure liquid materials using different technologies such as stereo lithography (SLA). In the method of laminated object manufacturing (LOM), thin layers (made inter alia of paper, polymer, or metal) are cut to shape and joined together.

The energy beam may be projected on a material bed to transform a portion of the pre-transformed material to form the 3D object. At times, debris (e.g., metal vapor, molten metal, or plasma) may be generated in the enclosure (e.g., above the material bed). The debris may float in the enclosure atmosphere. The floating debris may alter at least one characteristic of the energy beam (e.g., its power per unit area) during its passage through the enclosure towards material bed. The debris may alter (e.g., damage) to various components of the 3D printing system (e.g., optical window). Some existing 3D printers establish cross flow of gas to reduce the debris in the enclosure atmosphere. However, some of these cross-flow solutions cause undesirable gas flow structures (e.g., stagnation, recirculation of gas within the enclosure that may lead to a steady state) that do not completely solve the debris related issues. It may be desirable to establish a gas flow solution that avoids the undesirable gas flow structures and allows removal of debris from the enclosure atmosphere.

At times, during the 3D printing, various material forms become gas-borne. The material forms may compromise (e.g., fine) powder or soot. Some of the gas-borne material may be susceptible to reaction with a reactive agent (e.g., an oxidizing agent). Some of the gas-borne material may violently react (e.g., when coming into contact with the reactive agent). At times, it may be desirable to provide low leakage of the reactive agent (e.g., oxygen in the ambient atmosphere) into one or more segments of the 3D printer. At times, it may be desirable to isolate the interior of one or more segments of the 3D printer from a harmful (e.g., violently reactive) level of the reactive agent (e.g., that is present in the atmosphere external to the one or more segments of the 3D printer). At times, it may be desirable to preserve a non-reactive (e.g., inert) atmosphere in at least one segment of the 3D printer (e.g., before, during and/or after the 3D printing).

At times, gas-borne material may be collected within a filtering mechanism. The gas-borne material may violently react (e.g., ignite, flame and/or combust), when exposed to an atmosphere comprising the reactive agent (e.g., an ambient atmosphere comprising oxygen). It may be desirable to incorporate a filter mechanism that is separated (e.g., isolated) from an external (e.g., ambient) atmosphere comprising the reactive agent. It may be desirable to incorporate a filter mechanism that maintains an inert interior atmosphere around the filter, at least during the filtering operation and/or disassembling of the filter from the filtering mechanism. It may further be desirable to facilitate an uninterrupted exchange of the filter in the filtering mechanism, for example, in order to facilitate continuous separation of gas-borne material from the recirculating gas in at least one or more segments of the 3D printer during the 3D printing, for example, when the filter clogs and requires exchange and/or refurbishing. The present application describes ways of meeting at least some of these desires.

SUMMARY

In one aspect, a system for three-dimensional (3D) printing comprises: (a) an enclosure comprising a material bed, a first enclosure side and a second enclosure side, wherein the first enclosure side opposes the second enclosure side, wherein the material bed is between the first enclosure side and the second enclosure side, wherein between is inclusive; (b) an energy source generating an energy beam that transforms a portion of the material bed to a transformed material and defines a processing cone volume disposed in the enclosure and above the material bed, wherein the processing cone is an enclosure volume which the energy beam occupies during the transforms; (c) a gas inlet opening through which a gas flows into the processing cone volume, which gas inlet opening is disposed in the first side; (d) a gas outlet opening through which the gas flows out of the processing cone volume, which gas outlet opening is disposed in the second side; and (e) at least one controller that is operatively coupled to the enclosure, energy beam, gas inlet, and gas outlet, and is programmed to (i) direct the energy beam to transform at least a portion of the material bed to a transformed material to form the 3D object, (ii) direct the gas inlet opening to allow the gas to flow through the processing cone, and (iii) direct the gas outlet opening to allow an exit of the gas from the processing cone, wherein the gas flows at least through the processing cone in a gas flow velocity direction along a width of the enclosure, which gas flow velocity direction remains unchanged during the gas flow at least through the processing cone.

In some embodiments, the gas flow velocity direction does not become zero (e.g., is different than zero, e.g., dose not stay still, e.g., is not stagnant) during the gas flow at least through the processing cone. In some embodiments, the second enclosure side is comprised (e.g., included) in an aerodynamic shaped enclosure portion. In some embodiments, the second enclosure side is comprised in a wind tunnel. In some embodiments, the enclosure comprises a wind tunnel that includes the second side. In some embodiments, the gas flow velocity magnitude along the width of the enclosure differs as the gas flows through at least the processing cone, during at least the transformation. In some embodiments, the gas flow velocity magnitude along the width of the enclosure is substantially constant as the gas flows through at least the processing cone, during at least the transformation. In some embodiments, the gas flow velocity magnitude along at least one of a height or a depth of the enclosure differs as the gas flows through at least the processing cone, during at least the transformation. In some embodiments, the gas flow velocity direction along at least one of a height or a depth of the enclosure differs as the gas flows through at least the processing cone, during at least the transformation. In some embodiments, the gas flow velocity magnitude along at least one of a height or a depth of the enclosure is substantially constant as the gas flows through at least the processing cone, during at least the transformation. In some embodiments, the gas flow velocity direction along at least one of a height or a depth of the enclosure is substantially constant as the gas flows through at least the processing cone, during at least the transformation. In some embodiments, the gas flows through the processing cone is free of at least one of (1) a recirculation, (2) flow stagnation, and (3) static vortex of the gas. In some embodiments, the gas flows through the processing cone in a smooth (e.g., undisturbed) flow. In some embodiments, the gas flows through the processing cone in a laminar flow. In some embodiments, the gas flows through the processing cone in a non-turbulent flow. In some embodiments, the gas flows through the processing cone in a non-stagnant flow. In some embodiments, the gas flows through the processing cone in a non-circulatory flow. In some embodiments, the first side comprises an internal wall disposed between the material bed and the inlet opening. In some embodiments, the internal wall comprises a filter. In some embodiments, the filter is a High-Efficiency Particulate Arrestance (TEPA) filter. In some embodiments, the internal wall comprises an opening. In some embodiments, the internal wall comprises a perforated plate. In some embodiments, the internal wall comprises a flow aligning passage. In some embodiments, the enclosure comprises a baffle between the inlet opening and the internal wall. In some embodiments, the internal wall comprises a ledge. In some embodiments, the internal wall comprises a ledge and a perforated plate. In some embodiments, the gas flow may alter an amount of debris in an atmosphere of the enclosure. In some embodiments, alter is reduce. In some embodiments, the gas flow removes an amount of debris in an atmosphere of the enclosure. In some embodiments, remove is during at least a portion of the 3D printing. In some embodiments, the gas flow flows during at least a portion of the 3D printing. In some embodiments, at least a portion of the 3D printing comprises during the operation of the energy beam. In some embodiments, during the operation of the energy beam comprises during the transforming. In some embodiments, the system further comprises a recycling mechanism that treats (e.g., filters and/or removes a reacting species (e.g., oxygen and/or humidity)) the gas that flows from the outlet opening. In some embodiments, the recycling mechanism comprises a valve. In some embodiments, the recycling mechanism is fluidly connected (e.g., allows flow therethrough, e.g., flow of gas and/or liquid) to the outlet opening. In some embodiments, the recycling mechanism is fluidly connected to the inlet opening. In some embodiments, the recycling mechanism filters the gas that enters the recycling mechanism, from a debris. In some embodiments, the recycling mechanism removes a reactive species from the gas that enters the recycling mechanism. In some embodiments, the recycling mechanism outputs a gas with a reduced amount of a debris. In some embodiments, the recycling mechanism may output a gas with a reduced concentration of a reactive species. In some embodiments, at least one controller is further operatively coupled to the recycling mechanism and may direct the recycling mechanism to recycle the gas that is evacuated from the enclosure. In some embodiments, treating is during at least a portion of the 3D printing. In some embodiments, treating is continuous during at least a portion of the 3D printing. In some embodiments, the recycling mechanism comprises a gas composition sensor. In some embodiments, the recycling mechanism comprises a pump. In some embodiments, the pump comprises a variable frequency drive to control the flow of gas. In some embodiments, at least one controller is a plurality of controllers. In some embodiments, at least two of operations (i), (ii), and (iii) are performed by the same controller. In some embodiments, at least two of operations (i), (ii), and (iii) are performed by different controllers. In some embodiments, the material bed comprises at least one particulate material that is selected from the group consisting of an elemental metal, metal alloy, ceramic, and an allotrope of elemental carbon. In some embodiments, the 3D printing is additive manufacturing. In some embodiments, the additive manufacturing comprises selective laser sintering or selective laser melting. In some embodiments, the energy beam comprises electromagnetic or charged particle radiation. In some embodiments, the energy beam comprises a laser beam. In some embodiments, the gas comprises argon.

In another aspect, a method for generating a 3D object comprising: (a) using an energy beam to transform a portion of a material bed to a transformed material to form at least a portion of the 3D object, wherein the material bed is disposed in an enclosure, wherein the enclosure has a first enclosure side and a second enclosure side that opposes the first enclosure side, wherein the material bed is disposed between the first enclosure side and the second enclosure side, wherein between is inclusive, wherein the energy beam occupies a processing cone volume within the enclosure and above the material bed during the using; and (b) flowing a gas through the processing cone from the first enclosure side, to the second enclosure side which gas exits the enclosure, wherein the gas flow has a velocity direction along a width of the enclosure, which velocity direction of the gas flow remains unchanged during the gas flow through at least the processing cone.

In some embodiments, the gas flows through at least the processing cone without forming (at least in the processing cone volume) at least one of (1) a recirculation, (2) flow stagnation, and (3) static vortex, of the gas. In some embodiments, the gas flows aerodynamically at least in the processing cone. In some embodiments, the phrase "at least in the processing cone" comprises a first enclosure volume that is from the first enclosure side to the processing cone. In some embodiments, the phrase "at least in the processing cone" comprises a second enclosure volume that is from the processing cone to the second enclosure side. In some embodiments, the phrase "at least in the processing cone" comprises the entire processing chamber and/or enclosure volume. In some embodiments, the method further comprises recycling the gas out of (e.g., externally to) the enclosure from the second enclosure side. In some embodiments, the method further comprises recycling the gas out of the enclosure from the second enclosure side, and into the enclosure through the first enclosure side. In some embodiments, the method further comprises treating the gas that flows out of the enclosure from the second enclosure side. In some embodiments, treating comprises filtering the gas from a debris. In some embodiments, treating comprises removing a reactive species from the gas that flows from the outlet opening.

In another aspect, an apparatus for 3D printing comprising: (a) an enclosure comprising a material bed, a first enclosure side and a second enclosure side, wherein the first enclosure side opposes the second enclosure side, wherein the material bed is between the first enclosure side and the second enclosure side, wherein between is inclusive; (b) an energy source generating an energy beam that transforms a portion of the material bed to a transformed material and defines a processing cone volume disposed in the enclosure and above the material bed, wherein the processing cone volume is at least a portion of the enclosure volume that the energy beam occupies during the transforms; (c) a gas inlet opening through which a gas flows into the processing cone volume, which gas inlet opening is disposed in the first side; and (d) a gas outlet opening through which the gas flows out of the processing cone volume, which gas outlet opening is disposed in the second side, which gas flow has a velocity direction, wherein the enclosure has an internal shape that is configured to allow the velocity direction of the gas flow along a width of the enclosure to remain unchanged during the gas flow through at least the processing cone.

In another aspect, an apparatus for 3D printing comprising at least one controller that is programmed to perform operations: operation (a) direct an energy beam from an energy source to a material bed to transform at least a portion of the material bed to a transformed material and form the 3D object, wherein the material bed is disposed in an enclosure, wherein the enclosure has a first enclosure side and a second enclosure side opposing the first enclosure side, wherein the material bed is disposed between the first opposing side and the second opposing side, wherein between is inclusive; and operation (b) direct a gas flow from the first enclosure side through a processing cone, to the second enclosure side, which processing cone is an enclosure volume that the energy beam occupies during the transform, which gas flow has a velocity direction, wherein the velocity direction of the gas flow along a width of the enclosure remains unchanged during the gas flow through at least the processing cone.

In some embodiments, the flow of gas through at least the processing cone volume is devoid of at least one of (1) a recirculation, (2) flow stagnation, and (3) static vortex. In some embodiments, at least one controller is a multiplicity of controllers and wherein at least two of operations (a), and (b) is directed by the same controller. In some embodiments, at least one controller is a multiplicity of controllers and wherein at least two of operations (a), and (b) is directed by the different controllers. In some embodiments, the controller directs a first valve to control the gas that enters the first enclosure side. In some embodiments, the controller directs a second valve to control the gas that exits the second enclosure side. In some embodiments, the controller controls at least one of the makeup, density, trajectory, and velocity of the gas that enters the enclosure. In some embodiments, at least in the processing cone, the trajectory of a flow of the gas is linear. In some embodiments, the trajectory is linear in one or more of: the height, depth, and width of the enclosure. In some embodiments, at least in the processing cone, the trajectory of a flow of the gas is smooth. In some embodiments, the trajectory is smooth in one or more of: the height, depth, and width of the enclosure.

In another aspect, a method for printing a 3D object comprises, during the 3D printing: (a) flowing at least one gas at a velocity through a gas flow mechanism, which at least one gas is inserted to the gas flow mechanism through an opening in the gas flow mechanism, which gas is inert with respect to the material used or produced in a 3D printing of the 3D object; (b) maintaining the pressure of the at least one gas in the gas flow mechanism to above an ambient atmospheric pressure; and (c) maintaining a low level of a reactive agent in the gas flow mechanism, which low level is below a violent reaction level of the reactive agent with the material used or produced during the 3D printing, wherein the material used or produced during the 3D printing reacts violently at an ambient atmosphere flowing at the velocity.

In some embodiments, the violent reaction is an exothermic reaction. In some embodiments, the violent reaction comprises combustion, ignition, or flaming. In some embodiments, the gas flow mechanism comprises a channel, chamber, valve, or a pump. In some embodiments, maintaining the pressure comprises limiting occurrence of a negative pressure with respect to the ambient atmospheric pressure in at least one section of the gas flow mechanism. In some embodiments, at least one section of the gas flow mechanism comprises an area adjacent to the pump. In some embodiments, at least one section of the gas flow mechanism comprises an area behind the pump relative to the direction of gas flow. In some embodiments, maintaining the pressure comprises raising the pressure of the at least one gas in the gas flow mechanism. In some embodiments, maintaining the pressure comprises purging of at least one reactive agent from the gas flow mechanism. In some embodiments, purging comprises opening, closing, or adjusting one or more valves. In some embodiments, purging comprises opening at least one inlet-purge-valve to insert at least one gas into the gas flow mechanism, and opening at least one outlet-purge-valve to evacuate at least one reactive agent from the gas flow mechanism and reach a low level of the reactive agent in the gas flow mechanism. In some embodiments, a least one gas is an inert gas with respect to the material used or produced in the 3D printing. In some embodiments, the method further comprises opening at least one inlet modulating-valve and at least one outlet modulating-valve to maintain or reduce the low level of the reactive agent in the gas flow mechanism. In some embodiments, maintaining or reducing the low level of the reactive agent in the gas flow mechanism comprises inserting at least one gas into the gas flow mechanism through the inlet modulating-valve, and expelling the reactive agent through the outlet modulating valve. In some embodiments, at least two of: the inlet purge-valve, outlet purge-valve, inlet modulating-valve, and outlet modulating-valve have the same cross section. In some embodiments, at least two of the inlet purge-valve, outlet purge-valve, inlet modulating-valve, and outlet modulating-valve have a different cross section. In some embodiments, the modulating-valve has a smaller cross section than the purge-valve. In some embodiments, the modulating-valve facilitates a slow mass flow of gas into at least a segment of the gas flow mechanism. In some embodiments, purging is performed within at least one segment of the gas flow mechanism. In some embodiments, at least two segments of the gas flow mechanism are purged simultaneously. In some embodiments, at least two segments of the gas flow mechanism are purged sequentially. In some embodiments, purging is performed independently within one or more segments of the gas flow mechanism. In some embodiments, the one or more segments of the gas flow mechanism is isolated with respect to their gas flow. In some embodiments, purging is performed collectively within two or more segments of the gas flow mechanism. In some embodiments, purging is switched from being performed independently to being performed collectively, and vice-versa. In some embodiments, switching is based on a reactive agent level threshold. In some embodiments, purging includes engaging and/or disengaging an operation of a pump. In some embodiments, purging comprises separating at least one segment of the gas flow mechanism and purging it separately. In some embodiments, purging comprises flowably separating at least one segment of the gas flow mechanism, and purging it separately. In some embodiments, purging separately excludes using a pump. In some embodiments, purging comprises coupling at least two segments of the gas flow mechanism and purging the at least two segments collectively. In some embodiments, purging comprises flowably coupling the at least two segments of the gas flow mechanism and purging the at least two segments collectively. In some embodiments, purging the at least two segments collectively excludes using a pump. In some embodiments, coupling at least two segments of the gas flow mechanism comprises the processing chamber and a gas filter. In some embodiments, the reactive agent comprises oxygen, water, carbon dioxide, or nitrogen. In some embodiments, the at least one gas comprises an inert gas with respect to the material used or produced during the 3D printing. In some embodiments, the at least one gas comprises a noble gas. In some embodiments, the at least one gas comprises Argon. In some embodiments, the material used during the 3D printing comprises an elemental metal, metal alloy, ceramic, an allotrope of elemental carbon, polymer, or a resin. In some embodiments, the material used during the 3D printing comprises an elemental metal, metal alloy, ceramic, or an allotrope of elemental carbon. In some embodiments, the material used during the 3D printing comprises a particulate material. In some embodiments, the material produced during the 3D printing comprises soot, and/or a transformed material. In some embodiments, the transformed material comprises a molten material (e.g., that subsequently solidified). In some embodiments, the gas flow mechanism comprises a processing chamber in which the 3D object is printed during the 3D printing. In some embodiments, maintaining in operation (c) comprises allowing a flow rate of the reactive agent into the gas flow mechanism of at most five cubic centimeter per minute. In some embodiments, maintaining in operation (c) comprises allowing a flow rate of the reactive agent into the gas flow. In some embodiments, maintaining in operation (c) comprises allowing a flow rate of the reactive agent into the gas flow mechanism of at most one tenth of a cubic centimeter per minute. In some embodiments, maintaining in operation (c) comprises allowing a flow rate of the reactive agent into the gas flow mechanism of at most one hundredth of a cubic centimeter per minute.

In another aspect, a system used in 3D printing of at least one 3D object comprises: a gas flow mechanism, which gas flow mechanism comprises an opening; and at least one controller that is operatively coupled to the gas flow mechanism, which at least one controller is programmed to direct performance of the following operations during the 3D printing: operation (i) direct flowing at least one gas at a velocity through the gas flow mechanism, which at least one gas is inserted to the gas flow mechanism through the opening, which gas is inert with respect to the material used or produced in the 3D printing of the 3D object, operation (ii) direct maintaining a pressure of the at least one gas in the gas flow mechanism to above an ambient atmospheric pressure, and operation (iii) direct maintaining a low level of a reactive agent in the gas flow mechanism, which low level is below a violent reaction level of the reactive agent with the material used or produced during the 3D printing, wherein the material used or produced during the 3D printing reacts violently at an ambient atmosphere that flows at the velocity.

In some embodiments, the opening is configured to facilitate transporting the at least one gas to or from the gas flow mechanism. In some embodiments, the system further comprises an energy source configured to generate an energy beam that transforms the material used in 3D printing for printing of the 3D object, and wherein the controller is operatively coupled to the energy beam and directs the energy beam to transform the material used in 3D printing for printing of the 3D object. In some embodiments, the violent reaction is an exothermic reaction. In some embodiments, the violent reaction comprises combustion, ignition, or flaming. In some embodiments, the gas flow mechanism comprises a channel, chamber, valve, or a pump. In some embodiments, the system further comprises one or more valves operatively coupled to the gas flow mechanism. In some embodiments, the one or more valves are configured to facilitate maintaining a low level of a reactive agent in the gas flow mechanism. In some embodiments, the at least one controller is operatively coupled to the one or more valves, and is further configured to direct performance of operation (iv) direct the at least one valve to open or close. In some embodiments, at least one controller is configured to direct the timing and/or degree at which the at least one valve opens or closes. In some embodiments, at least two of operations (i), (ii), (iii), and (iv) are directed by the same controller. In some embodiments, at least two of operations (i), (ii), (iii), and (iv) are directed by the different controllers. In some embodiments, the system further comprises one or more sensors operatively coupled to the gas flow mechanism. In some embodiments, at least one controller is operatively coupled to the one or more sensors. In some embodiments, the controller considers the signal when performing one or more of operations (i), (ii), (iii), and (iv). In some embodiments, the sensor is configured to facilitate sensing a temperature, pressure, reactive agent level, and/or the velocity, of the at least one gas within the gas flow mechanism.

In another aspect, an apparatus used in a 3D printing of at least one 3D object comprises at least one controller that is programmed to perform the following operations: operation (i) direct flowing at least one gas at a velocity through a gas flow mechanism, which at least one gas is inserted to the gas flow mechanism through an opening in the gas flow mechanism, which gas is inert with respect to the material used or produced in a 3D printing of the 3D object; operation (ii) direct maintaining a pressure of the at least one gas in the gas flow mechanism to above an ambient atmospheric pressure; and operation (iii) direct maintaining a low level of a reactive agent in the gas flow mechanism, which low level is below a violent reaction level of the reactive agent with the material used or produced during the 3D printing, wherein the material used or produced during the 3D printing reacts violently at an ambient atmosphere flowing at the velocity.

In some embodiments, the two or more of operation (i), (ii), and (iii) are directed by the same controller. In some embodiments, the at least one controller is a plurality of controllers. In some embodiments, two or more of operation (i), (ii), and (iii) are directed by different controllers. In some embodiments, the controller is operatively coupled to an energy beam and directs the energy beam to transform the material used in 3D printing for printing the 3D object. In some embodiments, the violent reaction is an exothermic reaction. In some embodiments, the violent reaction comprises combustion, ignition, or flaming. In some embodiments, the at least one controller is operatively coupled to one or more valves and is further configured to direct performance of operation (iv): direct the at least one valve to open or close. In some embodiments, the one or more valves is configured to facilitate maintaining a low level of a reactive agent in the gas flow mechanism. In some embodiments, the at least one controller is configured to direct the timing and/or degree at which the at least one valve opens or closes. In some embodiments, at least two of operations (i), (ii), (iii), and (iv) are directed by the same controller. In some embodiments, at least two of operations (i), (ii), (iii), and (iv) are directed by the different controllers. In some embodiments, the apparatus further comprises one or more sensors operatively coupled to the gas flow mechanism. In some embodiments, the at least one controller is operatively coupled to the one or more sensors. In some embodiments, the at least one controller considers input from the one or more sensors when performing at least one of operations (i), (ii), (iii), and (iv). In some embodiments, the one or more sensors is configured sense a temperature, pressure, reactive agent level, and/or the velocity, of the at least one gas within the gas flow mechanism. In some embodiments, the at least one controller considers the input using feedback or close loop control. In some embodiments, the at least one controller is further configured to direct reducing a level of a reactive agent in the gas flow mechanism.

In another aspect, a computer software product for 3D printing of at least one 3D object, comprises a non-transitory computer-readable medium in which program instructions are stored, which instructions, when read by a computer, cause the computer to perform operations comprising: operation (i) direct flowing at least one gas at a velocity through a gas flow mechanism, which at least one gas is inserted to a gas flow mechanism through an opening in the gas flow mechanism, which gas is inert with respect to a material used or produced in a 3D printing of the 3D object; operation (ii) direct maintaining the pressure of the at least one gas in the gas flow mechanism to above an ambient atmospheric pressure; and operation (iii) direct maintaining a low level of a reactive agent in the gas flow mechanism, which low level is below a violent reaction level of the reactive agent with the material used or produced during the 3D printing, wherein the material used or produced during the 3D printing reacts violently at an ambient atmosphere flowing at the velocity.

In another aspect, a method for generating at least one 3D object (e.g., a 3D object) comprises: (a) isolating a first filter from an external atmosphere, which external atmosphere comprises a reactive agent that reacts with the material used or generated during a 3D printing of the 3D object; (b) separating during the 3D printing a gas-borne material that is used or generated during the 3D printing, from a recirculating gas through the first filter, which recirculating gas recirculates through a gas flow mechanism comprising a processing chamber in which the 3D object is printed, which recirculating gas flows at a velocity in the processing chamber; (c) isolating a second filter from the external atmosphere, wherein the gas flow mechanism comprises the first filter or the second filter; and (d) switching from the first filter to the second filter while continuously and uninterruptedly separating the gas-borne material from the recirculating gas through the gas flow mechanism.

In some embodiments, the reactive agent reacts with the material that is used or generated during 3D printing, when translating at the velocity. In some embodiments, isolating the first filter from the external atmosphere comprises encasing it in a first canister. In some embodiments, isolating the second filter from the external atmosphere comprises encasing it in a second canister. In some embodiments, isolating the first filter from the external atmosphere comprises encasing it in a first canister, isolating the second filter from the external atmosphere comprises encasing it in a second canister, and the gas flow mechanism comprises the first canister and the second canister. In some embodiments, switching from the first filter to the second filter comprises switching from the first canister to the second canister. In some embodiments, isolating comprises reducing influx of the external atmosphere. In some embodiments, isolating comprises facilitating penetration of the external atmosphere. In some embodiments, the first canister comprises a non-reactive, inert, and/or noble-gas interior atmosphere. In some embodiments, the non-reactivity is relative to a reaction with the material used or produced during the 3D printing. In some embodiments, the second canister comprises a non-reactive, inert, and/or noble-gas interior atmosphere. In some embodiments, non-reactive is relative to a reaction with the material used or produced during the 3D printing. In some embodiments, switching comprises determining clogging of the first filter. In some embodiments, switching comprises determining unsafe use of the first filter. In some embodiments, switching comprises determining presence and safe use of the second filter.

In another aspect, an apparatus for 3D printing of at least one 3D object, comprises: a first canister comprising a first filter, which first filter is configured to separate gas-borne material from a recirculating gas at least during the 3D printing, which first canister comprises a first casing that separates the first filter from an external atmosphere comprising a reactive agent, wherein the gas-borne material comprises a material used or produced during the 3D printing; a second canister comprising a second filter, which second filter is configured to separate the gas-borne material from the recirculating gas which second canister comprises a second casing that separates the filter from the external atmosphere comprising the reactive agent; and a gas flow mechanism comprises the first canister, the second canister, or a processing chamber where the 3D object is printed during the 3D printing, which gas flow mechanism is configured to recirculate gas from the processing chamber to the first canister and/or to the second canister.

In some embodiments, the first canister comprises a first casing configured to prevent combustion of the reactive agent with the gas-borne material. In some embodiments, the second canister comprises a second casing configured to prevent combustion of the reactive agent with the gas-borne material. In some embodiments, the first canister comprises a first casing that is configured to prevent combustion of the reactive agent with the gas-borne material, the second canister comprises a second casing configured to prevent combustion of the reactive agent with the gas-borne material, and wherein the first casing is of the same type as the second casing. In some embodiments, the first canister comprises a first casing that is configured to prevent combustion of the reactive agent with the gas-borne material, the second canister comprises a second casing configured to prevent combustion of the reactive agent with the gas-borne material, and the first casing is different from the second casing. In some embodiments, the first casing is different from the second casing by its material type, casing wall structure, and/or casing shape. In some embodiments, the first casing and/or second casing comprises (i) a material type, (ii) casing wall structure, or (iii) casing shape, that is configured to reduce a flow of the external atmosphere into the first canister or second canister respectively. In some embodiments, the wall structure is configured to isolate the external atmosphere from an interior of the second casing and/or first casing respectively. In some embodiments, the wall structure comprises one or more layers. In some embodiments, the layers comprise a solid layer, a liquid layer, a semi-solid layer, or a gas-layer. In some embodiments, the gas-layer is a reduced pressure (e.g., vacuum) gas-layer. In some embodiments, the first casing and the second casing is fluidly (e.g., flowingly, or permitting flow) and/or reversibly coupled to the processing chamber through at least one valve. In some embodiments, the at least one valve decouples (e.g., separate, disengage) the first canister and/or the second canister from the processing chamber. In some embodiments, the decoupling of the first canister and/or the second canister from the processing chamber is configured to facilitate recirculation of the gas at least in the processing chamber. In some embodiments, the decoupling of the first canister or the second canister from the processing chamber is configured to facilitate continuous filtering of the gas-borne material during the 3D printing. In some embodiments, the first canister comprises a first valve. In some embodiments, the first valve can couple the first canister to the processing chamber. In some embodiments, the second canister comprises a second valve. In some embodiments, the second valve couples the second canister to the processing chamber.

In another aspect, a system used in 3D printing of at least one 3D object, comprises: a first canister comprising a first filter, wherein the first filter is configured to separate at least one gas from a gas-borne material that is used or generated during a 3D printing of the at least one 3D object, wherein the external atmosphere comprises a reactive agent that violently reacts with the gas-borne material, wherein the first canister is configured to separate the first filter from an external atmosphere, wherein the at least one gas does not react violently with the reactive agent; a second canister comprising a second filter, wherein the second filter is configured to separate the at least one gas from the gas-borne material, wherein the second canister is configured to separate the second filter from the external atmosphere to lower the possibility of violent reaction between the gas-borne material and the reactive agent; a gas flow mechanism comprising the first canister, or the second canister, which gas flow mechanism is configured to accommodate the at least one gas; and at least one controller that is operatively coupled to the first canister, and the second canister, which at least one controller is programmed to separately or collectively direct performance of the following operations at least during the 3D printing: operation (i) direct using the first filter to separate the gas-borne material from the at least one gas that recirculates through the gas flow mechanism, and operation (ii) direct switching from (a) using the first filter to separate the at least one gas from the gas-borne material to (b) using the second filter to separate the at least one gas from the gas-borne material, which switching facilitates continuous and uninterrupted separation of the gas-borne material from the at least one gas.

In some embodiments, the system further comprises a processing chamber where the at least one 3D object is printed. In some embodiments, the gas flow mechanism comprises the processing chamber. In some embodiments, the at least one gas flows at a velocity (e.g., a pre-determined velocity) in the first canister and/or second canister. In some embodiments, lowering the possibility of violent reaction between the gas-borne material and the reactive agent is when the gas borne material and/or reactive agent flows (e.g., maintained below or) at the velocity. In some embodiments, the violent reaction comprises combustion, flaming, or ignition. In some embodiments, the first canister is fluidly coupled to the second canister. In some embodiments, the first canister is fluidly coupled to the processing chamber. In some embodiments, the second canister is fluidly coupled to the processing chamber. In some embodiments, direct switching comprises direct altering the status of one or more valves. In some embodiments, direct switching comprises direct altering the status of one or more valves. In some embodiments, direct switching comprises disconnecting the first canister with the processing chamber. In some embodiments, disconnecting comprises disconnecting the flow of the at least one gas and/or gas-borne material. In some embodiments, direct switching comprises connecting the second canister with the processing chamber. In some embodiments, connecting comprises connecting the flow of the at least one gas and/or gas-borne material. In some embodiments, at least one controller is operatively coupled to the processing chamber.

In another aspect, an apparatus for 3D printing of at least one 3D object comprises at least one controller that is programmed to collectively or separately perform the following operations at least during the 3D printing: operation (i) direct using a first filter to separate a gas-borne material from at least one gas that recirculates through a gas flow mechanism, which first filter is housed in a first canister that is configured to separate the first filter from an external atmosphere, wherein the gas-borne material is used or produced during the 3D printing, which gas flow mechanism comprises the first canister, wherein the external atmosphere comprises a reactive agent that violently reacts with the gas-borne material, wherein the at least one gas does not react violently with the reactive agent; and operation (ii) direct switching from (a) using the first filter to separate the at least one gas from the gas-borne material to (b) using a second filter to separate the at least one gas from the gas-borne material, which switching facilitates continuous and uninterrupted separation of the gas-borne material from the at least one gas, wherein the second filter is housed in a second canister that is configured to separate the second filter from the external atmosphere, wherein the gas flow mechanism comprises the second canister.

In some embodiments, the gas flow mechanism comprises a processing chamber in which the 3D object is printed during the 3D printing. In some embodiments, the processing chamber is operatively coupled to first canister, the second canister, or both the first canister and the second canister. In some embodiments, the processing chamber is fluidly connected to first canister, the second canister, or both the first canister and the second canister. In some embodiments, the at least one controller is programmed to direct an energy beam to transform the material used for the 3D printing to transform to print the 3D object.

In another aspect, a computer software product for 3D printing of at least one 3D object, comprising a non-transitory computer-readable medium in which program instructions are stored, which instructions, when read by a computer, cause the computer to perform operations comprises: operation (i) direct using a first filter to separate a gas-borne material from at least one gas that recirculates through a gas flow mechanism, which first filter is housed in a first canister that is configured to separate the first filter from an external atmosphere, wherein the gas-borne material is used or produced during the 3D printing, which gas flow mechanism comprises the first canister, wherein the external atmosphere comprises a reactive agent that violently reacts with the gas-borne material, wherein the at least one gas does not react violently with the reactive agent; and operation (ii) direct switching from (a) using the first filter to separate the at least one gas from the gas-borne material to (b) using a second filter to separate the at least one gas from the gas-borne material, which switching facilitates continuous and uninterrupted separation of the gas-borne material from the at least one gas, wherein the second filter is housed in a second canister that is configured to separate the second filter from the external atmosphere, wherein the gas flow mechanism comprises the second canister.

In another aspect, a system for printing a 3D object comprises: an energy source configured to generate an energy beam for transforming at least a portion of a pre-transformed material to a transformed material; a platform configured to support the 3D object; and an enclosure configured to enclose at least a portion of the platform during a printing operation, the enclosure (I) is operatively coupled to, or comprises a gas inlet portion at a first enclosure side and (II) is operatively coupled to, or comprises a gas outlet portion at a second enclosure side, wherein the gas inlet portion is configured to direct a flow of gas over a target surface that is (i) adjacent to the platform or (ii) comprises an exposed surface of the platform, and to the gas outlet portion, which gas inlet portion is configured to alter at least one characteristic of the flow of gas.

In some embodiments, altering the at least one characteristic of the flow of gas comprises altering a shape, a volume, a velocity, a direction, or an alignment of the flow of gas. In some embodiments, the platform is configured to vertically translate. In some embodiments, the platform is configured to vertically translate during the printing. In some embodiments, the target surface comprises the exposed surface of the 3D object. In some embodiments, the pre-transformed material is part of a material bed that is disposed on the platform. In some embodiments, the target surface comprises an exposed surface of the material bed. In some embodiments, the gas inlet portion is configured to direct the flow of gas in a direction that is substantially parallel to the target surface. In some embodiments, the system may be configured for printing a plurality of 3D objects. In some embodiments, the system may be configured for printing a plurality of 3D objects in the printing operation. In some embodiments, the first enclosure side faces the second enclosure side. In some embodiments, first enclosure side is disposed in an opposite direction to the second enclosure side. In some embodiments, the gas inlet portion is configured to direct the flow of gas in a first direction, wherein the gas inlet portion is configured to reduce a second flow of gas in a second direction that is substantially orthogonal to the first direction. In some embodiments, the enclosure comprises a window configured to allow the energy beam to pass therethrough. In some embodiments, the window is located vertically with respect to the platform. In some embodiments, the gas inlet portion is configured to direct the flow of gas in a substantially parallel to an average plane of the window. In some embodiments, the gas inlet portion comprises at least one baffle having at least one surface that is (e.g., substantially) non-parallel to the exposed surface of the platform. In some embodiments, the flow of gas over the target surface is substantially in accordance with a first directional component, wherein the at least one baffle is configured to increase a second directional component of the flow of gas within the gas inlet portion, wherein the second directional component is (e.g., substantially) non-parallel with the first directional component. The enclosure is configured to hold a positive pressure. In some embodiments, the flow of gas over the target surface is substantially in an X direction. In some embodiments, the at least one baffle is configured to increase Z and/or Y directional components of the flow of gas through the gas inlet portion. In some embodiments, the gas inlet portion comprises an elongated opening defined by a width and height. In some embodiments, a width-to-height ratio of the elongated opening is at least about 1, 1.5, 2, 5, 10, 15, 20, or 50. In some embodiments, the gas inlet portion comprises a first outlet port. In some embodiments, the first outlet port includes a perforated plate that channels the flow of gas through the first outlet port. In some embodiments, the gas inlet portion comprises a plurality of channels that channel the flow of gas through the first outlet port. In some embodiments, the plurality of channels are within a flow straightener (e.g., flow aligner). In some embodiments, the first outlet port includes a perforated plate that channels the flow of gas through the first outlet port. In some embodiments, the gas outlet portion has an aerodynamic shape configured to reduce gas turbulence within a processing chamber of the enclosure. In some embodiments, a path of the energy beam in a volume of a processing chamber of the enclosure defines a processing cone. In some embodiments, the gas outlet portion comprises a second inlet port and a second outlet port, wherein the gas outlet portion is configured to reduce backflow, turbulence, standing vortex, or any combination thereof, at least in the processing cone. In some embodiments, channeling the flow of gas comprises aligning the flow of gas. In some embodiments, the gas inlet portion is separated from a processing chamber of the enclosure by a first wall. In some embodiments, the gas outlet portion is separated from the processing chamber of the enclosure by a second wall. In some embodiments, the system comprises an optical mechanism that is configured to control a trajectory of the energy beam through the enclosure. In some embodiments, at least a portion of the optical mechanism is enclosed in a casing. the casing is purged by a purging gas flow. In some embodiments, the casing is leaky (e.g., to facilitate exit of the flow of gas). In some embodiments, the energy source is a first energy source and the energy beam is a first energy beam. In some embodiments, the system includes a second energy source configured to generate a second energy beam. In some embodiments, the second energy source is configured to direct the second energy beam at the target surface. In some embodiments, the second energy beam has at least one different energy characteristic than the first energy beam. In some embodiments, the second energy beam has at least one energy characteristic that is the same as that of the first energy beam. In some embodiments, the system further comprises a window configured to allow the energy beam to pass therethrough, and a recessed portion that supports the window and that includes a wall that defines a volume. In some embodiments, the wall includes an outlet opening arranged to direct a purging flow of gas into the volume. In some embodiments, the outlet opening is arranged to direct the flow of gas away from the window. In some embodiments, away from the window comprises toward a processing chamber of the enclosure. In some embodiments, the outlet opening is arranged to direct the flow of gas in a direction substantially parallel to a surface of the window. In some embodiments, the system further comprises a gas recycling system comprising: a filtration system that filters debris from the flow of gas exiting the gas outlet portion. In some embodiments, the system further comprises a gas recycling system comprising: at least one pump configured to control a pressure of the flow of gas. In some embodiments, controlling the pressure comprises regulating the pressure. In some embodiments, controlling the pressure comprises increasing the pressure. In some embodiments, the system comprises a window housing having a window and an outlet opening, wherein the gas recycling system is configured to supply clean gas to the outlet opening. In some embodiments, the gas inlet portion is configured to direct the flow of gas toward a surface of a material bed of the pre-transformed material. In some embodiments, the gas inlet portion comprises a backflow gas outlet portion configured to allow a backflow of gas to exit the enclosure. In some embodiments, the backflow gas outlet portion is disposed proximate to a gas inlet port of the gas inlet portion.

In another aspect, a method for printing a 3D object comprises: (a) directing a flow of gas through an enclosure from an inlet portion to an outlet portion, which flow of gas is above a target surface; (b) altering at least one characteristic of the flow of gas as it flows through the inlet portion; and (c) directing an energy beam toward a platform to transform a pre-transformed material to a transformed material as part of the printing of the 3D object, wherein the platform is disposed in the enclosure.

In some embodiments, the flow of gas above the target surface is in accordance with a first directional component, the method further comprising increasing a second directional component of the flow of gas within the inlet portion, the second directional component being (e.g., substantially) non-parallel with respect to the first directional component. In some embodiments, the flow of gas above the target surface is in accordance with a first directional component, the method further comprising increasing the flow of gas in the first directional component by directing the flow of gas through a plurality of channels within the inlet portion. In some embodiments, one or more controllers collectively or separately are programmed to direct the operations of (a), (b) and (c). In some embodiments, during (c), an insubstantial amount of debris affects the printing of the three-dimensional 3D object. In some embodiments, insubstantial comprises negligent, non-material, inconsequential, trivial, or negligible. In some embodiments, insubstantial is to a detectable degree. In some embodiments, during operation (c) an insubstantial amount of debris interacts with the energy beam. In some embodiments, during operation (c) an insubstantial amount of debris accumulates on and/or obstructs a window through which the energy beam travels. In some embodiments, the flow of gas is a primary flow of gas. In some embodiments, the method further comprises directing a secondary flow of gas within a volume of a recessed portion that is configured to support the window. In some embodiments, altering the at least one characteristic of the flow of gas comprises altering a shape, a volume, a velocity, a direction, or an alignment of the flow of gas. In some embodiments, vertically translating the platform is during the printing. In some embodiments, the target surface is an exposed surface of the 3D object. In some embodiments, the pre-transformed material is part of a material bed that is disposed on the platform. In some embodiments, the target surface comprises an exposed surface of the material bed. In some embodiments, the method further comprises printing a plurality of 3D objects. In some embodiments, directing the flow of gas over the target surface is while at least the portion of the pre-transformed material is being transformed to the transformed material. In some embodiments, the inlet portion directs the flow of gas in a direction that is substantially parallel to the target surface. In some embodiments, the inlet portion directs the flow of gas in a first direction and alters at least one characteristic of the flow of gas in a second direction. In some embodiments, the second direction is substantially orthogonal to the first direction. In some embodiments, directing the energy beam at the target surface comprises directing the energy beam through a window that is located (I) vertically with respect to the platform and/or (II) in a wall of the enclosure that faces the platform. In some embodiments, the flow of gas over the target surface is substantially in an X direction. In some embodiments, the inlet portion comprises baffles that increase Z and/or Y directional components of the flow of gas through the inlet portion. In some embodiments, the inlet portion comprises an elongated opening defined by a width and height, wherein a width-to-height ratio of the elongated opening is at least about 1, 1.5, 2, 5, 10, 15, 20, or 50. In some embodiments, the inlet portion comprises an outlet port comprising a plurality of channels that aligns the flow of gas through the outlet port. In some embodiments, the outlet port comprises a perforated plate. In some embodiments, the inlet portion is separated from a processing chamber of the enclosure by a first wall. In some embodiments, the enclosure comprises a processing chamber. In some embodiments, the method further comprising directing the flow of gas into the processing chamber via the inlet portion that is (i) a part of the processing chamber or (ii) is operatively coupled to the processing chamber. In some embodiments, the method further comprising directing the flow of gas out of the processing chamber via a gas outlet portion that is (i) a part of the processing chamber or (ii) is operatively coupled to the processing chamber. In some embodiments, the gas outlet portion has an aerodynamic shape that reduces a turbulence of the flow of gas within the processing chamber. In some embodiments, directing the energy beam at the target surface comprises controlling a trajectory of the energy beam through the enclosure using an optical mechanism. In some embodiments, the method further comprises purging a casing with a purging gas flow. In some embodiments, at least a portion of the optical mechanism is enclosed by the casing. In some embodiments, the casing is leaky (e.g., to facilitate exit of the purging gas flow from the casing). In some embodiments, the energy beam is a first energy beam. In some embodiments, the method further comprises directing a second energy beam toward the platform. In some embodiments, the second energy beam has a different energy characteristic than the first energy beam. In some embodiments, directing the energy beam at the target surface comprises directing the energy beam through a window positioned within a recessed portion that supports the of the enclosure. In some embodiments, the method further comprises directing a purging flow of gas to a volume of the recessed portion. In some embodiments, the purging flow of gas is in a direction away from a surface of the window. In some embodiments, the purging flow of gas is in a direction substantially parallel to a surface of the window. In some embodiments, the method further comprises directing the flow of gas out of the enclosure and through a gas recycling system. In some embodiments, the gas recycling system comprises: (a) a filtration system that filters debris from the flow of gas exiting the enclosure, or (b) at least one pump configured to increase a pressure of the flow of gas. In some embodiments, the method further comprises supplying clean gas to an outlet opening of a window housing. In some embodiments, the window housing is coupled to the window. In some embodiments, the inlet portion is configured to direct the flow of gas toward the target surface. In some embodiments, the method further comprises backflowing a portion of the flow of gas from the enclosure through a back-flow outlet port that is proximal to an outlet port of a gas inlet portion. In some embodiments, the flow of gas in the enclosure facilitates a reduced amount of debris from interfering with the printing of the 3D object. In some embodiments, the reduced amount of debris corresponds to an amount that is not material to formation of the 3D object. In some embodiments, a path of the energy beam in a volume of a processing chamber of the enclosure defines a processing cone, wherein the reduced amount of debris is at least in the processing cone. In some embodiments, the reduced amount of debris is adjacent to the target surface. In some embodiments, the reduced amount of debris does not adhere to a window through which the energy beam travels into a processing chamber of the enclosure.

In another aspect, a system for printing a 3D object comprises: an energy source configured to generate an energy beam for transforming a pre-transformed material to a transformed material; a platform configured to support the 3D object; and an enclosure configured to enclose the platform, the enclosure comprising: a window configured to allow the energy beam to pass therethrough, and (i) a recessed portion that supports the window and that includes a wall that defines a volume, (ii) an outlet opening configured to direct a flow of gas into the volume in a direction away from the window, or (iii) a combination of (i) and (ii).

In some embodiments, the window has an internal window surface that is exposed to the volume. In some embodiments, the direction away from the window is at an acute angle with respect to the internal window surface. In some embodiments, the window has a plurality of outlet openings. In some embodiments, at least two of the outlet openings face each other. In some embodiments, at least a first opening and a second opening of the plurality of outlet openings are configured such that: (a) the first opening directs a first gas flow away from the window and towards the second opening, and (b) the second opening directs a second gas flow away from the window and towards the first opening. In some embodiments, the second gas flow merges with the first gas flow to form a third gas flow. In some embodiments, the first opening and the second opening are configured to facilitate flowing the third gas flow towards a plane of a target surface that is disposed in the enclosure. In some embodiments, the window has an internal window surface that is exposed to the volume. In some embodiments, a flow vector of the flow of gas is non-tangential to the internal window surface. In some embodiments, the flow of gas is characterized as having cone-shaped convergence vectors. In some embodiments, the enclosure includes a window housing that supports the window and at least partially defines the recessed portion. In some embodiments, the window housing includes a plenum portion that is configured to supply gas to the outlet opening. In some embodiments, the outlet opening is within the wall. In some embodiments, the system comprises a plurality of windows that are configured to allow the energy beam to pass therethrough. In some embodiments, the system comprises a plurality of window housings that are configured to support the plurality of windows. In some embodiments, the volume is between the window and the platform. In some embodiments, the recessed portion and/or an outlet opening within the wall is/are configured to reduce an amount of debris from (i) altering the energy beam, (ii) obstructing the window, or (iii) any combination thereof. In some embodiments, altering the energy beam comprises altering a wavelength, power density, or trajectory thereof. In some embodiments, obstructing the window comprises adhering to and/or reacting with the optical window.

In another aspect, a method for printing a 3D object comprises: (a) directing an energy beam toward a platform to transform at least a portion of a pre-transformed material to a transformed material, wherein the platform is disposed in an enclosure, wherein the energy beam is directed through a window that is (i) positioned within a recessed portion of the enclosure, the recessed portion including a wall that defines a volume, (ii) proximate to an outlet opening configured to allow a flow of gas to flow therethrough, or (iii) a combination of (i) and (ii); and (b) in case of (ii) or (iii), directing the flow of gas through the outlet opening in a direction away from the window.

In some embodiments, one or more controllers are collectively or separately programmed to direct operations (a) and (b). In some embodiments, during operation (b), an insubstantial amount of debris affects the printing of the 3D object. In some embodiments, insubstantial comprises negligent, non-material, inconsequential, trivial, or negligible. In some embodiments, insubstantial is to a detectable degree. In some embodiments, during operation (b) an insubstantial amount of debris interacts with the energy beam. In some embodiments, during operation (b) an insubstantial amount of debris accumulates on and/or obstructs the window. In some embodiments, directing the flow of gas through the outlet opening in the direction away from the window further comprises directing the flow of gas into the volume of the recessed portion. In some embodiments, the window has an internal window surface that is exposed to the volume. In some embodiments, the direction away from the window is at an acute angle with respect to the internal window surface. In some embodiments, the window has an internal window surface that is exposed to the volume. In some embodiments, directing the flow of gas in operation (b) comprises directing a flow vector of the flow of gas in a direction non-tangential to the internal window surface. In some embodiments, directing the flow of gas in operation (b) comprises directing the flow of gas in convergence vectors. In some embodiments, the convergence vectors have a triangular shape. In some embodiments, the enclosure includes a window housing that supports the window and at least partially defines the recessed portion. In some embodiments, the window housing includes a plenum portion that supplies gas to the outlet opening. In some embodiments, the method further comprises flowing the gas through the plenum portion. In some embodiments, the energy beam is a first energy beam and the window is a first window. In some embodiments, the method further comprising directing a second energy beam toward the platform through a second window. In some embodiments, the second window is positioned in a second recessed portion of the enclosure. In some embodiments, the volume is between the window and the platform.

In another aspect, a system for printing a three-dimensional (3D) object, the system comprises: a platform configured to support the 3D object; and an enclosure configured to enclose at least the platform during a printing operation, the enclosure operatively coupled to, or comprises: a gas inlet portion at a first enclosure side, the gas inlet portion configured to direct a flow of gas in a first direction over a target surface that is (i) adjacent to the platform, or (ii) comprises a surface of the platform, and a gas outlet portion at a second enclosure side, the gas outlet portion configured to direct the flow of gas out of the enclosure via at least one outlet opening, wherein (a) the gas inlet portion includes at least one baffle configured to direct gas in a second direction different from the first direction, which gas is directed within the gas inlet portion, (b) the gas outlet portion has a cross-sectional shape that tapers toward the at least one outlet opening, or (c) any combination of (a) and (b).

In some embodiments, the at least one baffle comprises at least one surface that is substantially non-parallel (e.g., is perpendicular) to the surface of the platform. In some embodiments, the gas inlet portion opposes the gas outlet portion in space. In some embodiments, the gas inlet portion further comprises at least one flow aligner having walls that direct the flow of gas in the first direction. In some embodiments, the at least one flow aligner is more proximate to the platform than the at least one baffle. In some embodiments, the at least one flow aligner directs gas within the gas inlet portion toward an outlet port of the gas inlet portion. In some embodiments, the at least one flow aligner is part of an outlet port section of the gas inlet portion, the outlet port section having an elongated shape. In some embodiments, the gas outlet portion comprises a first side (e.g., top) and an opposing second side (e.g., bottom). In some embodiments, the first side tapers toward the at least one outlet opening more than the second side tapers toward the at least one outlet opening. In some embodiments, the second side is more proximate to the platform than the first side. In some embodiments, the first direction is substantially parallel to the target surface. In some embodiments, the gas inlet portion is configured to alter a shape, a volume, a velocity, a direction, or an alignment of the flow of gas. In some embodiments, the platform is configured to vertically translate. In some embodiments, the platform is configured to translate in a direction that is substantially non-parallel (e.g., is perpendicular) to the first direction. In some embodiments, the system further comprises an energy source configured to generate an energy beam for transforming at least a portion of a pre-transformed material to a transformed material as part of the 3D object. In some embodiments, the gas inlet portion and/or the outlet portion comprises at least one filter configured to reduce an amount of gas-borne material within the enclosure. In some embodiments, the at least one filter comprises a High-Efficiency Particulate Arrestance (HEPA) filter. In some embodiments, the gas outlet portion is separated by a main portion of the enclosure by a wall. In some embodiments, the wall comprises one or more openings configured to allow the flow of gas to enter the gas outlet portion from the main portion of the enclosure. In some embodiments, a size of the one or more openings is adjustable. In some embodiments, the gas inlet portion comprises a flow aligning structure (e.g., comprises the at least flow aligner) configured to align the flow of gas in the first direction by directing the flow of gas through a plurality of channels. In some embodiments, the flow aligning structure is positioned at a part of the gas inlet portion adjacent the platform. In some embodiments, the flow aligning structure is positioned at a bottom part of the gas inlet portion. In some embodiments, the flow aligning structure has a height of at most about 5, 4, 3, 2, 1, or 0.5 inches. In some embodiments, the enclosure is configured to hold a positive pressure. In some embodiments, the at least one baffle comprises a surface that is configured to (i) minimize friction between the flow of gas and the surface of the baffle and/or (ii) reduce a reactive species in the flow of gas. In some embodiments, the surface is polished. In some embodiments, the surface comprises an absorbing species of the reactive species, or a quenching agent to the reactive species. In some embodiments, the absorbing species is a chelate. In some embodiments, the absorbing species is a desiccant. In some embodiments, the gas inlet portion is configured to facilitate (I) expansion of a cross section of the flow of gas as it flows through the gas inlet portion and/or (II) homogenization of the flow of gas through the cross section. In some embodiments, the at least one baffle is configured to facilitate (I) expansion of a cross section of the flow of gas as it flows through the gas inlet portion and/or (II) homogenization of the flow of gas through the cross section. In some embodiments, the cross section is a vertical cross section. In some embodiments, the vertical cross section is expanded to encompass a fundamental length scale (e.g., width) of the platform. In some embodiments, the cross-sectional shape that tapers is configured to reduce turbulence, backflow, and/or standing vortices in a processing cone volume by tapering the flow of gas. In some embodiments, the processing cone is above the target surface or comprises the target surface. In some embodiments, the at least one baffle is configured to be exchangeable and/or movable. In some embodiments, the exchangeable and/or movable is before, during and/or after the printing.

In another aspect, a method for printing a 3D object, the method comprises: (a) directing a flow of gas through an enclosure from a gas inlet portion to a gas outlet portion, which flow of gas is in a first direction over a target surface that is (i) adjacent to a platform configured to support the 3D object, or (ii) comprises a surface of the platform; and (b) using at least one baffle of the gas inlet portion to direct the flow of gas in a second direction different from the first direction as it flows through the gas inlet portion, (b) tapering the flow of gas within the gas outlet portion toward at least one outlet opening of the gas outlet portion, or (c) a combination of (a) and (b).

In some embodiments, the second direction is substantially non-parallel to the first direction. In some embodiments, the second direction is substantially orthogonal to the first direction. In some embodiments, the first direction is substantially parallel to the surface of the platform. In some embodiments, the method further comprises aligning the flow of gas in the first direction by directing the flow of gas through a plurality of channels within the gas inlet portion.

In some embodiments, the method further comprises directing an energy beam toward the platform to transform a pre-transformed material to a transformed material as part of the printing of the 3D object. In some embodiments, the method further comprises causing the flow of gas to flow through at least one filter (e.g., HEPA filter) prior to entering the gas inlet portion. In some embodiments, the method further comprises translating the platform. In some embodiments, translating the platform comprises vertically translating the platform. In some embodiments, translating the platform comprises translating the platform in a third direction different than the first direction. In some embodiments, the third direction is substantially non-parallel to the first direction. In some embodiments, the third direction is substantially orthogonal to the first direction. In some embodiments, the method further comprises expanding a cross section of the flow of gas during its flow through the gas inlet portion. In some embodiments, the cross section is a vertical cross section. In some embodiments, the vertical cross section is expanded to encompass a fundamental length scale (e.g., width) of the platform. In some embodiments, the method further comprises using the at least one baffle for the expanding. In some embodiments, the method further comprises homogenizing the flow of gas across a cross section of the flow of gas during its flow through the gas inlet portion. In some embodiments, the cross section is a vertical cross section. In some embodiments, the vertical cross section is homogenized along a fundamental length scale (e.g., width) of the platform. In some embodiments, the method further comprises using the at least one baffle for the homogenizing. In some embodiments, the method further comprises reducing turbulence, backflow, and/or standing vortices in a processing cone volume by tapering the flow of gas. In some embodiments, the processing cone is above the target surface or comprises the target surface. In some embodiments, the method further comprises exchanging the at least one baffle. In some embodiments, the exchanging is before, during and/or after the printing. In some embodiments, the method further comprises moving the at least one baffle. In some embodiments, the exchanging is before, during and/or after the printing.

In another aspect, an apparatus for printing a 3D object, the apparatus comprises: a platform configured to support the 3D object during the printing; an energy source configured to generate an energy beam that transforms a pre-transformed material to a transformed material to print the 3D object, which energy beam is operatively coupled to the platform; a window that facilitates transmittal of the energy beam therethrough; and a wall configured to at least in part support the window and define a volume adjacent to the window, which wall comprises (i) a channel configured to facilitate flow of a gas therethrough, and (ii) an opening of the channel configured to direct flow of the gas away from the window, which opening is disposed adjacent to the window.

In some embodiments, the window is an optical window. In some embodiments, the platform is housed in an enclosure that comprises an outlet opening configured to direct a flow of gas into the volume in the direction away from the window. In some embodiments, the platform is housed in an enclosure that comprises the volume, the wall, and the window. In some embodiments, the window comprises an internal window surface that is exposed to the volume. In some embodiments, the direction away from the window is at an acute angle with respect to the internal window surface. In some embodiments, the wall comprises a plurality of (outlet) openings. In some embodiments, at least two of the (outlet) openings face each other. In some embodiments, the opening corresponds to an annular-shaped slit. In some embodiments, the wall comprises the (outlet) opening that is configured to direct the gas flow away from the window. In some embodiments, away from the window comprises towards the platform, downwards, in a vertical direction, and/or towards a gravitational center (e.g., of earth). In some embodiments, the flow of the gas that is directed flows in a laminar or spiral flow in a direction away from the window. In some embodiments, the wall has a plurality of outlet openings. In some embodiments, at least a first opening and a second opening of the plurality of outlet openings are configured such that: the first opening directs a first gas flow (i) away from the window and/or (ii) towards the second opening, and the second opening directs a second gas flow away from the window and/or towards the first opening. In some embodiments, the second gas flow merges with the first gas flow to form a third gas flow, and wherein the first opening and the second opening are configured to facilitate flowing the third gas flow towards the platform, towards a gravitational center, downwards, and/or in a vertical direction. In some embodiments, the window has an internal window surface that is exposed to the volume. In some embodiments, a flow vector of the flow of the gas is non-tangential to the internal window surface. In some embodiments, the outlet is configured to facilitate a flow of gas away from the window that is characterized as having cone-shaped convergence vectors. In some embodiments, the apparatus further comprises a holder configured to support the window. In some embodiments, the holder is operatively coupled to the wall and to the window. In some embodiments, the apparatus is configured to facilitate reduction in an amount of a debris formed during the printing from (i) altering the energy beam, (ii) obstructing the window, or (iii) a combination of (i) and (ii). In some embodiments, altering the energy beam comprises altering a wavelength, power density, or trajectory thereof. In some embodiments, obstructing the window comprises adhering to and/or reacting with the window. In some embodiments, the window comprises a material having a thermally conductivity higher than that of fused silica. In some embodiments, the material is substantially transparent to at least a portion of wavelengths of the energy beam. In some embodiments, the window comprises sapphire, crystal quartz, zinc selenide (ZnSe), magnesium fluoride ($MgF_2$), or calcium fluoride ($CaF_2$). In some embodiments, the window comprises a material having a thermal conductivity of at least about 5 W/m° C. at 300 K. In some embodiments, the enclosure is configured to maintain an internal atmosphere at a positive pressure. In some embodiments, the energy source is configured to direct the energy beam through another volume defined by a processing cone within the enclosure. In some embodiments, the enclosure comprises at least one vacuum duct that is configured to remove at least a portion of debris within the processing cone. In some embodiments, the channel comprises a portion that is different from a horizontal channel. In some embodiments, the channel comprises a vertical channel portion. In some embodiments, the channel is a covered channel. In some embodiments, the opening forms an acute angle with the (e.g., optical) window. In some embodiments, the acute angle points the opening towards the platform. In some embodiments, the flow of the gas is filtered by a HEPA filter prior to its entry into the channel.

In another aspect, a method for printing a 3D object, the method comprises: (a) directing an energy beam through a window toward a platform to transform at least a portion of a pre-transformed material to a transformed material to form the 3D object; and (b) directing a flow of a gas in a direction away from the window, which gas flows through a channel in a wall and through an outlet opening in the wall, which wall at least in part supports the window, which outlet opening is adjacent to the window, which outlet opening is coupled to the channel.

In some embodiments, one or more controllers collectively or separately are programmed to direct the operations of (a) and (b). In some embodiments, during operation (b), a reduced amount of debris affects the printing of the 3D object. In some embodiments, reduced is in comparison to lack of the flow of the gas. In some embodiments, during operation (b), an insubstantial amount of debris affects the printing of the 3D object. In some embodiments, insubstantial comprises negligent, non-material, inconsequential, trivial, or negligible. In some embodiments, insubstantial is to a detectable degree. In some embodiments, during operation (b) an insubstantial amount of debris interacts with the energy beam. In some embodiments, during operation (b) an insubstantial amount of debris accumulates on and/or obstructs the window. In some embodiments, during operation (b), a substantially undetectable amount of debris affects a peak intensity of the energy beam used to transform the pre-transformed material. In some embodiments, during operation (b), a peak intensity of the energy beam is substantially unchanged after transformation of at least 500 layers of pre-transformed material. In some embodiments, during operation (b), a peak intensity of the energy beam is substantially unchanged after transformation of at least about 3.4 milliliters of pre-transformed material. In some embodiments, directing the flow of the gas through the outlet opening in the direction away from the window further comprises directing the flow of the gas into a volume of a recessed portion defined at least in part by the wall and the window. In some embodiments, the window has an internal window surface that is exposed to the volume. In some embodiments, a direction away from the window is at an acute angle with respect to the internal window surface. In some embodiments, the window has an internal window surface that is exposed to the volume. In some embodiments, directing the flow of the gas in operation (b) comprises directing a flow vector of the flow of gas in a direction non-tangential to the internal window surface. In some embodiments, directing the flow of the gas in operation (b) comprises directing the flow of gas in convergence vectors. In some embodiments, the convergence vectors have a triangular shape. In some embodiments, the flow of the gas flows away from the window comprises a pyramidal, conical, and/or spiraling shape in a recessed portion defined at least in part by the wall and the window. In some embodiments, the platform is disposed in an enclosure that includes a window housing that supports the window and at least partially defines the recessed portion. In some embodiments, the window housing includes a plenum portion that supplies gas to the outlet opening, and wherein the method further comprises flowing the gas through the plenum portion. In some embodiments, the window housing comprises the wall. In some embodiments, the energy beam is a first energy beam and the window is a first window, the method further comprises directing a second energy beam toward the platform through a second window. In some embodiments, the platform is disposed in an enclosure that includes the window that is part of a first recessed portion. In some embodiments, the second window is positioned in a second recessed portion of the enclosure. In some embodiments, the volume is between the window and the platform.

In another aspect, a system for printing a 3D object, the system comprises: a platform configured to support the 3D object (e.g., during the printing); a material dispenser configured to dispense a pre-transformed material towards the platform, wherein the material dispenser is configured to traverse in a first direction adjacent to the platform; and a gas flow director configured to direct a flow of gas in a second direction adjacent the platform, wherein the first direction is non-parallel to the second direction.

In some embodiments, the platform is configured to support a material bed that comprises the pre-transformed material. In some embodiments, the material dispenser is part of a layer forming apparatus is configured to dispense a planar layer of pre-transformed material above the platform. In some embodiments, adjacent to the platform comprises above the platform and/or parallel to the platform. In some embodiments, the first direction is substantially orthogonal to the second direction. In some embodiments, the system further comprises an enclosure configured to enclose the platform. In some embodiments, the enclosure comprises a processing chamber that is configured to enclose the at least one layer of pre-transformed material during a transformation process. In some embodiments, the enclosure is configured to house the material dispenser. In some embodiments, the material dispenser is housed in an ancillary chamber during a transformation process. In some embodiments, the ancillary chamber is comprised in the enclosure. In some embodiments, the gas flow director comprises (i) a gas inlet portion at a first side of the enclosure, (ii) a gas outlet portion at a second side of the enclosure, or (iii) a combination of (i) and (ii). In some embodiments, the enclosure is operatively coupled to, or comprises, the gas inlet portion. In some embodiments, the enclosure is operatively coupled to, or comprises, the gas outlet portion. In some embodiments, the gas flow director is configured to control one or more of a shape, a velocity, a temperature, a chemical makeup, and a uniformity, of the flow of gas. In some embodiments, the gas flow director is configured to impart a (e.g., substantially) planar shape to the flow of gas at least above the platform. In some embodiments, the gas flow director comprises a gas inlet portion comprises an elongated aperture that imparts a (e.g., substantially) planar shape to the flow of gas at least above the platform. In some embodiments, the gas flow director comprises a gas inlet portion comprises at least one baffle configured to change a direction of the flow of gas, uniformity along a (e.g., vertical) cross section of the flow of gas, and/or a size of a (e.g., vertical) cross section of the flow of gas, in the gas inlet portion. In some embodiments, change comprises adjust temperature, adjust chemical makeup (e.g., level of a reactive agent, e.g., oxygen or humidity), homogenize or expand, the flow of gas. In some embodiments, the at least one baffle is configured to change a direction of the flow of gas within the gas flow director to a third direction different than (a) the first direction, (b) the second direction, or (c) the first and second directions. In some embodiments, the gas flow director comprises a gas inlet portion comprises at least one alignment structure configured to align portions of the flow of gas in the gas inlet portion (e.g., in accordance with the second direction). In some embodiments, the at least one alignment structure includes walls that align the portions of the flow of gas within the gas inlet portion. In some embodiments, the gas flow director comprises at least one valve configured to control a velocity and/or pressure of the flow of gas. In some embodiments, the system further comprises an enclosure configured to enclose at least one layer of pre-transformed material during a printing operation. In some embodiments, the system further comprises an energy source configured to generate an energy beam for transforming at least a portion of the at least one layer to a transformed material. In some embodiments, the system further comprises an enclosure. In some embodiments, the energy source is configured to direct the energy beam defined by a processing cone within the enclosure. In some embodiments, the enclosure comprises at least one vacuum duct that is configured to remove at least a portion of debris within and/or out of the processing cone. In some embodiments, the material dispenser is configured to translate (e.g., laterally) over the platform. In some embodiments, the gas flow director is configured to direct the flow of gas over the platform. In some embodiments, the platform is configured to support multiple layers of pre-transformed material as a material bed. In some embodiments, the system further comprises at least one controller configured to cause the material dispenser to dispense the pre-transformed material (e.g., while the gas flow director directs the flow of gas in the second direction). In some embodiments, the material dispenser is part of a layer forming apparatus that further comprises a leveler, or a material remover. In some embodiments, the layer forming apparatus is configured to form a (e.g., substantially) planar shaped at least one layer of pre-transformed material. In some embodiments, the material dispenser having an opening that is configured to dispense a pre-transformed material therethrough. In some embodiments, the layer forming apparatus comprises a leveler having an elongated edge that is configured to level an exposed surface of a material bed. In some embodiments, the layer forming apparatus comprises a material remover having an elongated opening that is configured to accept at least a portion of material from a material bed therethrough. In some embodiments, the system further comprises at least one controller configured to cause the layer forming apparatus to form the at least one layer of pre-transformed material (e.g., while the gas flow director directs the flow of gas in the second direction). In some embodiments, the system further comprises at least one controller configured to cause the layer forming apparatus to form the at least one layer of pre-transformed material (e.g., while the gas flow director is directing the flow of gas in the second direction). In some embodiments, the system further comprises at least one controller configured to cause the gas flow director to direct the flow of gas out of the enclosure (e.g., and away from the platform), e.g., while the layer forming apparatus forms the at least one layer of pre-transformed material. In some embodiments, the system further comprises at least one controller configured to cause the flow of gas director to direct the flow of gas out of an enclosure while the material dispenser dispenses the pre-transformed material. In some embodiments, the enclosure comprises: the platform, at least part of the flow of gas, and the material dispenser In some embodiments, away from the platform comprises outside of an enclosure configured to enclose the at least one layer of pre-transformed material during a printing operation. In some embodiments, the gas flow director comprises a gas inlet portion and/or a gas outlet portion. In some embodiments, the gas inlet portion and/or the gas outlet portion comprises at least one filter configured to control a quality of the flow of gas. In some embodiments, the at least one filter comprises a HEPA filter. In some embodiments, the gas flow director is configured to control at least one characteristic of the flow of gas. In some embodiments, the system further comprises at least one controller operatively coupled to the gas flow director. In some embodiments, the at least one controller is configured to effectuate the control. In some embodiments, the at least one characteristic of the flow of gas comprises: velocity, fundamental cross section of a volume of the flow of gas, homogeneity of a volume of the flow of gas in a cross section, chemical makeup of the flow of gas, laminarity of the flow of gas, turbulence of the flow of gas, or a temperature of the flow of gas. In some embodiments, the cross section is a vertical cross section. In some embodiments, the vertical cross section encompasses a fundamental length scale of the platform.

In another aspect, a method of printing a 3D object, the method comprises: (a) using a material dispenser to dispense pre-transformed material towards a platform while traversing the material dispenser in a first direction adjacent to the platform; and (b) using a gas flow director to direct a flow of gas in a second direction adjacent to the platform. In some embodiments, the first direction is non-parallel to the second direction.

In some embodiments, the material dispenser is part of a layer forming apparatus used to form a planar layer of pre-transformed material disposed above the platform. In some embodiments, the method further comprises transforming at least a portion of the pre-transformed material to a transformed material to print the 3D object. In some embodiments, the method further comprises using an energy beam to effectuate the transforming. In some embodiments, using the gas flow director to direct a flow of gas in a second direction is during the printing. In some embodiments, using the material dispenser is during a period different from when transforming the pre-transformed material to a transformed material as part of the 3D object. In some embodiments, using the gas flow director to direct a flow of gas in a second direction is when transforming the pre-transformed material to a transformed material as part of the 3D object. In some embodiments, the method further comprises controlling one or more characteristics of the flow of gas. In some embodiments, one or more characteristics of the flow of gas differs (i) when transforming the pre-transformed material to a transformed material as part of the 3D object as compared to a period lacking the transforming, and/or (ii) while using the material dispenser as compared to during a period where the material dispenser is not used to dispense the pre-transformed material. In some embodiments, the flow of gas is flowing at a different rate (i) when transforming the pre-transformed material to a transformed material as part of the 3D object as compared to a period lacking the transforming and/or (i) while using the material dispenser as compared to during a period where the material dispenser is not used to dispense the pre-transformed material. In some embodiments, using the flow of gas comprises controlling one or more characteristics of the flow of gas. In some embodiments, using the flow of gas comprises altering one or more characteristics of the flow of gas. In some embodiments, the first direction is substantially orthogonal to the second direction. In some embodiments, the method further comprises directing the flow of gas through a gas inlet portion prior to directing the flow of gas adjacent to the platform. In some embodiments, the method further comprises modifying at least one of a shape, a velocity, a chemical makeup (e.g., level of a reactive agent), a temperature, or a uniformity of the flow of by flowing the flow of gas through a gas inlet portion that is coupled to or is a part of an enclosure that comprises the platform, at least part of the flow of gas, and the material dispenser. In some embodiments, the reactive agent reacts with a by-product of the printing and/or the pre-transformed material under the printing, flow of gas, and/or gas filtration conditions. In some embodiments, the method further comprises directing the flow of gas through a gas outlet portion subsequent to directing the flow of gas adjacent to the platform. In some embodiments, the method further comprises directing an energy beam toward the platform to transform at least a portion of the at least one layer of pre-transformed material to a transformed material. In some embodiments, the method further comprises translating the platform. In some embodiments, the platform is translated in a third direction that is different than at least one of the first and second directions. In some embodiments, the third direction is substantially orthogonal to at least one of the first and second directions.

In another aspect, a system for printing a 3D object, the system comprises: a platform configured to support at least one layer of pre-transformed material; a layer forming apparatus configured to traverse adjacent the platform and dispense a pre-transformed material towards the platform; and a gas flow director configured to direct a flow of gas at a velocity adjacent the platform, wherein the gas flow director is configured to alter the velocity for at least a portion time that the layer forming apparatus traverses adjacent the platform.

In some embodiments, the layer forming apparatus is configured to dispense a planar layer of the pre-transformed material. In some embodiments, the pre-transformed material forms a material bed, and wherein the platform is configured to support the material bed. In some embodiments, the system further comprises an energy source configured to generate an energy beam that transforms the pre-transformed material to a transformed material as part of the 3D object. In some embodiments, alter the velocity comprises increase or decrease the velocity. In some embodiments, alter comprises linear alteration of the velocity. In some embodiments, the gas flow director is configured to change the flow of gas when the layer forming apparatus is dispensing the pre-transformed material. In some embodiments, the gas flow director is configured to change the flow of gas when the layer forming apparatus is dispensing the pre-transformed material. In some embodiments, the layer forming apparatus comprises at least one of (i) a material dispenser configured to dispense the at least one layer of pre-transformed material, (ii) a material remover configured to remove at least a portion of the at least one layer of pre-transformed material, or (iii) leveler configured to level an exposed surface of the at least one layer of pre-transformed material. In some embodiments, the material dispenser and the material remover traverse together over the platform. In some embodiments, the material dispenser is configured to dispense the at least one layer of pre-transformed material when traversing in a forward direction over the platform. In some embodiments, and the material remover is configured to remove the at least a portion of the at least one layer of pre-transformed material when traversing in a reverse direction over the platform. In some embodiments, the gas flow director comprises at least one valve. In some embodiments, the at least one valve (a) constricts the flow of gas, (b) obstructs the flow of gas, (c) diverts the flow of gas, or (d) at least two of (a), (b) or (c). In some embodiments, the gas flow director is configured to divert at least a portion of the flow of gas to a gas outlet. In some embodiments, the gas flow director is configured to divert at least a portion of the flow of gas to a recycling system. In some embodiments, the gas flow director comprises a flow diverter configured to divert the flow of gas within an enclosure that encloses the pre-transformed material during printing. In some embodiments, the system further comprises at least one pump configured to supply the flow of gas. In some embodiments, the system further comprises at least one upstream valve and/or at least one downstream valve that is/are configured to at least partially control altering the velocity. In some embodiments, the system further comprises at least one filter configured to control a quality of the flow of gas. In some embodiments, the at least one filter comprises a HEPA filter. In some embodiments, the platform is configured to traverse in a vertical direction. In some embodiments, the platform is configured to traverse during printing. In some embodiments, the platform is configured to traverse in a direction that is non-parallel to a direction of the flow of gas.

In another aspect, a method of printing a 3D object, the method comprises: (A) traversing a layer forming apparatus adjacent a platform to dispense a pre-transformed material towards the platform; and (B) causing a gas flow director to direct a flow of gas adjacent the platform, wherein the gas flow director directs the flow of gas at a first velocity for at least a portion time that the layer forming apparatus is traversing adjacent the platform and at a second velocity for at least a portion of time that the layer forming apparatus is not traversing adjacent the platform.

In some embodiments, the first velocity is greater than the second velocity. In some embodiments, the first velocity is less than the second velocity. In some embodiments, the gas flow director changes the flow of gas between the first velocity and the second velocity by diverting at least a portion of the flow of gas to a region within an enclosure that encloses the pre-transformed material. In some embodiments, the diverting is during the printing. In some embodiments, diverting the at least the portion of the flow of gas is toward a gas outlet. In some embodiments, the gas flow director changes the flow of gas between the first velocity and the second velocity by adjusting at least one pump that at least partially supplies and/or pressurizes the flow of gas. In some embodiments, the gas flow director changes the flow of gas between the first velocity and the second velocity by using at least one valve to (a) constrict the flow of gas, (b) obstruct the flow of gas, (c) divert the flow of gas, or (d) at least two of (a), (b) or (c). In some embodiments, the gas flow director changes the flow of gas between the first velocity and the second velocity during the printing. In some embodiments, the method further comprises directing an energy beam toward the platform to transform the pre-transformed material to a transformed material to print the 3D object. In some embodiments, the gas flow director changes the flow of gas between the first velocity and the second velocity during transformation of the pre-transformed material to a transformed material. In some embodiments, the method further comprises translating the platform. In some embodiments, the method further comprises translating the platform during the printing.

In another aspect, a system for printing a 3D object, the system comprises: a platform configured to support the 3D object during the printing; an enclosure configured to enclose the 3D object within an internal atmosphere comprises a gas (e.g., during printing); and a filtering system configured to filter a gas-borne material from a flow of the gas that exits the enclosure, the filtering system comprises: a first canister operationally coupled with the enclosure and comprises a first filter, a second canister operationally coupled with the enclosure and comprises a second filter, wherein each of the first and second filters is configured to separate the gas-borne material from the flow of the gas, and at least one valve configured to switch a direction of the flow of the gas between the first canister and the second canister, which switching facilitates uninterrupted separation of the gas-borne material from the flow of the gas during the printing.

In some embodiments, during the printing, each of the first and second filters is configured to (i) separate the gas-borne material from the flow of the gas. In some embodiments, each of the first and second filters is further configured to (i) separate the gas-borne material from an external atmosphere, and/or (ii) separate the flow of the gas from the external atmosphere. In some embodiments, during the printing, each of the first and second filters is further configured to (i) separate the gas-borne material from an external atmosphere, and/or (ii) separate the flow of the gas from the external atmosphere. In some embodiments, the system further comprises at least one pump configured to supply a pumping force that drives the flow of the gas through at least one of the first canister or the second canister and back into the enclosure. In some embodiments, the at least one pump is configured to direct the flow of the gas from an outlet port of the enclosure to an inlet port of the enclosure. In some embodiments, the first and second canisters are configured to substantially prevent a reactive agent in an external atmosphere from reacting with the gas-borne material within the first and second canisters respectively. In some embodiments, the first canister is fluidly coupled with the second canister. In some embodiments, fluidly coupled comprises facilitating travel of the gas and/or the gas borne material. In some embodiments, the first canister is fluidly coupled with the enclosure. In some embodiments, the second canister is fluidly coupled with the enclosure. In some embodiments, the platform is configured to traverse during printing. In some embodiments, the platform is configured to vertically traverse. In some embodiments, the enclosure is configured to maintain the internal atmosphere at a positive pressure. In some embodiments, the system further comprises a third filter coupled with a wall of the enclosure. In some embodiments, the third filter is within or proximate to a gas inlet portion and/or a gas outlet portion of the enclosure. In some embodiments, the first filter and/or the second filter comprises a HEPA filter. In some embodiments, the first canister comprises a first casing material and the second canister comprises a second casing material. In some embodiments, the first casing material has a different (i) material type, (ii) casing wall structure, (iii) casing shape, or (iv) at least two of (i) to (iii) compared to the second casing material. In some embodiments, the first canister comprises a first casing material and the second canister comprises a second casing material. In some embodiments, the first casing material has the same (i) material type, (ii) casing wall structure, (iii) casing shape, or (iv) at least two of (i) to (iii) as the second casing material. In some embodiments, the first canister comprises a first casing material and the second canister comprises a second casing material. In some embodiments, at least one of the first and/or the second casing materials includes one or more layers. In some embodiments, the one or more layers comprise a solid layer, a liquid layer, a semi-solid layer, or a gas-layer. In some embodiments, the first canister comprises a first valve. In some embodiments, the first valve operatively couples the first canister to the enclosure. In some embodiments, the second canister comprises a second valve. In some embodiments, the second valve operatively couples the second canister to the enclosure. In some embodiments, the at least one valve is configured to reversibly decouple the first canister and/or the second canister from the enclosure. In some embodiments, the gas-borne material comprises at least one of debris, soot, or pre-transformed material. In some embodiments, the system further comprises at least one sensor configured to detect (i) a reactive agent, or (ii) the gas-borne material in the flow of gas. In some embodiments, the reactive agent is reactive with the gas borne material under the conditions prevailing in the enclosure, first canister, and/or second canister. In some embodiments, the reactive agent comprises oxygen or water. In some embodiments, the system further comprises at least one sensor configured to detect (i) a presence or absence of the first filter and/or the second filter, (ii) a reactive species of the gas, (iii) a velocity of the gas traveling, or (iv) a pressure, in the first canister and/or the second canister. In some embodiments, detect is (i) during the printing, and/or (ii) a filtration process in the first canister and/or the second canister. In some embodiments, the at least one sensor is coupled to at least one controller (e.g., respectively). In some embodiments, the at least one controller is configured to (i) control the flow of gas, (ii) direct replacement of the first filter and/or the second filter, and/or (iii) direct decoupling of the first canister and/or the second canister from the enclosure (e.g., considering an output from the sensor).

In another aspect, a method of printing a 3D object, the method comprises: (a) directing a flow of gas out of an enclosure that is configured to enclose the 3D object within an internal atmosphere during printing; and (b) uninterruptedly during the printing, using a filtering system operationally coupled to the enclosure to filter a gas-borne material from the flow of gas out of the enclosure, wherein using the filtering system comprises: (i) filtering the gas borne material in a first canister by passing the flow of gas through a first filter disposed in the first canister, (ii) directing the flow of gas from the first canister to a second canister, and (iii) filtering the gas borne material in the second canister by passing the flow of gas through a second filter disposed in the second canister to form a filtered gas.

In some embodiments, the method further comprises facilitating insertion of the filtered gas into the enclosure. In some embodiments, the method further comprises maintaining the flow of gas at or below (e.g., a pre-determined) velocity, temperature, and/or pressure associated with a risk of a violent reaction between the gas-borne material and a reactive agent (e.g., from an external atmosphere). In some embodiments, the method further comprises causing at least one pump to drive the flow of gas through the first canister gas and/or second canister. In some embodiments, the method further comprises printing the 3D object. In some embodiments, the gas-borne material is generated during the printing. In some embodiments, directing the flow of gas in the enclosure comprises directing the flow of gas from a gas inlet portion toward a gas outlet portion of the enclosure. In some embodiments, directing the flow of gas is adjacent a material bed. In some embodiments, the material bed is supported by a platform, the method further comprises vertically translating the platform. In some embodiments, the platform is vertically translated during printing of the 3D object. In some embodiments, the method further comprises printing the 3D object by directing an energy beam at a material bed comprises a pre-transformed material to form a transformed material as part of the 3D object. In some embodiments, directing the gas flow from the first canister to a second canister comprises using at least one valve to switch a direction of the flow of gas from the first canister to the second canister. In some embodiments, using the at least one valve comprises altering a status of the at least one valve. In some embodiments, using the at least one valve comprises operationally decoupling the first canister or the second canister from the enclosure. In some embodiments, directing the flow of gas from the first canister to a second canister comprises altering a status of a first valve associated with the first canister and altering a status of a second valve associated with the second canister. In some embodiments, the method further comprises detecting (i) a presence or absence of the first filter and/or second filters, (ii) a reactive species in the flow of gas, (iii) a velocity of the flow of the gas, or (iv) a pressure, or (v) a temperature of the flow of gas, in the first canister and/or second canister. In some embodiments, detecting is (i) during the printing, and/or (ii) a filtration process in the first canister and/or second canister. In some embodiments, the method further comprises using at least one controller to (i) control the flow of gas, (ii) direct replacement of the first filter and/or second filter, and/or (iii) direct decoupling of the first canister and/or second canister from the enclosure (e.g., considering an output from the sensor).

In another aspect, a system for printing a 3D object, the system comprises: an energy source configured to generate an energy beam for transforming a pre-transformed material to a transformed material; a platform configured to support the 3D object during the printing; and an enclosure configured to enclose at least a portion the platform, the enclosure comprises: a first wall; at least one window configured to allow the energy beam to pass therethrough, and a recessed portion relative to the first wall, which recessed portion comprises the at least one window and a second wall that at least partially separates the recessed portion from the first wall, which at least one window and second wall define a volume of the recessed portion.

In some embodiments, the at least one window is disposed at a position to facilitate a path of the energy beam to travel therethrough. In some embodiments, the path of the energy beam is directed toward the platform. In some embodiments, the second wall is configured to facilitate at least partial shielding of an interior surface of the window from a gas-borne material in the enclosure. In some embodiments, the at least partial shielding is during the printing. In some embodiments, the gas-borne material is produced during the printing. In some embodiments, the recessed portion comprises a window holder portion that is configured to support the at least one window. In some embodiments, the window holder portion is comprised in a further recessed volume. In some embodiments, the recessed portion comprises a plurality of window holder portions. In some embodiments, the plurality of window holder portions are (e.g., substantially) aligned with a direction of a flow of gas above the platform. In some embodiments, the system further comprises a plurality of window holder portions that are configured to support the window. In some embodiments, plurality of window holder portions are arranged in a (e.g., substantially) non-parallel alignment with a direction of a flow of gas above the platform. In some embodiments, each of the plurality of window holder portions supports a window. In some embodiments, each of the plurality of window holder portions supports a plurality of windows. In some embodiments, the window holder portion comprises a purging system configured to direct a flow of gas within the further recessed volume. In some embodiments, the purging system is configured to direct the flow of gas away from the window. In some embodiments, the purging system comprises one or more channels. In some embodiments, the second wall comprises the one or more channels. In some embodiments, the system further comprises a plurality of windows that include the window. In some embodiments, the plurality of windows are arranged in a non-parallel alignment with a direction of a flow of gas above the platform. In some embodiments, the second wall comprises sides that at least partially enclose a volume of the recessed portion. In some embodiments, the system comprises at plurality of recessed portions. In some embodiments, the system comprises a plurality of energy sources. In some embodiments, the volume is between the window and the platform. In some embodiments, the window comprises a material having a thermally conductivity higher than that of fused silica. In some embodiments, the material is substantially transparent to at least a portion of wavelengths of the energy beam. In some embodiments, the window comprises at least one of sapphire, crystal quartz, zinc selenide (ZnSe), magnesium fluoride ($MgF_2$), or calcium fluoride ($CaF_2$). In some embodiments, window comprises a material having a thermal conductivity measurement of at least 5 (Watts per meter per degrees Celsius) W/m° C. at 300 Kelvin (K). In some embodiments, the energy source is configured to direct the energy beam defined by a processing cone within the enclosure. In some embodiments, the enclosure comprises at least one vacuum duct that is configured to remove at least a portion of debris within and/or outside of the processing cone. In some embodiments, the recessed portion comprises one or more sensors configured to detect one or more input parameters within the enclosure during the printing. In some embodiments, the system further comprises at least one sensor configured to detect the gas-borne material. In some embodiments, the at least one sensors is operatively coupled to the window and/or the recessed portion. In some embodiments, the enclosure is configured to maintain an internal atmosphere at a positive pressure. In some embodiments, the first wall is a ceiling.

In another aspect, a method for printing a 3D object, the method comprises: directing an energy beam through a window to transform a pre-transformed material to a transformed material as part of the 3D object that is printed in an enclosure comprises a first wall, which window is disposed in a recessed portion relative to the first wall, which recessed portion comprises a second wall that supports the window.

In some embodiments, the gas-borne material comprises (i) a portion of the pre-transformed material or (ii) debris associated with the transforming the pre-transformed material to the transformed material. In some embodiments, the method further comprises at least partially shielding the interior surface of the window from a gas-borne material. In some embodiments, the interior surface partially defines of an interior volume of the enclosure. In some embodiments, the gas borne material is produced during the printing. In some embodiments, the at least partially shielding comprises passively shielding. In some embodiments, passively shielding is accomplished by the geometry of the recessed portion. In some embodiments, the at least partially shielding comprises actively shielding. In some embodiments, actively shielding comprises flowing a gas through one or more channels in the second wall. In some embodiments, actively shielding comprises flowing a gas from an outlet adjacent to the window. In some embodiments, the method further comprises controlling flowing of the gas from the outlet using one or more controllers. In some embodiments, controlling is during the printing. In some embodiments, controlling comprises adjusting a velocity and/or a pressure of the flowing of the gas. In some embodiments, controlling comprises using an output of one or more sensors. In some embodiments, the one or more sensors comprise optical sensors. In some embodiments, controlling comprises using a feedback loop that consider the output. In some embodiments, the output is indicative of an amount of the gas borne material in an atmosphere of the enclosure. In some embodiments, the output is indicative of an amount of the gas borne material that accumulated on an internal surface of the window. In some embodiments, flowing the gas is to a direction away from the window. In some embodiments, the flowing of the gas results in an undetectable amount of debris affecting a peak intensity of the energy beam used to transform the pre-transformed material. In some embodiments, the flowing of the gas results in a peak intensity of the energy beam being substantially unchanged after transformation of at least 500 layers of pre-transformed material. In some embodiments, the flowing of the gas results in a peak intensity of the energy beam is substantially unchanged after transformation of at least about 3.4 milliliters of pre-transformed material. In some embodiments, the at least partially shielding comprises reducing an amount of the gas-borne material from (i) altering the energy beam, (ii) obstructing the window, or (iii) a combination of (i) and (ii). In some embodiments, altering the energy beam comprises altering a wavelength, power density, or trajectory thereof. In some embodiments, obstructing the window comprises adhering to and/or reacting with the window. In some embodiments, the recessed portion includes a window holder that supports the window, the method further comprises directing the energy beam through a cavity of the window holder. In some embodiments, the recessed portion includes a plurality of window holders that supports the window, the method further comprises directing the energy beam between at least two of the plurality of window holders. In some embodiments, the method further comprises purging the cavity of the window holder using a flow gas. In some embodiments, an insubstantial amount of debris affects the printing of the 3D object. In some embodiments, the energy beam is a first energy beam and the window is a first window, the method further comprises directing a second energy beam through a second window. In some embodiments, the second window is positioned in the recessed portion. In some embodiments, the second window is positioned in another recessed portion.

Another aspect of the present disclosure provides systems, apparatuses, controllers, and/or non-transitory computer-readable medium (e.g., software) that implement any of the methods disclosed herein.

In another aspect, an apparatus for printing one or more 3D objects comprises a controller (or controllers) that is/are programmed to direct a mechanism used in a 3D printing methodology to implement (e.g., effectuate) any of the method disclosed herein, wherein the controller is operatively coupled to the mechanism.

In another aspect, the one or more controllers disclosed herein comprise a computer software product, e.g., as disclosed herein.

In another aspect, a computer software product, comprising a non-transitory computer-readable medium in which program instructions are stored, which instructions, when read by a computer, cause the computer to direct a mechanism used in the 3D printing process to implement (e.g., effectuate) any of the method disclosed herein, wherein the non-transitory computer-readable medium is operatively coupled to the mechanism.

Another aspect of the present disclosure provides a non-transitory computer-readable medium comprising machine-executable code that, upon execution by one or more computer processors, implements any of the methods disclosed herein.

Another aspect of the present disclosure provides a computer system comprising one or more computer processors and a non-transitory computer-readable medium coupled thereto. In some embodiments, the non-transitory computer-readable medium comprises machine-executable code that, upon execution by the one or more computer processors, implements any of the methods disclosed herein.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings or figures (also "FIG.," "FIGs.," "Fig.," and "Figs." herein), of which:

FIG. 19A-19B each schematically illustrate top view of components of one or more 3D printers;

FIGS. 29A-29B each schematically illustrate side views of components of a 3D printer;

FIGS. 32A-32B schematically illustrate perspective views of components of one or more 3D printers;

FIGS. 33A-33E schematically illustrate perspective views of various components of 3D printers;

FIGS. 34A and 34B each schematically illustrate various views of components of a 3D printer;

FIGS. 38A and 38B each schematically illustrate side views of components of a 3D printer; and FIGS. 39A-39C each schematically illustrate top views of an enclosure of a 3D printer.

Figure 1:
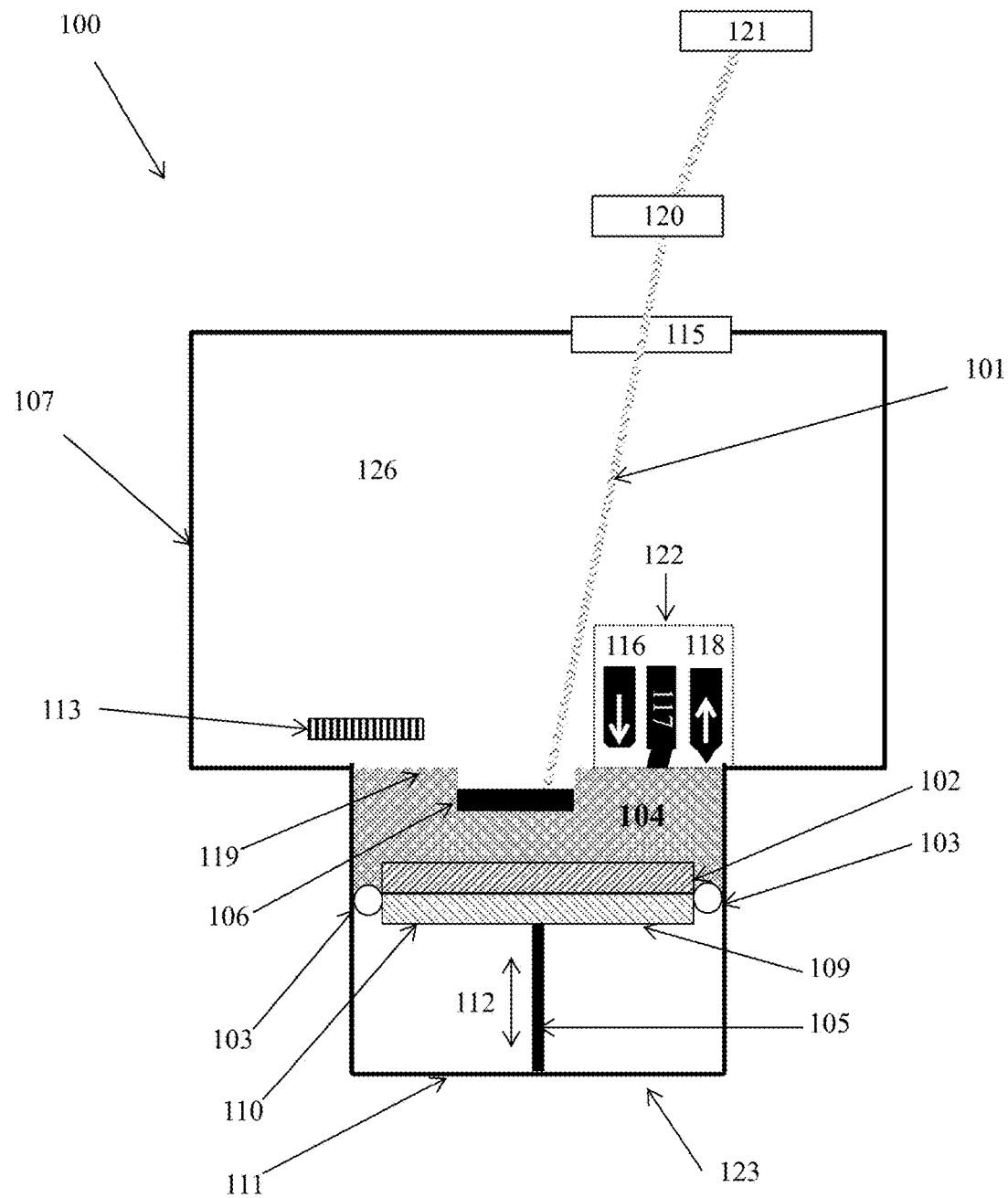
FIG. 1 schematically illustrates a side view of a three-dimensional (3D) printer and its components.

The figures and components therein may not be drawn to scale. Various components of the figures described herein may not be drawn to scale.

DETAILED DESCRIPTION

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein might be employed.

Terms such as "a", "an" and "the" are not intended to refer to only a singular entity, but include the general class of which a specific example may be used for illustration. The terminology herein is used to describe specific embodiments of the invention(s), but their usage does not delimit the invention(s).

When ranges are mentioned, the ranges are meant to be inclusive, unless otherwise specified. For example, a range between value 1 and value 2 is meant to be inclusive and include value 1 and value 2. The inclusive range will span any value from about value 1 to about value 2. The term "adjacent" or "adjacent to," as used herein, includes 'next to', 'adjoining', 'in contact with', and 'in proximity to.'

Where suitable, one or more of the features shown in a figure comprising a 3D printer and/or components thereof can be combined with one or more of the various features of other 3D printers and/or components thereof described herein. A figure shown herein may not show certain features of a 3D printer and/or components thereof described herein. It should be understood that any such features can be incorporated within the 3D printer as desired and where suitable.

The present disclosure provides three-dimensional (3D) printing apparatuses, systems, software, and methods for forming a 3D object. For example, a 3D object may be formed by sequential addition of material or joining of pre-transformed material to form a structure in a controlled manner (e.g., under manual or automated control). Pre-transformed material, as understood herein, is a material before it has been transformed during the 3D printing process. The transformation can be effectuated by utilizing an energy beam and/or flux. The pre-transformed material may be a material that was, or was not, transformed prior to its use in a 3D printing process. The pre-transformed material may be a starting material for the 3D printing process.

In a 3D printing process, the deposited pre-transformed material may be fused, (e.g., sintered or melted), bound or otherwise connected to form at least a portion of the desired 3D object. Fusing, binding or otherwise connecting the material is collectively referred to herein as "transforming" the material. Fusing the material may refer to melting, smelting, or sintering a pre-transformed material.

Melting may comprise liquefying the material (i.e., transforming to a liquefied state). A liquefied state refers to a state in which at least a portion of a transformed material is in a liquid state. Melting may comprise liquidizing the material (i.e., transforming to a liquidus state). A liquidus state refers to a state in which an entire transformed material is in a liquid state. The apparatuses, methods, software, and/or systems provided herein are not limited to the generation of a single 3D object, but are may be utilized to generate one or more 3D objects simultaneously (e.g., in parallel) or separately (e.g., sequentially). The multiplicity of 3D object may be formed in one or more material beds (e.g., powder bed). In some embodiments, a plurality of 3D objects is formed in one material bed.

In some examples, 3D printing methodologies comprise extrusion, wire, granular, laminated, light polymerization, or powder bed and inkjet head 3D printing. Extrusion 3D printing can comprise robo-casting, fused deposition modeling (FDM) or fused filament fabrication (FFF). Wire 3D printing can comprise electron beam freeform fabrication (EBF3). Granular 3D printing can comprise direct metal laser sintering (DMLS), electron beam melting (EBM), selective laser melting (SLM), selective heat sintering (SHS), or selective laser sintering (SLS). Powder bed and inkjet head 3D printing can comprise plaster-based 3D printing (PP). Laminated 3D printing can comprise laminated object manufacturing (LOM). Light polymerized 3D printing can comprise stereo-lithography (SLA), digital light processing (DLP), or laminated object manufacturing (LOM). 3D printing methodologies can comprise Direct Material Deposition (DMD). The Direct Material Deposition may comprise, Laser Metal Deposition (LMD, also known as, Laser deposition welding). 3D printing methodologies can comprise powder feed, or wire deposition.

In some examples, 3D printing methodologies differ from methods traditionally used in semiconductor device fabrication (e.g., vapor deposition, etching, annealing, masking, or molecular beam epitaxy). In some instances, 3D printing may further comprise one or more printing methodologies that are traditionally used in semiconductor device fabrication. 3D printing methodologies can differ from vapor deposition methods such as chemical vapor deposition, physical vapor deposition, or electrochemical deposition. In some instances, 3D printing may further include vapor deposition methods.

In some embodiments, the deposited pre-transformed material within the enclosure is a liquid material, semi-solid material (e.g., gel), or a solid material (e.g., powder). The deposited pre-transformed material within the enclosure can be in the form of a powder, wires, sheets, or droplets. The material (e.g., pre-transformed, transformed, and/or hardened) may comprise elemental metal, metal alloy, ceramics, or an allotrope of elemental carbon. The allotrope of elemental carbon may comprise amorphous carbon, graphite, graphene, diamond, or fullerene. The fullerene may be selected from the group consisting of a spherical, elliptical, linear, and tubular fullerene. The fullerene may comprise a buckyball, or a carbon nanotube. The ceramic material may comprise cement. The ceramic material may comprise alumina, zirconia, or carbide (e.g., silicon carbide, or tungsten carbide). The ceramic material may include high performance material (HPM). The ceramic material may include a nitride (e.g., boron nitride or aluminum nitride). The material may comprise sand, glass, or stone. In some embodiments, the material may comprise an organic material, for example, a polymer or a resin (e.g., 114 W resin). The organic material may comprise a hydrocarbon. The polymer may comprise styrene or nylon (e.g., nylon 11). The polymer may comprise a thermoplast. The organic material may comprise carbon and hydrogen atoms. The organic material may comprise carbon and oxygen atoms. The organic material may comprise carbon and nitrogen atoms. The organic material may comprise carbon and sulfur atoms. In some embodiments, the material may exclude an organic material. The material may comprise a solid or a liquid. In some embodiments, the material may comprise a silicon-based material, for example, silicon based polymer or a resin. The material may comprise an organosilicon-based material. The material may comprise silicon and hydrogen atoms. The material may comprise silicon and carbon atoms. In some embodiments, the material may exclude a silicon-based material. The powder material may be coated by a coating (e.g., organic coating such as the organic material (e.g., plastic coating)). The material may be devoid of organic material. The liquid material may be compartmentalized into reactors, vesicles, or droplets. The compartmentalized material may be compartmentalized in one or more layers. The material may be a composite material comprising a secondary material. The secondary material can be a reinforcing material (e.g., a material that forms a fiber). The reinforcing material may comprise a carbon fiber, Kevlar®, Twaron®, ultra-high-molecular-weight polyethylene, or glass fiber. The material can comprise powder (e.g., granular material) and/or wires. The bound material can comprise chemical bonding. Transforming can comprise chemical bonding. Chemical bonding can comprise covalent bonding. The pre-transformed material may be pulverous. The printed 3D object can be made of a single material (e.g., single material type) or multiple materials (e.g., multiple material types). Sometimes one portion of the 3D object and/or of the material bed may comprise one material, and another portion may comprise a second material different from the first material. The material may be a single material type (e.g., a single alloy or a single elemental metal). The material may comprise one or more material types. For example, the material may comprise two alloys, an alloy and an elemental metal, an alloy and a ceramic, or an alloy and an elemental carbon. The material may comprise an alloy and alloying elements (e.g., for inoculation). The material may comprise blends of material types. The material may comprise blends with elemental metal or with metal alloy. The material may comprise blends excluding (e.g., without) elemental metal or including (e.g., with) metal alloy. The material may comprise a stainless steel. The material may comprise a titanium alloy, aluminum alloy, and/or nickel alloy.

In some cases, a layer within the 3D object comprises a single type of material. In some examples, a layer of the 3D object may comprise a single elemental metal type, or a single alloy type. In some examples, a layer within the 3D object may comprise several types of material (e.g., an elemental metal and an alloy, an alloy and a ceramic, an alloy and an elemental carbon). In certain embodiments, each type of material comprises only a single member of that type. For example: a single member of elemental metal (e.g., iron), a single member of metal alloy (e.g., stainless steel), a single member of ceramic material (e.g., silicon carbide or tungsten carbide), or a single member of elemental carbon (e.g., graphite). In some cases, a layer of the 3D object comprises more than one type of material. In some cases, a layer of the 3D object comprises more than member of a type of material.

In some examples the material bed, build platform (also referred to herein as platform), or both material bed and platform comprise a material type which constituents (e.g., atoms) readily lose their outer shell electrons, resulting in a free-flowing cloud of electrons within their otherwise solid arrangement. In some examples the powder, the base, or both the powder and the base comprise a material characterized in having high electrical conductivity, low electrical resistivity, high thermal conductivity, or high density. The high electrical conductivity can be at least about $1*10^5$ Siemens per meter (S/m), $5*10^5$ S/m, $1*10^6$ S/m, $5*10^6$ S/m, $1*10^7$ S/m, $5*10^7$ S/m, or $1*10^8$ S/m. The symbol "*" designates the mathematical operation "times." The high electrical conductivity can be between any of the aforementioned electrical conductivity values (e.g., from about $1*10^5$ S/m to about $1*10^8$ S/m). The thermal conductivity, electrical resistivity, electrical conductivity, and/or density can be measured at ambient temperature (e.g., at R.T., or 20° C.). The low electrical resistivity may be at most about $1*10^{-5}$ ohm times meter ($\Omega*m$), $5*10^{-6}$ $\Omega*m$, $1*10^{-6}$ $\Omega*m$, $5*10^{-7}$ $\Omega*m$, $1*10^{-7}$ $\Omega*m$, $5*10^{-8}$ or $1*10^{-8}$ $\Omega*m$. The low electrical resistivity can be between any of the afore-mentioned values (e.g., from about $1\times10^{-5}$ $\Omega*m$ to about $1\times10^{-8}$ $\Omega*m$). The high thermal conductivity may be at least about 10 Watts per meter times Kelvin (W/mK), 15 W/mK, 20 W/mK, 35 W/mK, 50 W/mK, 100 W/mK, 150 W/mK, 200 W/mK, 205 W/mK, 300 W/mK, 350 W/mK, 400 W/mK, 450 W/mK, 500 W/mK, 550 W/mK, 600 W/mK, 700 W/mK, 800 W/mK, 900 W/mK, or 1000 W/mK. The high thermal conductivity can be between any of the aforementioned thermal conductivity values (e.g., from about 20 W/mK to about 1000 W/mK). The high density may be at least about 1.5 grams per cubic centimeter (g/cm$^3$), 1.7 g/cm$^3$, 2 g/cm$^3$, 2.5 g/cm$^3$, 2.7 g/cm$^3$, 3 g/cm$^3$, 4 g/cm$^3$, 5 g/cm$^3$, 6 g/cm$^3$, 7 g/cm$^3$, 8 g/cm$^3$, 9 g/cm$^3$, 10 g/cm$^3$, 11 g/cm$^3$, 12 g/cm$^3$, 13 g/cm$^3$, 14 g/cm$^3$, 15 g/cm$^3$, 16 g/cm$^3$, 17 g/cm$^3$, 18 g/cm$^3$, 19 g/cm$^3$, 20 g/cm$^3$, or 25 g/cm$^3$. The high density can be any value between the afore mentioned values (e.g., from about 1 g/cm$^3$ to about 25 g/cm$^3$).

In some embodiments, the elemental metal is an alkali metal, an alkaline earth metal, a transition metal, a rare-earth element metal, or another metal. The alkali metal can be Lithium, Sodium, Potassium, Rubidium, Cesium, or Francium. The alkali earth metal can be Beryllium, Magnesium, Calcium, Strontium, Barium, or Radium. The transition metal can be Scandium, Titanium, Vanadium, Chromium, Manganese, Iron, Cobalt, Nickel, Copper, Zinc, Yttrium, Zirconium, Platinum, Gold, Rutherfordium, Dubnium, Seaborgium, Bohrium, Hassium, Meitnerium, Ununbium, Niobium, Iridium, Molybdenum, Technetium, Ruthenium, Rhodium, Palladium, Silver, Cadmium, Hafnium, Tantalum, Tungsten, Rhenium or Osmium. The transition metal can be mercury. The rare-earth metal can be a lanthanide or an actinide. The antinode metal can be Lanthanum, Cerium, Praseodymium, Neodymium, Promethium, Samarium, Europium, Gadolinium, Terbium, Dysprosium, Holmium, Erbium, Thulium, Ytterbium, or Lutetium. The actinide metal can be Actinium, Thorium, Protactinium, Uranium, Neptunium, Plutonium, Americium, Curium, Berkelium, Californium, Einsteinium, Fermium, Mendelevium, Nobelium, or Lawrencium. The other metal can be Aluminum, Gallium, Indium, Tin, Thallium, Lead, or Bismuth. The material may comprise a precious metal. The precious metal may comprise gold, silver, palladium, ruthenium, rhodium, osmium, iridium, or platinum. The material may comprise at least about 40%, 50%, 60%, 70%, 80%, 90%, 95%, 97%, 98%, 99%, 99.5% or more precious metal. The powder material may comprise at most about 40%, 50%, 60%, 70%, 80%, 90%, 95%, 97%, 98%, 99%, 99.5% or less precious metal. The material may comprise precious metal with any value in between the afore-mentioned values. The material may comprise at least a minimal percentage of precious metal according to the laws in the particular jurisdiction.

In some embodiments, the metal alloy comprises iron based alloy, nickel based alloy, cobalt based alloy, chrome based alloy, cobalt chrome based alloy, titanium based alloy, magnesium based alloy, or copper based alloy. The alloy may comprise an oxidation or corrosion resistant alloy. The alloy may comprise a super alloy (e.g., Inconel). The super alloy may comprise Inconel 600, 617, 625, 690, 718 or X-750. The alloy may comprise an alloy used for aerospace applications, automotive application, surgical application, or implant applications. The metal may include a metal used for aerospace applications, automotive application, surgical application, or implant applications. The super alloy may comprise IN 738 LC, IN 939, Rene 80, IN 6203 (e.g., IN 6203 DS), PWA 1483 (e.g., PWA 1483 SX), or Alloy 247.

In some embodiments, the metal alloys are Refractory Alloys. The refractory metals and alloys may be used for heat coils, heat exchangers, furnace components, or welding electrodes. The Refractory Alloys may comprise a high melting points, low coefficient of expansion, mechanically strong, low vapor pressure at elevated temperatures, high thermal conductivity, or high electrical conductivity.

In some embodiments, the material (e.g., alloy or elemental) comprises a material used for applications in industries comprising aerospace (e.g., aerospace super alloys), jet engine, missile, automotive, marine, locomotive, satellite, defense, oil & gas, energy generation, semiconductor, fashion, construction, agriculture, printing, or medical. The material may comprise an alloy used for products comprising, devices, medical devices (human & veterinary), machinery, cell phones, semiconductor equipment, generators, engines, pistons, electronics (e.g., circuits), electronic equipment, agriculture equipment, motor, gear, transmission, communication equipment, computing equipment (e.g., laptop, cell phone, i-pad), air conditioning, generators, furniture, musical equipment, art, jewelry, cooking equipment, or sport gear. The material may comprise an alloy used for products for human or veterinary applications comprising implants, or prosthetics. The metal alloy may comprise an alloy used for applications in the fields comprising human or veterinary surgery, implants (e.g., dental), or prosthetics.

In some embodiments, the alloy includes a high-performance alloy. The alloy may include an alloy exhibiting at least one of excellent mechanical strength, resistance to thermal creep deformation, good surface stability, resistance to corrosion, and resistance to oxidation. The alloy may include a face-centered cubic austenitic crystal structure. The alloy may comprise Hastelloy, Inconel, Waspaloy, Rene alloy (e.g., Rene-80, Rene-77, Rene-220, or Rene-41), Scandium alloy, Haynes alloy, Incoloy, MP98T, TMS alloy, MTEK (e.g., MTEK grade MAR-M-247, MAR-M-509, MAR-M-R41, or MAR-M-X-45), or CMSX (e.g., CMSX-3, or CMSX-4). The alloy can be a single crystal alloy.

In some instances, the iron-based alloy comprises Elinvar, Fernico, Ferroalloys, Invar, Iron hydride, Kovar, Spiegeleisen, Staballoy (stainless steel), or Steel. In some instances, the metal alloy is steel. The Ferroalloy may comprise Ferroboron, Ferrocerium, Ferrochrome, Ferromagnesium, Ferromanganese, Ferromolybdenum, Ferronickel, Ferrophosphorus, Ferrosilicon, Ferrotitanium, Ferrouranium, or Ferrovanadium. The iron-based alloy may include cast iron or pig iron. The steel may include Bulat steel, Chromoly, Crucible steel, Damascus steel, Hadfield steel, High speed steel, HSLA steel, Maraging steel, Maraging Steel (M300), Reynolds 531, Silicon steel, Spring steel, Stainless steel, Tool steel, Weathering steel, or Wootz steel. The high-speed steel may include Mushet steel. The stainless steel may include AL-6XN, Alloy 20, celestrium, marine grade stainless, Martensitic stainless steel, surgical stainless steel, or Zeron 100. The tool steel may include Silver steel. The steel may comprise stainless steel, Nickel steel, Nickel-chromium steel, Molybdenum steel, Chromium steel, Chromium-vanadium steel, Tungsten steel, Nickel-chromium-molybdenum steel or Silicon-manganese steel. The steel may be comprised of any Society of Automotive Engineers (SAE) grade such as 440F, 410, 312, 430, 440A, 440B, 440C, 304, 305, 304L, 304L, 301, 304LN, 301LN, 2304, 316, 316LN, 316L, 317L, 2205, 409, 904L, 321, 254SMO, 316Ti, 321H, 17-4, 15-5, 420 or 304H. The steel may comprise stainless steel of at least one crystalline structure selected from the group consisting of austenitic, superaustenitic, ferritic, martensitic, duplex and precipitation-hardening martensitic. Duplex stainless steel may be lean duplex, standard duplex, super duplex or hyper duplex. The stainless steel may comprise surgical grade stainless steel (e.g., austenitic 316, martensitic 420 or martensitic 440). The austenitic 316 stainless steel may include 316L or 316LVM. The steel may include 17-4 Precipitation Hardening steel (also known as type 630 is a chromium-copper precipitation hardening stainless steel; 17-4PH steel). The stainless steel may comprise 360L stainless steel.

In some embodiments, the titanium-based alloys include alpha alloys, near alpha alloys, alpha and beta alloys, or beta alloys. The titanium alloy may comprise grade 1, 2, 2H, 3, 4, 5, 6, 7, 7H, 8, 9, 10, 11, 12, 13, 14, 15, 16, 16H, 17, 18, 19, 20, 21, 2, 23, 24, 25, 26, 26H, 27, 28, 29, 30, 31, 32, 33, 34, 35, 36, 37, 38 or higher. In some instances, the titanium base alloy includes TiAl$_6$V$_4$ or TiAl$_6$Nb$_7$.

In some embodiments, the Nickel based alloy includes Alnico, Alumel, Chromel, Cupronickel, Ferronickel, German silver, Hastelloy, Inconel, Monel metal, Nichrome, Nickel-carbon, Nicrosil, Nisil, Nitinol, Hastelloy X, Cobalt-Chromium or Magnetically "soft" alloys. The magnetically "soft" alloys may comprise Mu-metal, Permalloy, Supermalloy, or Brass. The Brass may include nickel hydride, stainless or coin silver. The cobalt alloy may include Megallium, Stellite (e. g. Talonite), Ultimet, or Vitallium. The chromium alloy may include chromium hydroxide, or Nichrome.

In some embodiments, the aluminum-based alloy includes AA-8000, Al—Li (aluminum-lithium), Alnico, Duralumin, Hiduminium, Kryron Magnalium, Nambe, Scandium-aluminum, or, Y alloy. The magnesium alloy may be Elektron, Magnox or T—Mg—Al—Zn (Bergman phase) alloy. At times, the material excludes at least one aluminum-based alloy (e.g., $AlSi_{10}Mg$).

In some embodiments, the copper based alloy comprises Arsenical copper, Beryllium copper, Billon, Brass, Bronze, Constantan, Copper hydride, Copper-tungsten, Corinthian bronze, Cunife, Cupronickel, Cymbal alloys, Devarda's alloy, Electrum, Hepatizon, Heusler alloy, Manganin, Molybdochalkos, Nickel silver, Nordic gold, Shakudo or Tumbaga. The Brass may include Calamine brass, Chinese silver, Dutch metal, Gilding metal, Muntz metal, Pinchbeck, Prince's metal, or Tombac. The Bronze may include Aluminum bronze, Arsenical bronze, Bell metal, Florentine bronze, Guanin, Gunmetal, Glucydur, Phosphor bronze, Ormolu or Speculum metal. The copper alloy may be a high-temperature copper alloy (e.g., GRCop-84).

In some embodiments, the elemental carbon comprises graphite, Graphene, diamond, amorphous carbon, carbon fiber, carbon nanotube, or fullerene.

In some embodiments, the material comprises powder material (also referred to herein as a "pulverous material"). The powder material may comprise a solid comprising fine particles. The powder may be a granular material. The powder can be composed of individual particles. At least some of the particles can be spherical, oval, prismatic, cubic, or irregularly shaped. At least some of the particles can have a fundamental length scale (e.g., diameter, spherical equivalent diameter, length, width, depth, or diameter of a bounding sphere). The fundamental length scale (abbreviated herein as "FLS") of at least some of the particles can be from about 1 nanometers (nm) to about 1000 micrometers (microns), 500 microns, 400 microns, 300 microns, 200 microns, 100 microns, 50 microns, 40 microns, 30 microns, 20 microns, 10 microns, 1 micron, 500 nm, 400 nm, 300 nm, 200 nm, 100 nm, 50 nm, 40 nm, 30 nm, 20 nm, 10 nm, or 5 nm. At least some of the particles can have a FLS of at least about 1000 micrometers (microns), 500 microns, 400 microns, 300 microns, 200 microns, 100 microns, 50 microns, 40 microns, 30 microns, 20 microns, 10 microns, 1 micron, 500 nm, 400 nm, 300 nm, 200 nm, 100 nm, 50 nm, 40 nm, 30 nm, 20 nm, 10 nm, 5 nanometers (nm) or more. At least some of the particles can have a FLS of at most about 1000 micrometers (microns), 500 microns, 400 microns, 300 microns, 200 microns, 100 microns, 50 microns, 40 microns, 30 microns, 20 microns, 10 microns, 1 micron, 500 nm, 400 nm, 300 nm, 200 nm, 100 nm, 50 nm, 40 nm, 30 nm, 20 nm, 10 nm, 5 nm or less. In some cases, at least some of the powder particles may have a FLS in between any of the afore-mentioned FLSs.

In some embodiments, the powder comprises a particle mixture, which particle comprises a shape. The powder can be composed of a homogenously shaped particle mixture such that all of the particles have substantially the same shape and FLS magnitude within at most about 1%, 5%, 8%, 10%, 15%, 20%, 25%, 30%, 35%, 40%, 50%, 60%, 70%, or less distribution of FLS. In some cases, the powder can be a heterogeneous mixture such that the particles have variable shape and/or FLS magnitude. In some examples, at least about 30%, 40%, 50%, 60%, or 70% (by weight) of the particles within the powder material have a largest FLS that is smaller than the median largest FLS of the powder material. In some examples, at least about 30%, 40%, 50%, 60%, or 70% (by weight) of the particles within the powder material have a largest FLS that is smaller than the mean largest FLS of the powder material.

In some examples, the size of the largest FLS of the transformed material (e.g., height) is greater than the average largest FLS of the powder material by at least about 1.1 times, 1.2 times, 1.4 times, 1.6 times, 1.8 times, 2 times, 4 times, 6 times, 8 times, or 10 times. In some examples, the size of the largest FLS of the transformed material is greater than the median largest FLS of the powder material by at most about 1.1 times, 1.2 times, 1.4 times, 1.6 times, 1.8 times, 2 times, 4 times, 6 times, 8 times, or 10 times. The powder material can have a median largest FLS that is at least about 1 µm, 5 µm, 10 µm, 20 µm, 30 µm, 40 µm, 50 µm, 100 µm, or 200 µm. The powder material can have a median largest FLS that is at most about 1 µm, 5 µm, 10 µm, 20 µm, 30 µm, 40 µm, 50 µm, 100 µm, or 200 µm. In some cases, the powder particles may have a FLS in between any of the FLS listed above (e.g., from about 1 µm to about 200 µm, from about 1 µm to about 50 µm, or from about 5 µm to about 40 µm).

Figure 3:
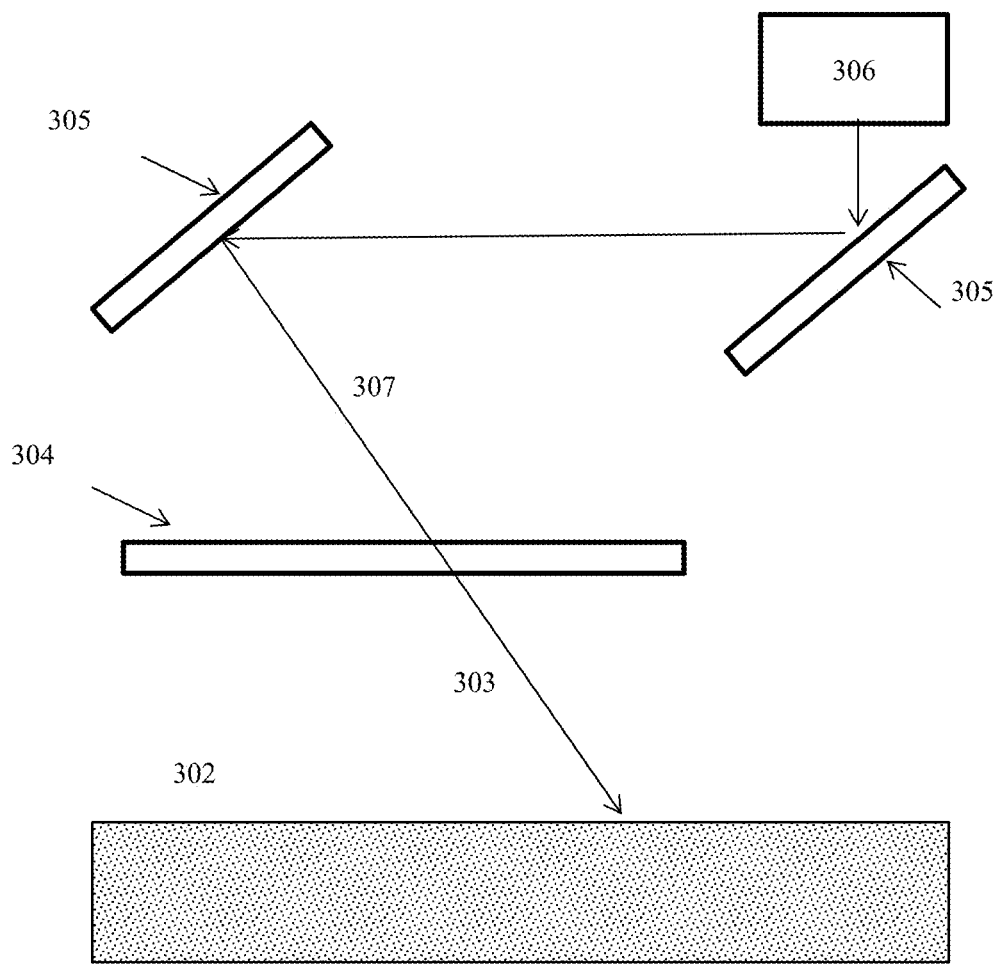
FIG. 3 schematically illustrates a side view of components in a 3D printer.

In another aspect provided herein is a system for generating a 3D object comprising: an enclosure for accommodating at least one layer of pre-transformed material (e.g., powder); an energy (e.g., energy beam) capable of transforming the pre-transformed material to form a transformed material; and a controller that directs the energy to at least a portion of the layer of pre-transformed material according to a path (e.g., as described herein). The transformed material may be capable of hardening to form at least a portion of a 3D object. The system may comprise an energy source, an optical system (e.g., FIG. 3), a temperature control system, a material delivery mechanism (e.g., a recoater), a pressure control system, an atmosphere control system, an atmosphere, a pump, a nozzle, a valve, a sensor, a central processing unit, a display, a chamber, or an algorithm. The chamber may comprise a building platform. The system for generating a 3D object and its components may be any 3D printing system such as, for example, the one described in Patent Application serial number PCT/US15/36802 filed on Jun. 19, 2015, titled "APPARATUSES, SYSTEMS AND METHODS FOR THREE-DIMENSIONAL PRINTING" or in Provisional Patent Application Ser. No. 62/317,070 filed Apr. 1, 2016, titled "APPARATUSES, SYSTEMS AND METHODS FOR EFFICIENT THREE-DIMENSIONAL PRINTING", both of which are entirely incorporated herein by references.

Figure 2:
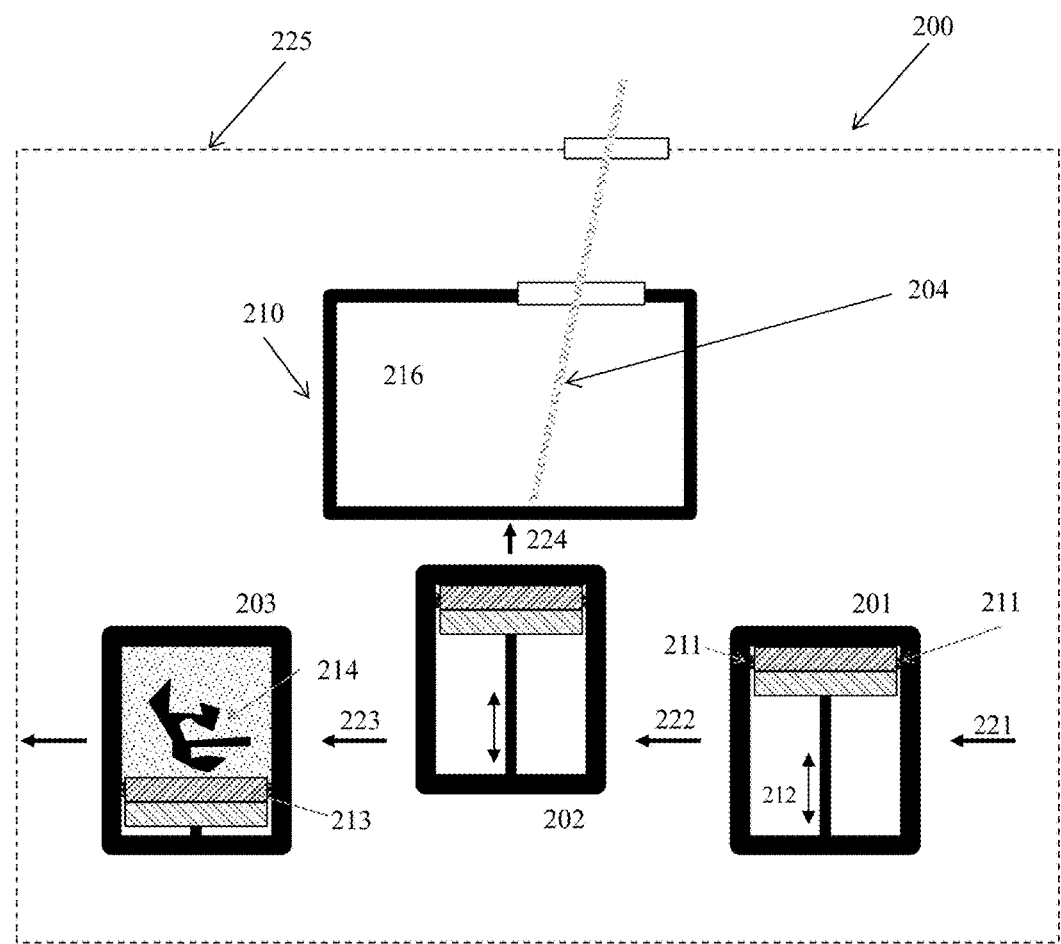
FIG. 2 schematically illustrates a side view of a 3D printer and its components.

In some embodiments, the 3D printing system comprises a chamber (e.g., FIG. 1, 116; FIG. 2, 216). The chamber may be referred herein as the "processing chamber." The processing chamber may comprise an energy beam (e.g., FIG. 1, 101; FIG. 2, 204). The energy beam may be directed towards an exposed surface of a material bed (e.g., FIG. 1, 119). The 3D printing system may comprise one or more modules (e.g., FIGS. 2, 201, 202, and 203). The one or more modules may be referred herein as the "build modules." At times, at least one build module (e.g., FIG. 1, 123) may be situated in the enclosure comprising the processing chamber (e.g., FIG. 1, 116). At times, at least one build module may engage with the processing chamber (e.g., FIG. 1). At times, at least one build module may not engage with the processing chamber (e.g., FIG. 2). At times, a plurality of build modules (e.g., FIGS. 2, 201, 202, and 203) may be situated in an enclosure (e.g., FIG. 2, 200) comprising the processing chamber (e.g., FIG. 2, 210). The build module may reversibly engage with (e.g., couple to) the processing chamber. The engagement of the build module with the processing chamber may be controlled (e.g., by a controller). The control may be automatic and/or manual. The engagement of the build module with the processing chamber may be reversible. In some embodiments, the engagement of the build module with the processing chamber may be permanent. The FLS (e.g., width, depth, and/or height) of the processing chamber and/or the build plate can be at least about 50 millimeters (mm), 60 mm, 70 mm, 80 mm, 90 mm, 100 mm, 200 mm, 250 mm, 280 mm, 320 mm, 400 mm, 450 mm, 500 mm, 800 mm, 900 mm, 1 meter (m), 2 m, or 5 m. The FLS of the processing chamber and/or the build plate can be at most about 50 millimeters (mm), 60 mm, 70 mm, 80 mm, 90 mm, 100 mm, 200 mm, 250 mm, 400 mm, 500 mm, 800 mm, 900 mm, 1 meter (m), 2 m, or 5 m. The FLS of the processing chamber and/or the build plate can be between any of the afore-mentioned values (e.g., 50 mm to about 5 m, from about 250 mm to about 500 mm, or from about 500 mm to about 5 m).

In some embodiments, the build module is operatively coupled to at least one controller. At least one of the build modules may have a controller. The controller may be its own controller. The controller may be different than the controller controlling the 3D printing process and/or the processing chamber. The translation facilitator (e.g., build module delivery system) may comprise a controller (e.g., its own controller). The controller of the translation facilitator may be different than the controller controlling the 3D printing process and/or the processing chamber. The controller of the translation facilitator may be different than the controller of the build module. The build module controller and/or the translation facilitator controller may be a microcontroller. At times, the controller of the 3D printing process and/or the processing chamber may not interact with the controller of the build module and/or translation facilitator. At times, the controller of the build module and/or translation facilitator may not interact with the controller of the 3D printing process and/or the processing chamber. For example, the controller of the build module may not interact with the controller of the processing chamber. For example, the controller of the translation facilitator may not interact with the controller of the processing chamber. The controller of the 3D printing process and/or the processing chamber may be able to interpret one or more signals emitted from (e.g., by) the build module and/or translation facilitator. The controller of the build module and/or translation facilitator may be able to interpret one or more signals emitted from (e.g., by) the processing chamber. The one or more signals may be electromagnetic, electronic, magnetic, pressure, or sound signals. The electromagnetic signals may comprise visible light, infrared, ultraviolet, or radio frequency signals. The electromagnetic signals may comprise a radio frequency identification signal (RFID). The RFID may be specific for a build module, user, entity, 3D object model, processor, material type, printing instruction, 3D print job, or any combination thereof.

In some examples, the build module controller controls the translation of the build module, sealing status of the build module, atmosphere of the build module, engagement of the build module with the processing chamber, exit of the build module from the enclosure, entry of the build module into the enclosure, or any combination thereof. Controlling the sealing status of the build module may comprise opening or closing of the build module shutter. The build chamber controller may be able to interpret signals from the 3D printing controller and/or processing chamber controller. The processing chamber controller may be the 3D printing controller. For example, the build module controller may be able to interpret and/or respond to a signal regarding the atmospheric conditions in the load lock. For example, the build module controller may be able to interpret and/or respond to a signal regarding the completion of a 3D printing process (e.g., when the printing of a 3D object is complete). The build module may be connected to an actuator. The actuator may be translating or stationary. The controller of the build module may direct the translation facilitator (e.g., actuator) to translate the build module from one position to another (e.g., arrows 221-224 in FIG. 2), when translation is possible. The translation facilitator may be a build module delivery system. The translation facilitator may be autonomous. The translation facilitator may operate independently of the 3D printer (e.g., mechanisms directed by the 3D printing controller). The translation facilitator (e.g., build module delivery system) may comprise a controller and/or a motor. The translation facilitator may comprise a machine or a human. The translation is possible, for example, when the destination position of the build module is empty. The controller of the 3D printing and/or the processing chamber may be able to sense signals emitted from the controller of the build module. For example, the controller of the 3D printing and/or the processing chamber may be able to sense a signal from the build module that is emitted when the build module is docked into engagement position with the processing chamber. The signal from the build module may comprise reaching a certain position in space, reaching a certain atmospheric characteristic threshold, opening or shutting the build platform closing, or engaging or disengaging (e.g., docking or undocking) from the processing chamber. The build module may comprise one or more sensors. For example, the build module may comprise a proximity, movement, light, sounds, or touch sensor.

In some embodiments, the build module is included as part of the 3D printing system. In some embodiments, the build module is separate from the 3D printing system. The build module may be independent (e.g., operate independently) from the 3D printing system. For example, build module may comprise its own controller, motor, elevator, build platform, valve, channel, and/or shutter. In some embodiments, one or more conditions differ between the build module and the processing chamber, and/or among the different build modules. The difference may comprise different pre-transformed materials, atmospheres, platforms, temperatures, pressures, humidity levels, an oxidizing gas (e.g., oxygen) level, gas type (e.g., inert), traveling speed (e.g., of the build modules), traveling method (e.g., of the build modules), acceleration speed (e.g., of the build modules), or post processing treatment (e.g., within the processing chamber and/or build module(s)). The difference may comprise different reactive agent levels. The term "gas" may comprise one or more gasses. For example, the relative velocity of the various build modules with respect to the processing chamber may be different, similar, or substantially similar. The build platform may undergo different, similar, or substantially similar post processing treatment (e.g., further processing of the 3D object and/or material bed after the generation of the 3D object in the material bed is complete).

In some examples, at least one build module translates relative to the processing chamber. The translation may be parallel or substantially parallel to the bottom surface of the build chamber. The bottom surface of the build chamber is the one closest to the gravitational center. The translation may be at an angle (e.g., planar or compound) relative to the bottom surface of the build chamber. The translation may use any device that facilitates translation (e.g., an actuator). For example, the translation facilitator may comprise a robotic arm, conveyor (e.g., conveyor belt), rotating screw, or a moving surface (e.g., platform). The translation facilitator may comprise a chain, rail, motor, or an actuator. The translation facilitator may comprise a component that can move another. The movement may be controlled (e.g., using a controller). The movement may comprise using a control signal and source of energy (e.g., electricity). The translation facilitator may use electricity, pneumatic pressure, hydraulic pressure, or human power.

In some embodiments, the 3D printing system comprises a plurality of build modules. The 3D printing system may comprise at least 1, 2, 3, 4, 5, 6, 7, 8, 9, or 10 build modules. FIG. 2 shows an example of three build modules (e.g., 201, 202, and 203) and one processing chamber 210. Examples of enclosures, build modules, unpacking stations, processing chambers and their components can be found in PCT patent application serial number PCT/US17/39422, which is incorporated herein by reference in its entirety.

In some examples, at least one build module engages with the processing chamber to expand the interior volume of the processing chamber (e.g., into the volume of the engaged build module). During at least a portion of the 3D printing process, the atmospheres of the chamber and enclosure may merge. At times, during at least a portion of the 3D printing process, the atmospheres of the chamber and enclosure may remain separate. During at least a portion of the 3D printing process, the atmospheres of the build module and processing chamber may be separate. The build module may be mobile or stationary. The build module may comprise an elevator. The elevator may be connected to a platform (e.g., building platform). The elevator may be reversibly connected to at least a portion of the platform (e.g., to the base). The elevator may be irreversibly connected to at least a portion of the platform (e.g., to the substrate). The platform may be separated from one or more walls (e.g., side walls) of the build module by a seal (e.g., FIG. 2, 211; FIG. 1, 103). The seal may be impermeable or substantially impermeable to gas. The seal may be permeable to gas. The seal may be flexible. The seal may be elastic. The seal may be bendable. The seal may be compressible. The seal may comprise rubber (e.g., latex), Teflon, plastic, or silicon. The seal may comprise a mesh, membrane, sieve, paper (e.g., filter paper), cloth (e.g., felt), or brush. The mesh, membrane, paper and/or cloth may comprise randomly and/or non-randomly arranged fibers. The paper may comprise a High-efficiency particulate arrestance filter (TEPA) filter. The seal may be permeable to at least one gas, and impermeable to the pre-transformed (e.g., and to the transformed) material. The seal may not allow a pre-transformed (e.g., and to the transformed) material to pass through.

In some examples, the build module and/or processing chamber comprises an openable shutter. For example, the build module and processing chamber may each comprise a separate openable shutter. The shutter may be a seal, door, blockade, stopple, stopper, plug, piston, cover, roof, hood, block, stopple, obstruction, lid, closure, or a cap. The shutter may be opened upon engagement of the build module with the processing chamber. FIG. 1 shows an example of a processing chamber (e.g., FIG. 1, 126) and a build module (e.g., FIG. 1, 123). The processing chamber comprises the energy beam (e.g., FIG. 1, 101). The build module comprises a build platform comprising a substrate (e.g., FIG. 1, 109), a base (e.g., FIG. 1, 102), and an elevator shaft (e.g., FIG. 1, 105) that allows the platform to move vertically up and down. The build module (e.g., FIG. 1, 123) may comprise a shutter. The processing chamber may comprise a shutter. The shutter may be openable. The shutter may be removable. The removal of the shutter may comprise manual or automatic removal. The build module shutter may be opened while being connected to the build module. The processing chamber shutter may be opened while being connected to the processing chamber (e.g., through connector). The shutter connector may comprise a hinge, chain, or a rail. In an example, the shutter may be opened in a manner similar to opening a door or a window. The shutter may be opened by swiveling (e.g., similar to opening a door or a window held on a hinge). The shutter may be opened by its removal from the opening which it blocks. The removal may be guided (e.g., by a rail, arm, pulley, crane, or conveyor). The guiding may be using a robot. The guiding may be using at least one motor and/or gear. The shutter may be opened while being disconnected from the build module. For example, the shutter may be opened similar to opening a lid. The shutter may be opened by shifting or sliding (e.g., to a side).

In some embodiments, the build module, processing chamber, and/or enclosure comprises one or more seals. The seal may be a sliding seal or a top seal. For example, the build module and/or processing chamber may comprise a sliding seal that meets with the exterior of the build module upon engagement of the build module with the processing chamber. For example, the processing chamber may comprise a top seal that faces the build module and is pushed upon engagement of the processing chamber with the build module. For example, the build module may comprise a top seal that faces the processing chamber and is pushed upon engagement of the processing chamber with the build module. The seal may be a face seal, or compression seal. The seal may comprise an O-ring.

In some embodiments, the build module, processing chamber, and/or enclosure is sealed, sealable, or open. The atmosphere of the build module, processing chamber, and/or enclosure may be regulated. The build module may be sealed, sealable, or open. The processing chamber may be sealed, sealable, or open. The enclosure may be sealed, sealable, or open. The build module, processing chamber, and/or enclosure may comprise a valve and/or a gas opening-port. The valve and/or a gas opening-port may be below, or above the building platform. The valve and/or a gas opening-port may be disposed at the horizontal plane of the build platform. The valve and/or a gas opening-port may be disposed at the adjacent to the build platform. The valve may allow at least one gas to travel through. The gas may enter or exit through the valve. For example, the gas may enter or exit the build module, processing chamber, and/or enclosure through the valve. In some embodiments, the atmosphere of the build module, processing chamber, and/or enclosure may be individually controlled. In some embodiments, the atmosphere of at least two of the build module, processing chamber, and enclosure may be separately controlled. In some embodiments, the atmosphere of at least two of the build module, processing chamber, and enclosure may be controlled in concert (e.g., simultaneously). In some embodiments, the atmosphere of at least one of the build module, processing chamber, or enclosure may be controlled by controlling the atmosphere of at least one of the build module, processing chamber, or enclosure in any combination or permutation. In some examples, the atmosphere in the build module is not controllable by controlling the atmosphere in the processing chamber.

In some embodiments, the 3D printing system comprises a load lock. The load lock may be disposed between the processing chamber and the build module. The load lock may be formed by engaging the build module with the processing chamber. The load lock may be sealable. For example, the load lock may be sealed by engaging the build module with the processing chamber (e.g., directly or indirectly). In some embodiments, the load lock may comprise one or more gas opening-ports. At times, the load lock may comprise one or more gas transport channels. At times, the load lock may comprise one or more valves. A gas transport channel may comprise a valve. The opening and/or closing of a first valve of the 3D printing system may or may not be coordinated with the opening and/or closing of a second valve of the 3D printing system. The valve may be controlled automatically (e.g., by a controller) and/or manually. The load lock may comprise a gas entry opening-port and a gas exit opening-port. In some embodiments, a pressure below ambient pressure (e.g., of 1 atmosphere) is formed in the load lock. In some embodiments, a pressure exceeding ambient pressure (e.g., of 1 atmosphere) is formed in the load lock. At times, during the exchange of load lock atmosphere, a pressure below and/or above ambient pressure if formed in the load lock. At times, a pressure equal or substantially equal to ambient pressure is maintained (e.g., automatically and/or manually) in the load lock. The load lock, building module, processing chamber, and/or enclosure may comprise a valve. The valve may comprise a pressure relief, pressure release, pressure safety, safety relief, pilot-operated relief, low pressure safety, vacuum pressure safety, low and vacuum pressure safety, pressure vacuum release, snap acting, or modulating valve. The valve may comply with the legal industry standards presiding the jurisdiction. The volume of the load lock may be smaller than the volume within the build module and/or processing chamber. The total volume within the load lock may be at most about 0.1%, 0.5%, 1%, 5%, 10%, 20%, 50%, or 80% of the total volume encompassed by the build module and/or processing chamber. The total volume within the load lock may be between any of the afore-mentioned percentage values (e.g., from about 0.1% to about 80%, from about 0.1% to about 5%, from about 5% to about 20%, from about 20% to about 50%, or from about 50% to about 80%). The percentage may be volume per volume percentage.

In some embodiments, the atmosphere of the build module and/or the processing chamber is fluidly connected to the atmosphere of the load lock. At times, conditioning the atmosphere of the load lock will condition the atmosphere of the build module and/or the processing chamber that is fluidly connected to the load lock. The fluid connection may comprise gas flow. The fluid connection may be through a gas permeable seal and/or through a channel (e.g., a pipe). The channel may be a sealable channel (e.g., using a valve).

In some embodiments, the shutter of the build module engages with the shutter of the processing chamber. The engagement may be spatially controlled. For example, when the shutter of the build module is within a certain gap distance from the processing chamber shutter, the build module shutter engages with the processing chamber shutter. The gap distance may trigger an engagement mechanism. The gap trigger may be sufficient to allow sensing of at least one of the shutters. The engagement mechanism may comprise magnetic, electrostatic, electric, hydraulic, pneumatic, or physical force. The physical force may comprise manual force. Subsequent to the engagement, the single unit may transfer (e.g., relocate, or move) away from the energy beam. For example, the engagement may trigger the transferring (e.g., relocating) of the build module shutter and the processing chamber shutter as a single unit.

In some examples, removal of the shutter (e.g., of the build module and/or processing chamber) depends on reaching a certain (e.g., predetermined) level of at atmospheric characteristics comprising a gas content (e.g., relative gas content), gas pressure, oxidizing gas level, humidity, argon level, or nitrogen level. The atmospheric characteristics may comprise a reactive agent level. The oxidizing gas may comprise oxygen. The oxidizing agent may comprise the oxidizing gas. For example, the certain level may be an equilibrium between an atmospheric characteristic in the build chamber and that atmospheric characteristics in the processing chamber.

In some embodiments, the 3D printing process initiates after merging of the build module with the processing chamber. At the beginning of the 3D printing process, the build platform may be at an elevated position (e.g., FIG. 2, 212). At the end of the 3D printing process, the build platform may be an a vertically reduced position (e.g., FIG. 2, 213). The building module may translate between three positions during a 3D printing run. The build module may enter to the enclosure from a position away from the engagement position with the processing chamber (e.g., FIG. 2, 201). The build module may then advance toward the processing chamber (e.g., FIG. 2, 202), and engage with the processing chamber (e.g., as described herein). The layer dispensing mechanism and energy beam will translate and form the 3D object within the material bed (e.g., as described herein), while the platform gradually lowers its vertical position. Once the 3D object printing is complete (e.g., FIG. 2, 214), the build module may disengage from the processing chamber and translate away from the processing chamber engagement position (e.g., FIG. 2, 203). Disengagement of the build module from the processing chamber may include closing the processing chamber with its shutter, closing the build module with its shutter, or both closing the processing chamber shutter and closing the build module shutter. Disengagement of the build module from the processing chamber may include maintaining the processing chamber atmosphere to be separate from the enclosure atmosphere, maintaining the build module atmosphere to be separate from the enclosure atmosphere, or maintaining both the processing chamber atmosphere and the build atmosphere separate from the enclosure atmosphere. Disengagement of the build module from the processing chamber may include maintaining the processing chamber atmosphere to be separate from the ambient atmosphere, maintaining the build module atmosphere to be separate from the ambient atmosphere, or maintaining both the processing chamber atmosphere and the build atmosphere separate from the ambient atmosphere. The building platform that is disposed within the build module before engagement with the processing chamber, may be at its top most position, bottom most position, or anywhere between its top most position and bottom most position within the build module.

In some examples, the usage of sealable build modules, processing chamber, and/or unpacking chamber allows a small degree of operator intervention, low degree of operator exposure to the pre-transformed material, and/or low down time of the 3D printer. The 3D printing system may operate most of the time without an intermission. The 3D printing system may be utilized for 3D printing most of the time. Most of the time may be at least about 50%, 70%, 80%, 90%, 95%, 96% 97%, 98%, or 99% of the time. Most of the time may be between any of the afore-mentioned values (e.g., from about 50% to about 99%, from about 80% to about 99%, from about 90% to about 99%, or from about 95% to about 99% of the time. The entire time includes the time during which the 3D printing system prints a 3D object, and time during which it does not print a 3D object. Most of the time may include operation during seven days a week and/or 24 hours during a day.

In some embodiments, the processing chamber (e.g., FIG. 8, 826) comprises one or more side walls (e.g., 873). The processing chamber may comprise at least one inlet (e.g., FIG. 8, 844, 846) coupled to a first of the processing chamber side walls. The processing chamber may comprise at least one outlet (e.g., FIG. 8, 872) coupled to a side wall of the chamber. The side wall that is connected to the inlet may not be connected to the outlet. The side wall connected to the inlet may be different from the side wall connected to the outlet. For example, the inlet may be coupled to the first of the processing chamber side walls, and the outlet may be coupled to the second of the processing chamber side walls. The first side wall may be different from the second side wall. For example, the first side wall may oppose the second side wall. The outlet opening may be (e.g., fluidly) connected to a gas recycling system. In some embodiments, the outlet opening (or a supplemental outlet opening) may be adjacent to an optical window. The outlet opening may be (e.g., fluidly) connected to a pump. Fluid connection may allow a gas to flow through. The gas may flow through the opening due to a pressure difference between the two sides of the outlet opening. The gas may be sucked through the outlet opening. The gas may be pressurized through the outlet opening. The pressure at the side of the opening away from the processing pressure may be lower than the pressure at the side of the outlet opening closer to the processing chamber. At times, the pressure at the two sides of the outlet opening may be (e.g., substantially) equal.

In some embodiments, the temperature of the gas that flows to the processing chamber and/or processing cone may be temperature controlled. For example, the gas may be heated and/or cooled before, or during the time it flows into the processing chamber and/or cone. For example, the gas may flow through a heat exchanger and/or heat sink. The gas may be temperature controlled outside and/or inside the processing chamber. The gas may be temperature controlled at least one inlet to the processing chamber. In some embodiments, the temperature of the atmosphere in the processing chamber and/or cone may be kept (e.g., substantially) constant. Substantially constant temperature may allow for a temperature fluctuation (e.g., error delta) of at most about 15° C., 12° C., 10° C., 5° C., 4° C., 3° C., 2° C., 1° C., or 0.5° C.

In some examples, the 3D printing system requires operation of maximum a single standard daily work shift. The 3D printing system may require operation by a human operator working at most of about 8 hours (h), 7 h, 6 h, 5 h, 4 h, 3 h, 2 h, 1 h, or 0.5 h a day. The 3D printing system may require operation by a human operator working between any of the afore-mentioned time frames (e.g., from about 8 h to about 0.5 h, from about 8 h to about 4 h, from about 6 h to about 3 h, from about 3 h to about 0.5 h, or from about 2 h to about 0.5 h a day).

In some examples, the 3D printing system requires operation of maximum a single standard work week shift. The 3D printing system may require operation by a human operator working at most of about 50 h, 40 h, 30 h, 20 h, 10 h, 5 h, or 1 h a week. The 3D printing system may require operation by a human operator working between any of the afore-mentioned time frames (e.g., from about 40 h to about 1 h, from about 40 h to about 20 h, from about 30 h to about 10 h, from about 20 h to about 1 h, or from about 10 h to about 1 h a week). A single operator may support during his daily and/or weekly shift at least 1, 2, 3, 4, 5, 6, 7, 8, 9, or 10 3D printers (i.e., 3D printing systems).

In some embodiments, the enclosure and/or processing chamber of the 3D printing system may be opened to the ambient environment sparingly. In some embodiments, the enclosure and/or processing chamber of the 3D printing system may be opened by an operator (e.g., human) sparingly. Sparing opening may be at most once in at most every 1, 2, 3, 4, or 5 weeks. The weeks may comprise weeks of standard operation of the 3D printer.

In some embodiments, the 3D printer has a capacity of 1, 2, 3, 4, or 5 full prints in terms of pre-transformed material (e.g., powder) reservoir capacity. The 3D printer may have the capacity to print a plurality of 3D objects in parallel. For example, the 3D printer may be able to print at least 2, 3, 4, 5, 6, 7, 8, 9, or 10 3D objects in parallel.

In some embodiments, the printed 3D object is retrieved soon after terminating the last transformation operation of at least a portion of the material bed. Soon after terminating may be at most about 1 day, 12 hours, 6 hours, 3 hours, 2 hours, 1 hour, 30 minutes, 15 minutes, 5 minutes, 240 seconds (sec), 220 sec, 200 sec, 180 sec, 160 sec, 140 sec, 120 sec, 100 sec, 80 sec, 60 sec, 40 sec, 20 sec, 10 sec, 9 sec, 8 sec, 7 sec, 6 sec, 5 sec, 4 sec, 3 sec, 2 sec, or 1 sec. Soon after terminating may be between any of the afore-mentioned time values (e.g., from about 1 s to about 1 day, from about 1 s to about 1 hour, from about 30 minutes to about 1 day, or from about 20 s to about 240 s).

In some embodiments, the 3D printer has a capacity of 1, 2, 3, 4, or 5 full prints before requiring human intervention. Human intervention may be required for refilling the pre-transformed (e.g., powder) material, unloading the build modules, unpacking the 3D object, or any combination thereof. The 3D printer operator may condition the 3D printer at any time during operation of the 3D printing system (e.g., during the 3D printing process). Conditioning of the 3D printer may comprise refilling the pre-transformed material that is used by the 3D printer, replacing gas source, or replacing filters. The conditioning may be with or without interrupting the 3D printing system. For example, refilling and unloading from the 3D printer can be done at any time during the 3D printing process without interrupting the 3D printing process. Conditioning may comprise refreshing the 3D printer.

In some embodiments, the 3D printer comprises a filter. The 3D printer may comprise at least one filter. The filter may be a ventilation filter. The ventilation filter may capture fine powder from the 3D printing system. The filter may comprise a paper filter such as a high-efficiency particulate arrestance (TEPA) filter (a.k.a., high-efficiency particulate arresting or high-efficiency particulate air filter). The ventilation filter may capture spatter. The spatter may result from the 3D printing process. The ventilator may direct the spatter in a desired direction (e.g., by using positive or negative gas pressure). For example, the ventilator may use vacuum. For example, the ventilator may use gas blow.

In some embodiments, there is a time lapse between the end of a first 3D printing cycle in a first material bed and the beginning of a second 3D printing cycle in a second material bed. The time lapse between the end of the first 3D printing cycle in a first material bed, and the beginning of the second 3D printing cycle in a second material bed may be at most about 60 minutes (min), 40 min, 30 min, 20 min, 15 min, 10 min, or 5 min. The time lapse between the end of printing in a first material bed, and the beginning of printing in a second material bed may be between any of the afore-mentioned times (e.g., from about 60 min to abo 5 min, from about 60 min to about 30 min, from about 30 min to about 5 min, from about 20 min to about 5 min, from about 20 min to about 10 min, or from about 15 min to about 5 min). The speed during which the 3D printing process proceeds is disclosed in Patent Application serial number PCT/US15/36802 that is incorporated herein in its entirety.

In some embodiments, the generated 3D object requires very little or no further processing after its retrieval. Further processing may be post printing processing. Further processing may comprise trimming, as disclosed herein. Further processing may comprise polishing (e.g., sanding). In some cases, the generated 3D object can be retrieved and finalized without removal of transformed material and/or auxiliary support features.

In some embodiments, the 3D object (e.g., solidified material) that is generated has an average deviation value from the intended dimensions (e.g., of a desired 3D object) of at most about 0.5 microns (μm), 1 μm, 3 μm, 10 μm, 30 μm, 100 μm, 300 μm or less. The deviation can be any value between the afore-mentioned values. The average deviation can be from about 0.5 μm to about 300 μm, from about 10 μm to about 50 μm, from about 15 μm to about 85 μm, from about 5 μm to about 45 μm, or from about 15 μm to about 35 μm. The 3D object can have a deviation from the intended dimensions in a specific direction, according to the formula $Dv+L/K_{dv}$, wherein Dv is a deviation value, L is the length of the 3D object in a specific direction, and $K_{dv}$ is a constant. Dv can have a value of at most about 300 μm, 200 μm, 100 μm, 50 μm, 40 μm, 30 μm, 20 μm, 10 μm, 5 μm, 1 μm, or 0.5 μm. Dv can have a value of at least about 0.5 μm, 1 μm, 3 μm, 5 μm, 10 μm, 20 μm, 30 μm, 50 μm, 70 μm, 100 μm, 300 μm or less. Dv can have any value between the afore-mentioned values. For example, Dv can have a value that is from about 0.5 μm to about 300 μm, from about 10 μm to about 50 μm, from about 15 μm to about 85 μm, from about 5 μm to about 45 μm, or from about 15 μm to about 35 μm. $K_{dv}$ can have a value of at most about 3000, 2500, 2000, 1500, 1000, or 500. $K_{dv}$ can have a value of at least about 500, 1000, 1500, 2000, 2500, or 3000. $K_{dv}$ can have any value between the afore-mentioned values. For example, $K_{dv}$ can have a value that is from about 3000 to about 500, from about 1000 to about 2500, from about 500 to about 2000, from about 1000 to about 3000, or from about 1000 to about 2500.

In some examples, the generated 3D object requires a diminished amount of further processing. The generated 3D object (i.e., the printed 3D object) may not require further processing following its generation by a method described herein. The printed 3D object may require reduced amount of processing after its generation by a method described herein. For example, the printed 3D object may not require removal of auxiliary support (e.g., since the printed 3D object was generated as a 3D object devoid of auxiliary support). The printed 3D object may not require smoothing, flattening, polishing, or leveling. The printed 3D object may not require further machining. In some examples, the printed 3D object may require one or more treatment operations following its generation (e.g., post generation treatment, or post printing treatment). The further treatment step(s) may comprise surface scraping, machining, polishing, grinding, blasting (e.g., sand blasting, bead blasting, shot blasting, or dry ice blasting), annealing, or chemical treatment. The further treatment may comprise physical or chemical treatment. The further treatment step(s) may comprise electrochemical treatment, ablating, polishing (e.g., electro polishing), pickling, grinding, honing, or lapping. In some examples, the printed 3D object may require a single operation (e.g., of sand blasting) following its formation. The printed 3D object may require an operation of sand blasting following its formation. Polishing may comprise electro polishing (e.g., electrochemical polishing or electrolytic polishing). The further treatment may comprise the use of abrasive(s). The blasting may comprise sand blasting or soda blasting. The chemical treatment may comprise use or an agent. The agent may comprise an acid, a base, or an organic compound. The further treatment step(s) may comprise adding at least one added layer (e.g., cover layer). The added layer may comprise lamination. The added layer may be of an organic or inorganic material. The added layer may comprise elemental metal, metal alloy, ceramic, or elemental carbon. The added layer may comprise at least one material that composes the printed 3D object. When the printed 3D object undergoes further treatment, the bottom most surface layer of the treated object may be different than the original bottom most surface layer that was formed by the 3D printing (e.g., the bottom skin layer).

The methods described herein can be performed in the enclosure (e.g., container, processing chamber, and/or build module). One or more 3D objects can be formed in the enclosure (e.g., simultaneously and/or sequentially). The enclosure may have a predetermined and/or controlled pressure. The enclosure may have a predetermined and/or controlled atmosphere. The control may be manual or via a control system. The atmosphere may comprise at least one gas.

In some embodiments, the enclosure comprises a gas pressure. The enclosure may comprise ambient pressure (e.g., 1 atmosphere), negative pressure (i.e., vacuum) or positive pressure. Different portions of the enclosure may have different atmospheres. The different atmospheres may comprise different gas compositions. The different atmospheres may comprise different atmosphere temperatures. The different atmospheres may comprise ambient pressure (e.g., 1 atmosphere), negative pressure (i.e., vacuum) or positive pressure. The different portions of the enclosure may comprise the processing chamber, build module, or enclosure volume excluding the processing chamber and/or build module. The vacuum may comprise pressure below 1 bar, or below 1 atmosphere. The positively pressurized environment may comprise pressure above 1 bar or above 1 atmosphere. The pressure in the enclosure can be at least about $10^{-7}$ Torr, $10^{-6}$ Torr, $10^{-5}$ Torr, $10^{-4}$ Torr, $10^{-3}$ Torr, $10^{-2}$ Torr, $10^{-1}$ Torr, 1 Torr, 10 Torr, 100 Torr, 1 bar, 2 bar, 3 bar, 4 bar, 5 bar, 10 bar, 20 bar, 30 bar, 40 bar, 50 bar, 100 bar, 200 bar, 300 bar, 400 bar, 500 bar, 1000 bar, or 1100 bar. The pressure in the enclosure can be at least about 100 Torr, 200 Torr, 300 Torr, 400 Torr, 500 Torr, 600 Torr, 700 Torr, 720 Torr, 740 Torr, 750 Torr, 760 Torr, 900 Torr, 1000 Torr, 1100 Torr, or 1200 Torr. The pressure in the enclosure can be between any of the afore-mentioned enclosure pressure values (e.g., from about $10^{-7}$ Torr to about 1200 Torr, from about $10^{-7}$ Torr to about 1 Torr, from about 1 Torr to about 1200 Torr, or from about $10^{-2}$ Torr to about 10 Torr). The chamber can be pressurized to a pressure of at least $10^{-7}$ Torr, $10^{-6}$ Torr, $10^{-5}$ Torr, $10^{-4}$ Torr, $10^{-3}$ Torr, $10^{-2}$ Torr, $10^{-1}$ Torr, 1 Torr, 10 Torr, 100 Torr, 1 bar, 2 bar, 3 bar, 4 bar, 5 bar, 10 bar, 20 bar, 30 bar, 40 bar, 50 bar, 100 bar, 200 bar, 300 bar, 400 bar, 500 bar, or 1000 bar. The chamber can be pressurized to a pressure of at most $10^{-7}$ Torr, $10^{-6}$ Torr, $10^{-5}$ Torr, $10^{-4}$ Torr, $10^{-3}$ Torr, $10^{-2}$ Torr, $10^{-1}$ Torr, 1 Torr, 10 Torr, 100 Torr, 1 bar, 2 bar, 3 bar, 4 bar, 5 bar, 10 bar, 20 bar, 30 bar, 40 bar, 50 bar, 100 bar, 200 bar, 300 bar, 400 bar, 500 bar, or 1000 bar. The pressure in the chamber can be at a range between any of the afore-mentioned pressure values (e.g., from about $10^{-7}$ Torr to about 1000 bar, from about $10^{-7}$ Torr to about 1 Torr, from about 1 Torr to about 100 Barr, from about 1 bar to about 10 bar, from about 1 bar to about 100 bar, or from about 100 bar to about 1000 bar). In some cases, the chamber pressure can be standard atmospheric pressure. The pressure may be measured at an ambient temperature (e.g., room temperature, 20° C., or 25° C.).

In some embodiments, the enclosure includes an atmosphere comprising at least one gas. The enclosure may comprise a (e.g., substantially) inert atmosphere. The atmosphere in the enclosure may be (e.g., substantially) depleted by one or more gases present in the ambient atmosphere. The atmosphere in the enclosure may include a reduced level of one or more gases relative to the ambient atmosphere. For example, the atmosphere may be substantially depleted, or have reduced levels of water (i.e., humidity), oxidizing gas (e.g., oxygen), nitrogen, carbon dioxide, hydrogen sulfide, or any combination thereof. For example, the atmosphere may be substantially depleted, or have reduced levels of a reactive agent. The level of the depleted or reduced level may be at most about 1 ppm, 10 ppm, 50 ppm, 100 ppm, 500 ppm, 1000 ppm, 5000 ppm, 10000 ppm, 25000 ppm, 50000 ppm, or 70000 ppm volume by volume (v/v). The level of the depleted or reduced level may be at least about 1 ppm, 10 ppm, 50 ppm, 100 ppm, 500 ppm, 1000 ppm, 5000 ppm, 10000 ppm, 25000 ppm, 50000 ppm, or 70000 ppm (v/v). The level (e.g., depleted or reduced level gas, oxidizing gas, or water) may between any of the afore-mentioned levels. The atmosphere may comprise air. The atmosphere may be inert. The atmosphere may be non-reactive. The atmosphere may be non-reactive with the material (e.g., the pre-transformed material deposited in the layer of material (e.g., powder), or the material comprising the 3D object). The atmosphere may prevent oxidation of the generated 3D object. The atmosphere may prevent oxidation of the pre-transformed material within the layer of pre-transformed material before its transformation, during its transformation, after its transformation, before its hardening, after its hardening, or any combination thereof. The atmosphere may comprise argon or nitrogen gas. The atmosphere may comprise a Nobel gas. The atmosphere can comprise a gas selected from the group consisting of argon, nitrogen, helium, neon, krypton, xenon, hydrogen, carbon monoxide, and carbon dioxide. The atmosphere may comprise hydrogen gas. The atmosphere may comprise a safe amount of hydrogen gas. The atmosphere may comprise a v/v percent of hydrogen gas of at least about 0.05%, 0.1%, 0.2%, 0.3%, 0.4%, 0.5%, 0.6%, 0.7%, 0.8%, 0.9%, 1%, 2%, 3%, 4%, or 5%, at ambient pressure (e.g., and ambient temperature). The atmosphere may comprise a v/v percent of hydrogen gas of at most about 0.05%, 0.1%, 0.2%, 0.3%, 0.4%, 0.5%, 0.6%, 0.7%, 0.8%, 0.9%, 1%, 2%, 3%, 4%, or 5%, at ambient pressure (e.g., and ambient temperature). The atmosphere may comprise any percent of hydrogen between the afore-mentioned percentages of hydrogen gas. The atmosphere may comprise a v/v hydrogen gas percent that is at least able to react with the material (e.g., at ambient temperature and/or at ambient pressure), and at most adhere to the prevalent work-safety standards in the jurisdiction (e.g., hydrogen codes and standards). The material may be the material within the layer of pre-transformed material (e.g., powder), the transformed material, the hardened material, or the material within the 3D object. Ambient refers to a condition to which people are generally accustomed. For example, ambient pressure may be 1 atmosphere. Ambient temperature may be a typical temperature to which humans are generally accustomed. For example, from about 15° C. to about 30° C., from about −30° C. to about 60° C., from about −20° C. to about 50° C., from 16° C. to about 26° C., from about 20° C. to about 25° C. "Room temperature" may be measured in a confined or in a non-confined space. For example, "room temperature" can be measured in a room, an office, a factory, a vehicle, a container, or outdoors. The vehicle may be a car, a truck, a bus, an airplane, a space shuttle, a space ship, a ship, a boat, or any other vehicle. Room temperature may represent the small range of temperatures at which the atmosphere feels neither hot nor cold, approximately 24° C. it may denote 20° C., 25° C., or any value from about 20° C. to about 25° C.

In some embodiments, the pre-transformed material is deposited in an enclosure (e.g., a container). FIG. 1 shows an example of a container 123. The container can contain the pre-transformed material (e.g., without spillage; FIG. 1, 104). The material may be placed in, or inserted to the container. The material may be deposited in, pushed to, sucked into, or lifted to the container. The material may be layered (e.g., spread) in the container. The container may comprise a substrate (e.g., FIG. 1, 109). The substrate may be situated adjacent to the bottom of the container (e.g., FIG. 1, 111). Bottom may be relative to the gravitational field, or relative to the position of the footprint of the energy beam (e.g., FIG. 1, 101) on the layer of pre-transformed material as part of a material bed. The footprint of the energy beam may follow a Gaussian bell shape. In some embodiments, the footprint of the energy beam does not follow a Gaussian bell shape. The container may comprise a platform comprising a base (e.g., FIG. 1, 102). The platform may comprise a substrate. The base may reside adjacent to the substrate. The pre-transformed material may be layered adjacent to a side of the container (e.g., on the bottom of the container). The pre-transformed material may be layered adjacent to the substrate and/or adjacent to the base. Adjacent to may be above. Adjacent to may be directly above, or directly on. The substrate may have one or more seals that enclose the material in a selected area within the container (e.g., FIG. 1, 103). The one or more seals may be flexible or non-flexible. The one or more seals may comprise a polymer or a resin. The one or more seals may comprise a round edge or a flat edge. The one or more seals may be bendable or non-bendable. The seals may be stiff. The container may comprise the base. The base may be situated within the container. The container may comprise the platform, which may be situated within the container. The enclosure, container, processing chamber, and/or building module may comprise an optical window or an optical mechanism (e.g., FIG. 1, 120). An example of an optical window can be seen in FIG. 1, 115; and FIG. 3, 304. The optical window may allow the energy beam (e.g., 307) to pass through without (e.g., substantial) energetic loss (e.g., 303). A ventilator may prevent spatter from accumulating on the surface optical window that is disposed within the enclosure (e.g., within the processing chamber) during the 3D printing. An opening of the ventilator may be situated within the enclosure 116. A portion of the enclosure, that is occupied by the energy beam (e.g., during the 3D printing) can define a processing cone (e.g., FIG. 15, 1530). During the 3D printing may comprise during the entire 3D printing. The processing cone can be the enclosure space that is occupied by a non-reflected energy beam during the (e.g., entire) 3D printing. The processing cone can be the enclosure space that is occupied by an energy beam that is directed towards the material bed during the (e.g., entire) 3D printing. During the 3D printing may comprise during printing of a layer of hardened material.

In some embodiments, the 3D printer comprises a material dispensing mechanism. The pre-transformed material may be deposited in the enclosure by a material dispensing mechanism (also referred to herein as a layer dispenser, layer forming apparatus, or layer forming device) (e.g., FIG. 1, 122). In some embodiments, the material dispensing mechanism includes one or more material dispensers (also referred to herein as "dispensers") (e.g., FIG. 1, 116), one or more leveling mechanisms (also referred to herein as "levelers") (e.g., FIG. 1, 117), and/or one or more powder removal mechanisms (also referred to herein as material "removers") (e.g., FIG. 1, 118) to form a layer of pre-transformed material within the enclosure. The deposited material may be leveled by a leveling operation. The leveling operation may comprise using a powder removal mechanism that does not contact the exposed surface of the material bed (e.g., FIG. 1, 118). The leveling operation may comprise using a leveling mechanism that contacts the exposed surface of the material bed (e.g., FIG. 1, 117). The material (e.g., powder) dispensing mechanism may comprise one or more dispensers (e.g., FIG. 1, 116). The material dispensing system may comprise at least one material (e.g., bulk) reservoir. The material may be deposited by a layer dispensing mechanism (e.g., recoater). The layer dispensing mechanism may level the dispensed material without contacting the material bed (e.g., the top surface of the powder bed). The layer dispensing mechanism may include any layer dispensing mechanism and/or a material (e.g., powder) dispenser used in 3D printing such as, for example, the ones disclosed in international patent application number PCT/US15/36802 titled "APPARATUSES, SYSTEMS AND METHODS FOR 3D PRINTING" that was filed on Jun. 19, 2015, in international patent application number PCT/US16/66000 that was filed on Dec. 9, 2016, titled "SKILLFUL THREE-DIMENSIONAL PRINTING," or international patent application number PCT/US17/57340 that was filed on Oct. 19, 2017, titled "OPERATION OF THREE-DIMENSIONAL PRINTER COMPONENTS," each of which is entirely incorporated herein by reference. The FLS (e.g., width, depth, and/or height) of the material bed can be at least about 50 millimeters (mm), 60 mm, 70 mm, 80 mm, 90 mm, 100 mm, 200 mm, 250 mm, 280 mm, 400 mm, 500 mm, 600 mm, 800 mm, 900 mm, 1 meter (m), 2 m or 5 m. The FLS (e.g., width, depth, and/or height) of the material bed can be at most about 50 millimeters (mm), 60 mm, 70 mm, 80 mm, 90 mm, 100 mm, 200 mm, 250 mm, 280 mm, 400 mm, 500 mm, 600 mm, 800 mm, 900 mm, 1 meter (m), 2 m or 5 m. The FLS of the material bed can be between any of the afore-mentioned values (e.g., from about 50 mm to about 5 m, from about 250 mm to about 500 mm, from about 280 mm to about 1 m, or from about 500 mm to about 5 m). In some embodiments, the FLS of the material bed is in the direction of the gas flow. The layer dispensing mechanism may include components comprising a material dispensing mechanism, material leveling mechanism, material removal mechanism, or any combination or permutation thereof. The layer dispensing mechanism and any of its components may be any layer dispensing mechanism (e.g., used in 3D printing) such as for example, any of the ones described in Patent Application serial number PCT/US15/36802, or in Provisional Patent Application Ser. No. 62/317,070, both of which are entirely incorporated herein by references.

In some embodiments, the layer dispensing mechanism may reside within an ancillary chamber. The ancillary chamber may be any ancillary chamber such as, for example, the one described in Provisional Patent Application Ser. No. 62/471,222 filed Mar. 14, 2017, titled "OPERATION OF THREE-DIMENSIONAL PRINTER COMPONENTS", which is entirely incorporated herein by reference in its entirety. The layer dispenser may be physically secluded from the processing chamber when residing in the ancillary chamber. The ancillary chamber may be connected (e.g., reversibly) to the processing chamber. The ancillary chamber may be connected (e.g., reversibly) to the build module. The ancillary chamber may convey the layer dispensing mechanism adjacent to a platform (e.g., that is disposed within the build module). The layer dispensing mechanism may be retracted into the ancillary chamber (e.g., when the layer dispensing mechanism does not perform dispensing).

In some embodiments, the 3D printer comprises a platform. The platform (also herein, "printing platform" or "building platform") may be disposed in the enclosure (e.g., in the build module and/or processing chamber). The platform may be configured to support the material bed. The platform may be configured to support multiple layers of pre-transformed material (e.g., as part of the material bed). The platform may be configured to support at least a portion of the 3D object (e.g., during forming of the 3D object). The platform may comprise a substrate or a base. The substrate and/or the base may be removable or non-removable. The building platform may be (e.g., substantially) horizontal, (e.g., substantially) planar, or non-planar. The platform may have a surface that points towards the deposited pre-transformed material (e.g., powder material), which at times may point towards the top of the enclosure (e.g., away from the center of gravity). The platform may have a surface that points away from the deposited pre-transformed material (e.g., towards the center of gravity), which at times may point towards the bottom of the container. The platform may have a surface that is (e.g., substantially) flat and/or planar. The platform may have a surface that is not flat and/or not planar. The platform may have a surface that comprises protrusions or indentations. The platform may have a surface that comprises embossing. The platform may have a surface that comprises supporting features (e.g., auxiliary support). The platform may have a surface that comprises a mold. The platform may have a surface that comprises a wave formation. The surface may point towards the layer of pre-transformed material within the material bed. The wave may have an amplitude (e.g., vertical amplitude or at an angle). The platform (e.g., base) may comprise a mesh through which the pre-transformed material (e.g., the remainder) is able to flow through. The platform may comprise a motor. The platform (e.g., substrate and/or base) may be fastened to the container. The platform (or any of its components) may be transportable. The transportation of the platform may be controlled and/or regulated by a controller (e.g., control system). The platform may be transportable horizontally, vertically, or at an angle (e.g., planar or compound).

In some embodiments, the platform is transferable (e.g., translatable). The platform may be vertically transferable, for example using an actuator. The actuator may cause a vertical translation (e.g., and elevator). An actuator causing a vertical translation (e.g., an elevation mechanism) is shown as an example in FIG. 1, 105. The up and down arrow next to the elevation mechanism 105 signifies a possible direction of movement of the elevation mechanism, or a possible direction of movement effectuated by the elevation mechanism.

In some examples, auxiliary support(s) adhere to the upper surface of the platform. In some examples, the auxiliary supports of the printed 3D object may touch the platform (e.g., the bottom of the enclosure, the substrate, or the base). Sometimes, the auxiliary support may adhere to the platform. In some embodiments, the auxiliary supports are an integral part of the platform. At times, auxiliary support(s) of the printed 3D object, do not touch the platform. In any of the methods described herein, the printed 3D object may be supported only by the pre-transformed material within the material bed (e.g., powder bed, FIG. 1, 104). Any auxiliary support(s) of the printed 3D object, if present, may be suspended adjacent to the platform. Occasionally, the platform may have a pre-hardened (e.g., pre-solidified) amount of material. Such pre-solidified material may provide support to the printed 3D object. At times, the platform may provide adherence to the material. At times, the platform does not provide adherence to the material. The platform may comprise elemental metal, metal alloy, elemental carbon, or ceramic. The platform may comprise a composite material (e.g., as disclosed herein). The platform may comprise glass, stone, zeolite, or a polymeric material. The polymeric material may include a hydrocarbon or fluorocarbon. The platform (e.g., base) may include Teflon. The platform may include compartments for printing small objects. Small may be relative to the size of the enclosure. The compartments may form a smaller compartment within the enclosure, which may accommodate a layer of pre-transformed material.

In some embodiments, the 3D printer comprises an energy source that generates an energy beam. The energy beam may project energy to the material bed. The apparatuses, systems, and/or methods described herein can comprise at least one energy beam. In some cases, the apparatuses, systems, and/or methods described can comprise two, three, four, five, or more energy beams. The energy beam may include radiation comprising electromagnetic, electron, positron, proton, plasma, or ionic radiation. The electromagnetic beam may comprise microwave, infrared, ultraviolet or visible radiation. The ion beam may include a cation or an anion. The electromagnetic beam may comprise a laser beam. The energy beam may derive from a laser source. The energy source (e.g., FIG. 1, 121) may be a laser source. The laser may comprise a fiber laser, a solid-state laser or a diode laser.

In some embodiments, the energy source is a laser source. The laser source may comprise a Nd:YAG, Neodymium (e.g., neodymium-glass), or an Ytterbium laser. The laser may comprise a carbon dioxide laser ($CO_2$ laser). The laser may be a fiber laser. The laser may be a solid-state laser. The laser can be a diode laser. The energy source may comprise a diode array. The energy source may comprise a diode array laser. The laser may be a laser used for micro laser sintering. The energy beam may be any energy beam disclosed in Provisional Patent Application Ser. No. 62/317,070 that is entirely incorporated herein by reference.

In some embodiments, the energy beam (e.g., transforming energy beam) comprises a Gaussian energy beam. The energy beam may have any cross-sectional shape comprising an ellipse (e.g., circle), or a polygon (e.g., as disclosed herein). The energy beam may have a cross section with a FLS (e.g., diameter) of at least about 50 micrometers (μm), 100 μm, 150 μm, 200 μm, or 250 μm. The energy beam may have a cross section with a FLS of at most about 60 micrometers (μm), 100 μm, 150 μm, 200 μm, or 250 μm. The energy beam cross section may be measured at full width half maximum. The energy beam may have a cross section with a FLS of any value between the afore-mentioned values (e.g., from about 50 μm to about 250 μm, from about 50 μm to about 150 μm, or from about 150 μm to about 250 μm). The power per unit area of the energy beam may be at least about 100 Watt per millimeter square ($W/mm^2$), 200 $W/mm^2$, 300 $W/mm^2$, 400 $W/mm^2$, 500 $W/mm^2$, 600 $W/mm^2$, 700 $W/mm^2$, 800 $W/mm^2$, 900 $W/mm^2$, 1000 $W/mm^2$, 2000 $W/mm^2$, 3000 $W/mm^2$, 5000 W/mm2, 7000 $W/mm^2$, or 10000 $W/mm^2$. The power per unit area of the tiling energy flux may be at most about 110 $W/mm^2$, 200 $W/mm^2$, 300 $W/mm^2$, 400 $W/mm^2$, 500 $W/mm^2$, 600 $W/mm^2$, 700 $W/mm^2$, 800 $W/mm^2$, 900 $W/mm^2$, 1000 $W/mm^2$, 2000 $W/mm^2$, 3000 $W/mm^2$, 5000 $W/mm^2$, 7000 $W/mm^2$, or 10000 $W/mm^2$. The power per unit area of the energy beam may be any value between the afore-mentioned values (e.g., from about 100 $W/mm^2$ to about 3000 $W/mm^2$, from about 100 $W/mm^2$ to about 5000 $W/mm^2$, from about 100 $W/mm^2$ to about 10000 $W/mm^2$, from about 100 $W/mm^2$ to about 500 $W/mm^2$, from about 1000 $W/mm^2$ to about 3000 $W/mm^2$, from about 1000 $W/mm^2$ to about 3000 $W/mm^2$, or from about 500 $W/mm^2$ to about 1000 $W/mm^2$). The scanning speed of the energy beam may be at least about 50 millimeters per second (mm/sec), 100 mm/sec, 500 mm/sec, 1000 mm/sec, 2000 mm/sec, 3000 mm/sec, 4000 mm/sec, or 50000 mm/sec. The scanning speed of the energy beam may be at most about 50 mm/sec, 100 mm/sec, 500 mm/sec, 1000 mm/sec, 2000 mm/sec, 3000 mm/sec, 4000 mm/sec, or 50000 mm/sec. The scanning speed of the energy beam may any value between the afore-mentioned values (e.g., from about 50 mm/sec to about 50000 mm/sec, from about 50 mm/sec to about 3000 mm/sec, or from about 2000 mm/sec to about 50000 mm/sec). The energy beam may be continuous or non-continuous (e.g., pulsing). The energy beam may be modulated before and/or during the formation of a transformed material as part of the 3D object. The energy beam may be modulated before and/or during the 3D printing process.

In some embodiments, the energy source (e.g., laser) has a power of at least about 10 Watt (W), 30 W, 50 W, 80 W, 100 W, 120 W, 150 W, 200 W, 250 W, 300 W, 350 W, 400 W, 500 W, 750 W, 800 W, 900 W, 1000 W, 1500 W, 2000 W, 3000 W, or 4000 W. The energy source may have a power of at most about 10 W, 30 W, 50 W, 80 W, 100 W, 120 W, 150 W, 200 W, 250 W, 300 W, 350 W, 400 W, 500 W, 750 W, 800 W, 900 W, 1000 W, 1500, 2000 W, 3000 W, or 4000 W. The energy source may have a power between any of the afore-mentioned energy beam power values (e.g., from about 10 W to about 100 W, from about 100 W to about 1000 W, or from about 1000 W to about 4000 W). The energy beam may derive from an electron gun. The energy beam may include a pulsed energy beam, a continuous wave energy beam, or a quasi-continuous wave energy beam. The pulse energy beam may have a repetition frequency of at least about 1 Kilo Hertz (KHz), 2 KHz, 3 KHz, 4 KHz, 5 KHz, 6 KHz, 7 KHz, 8 KHz, 9 KHz, 10 KHz, 20 KHz, 30 KHz, 40 KHz, 50 KHz, 60 KHz, 70 KHz, 80 KHz, 90 KHz, 100 KHz, 150 KHz, 200 KHz, 250 KHz, 300 KHz, 350 KHz, 400 KHz, 450 KHz, 500 KHz, 550 KHz, 600 KHz, 700 KHz, 800 KHz, 900 KHz, 1 Mega Hertz (MHz), 2 MHz, 3 MHz, 4 MHz, or 5 MHz. The pulse energy beam may have a repetition frequency of at most about 1 Kilo Hertz (KHz), 2 KHz, 3 KHz, 4 KHz, 5 KHz, 6 KHz, 7 KHz, 8 KHz, 9 KHz, 10 KHz, 20 KHz, 30 KHz, 40 KHz, 50 KHz, 60 KHz, 70 KHz, 80 KHz, 90 KHz, 100 KHz, 150 KHz, 200 KHz, 250 KHz, 300 KHz, 350 KHz, 400 KHz, 450 KHz, 500 KHz, 550 KHz, 600 KHz, 700 KHz, 800 KHz, 900 KHz, 1 Mega Hertz (MHz), 2 MHz, 3 MHz, 4 MHz, or 5 MHz. The pulse energy beam may have a repetition frequency between any of the afore-mentioned repetition frequencies (e.g., from about 1 KHz to about 5 MHz, from about 1 KHz to about 1 MHz, or from about 1 MHz to about 5 MHz).

The methods, apparatuses and/or systems disclosed herein may comprise Q-switching, mode coupling or mode locking to effectuate the pulsing energy beam. The apparatus or systems disclosed herein may comprise an on/off switch, a modulator, or a chopper to effectuate the pulsing energy beam. The on/off switch can be manually or automatically controlled. The switch may be controlled by the control system. The switch may alter the "pumping power" of the energy beam. The energy beam may be at times focused, non-focused, or defocused. In some instances, the defocus is substantially zero (e.g., the beam is non-focused).

In some embodiments, the energy source(s) projects energy using a DLP modulator, a one-dimensional scanner, a two-dimensional scanner, or any combination thereof. The energy source(s) can be stationary or translatable. The energy source(s) can translate vertically, horizontally, or in an angle (e.g., planar or compound angle). The energy source(s) can be modulated. The energy beam(s) emitted by the energy source(s) can be modulated. The modulator can include an amplitude modulator, phase modulator, or polarization modulator. The modulation may alter the intensity of the energy beam. The modulation may alter the current supplied to the energy source (e.g., direct modulation). The modulation may affect the energy beam (e.g., external modulation such as external light modulator). The modulation may include direct modulation (e.g., by a modulator). The modulation may include an external modulator. The modulator can include an aucusto-optic modulator or an electro-optic modulator. The modulator can comprise an absorptive modulator or a refractive modulator. The modulation may alter the absorption coefficient the material that is used to modulate the energy beam. The modulator may alter the refractive index of the material that is used to modulate the energy beam.

In some embodiments, the energy beam(s), energy source(s), and/or the platform of the energy beam array is moved. The energy beam(s), energy source(s), and/or the platform of the energy beam array can be moved via a galvanometer scanner (e.g., moving the energy beam(s)), a polygon, a mechanical stage (e.g., X-Y stage), a piezoelectric device, gimble, or any combination of thereof. The galvanometer may comprise a mirror. The galvanometer scanner may comprise a two-axis galvanometer scanner. The scanner may comprise a modulator (e.g., as described herein). The scanner may comprise a polygonal mirror. The scanner can be the same scanner for two or more energy sources and/or beams. At least two (e.g., each) energy source and/or beam may have a separate scanner. The energy sources can be translated independently of each other. In some cases, at least two energy sources and/or beams can be translated at different rates, and/or along different paths. For example, the movement of a first energy source may be faster as compared to the movement of a second energy source. The systems and/or apparatuses disclosed herein may comprise one or more shutters (e.g., safety shutters), on/off switches, or apertures.

In some embodiments, the energy beam (e.g., laser) has a FLS (e.g., a diameter) of its footprint on the exposed surface of the material bed of at least about 1 micrometer (μm), 5 μm, 10 μm, 20 μm, 30 μm, 40 μm, 50 μm, 60 μm, 70 μm, 80 μm, 90 μm, 100 μm, 200 μm, 300 μm, 400 μm, or 500 μm. The energy beam may have a FLS on the layer of it footprint on the exposed surface of the material bed of at most about 1 μm, 5 μm, 10 μm, 20 μm, 30 μm, 40 μm, 50 μm, 60 μm, 70 μm, 80 μm, 90 μm, 100 μm, 200 μm, 300 μm, 400 μm, or 500 μm. The energy beam may have a FLS on the exposed surface of the material bed (e.g., FIG. 3, 302) between any of the afore-mentioned energy beam FLS values (e.g., from about 5 μm to about 500 μm, from about 5 μm to about 50 μm, or from about 50 μm to about 500 μm). The beam may be a focused beam. The beam may be a dispersed beam. The beam may be an aligned beam. The apparatus and/or systems described herein may further comprise a focusing coil, a deflection coil, or an energy beam power supply. The defocused energy beam may have a FLS of at least about 1 mm, 5 mm, 10 mm, 20 mm, 30 mm, 40 mm, 50 mm, or 100 mm. The defocused energy beam may have a FLS of at most about 1 mm, 5 mm, 10 mm, 20 mm, 30 mm, 40 mm, 50 mm, or 100 mm. The energy beam may have a defocused cross-sectional FLS on the layer of pre-transformed material between any of the afore-mentioned energy beam FLS values (e.g., from about 5 mm to about 100 mm, from about 5 mm to about 50 mm, or from about 50 mm to about 100 mm).

In some embodiments, the 3D printer comprises a power supply. The power supply to any of the components described herein can be supplied by a grid, generator, local, or any combination thereof. The power supply can be from renewable or non-renewable sources. The renewable sources may comprise solar, wind, hydroelectric, or biofuel. The powder supply can comprise rechargeable batteries.

In some embodiments, the exposure time of the energy beam is at least 1 microsecond (μs), 5 μs, 10 μs, 20 μs, 30 μs, 40 μs, 50 μs, 60 μs, 70 μs, 80 μs, 90 μs, 100 μs, 200 μs, 300 μs, 400 μs, 500 μs, 800 μs, or 1000 μs. The exposure time of the energy beam may be most about 1 μs, 5 μs, 10 μs, 20 μs, 30 μs, 40 μs, 50 μs, 60 μs, 70 μs, 80 μs, 90 μs, 100 μs, 200 μs, 300 μs, 400 μs, 500 μs, 800 μs, or 1000 μs. The exposure time of the energy beam may be any value between the afore-mentioned exposure time values (e.g., from about 1 μs to about 1000 μs, from about 1 μs to about 200 μs, from about 1 μs to about 500 μs, from about 200 μs to about 500 μs, or from about 500 μs to about 1000 μs).

In some embodiments, the 3D printer comprises at least one controller. The controller may control one or more characteristics of the energy beam (e.g., variable characteristics). The control of the energy beam may allow a low degree of material evaporation during the 3D printing process. For example, controlling on or more energy beam characteristics may (e.g., substantially) reduce the amount of spatter generated during the 3D printing process. The low degree of material evaporation may be measured in grams of evaporated material and compared to a Kilogram of hardened material formed as part of the 3D object. The low degree of material evaporation may be evaporation of at most about 0.25 grams (gr.), 0.5 gr, 1 gr, 2 gr, 5 gr, 10 gr, 15 gr, 20 gr, 30 gr, or 50 gr per every Kilogram of hardened material formed as part of the 3D object. The low degree of material evaporation per every Kilogram of hardened material formed as part of the 3D object may be any value between the afore-mentioned values (e.g., from about 0.25 gr to about 50 gr, from about 0.25 gr to about 30 gr, from about 0.25 gr to about 10 gr, from about 0.25 gr to about 5 gr, or from about 0.25 gr to about 2 gr).

The methods, systems and/or the apparatus described herein can further comprise at least one energy source. In some cases, the system can comprise two, three, four, five, or more energy sources. An energy source can be a source configured to deliver energy to an area (e.g., a confined area). An energy source can deliver energy to the confined area through radiative heat transfer.

In some embodiments, the energy source supplies any of the energies described herein (e.g., energy beams). The energy source may deliver energy to a point or to an area. The energy source may include an electron gun source. The energy source may include a laser source. The energy source may comprise an array of lasers. In an example, a laser can provide light energy at a peak wavelength of at least about 100 nanometer (nm), 500 nm, 1000 nm, 1010 nm, 1020 nm, 1030 nm, 1040 nm, 1050 nm, 1060 nm, 1070 nm, 1080 nm, 1090 nm, 1100 nm, 1200 nm, 1500 nm, 1600 nm, 1700 nm, 1800 nm, 1900 nm, or 2000 nm. In an example a laser can provide light energy at a peak wavelength of at most about 100 nanometer (nm), 500 nm, 1000 nm, 1010 nm, 1020 nm, 1030 nm, 1040 nm, 1050 nm, 1060 nm, 1070 nm, 1080 nm, 1090 nm, 1100 nm, 1200 nm, 1500 nm, 1600 nm, 1700 nm, 1800 nm, 1900 nm, or 2000 nm. In an example a laser can provide light energy at a peak wavelength between the afore-mentioned peak wavelengths (e.g., from 100 nm to 2000 nm, from 100 nm to 1100 nm, or from 1000 nm to 2000 nm). The energy beam can be incident on the top surface of the material bed. The energy beam can be incident on, or be directed to, a specified area of the material bed over a specified time period. The energy beam can be substantially perpendicular to the top (e.g., exposed) surface of the material bed. The material bed can absorb the energy from the energy beam (e.g., incident energy beam) and, as a result, a localized region of the material in the material bed can increase in temperature. The increase in temperature may transform the material within the material bed. The increase in temperature may heat and transform the material within the material bed. In some embodiments, the increase in temperature may heat and not transform the material within the material bed. The increase in temperature may heat the material within the material bed.

In some embodiments, the energy beam and/or source is moveable. The energy beam and/or source can be moveable such that it can translate relative to the material bed. The energy beam and/or source can be moved by a scanner. The movement of the energy beam and/or source can comprise utilization of a scanner. In some embodiments, the energy source is stationary.

At one point in time, and/or (e.g., substantially) during the entire build of the 3D object: At least two of the energy beams and/or sources can be translated independently of each other or in concert with each other. At least two of the multiplicity of energy beams can be translated independently of each other or in concert with each other. In some cases, at least two of the energy beams can be translated at different rates such that the movement of the one is faster compared to the movement of at least one other energy beam. In some cases, at least two of the energy sources can be translated at different rates such that the movement of the one energy source is faster compared to the movement of at least another energy source. In some cases, at least two of the energy sources (e.g., all of the energy sources) can be translated at different paths. In some cases, at least two of the energy sources can be translated at substantially identical paths. In some cases, at least two of the energy sources can follow one another in time and/or space. In some cases, at least two of the energy sources translate substantially parallel to each other in time and/or space. The power per unit area of at least two of the energy beam may be (e.g., substantially) identical. The power per unit area of at least one of the energy beams may be varied (e.g., during the formation of the 3D object). The power per unit area of at least one of the energy beams may be different. The power per unit area of at least one of the energy beams may be different. The power per unit area of one energy beam may be greater than the power per unit area of a second energy beam. The energy beams may have the same or different wavelengths. A first energy beam may have a wavelength that is smaller or larger than the wavelength of a second energy beam. The energy beams can derive from the same energy source. At least one of the energy beams can derive from different energy sources. The energy beams can derive from different energy sources. At least two of the energy beams may have the same power (e.g., at one point in time, and/or (e.g., substantially) during the entire build of the 3D object). At least one of the beams may have a different power (e.g., at one point in time, and/or substantially during the entire build of the 3D object). The beams may have different powers (e.g., at one point in time, and/or (e.g., substantially) during the entire build of the 3D object). At least two of the energy beams may travel at (e.g., substantially) the same velocity. At least one of the energy beams may travel at different velocities. The velocity of travel (e.g. speed) of at least two energy beams may be (e.g., substantially) constant. The velocity of travel of at least two energy beams may be varied (e.g., during the formation of the 3D object or a portion thereof). The travel may refer to a travel relative to (e.g., on) the exposed surface of the material bed (e.g., powder material). The travel may refer to a travel close to the exposed surface of the material bed. The travel may be within the material bed. The at least one energy beam and/or source may travel relative to the material bed.

Figure 6:
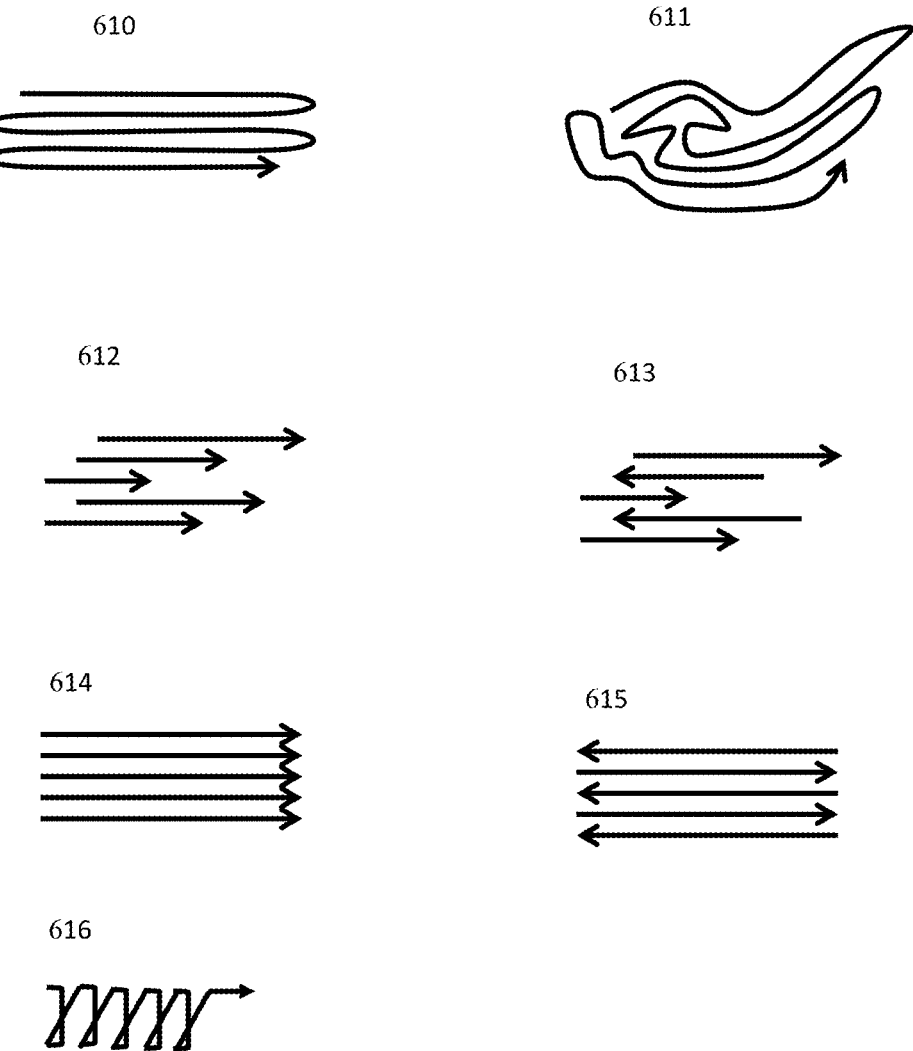
FIG. 6 illustrates various paths.

In some embodiments, the energy (e.g., energy beam) travels in a path. The path may comprise a hatch. The path of the energy beam may comprise repeating a path. For example, the first energy may repeat its own path. The second energy may repeat its own path, or the path of the first energy. The repetition may comprise a repetition of 1, 2, 3, 4, 5, 6, 7, 8, 9, 10 times or more. The energy may follow a path comprising parallel lines. For example, FIG. 6, 615 or 614 show paths that comprise parallel lines. The lines may be hatch lines. The distance between each of the parallel lines or hatch lines, may be at least about 1 μm, 5 μm, 10 μm, 20 μm, 30 μm, 40 μm, 50 μm, 60 μm, 70 μm, 80 μm, 90 μm, or more. The distance between each of the parallel lines or hatch lines, may be at most about 1 μm, 5 μm, 10 μm, 20 μm, 30 μm, 40 μm, 50 μm, 60 μm, 70 μm, 80 μm, 90 μm, or less. The distance between each of the parallel lines or hatch lines may be any value between any of the afore-mentioned distance values (e.g., from about 1 μm to about 90 μm, from about 1 μm to about 50 μm, or from about 40 μm to about 90 μm). The distance between the parallel or parallel lines or hatch lines may be substantially the same in every layer (e.g., plane) of transformed material. The distance between the parallel lines or hatch lines in one layer (e.g., plane) of transformed material may be different than the distance between the parallel lines or hatch lines respectively in another layer (e.g., plane) of transformed material within the 3D object. The distance between the parallel lines or hatch lines portions within a layer (e.g., plane) of transformed material may be substantially constant. The distance between the parallel lines or hatch lines within a layer (e.g., plane) of transformed material may be varied. The distance between a first pair of parallel lines or hatch lines within a layer (e.g., plane) of transformed material may be different than the distance between a second pair of parallel lines or hatch lines within a layer (e.g., plane) of transformed material respectively. The first energy beam may follow a path comprising two hatch lines or paths that cross in at least one point. The hatch lines or paths may be straight or curved. The hatch lines or paths may be winding. FIG. 6, 610 or 611 show examples of winding paths. The first energy beam may follow a hatch line or path comprising a U shaped turn (e.g., FIG. 6, 610). The first energy beam may follow a hatch line or path devoid of U shaped turns (e.g., FIG. 612).

In some embodiments, the formation of the 3D object includes transforming (e.g., fusing, binding or connecting) the pre-transformed material (e.g., powder material) using an energy beam. The energy beam may be projected on to a particular area of the material bed, thus causing the pre-transformed material to transform. The energy beam may cause at least a portion of the pre-transformed material to transform from its present state of matter to a different state of matter. For example, the pre-transformed material may transform at least in part (e.g., completely) from a solid to a liquid state. The energy beam may cause at least a portion of the pre-transformed material to chemically transform. For example, the energy beam may cause chemical bonds to form or break. The chemical transformation may be an isomeric transformation. The transformation may comprise a magnetic transformation or an electronic transformation. The transformation may comprise coagulation of the material, cohesion of the material, or accumulation of the material.

The methods described herein may further comprise repeating the operations of material deposition and material transformation operations to produce a 3D object (or a portion thereof) by at least one 3D printing (e.g., additive manufacturing) method. For example, the methods described herein may further comprise repeating the operations of depositing a layer of pre-transformed material and transforming at least a portion of the pre-transformed material to connect to the previously formed 3D object portion (e.g., repeating the 3D printing cycle), thus forming at least a portion of a 3D object. The transforming operation may comprise utilizing an energy beam to transform the material. In some instances, the energy beam is utilized to transform at least a portion of the material bed (e.g., utilizing any of the methods described herein).

In some embodiments, the transforming energy is provided by an energy source. The transforming energy may comprise an energy beam. The energy source can produce an energy beam. The energy beam may include a radiation comprising electromagnetic, electron, positron, proton, plasma, or ionic radiation. The electromagnetic beam may comprise microwave, infrared, ultraviolet, or visible radiation. The ion beam may include a charged particle beam. The ion beam may include a cation, or an anion. The electromagnetic beam may comprise a laser beam. The laser may comprise a fiber, or a solid-state laser beam. The energy source may include a laser. The energy source may include an electron gun. The energy depletion may comprise heat depletion. The energy depletion may comprise cooling. The energy may comprise an energy flux (e.g., energy beam. E.g., radiated energy). The energy may comprise an energy beam. The energy may be the transforming energy. The energy may be a warming energy that is not able to transform the deposited pre-transformed material (e.g., in the material bed). The warming energy may be able to raise the temperature of the deposited pre-transformed material. The energy beam may comprise energy provided at a (e.g., substantially) constant or varied energy beam characteristics. The energy beam may comprise energy provided at (e.g., substantially) constant or varied energy beam characteristics, depending on the position of the generated hardened material within the 3D object. The varied energy beam characteristics may comprise energy flux, rate, intensity, wavelength, amplitude, power, cross-section, or time exerted for the energy process (e.g., transforming or heating). The energy beam footprint may be the average (or mean) FLS of the foot print of the energy beam on the exposed surface of the material bed. The FLS may be a diameter, a spherical equivalent diameter, a length, a height, a width, or diameter of a bounding circle. The FLS may be the larger of a length, a height, and a width of a 3D form.

Figure 5:
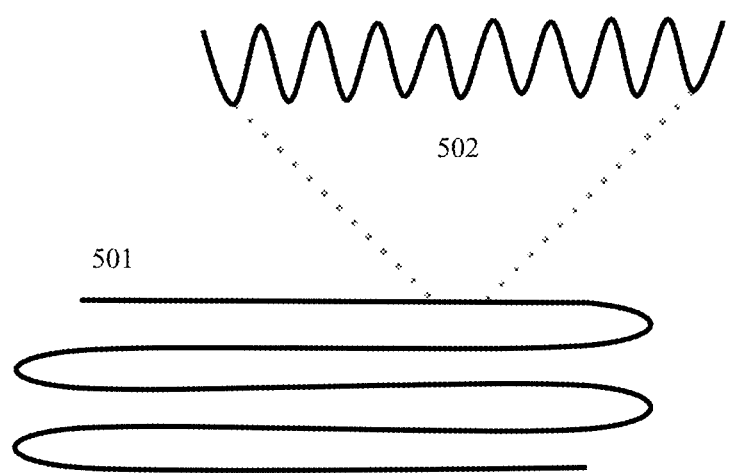
FIG. 5 illustrates a path.

In some embodiments, the energy beam follows a path. The path of the energy beam may be a vector. The path of the energy beam may comprise a raster, a vector, or any combination thereof. The path of the energy beam may comprise an oscillating pattern. The path of the energy beam may comprise a zigzag, wave (e.g., curved, triangular, or square), or curve pattern. The curved wave may comprise a sine or cosine wave. The path of the energy beam may comprise a sub-pattern. The path of the energy beam may comprise an oscillating (e.g., zigzag), wave (e.g., curved, triangular, or square), and/or curved sub-pattern. The curved wave may comprise a sine or cosine wave. FIG. 5 shows an example of a path 501 of an energy beam comprising a zigzag sub-pattern (e.g., 502 shown as an expansion (e.g., blow-up) of a portion of the path 501). The sub-path of the energy beam may comprise a wave (e.g., sine or cosine wave) pattern. The sub-path may be a small path that forms the large path. The sub-path may be a component (e.g., a portion) of the large path. The path that the energy beam follows may be a predetermined path. A model may predetermine the path by utilizing a controller or an individual (e.g., human). The controller may comprise a processor. The processor may comprise a computer, computer program, drawing or drawing data, statue or statue data, or any combination thereof.

In some embodiments, the path comprises successive lines. The successive lines may touch each other. The successive lines may overlap each other in at least one point. The successive lines may substantially overlap each other. The successive lines may be spaced by a first distance (e.g., hatch spacing). FIG. 6 shows an example of a path 614 that includes five hatches wherein each two immediately adjacent hatches are separated by a spacing distance. The hatch spacing may be any hatch spacing disclosed in Patent Application serial number PCT/US16/34857 filed on May 27, 2016, titled "THREE-DIMENSIONAL PRINTING AND THREE-DIMENSIONAL OBJECTS FORMED USING THE SAME" that is entirely incorporated herein by reference.

In some embodiments, the term "auxiliary support," as used herein, generally refers to at least one feature that is a part of a printed 3D object, but not part of the desired, intended, designed, ordered, and/or final 3D object. Auxiliary support may provide structural support during and/or subsequent to the formation of the 3D object. The auxiliary support may be anchored to the enclosure. For example, an auxiliary support may be anchored to the platform (e.g., building platform), to the side walls of the material bed, to a wall of the enclosure, to an object (e.g., stationary or semi-stationary) within the enclosure, or any combination thereof. The auxiliary support may be the platform (e.g., the base, the substrate, or the bottom of the enclosure). The auxiliary support may enable the removal or energy from the 3D object (e.g., or a portion thereof) that is being formed. The removal of energy (e.g., heat) may be during and/or after the formation of the 3D object. Examples of auxiliary support comprise a fin (e.g., heat fin), anchor, handle, pillar, column, frame, footing, wall, platform, or another stabilization feature. In some instances, the auxiliary support may be mounted, clamped, or situated on the platform. The auxiliary support can be anchored to the building platform, to the sides (e.g., walls) of the building platform, to the enclosure, to an object (stationary or semi-stationary) within the enclosure, or any combination thereof.

In some examples, the generated 3D object can be printed without auxiliary support. In some examples, overhanging feature of the generated 3D object can be printed without (e.g., without any) auxiliary support. The generated object can be devoid of auxiliary supports. The generated object may be suspended (e.g., float anchorlessly) in the material bed (e.g., powder bed). The term "anchorlessly," as used herein, generally refers to without or in the absence of an anchor. In some examples, an object is suspended in a powder bed anchorlessly without attachment to a support. For example, the object floats in the powder bed. The generated 3D object may be suspended in the layer of pre-transformed material (e.g., powder material). The pre-transformed material (e.g., powder material) can offer support to the printed 3D object (or the object during its generation). Sometimes, the generated 3D object may comprise one or more auxiliary supports. The auxiliary support may be suspended in the pre-transformed material (e.g., powder material). The auxiliary support may provide weights or stabilizers. The auxiliary support can be suspended in the material bed within the layer of pre-transformed material in which the 3D object (or a portion thereof) has been formed. The auxiliary support (e.g., one or more auxiliary supports) can be suspended in the pre-transformed material within a layer of pre-transformed material other than the one in which the 3D object (or a portion thereof) has been formed (e.g., a previously deposited layer of (e.g., powder) material). The auxiliary support may touch the platform. The auxiliary support may be suspended in the material bed (e.g., powder material) and not touch the platform. The auxiliary support may be anchored to the platform. The distance between any two auxiliary supports can be at least about 1 millimeter, 1.3 millimeters (mm), 1.5 mm, 1.8 mm, 1.9 mm, 2.0 mm, 2.2 mm, 2.4 mm, 2.5 mm, 2.6 mm, 2.7 mm, 3 mm, 4 mm, 5 mm, 10 mm, 11 mm, 15 mm, 20 mm, 30 mm, 40 mm, 41 mm, or 45 mm. The distance between any two auxiliary supports can be at most 1 millimeter, 1.3 mm, 1.5 mm, 1.8 mm, 1.9 mm, 2.0 mm, 2.2 mm, 2.4 mm, 2.5 mm, 2.6 mm, 2.7 mm, 3 mm, 4 mm, 5 mm, 10 mm, 11 mm, 15 mm, 20 mm, 30 mm, 40 mm, 41 mm, or 45 mm. The distance between any two auxiliary supports can be any value in between the afore-mentioned distances (e.g., from about 1 mm to about 45 mm, from about 1 mm to about 11 mm, from about 2.2 mm to about 15 mm, or from about 10 mm to about 45 mm). At times, a sphere intersecting an exposed surface of the 3D object may be devoid of auxiliary support. The sphere may have a radius XY that is equal to the distance between any two auxiliary supports mentioned herein.

In some examples, the diminished number of auxiliary supports or lack of auxiliary support, may facilitate a 3D printing process that requires a smaller amount of material, produces a smaller amount of material waste, and/or requires smaller energy as compared to commercially available 3D printing processes. The reduced number of auxiliary supports can be smaller by at least about 1.1, 1.3, 1.5, 2, 3, 4, 5, 6, 7, 8, 9, or 10 as compared to conventional 3D printing. The smaller amount may be smaller by any value between the aforesaid values (e.g., from about 1.1 to about 10, or from about 1.5 to about 5) as compared to conventional 3D printing.

In some examples, the generated 3D object has a surface roughness profile. The generated 3D object can have various surface roughness profiles, which may be suitable for various applications. The surface roughness may be the deviations in the direction of the normal vector of a real surface from its ideal form. The generated 3D object can have a Ra value of as disclosed herein.

The generated 3D object (e.g., the hardened cover) may be substantially smooth. The generated 3D object may have a deviation from an ideal planar surface (e.g., atomically flat or molecularly flat) of at most about 1.5 nanometers (nm), 2 nm, 3 nm, 4 nm, 5 nm, 10 nm, 15 nm, 20 nm, 25 nm, 30 nm, 35 nm, 100 nm, 300 nm, 500 nm, 1 micrometer (μm), 1.5 μm, 2 μm, 3 μm, 4 μm, 5 μm, 10 μm, 15 μm, 20 μm, 25 μm, 30 μm, 35 μm, 100 μm, 300 μm, 500 μm, or less. The generated 3D object may have a deviation from an ideal planar surface of at least about 1.5 nanometers (nm), 2 nm, 3 nm, 4 nm, 5 nm, 10 nm, 15 nm, 20 nm, 25 nm, 30 nm, 35 nm, 100 nm, 300 nm, 500 nm, 1 micrometer (μm), 1.5 μm, 2 μm, 3 μm, 4 μm, 5 μm, 10 μm, 15 μm, 20 μm, 25 μm, 30 μm, 35 μm, 100 μm, 300 μm, 500 μm, or more. The generated 3D object may have a deviation from an ideal planar surface between any of the afore-mentioned deviation values. The generated 3D object may comprise a pore. The generated 3D object may comprise pores. The pores may be of an average FLS (diameter or diameter equivalent in case the pores are not spherical) of at most about 1.5 nanometers (nm), 2 nm, 3 nm, 4 nm, 5 nm, 10 nm, 15 nm, 20 nm, 25 nm, 30 nm 35 nm, 100 nm, 300 nm, 500 nm, 1 micrometer (μm), 1.5 μm, 2 μm, 3 μm, 4 μm, 5 μm, 10 μm, 15 μm, 20 μm, 25 μm, 30 μm, 35 μm, 100 μm, 300 μm, or 500 μm. The pores may be of an average FLS of at least about 1.5 nanometers (nm), 2 nm, 3 nm, 4 nm, 5 nm, 10 nm, 15 nm, 20 nm, 25 nm, 30 nm, 35 nm, 100 nm, 300 nm, 500 nm, 1 micrometer (μm), 1.5 μm, 2 μm, 3 μm, 4 μm, 5 μm, 10 μm, 15 μm, 20 μm, 25 μm, 30 μm, 35 μm, 100 μm, 300 μm, or 500 μm. The pores may be of an average FLS between any of the afore-mentioned FLS values (e.g., from about 1 nm to about 500 μm, or from about 20 μm, to about 300 μm). The 3D object (or at least a layer thereof) may have a porosity of at most about 0.05 percent (%), 0.1% 0.2%, 0.3%, 0.4%, 0.5%, 0.6%, 0.7%, 0.8%, 0.9%, 1%, 2%, 3%, 4%, 5%, 6%, 7%, 8%, 9%, 10%, 20%, 30%, 40%, 50%, 60%, 70%, or 80%. The 3D object (or at least a layer thereof) may have a porosity of at least about 0.05%, 0.1%, 0.2%, 0.3%, 0.4%, 0.5%, 0.6%, 0.7%, 0.8%, 0.9%, 1%, 2%, 3%, 4%, 5%, 6%, 7%, 8%, 9%, 10%, 20%, 30%, 40%, 50%, 60%, 70%, or 80%. The 3D object (or at least a layer thereof) may have porosity between any of the afore-mentioned porosity percentages (e.g., from about 0.05% to about 80%, from about 0.05% to about 40%, from about 10% to about 40%, or from about 40% to about 90%). In some instances, a pore may traverse the generated 3D object. For example, the pore may start at a face of the 3D object and end at the opposing face of the 3D object. The pore may comprise a passageway extending from one face of the 3D object and ending on the opposing face of that 3D object. In some instances, the pore may not traverse the generated 3D object. The pore may form a cavity in the generated 3D object. The pore may form a cavity on a face of the generated 3D object. For example, pore may start on a face of the plane and not extend to the opposing face of that 3D object.

In some examples, the formed plane comprises a protrusion. The protrusion can be a grain, a bulge, a bump, a ridge, or an elevation. The generated 3D object may comprise protrusions. The protrusions may be of an average FLS of at most about 1.5 nanometers (nm), 2 nm, 3 nm, 4 nm, 5 nm, 10 nm, 15 nm, 20 nm, 25 nm, 30 nm, 35 nm, 100 nm, 300 nm, 500 nm, 1 micrometer ($\mu m$), 1.5 $\mu m$, 2 $\mu m$, 3 $\mu m$, 4 $\mu m$, 5 $\mu m$, 10 $\mu m$, 15 $\mu m$, 20 $\mu m$, 25 $\mu m$, 30 $\mu m$, 35 $\mu m$, 100 $\mu m$, 300 $\mu m$, 500 $\mu m$, or less. The protrusions may be of an average FLS of at least about 1.5 nanometers (nm), 2 nm, 3 nm, 4 nm, 5 nm, 10 nm, 15 nm, 20 nm, 25 nm, 30 nm, 35 nm, 100 nm, 300 nm, 500 nm, 1 micrometer ($\mu m$), 1.5 $\mu m$, 2 $\mu m$, 3 $\mu m$, 4 $\mu m$, 5 $\mu m$, 10 $\mu m$, 15 $\mu m$, 20 $\mu m$, 25 $\mu m$, 30 $\mu m$, 35 $\mu m$, 100 $\mu m$, 300 $\mu m$, 500 $\mu m$, or more. The protrusions may be of an average FLS between any of the afore-mentioned FLS values. The protrusions may constitute at most about 0.05%, 0.1%, 0.2%, 0.3%, 0.4%, 0.5%, 0.6%, 0.7%, 0.8%, 0.9%, 1%, 2%, 3%, 4%, 5%, 10%, 20%, 30%, 40%, or 50% of the area of the generated 3D object. The protrusions may constitute at least about 0.05%, 0.1%, 0.2%, 0.3%, 0.4%, 0.5%, 0.6%, 0.7%, 0.8%, 0.9%, 1%, 2%, 3%, 4%, 5%, 10%, 20%, 30%, 40%, or 50% of the area of the 3D object. The protrusions may constitute a percentage of an area of the 3D object that is between the afore-mentioned percentages of 3D object area. The protrusion may reside on any surface of the 3D object. For example, the protrusions may reside on an external surface of a 3D object. The protrusions may reside on an internal surface (e.g., a cavity) of a 3D object. At times, the average size of the protrusions and/or of the holes may determine the resolution of the printed (e.g., generated) 3D object. The resolution of the printed 3D object may be at least about 1 micrometer, 1.3 micrometers ($\mu m$), 1.5 $\mu m$, 1.8 $\mu m$, 1.9 $\mu m$, 2.0 $\mu m$, 2.2 $\mu m$, 2.4 $\mu m$, 2.5 $\mu m$, 2.6 $\mu m$, 2.7 $\mu m$, 3 $\mu m$, 4 $\mu m$, 5 $\mu m$, 10 $\mu m$, 20 $\mu m$, 30 $\mu m$, 40 $\mu m$, 50 $\mu m$, 60 $\mu m$, 70 $\mu m$, 80 $\mu m$, 90 $\mu m$, 100 $\mu m$, 200 $\mu m$, or more. The resolution of the printed 3D object may be at most about 1 micrometer, 1.3 micrometers ($\mu m$), 1.5 $\mu m$, 1.8 $\mu m$, 1.9 $\mu m$, 2.0 $\mu m$, 2.2 $\mu m$, 2.4 $\mu m$, 2.5 $\mu m$, 2.6 $\mu m$, 2.7 $\mu m$, 3 $\mu m$, 4 $\mu m$, 5 $\mu m$, 10 $\mu m$, 20 $\mu m$, 30 $\mu m$, 40 $\mu m$, 50 $\mu m$, 60 $\mu m$, 70 $\mu m$, 80 $\mu m$, 90 $\mu m$, 100 $\mu m$, 200 $\mu m$, or less. The resolution of the printed 3D object may be any value between the above-mentioned resolution values. At times, the 3D object may have a material density of at least about 99.9%, 99.8%, 99.7%, 99.6%, 99.5%, 99.4%, 99.3%, 99.2% 99.1%, 99%, 98%, 96%, 95%, 94%, 93%, 92%, 91%, 90%, 8%, or 70%. At times, the 3D object may have a material density of at most about 99.5%, 99%, 98%, 96%, 95%, 94%, 93%, 92%, 91%, 90%, 8%, or 70%. At times, the 3D object may have a material density between the afore-mentioned material densities. The resolution of the 3D object may be at least about 100 dots per inch (dpi), 300 dpi, 600 dpi, 1200 dpi, 2400 dpi, 3600 dpi, or 4800 dpi. The resolution of the 3D object may be at most about 100 dpi, 300 dpi, 600 dpi, 1200 dpi, 2400 dpi, 3600 dpi, or 4800 dip. The resolution of the 3D object may be any value between the afore-mentioned values (e.g., from 100 dpi to 4800 dpi, from 300 dpi to 2400 dpi, or from 600 dpi to 4800 dpi). The height uniformity (e.g., deviation from average surface height) of a planar surface of the 3D object may be at least about 100 $\mu m$, 90 $\mu m$, 80 $\mu m$, 70 $\mu m$, 60 $\mu m$, 50 $\mu m$, 40 $\mu m$, 30 $\mu m$, 20 $\mu m$, 10 $\mu m$, or 5 $\mu m$. The height uniformity of the planar surface may be at most about 100 $\mu m$, 90 $\mu m$, 80, 70 $\mu m$, 60 $\mu m$, 50 $\mu m$, 40 $\mu m$, 30 $\mu m$, 20 $\mu m$, 10 $\mu m$, or 5 $\mu m$. The height uniformity of the planar surface of the 3D object may be any value between the afore-mentioned height deviation values (e.g., from about 100 $\mu m$ to about 5 $\mu m$, from about 50 $\mu m$ to about 5 $\mu m$, from about 30 $\mu m$ to about 5 $\mu m$, or from about 20 $\mu m$ to about 5 $\mu m$). The height uniformity may comprise high precision uniformity.

In some examples, the energy is transferred from the material bed to the cooling member. Energy (e.g., heat) can be transferred from the material bed to the cooling member (e.g., heat sink) through any one or combination of heat transfer mechanisms. FIG. 1, 113 shows an example of a cooling member. The heat transfer mechanism may comprise conduction, radiation, or convection. The convection may comprise natural or forced convection. The cooling member can be solid, liquid, gas, or semi-solid. In some examples, the cooling member (e.g., heat sink) is solid. The cooling member may be located above, below, or to the side of the powder layer. The cooling member may comprise an energy conductive material. The cooling member may comprise an active energy transfer or a passive energy transfer. The cooling member may comprise a cooling liquid (e.g., aqueous or oil), cooling gas, or cooling solid. The cooling member may be further connected to a cooler and/or a thermostat. The gas, semi-solid, or liquid comprised in the cooling member may be stationary or circulating. The cooling member may comprise a material that conducts heat efficiently. The heat (thermal) conductivity of the cooling member may be at least about 20 Watts per meter times Kelvin (W/mK), 50 W/mK, 100 W/mK, 150 W/mK, 200 W/mK, 205 W/mK, 300 W/mK, 350 W/mK, 400 W/mK, 450 W/mK, 500 W/mK, 550 W/mK, 600 W/mK, 700 W/mK, 800 W/mK, 900 W/mK, or 1000 W/mK. The heat conductivity of the heat sink may be at most about 20 W/mK, 50 W/mK, 100 W/mK, 150 W/mK, 200 W/mK, 205 W/mK, 300 W/mK, 350 W/mK, 400 W/mK, 450 W/mK, 500 W/mK, 550 W/mK, 600 W/mK, 700 W/mK, 800 W/mK, 900 W/mK, or 1000 W/mK. The heat conductivity of the heat sink may any value between the afore-mentioned heat conductivity values. The heat (thermal) conductivity of the cooling member may be measured at ambient temperature (e.g., room temperature) and/or pressure. For example, the heat conductivity may be measured at about 20° C. and a pressure of 1 atmosphere. The heat sink can be separated from the powder bed or powder layer by a gap. The gap can be filled with a gas. The cooling member may be any cooling member (e.g., that is used in 3D printing) such as, for example, the ones described in Patent Application serial number PCT/US15/36802, or in Provisional Patent Application Ser. No. 62/317,070, both of which are entirely incorporated herein by references.

In some examples, when the energy source is in operation, the material bed reaches a certain (e.g., average) temperature. The average temperature of the material bed can be an ambient temperature or "room temperature." The average temperature of the material bed can have an average temperature during the operation of the energy (e.g., beam). The average temperature of the material bed can be an average temperature during the formation of the transformed material, the formation of the hardened material, or the generation of the 3D object. The average temperature can be below or just below the transforming temperature of the material. Just below can refer to a temperature that is at most about 1° C., 2° C., 3° C., 4° C., 5° C., 6° C., 7° C., 8° C., 9° C., 10° C., 15° C., or 20° C. below the transforming temperature. The average temperature of the material bed (e.g., pre-transformed material) can be at most about 10° C. (degrees Celsius), 20° C., 25° C., 30° C., 40° C., 50° C., 60° C., 70° C., 80° C., 90° C., 100° C., 120° C., 140° C., 150° C., 160° C., 180° C., 200° C., 250° C., 300° C., 400° C., 500° C., 600° C., 700° C., 800° C., 900° C., 1000° C., 1200° C., 1400° C., 1600° C., 1800° C., or 2000° C. The average temperature of the material bed (e.g., pre-transformed material) can be at least about 10° C., 20° C., 25° C., 30° C., 40° C., 50° C., 60° C., 70° C., 80° C., 90° C., 100° C., 120° C., 140° C., 150° C., 160° C., 180° C., 200° C., 250° C., 300° C., 400° C., 500° C., 600° C., 700° C., 800° C., 900° C., 1000° C., 1200° C., 1400° C., 1600° C., 1800° C., or 2000° C. The average temperature of the material bed (e.g., pre-transformed material) can be any temperature between the afore-mentioned material average temperatures. The average temperature of the material bed (e.g., pre-transformed material) may refer to the average temperature during the 3D printing. The pre-transformed material can be the material within the material bed that has not been transformed and generated at least a portion of the 3D object (e.g., the remainder). The material bed can be heated or cooled before, during, or after forming the 3D object (e.g., hardened material). Bulk heaters can heat the material bed. The bulk heaters can be situated adjacent to (e.g., above, below, or to the side of) the material bed, or within a material dispensing system. For example, the material can be heated using radiators (e.g., quartz radiators, or infrared emitters). The material bed temperature can be substantially maintained at a predetermined value. The temperature of the material bed can be monitored. The material temperature can be controlled manually and/or by a control system.

In some examples, the pre-transformed material is heated. The pre-transformed material within the material bed can be heated by a first energy source such that the heating will transform the pre-transformed material. The remainder of the material that did not transform to generate at least a portion of the 3D object (e.g., the remainder) can be heated by a second energy source. The remainder can be at an average temperature that is less than the liquefying temperature of the material (e.g., during the 3D printing). The maximum temperature of the transformed portion of the material bed and the average temperature of the remainder of the material bed can be different. The solidus temperature of the material can be a temperature wherein the material is in a solid state at a given pressure (e.g., ambient pressure). Ambient may refer to the surrounding. After the portion of the material bed is heated to the temperature that is at least a liquefying temperature of the material by the first energy source, that portion of the material may be cooled to allow the transformed (e.g., liquefied) material portion to harden (e.g., solidify). In some cases, the liquefying temperature can be at least about 100° C., 200° C., 300° C., 400° C., or 500° C., and the solidus temperature can be at most about 500° C., 400° C., 300° C., 200° C., or 100° C. For example, the liquefying temperature is at least about 300° C. and the solidus temperature is less than about 300° C. In another example, the liquefying temperature is at least about 400° C. and the solidus temperature is less than about 400° C. The liquefying temperature may be different from the solidus temperature. In some instances, the temperature of the pre-transformed material is maintained above the solidus temperature of the material and below its liquefying temperature. In some examples, the material from which the pre-transformed material is composed has a super cooling temperature (or super cooling temperature regime). In some examples, as the first energy source heats up the pre-transformed material to cause at least a portion of it to melt, the molten material will remain molten as the material bed is held at or above the material super cooling temperature of the material, but below its melting point. When two or more materials make up the material layer at a specific ratio, the materials may form a eutectic material on transformation of the material. The liquefying temperature of the formed eutectic material may be the temperature at the eutectic point, close to the eutectic point, or far from the eutectic point. Close to the eutectic point may designate a temperature that is different from the eutectic temperature (i.e., temperature at the eutectic point) by at most about 0.1° C., 0.5° C., 1° C., 2° C., 4° C., 5° C., 6° C., 8° C., 10° C., or 15° C. A temperature that is farther from the eutectic point than the temperature close to the eutectic point is designated herein as a temperature far from the eutectic Point. The process of liquefying and solidifying a portion of the material can be repeated until the entire object has been formed. At the completion of the generated 3D object, it can be removed from the remainder of material in the container. The remaining material can be separated from the portion at the generated 3D object. The generated 3D object can be hardened and removed from the container (e.g., from the substrate or from the base).

The methods described herein may further comprise stabilizing the temperature within the enclosure. For example, stabilizing the temperature of the atmosphere or the pre-transformed material (e.g., within the material bed). Stabilization of the temperature may be to a predetermined temperature value. The methods described herein may further comprise altering the temperature within at least one portion of the container. Alteration of the temperature may be to a predetermined temperature. Alteration of the temperature may comprise heating and/or cooling the material bed. Elevating the temperature (e.g., of the material bed) may be to a temperature below the temperature at which the pre-transformed material fuses (e.g., melts or sinters), connects, or bonds.

In some examples, the 3D printer comprises an optical system. The apparatus and/or systems described herein may comprise an optical system. The optical components may be controlled manually and/or via a control system (e.g., a controller). The optical system may be configured to direct at least one energy beam (e.g., 307) from the at least one energy source (e.g., 306) to a position on the material bed within the enclosure (e.g., a predetermined position). A scanner can be included in the optical system. The printing system may comprise a processor (e.g., a central processing unit). The processor can be programmed to control a trajectory of the at least one energy beam and/or energy source with the aid of the optical system. The systems and/or the apparatus described herein can further comprise a control system in communication with the at least one energy source and/or energy beam. The control system can regulate a supply of energy from the at least one energy source to the material in the container. The control system may control the various components of the optical system. The various components of the optical system (e.g., FIG. 3) may include optical components comprising a mirror (e.g., 305), a lens (e.g., concave or convex), a fiber, a beam guide, a rotating polygon, or a prism. The lens may be a focusing or a dispersing lens. The lens may be a diverging or converging lens. The mirror can be a deflection mirror. The optical components may be tiltable and/or rotatable. The optical components may be tilted and/or rotated. The mirror may be a deflection mirror. The optical components may comprise an aperture. The aperture may be mechanical. The optical system may comprise a variable focusing device. The variable focusing device may be connected to the control system. The variable focusing device may be controlled by the control system and/or manually. The variable focusing device may comprise a modulator. The modulator may comprise an acousto-optical modulator, mechanical modulator, or an electro optical modulator. The focusing device may comprise an aperture (e.g., a diaphragm aperture).

In some embodiments, the container comprises one or more sensors. The container described herein may comprise at least one sensor. The sensor may be connected and/or controlled by the control system (e.g., computer control system, or controller). The control system may be able to receive signals from the at least one sensor. The control system may act upon at least one signal received from the at least one sensor. The control may rely on feedback and/or feed forward mechanisms that has been pre-programmed. The feedback and/or feed forward mechanisms may rely on input from at least one sensor that is connected to the control unit.

In some embodiments, the sensor detects the amount material (e.g., pre-transformed material) in the enclosure. The controller may monitor the amount of material in the enclosure (e.g., within the material bed). The systems and/or the apparatus described herein can include a pressure sensor. The pressure sensor may measure the pressure of the chamber (e.g., pressure of the chamber atmosphere). The pressure sensor can be coupled to a control system. The pressure can be electronically and/or manually controlled. The controller may regulate the pressure (e.g., with the aid of one or more vacuum pumps) according to input from at least one pressure sensor. The sensor may comprise light sensor, image sensor, acoustic sensor, vibration sensor, chemical sensor, electrical sensor, magnetic sensor, fluidity sensor, movement sensor, speed sensor, position sensor, pressure sensor, force sensor, density sensor, metrology sensor, sonic sensor (e.g., ultrasonic sensor), or proximity sensor. The metrology sensor may comprise measurement sensor (e.g., height, length, width, depth, angle, and/or volume). The metrology sensor may comprise a magnetic, acceleration, orientation, or optical sensor. The optical sensor may comprise a camera (e.g., IR camera, or CCD camera (e.g., single line CCD camera)). or CCD camera (e.g., single line CCD camera). The sensor may transmit and/or receive sound (e.g., echo), magnetic, electronic, or electromagnetic signal. The electromagnetic signal may comprise a visible, infrared, ultraviolet, ultrasound, radio wave, or microwave signal. The metrology sensor may measure the tile. The metrology sensor may measure the gap. The metrology sensor may measure at least a portion of the layer of material (e.g., pre-transformed, transformed, and/or hardened). The layer of material may be a pre-transformed material (e.g., powder), transformed material, or hardened material. The metrology sensor may measure at least a portion of the 3D object. The sensor may comprise a temperature sensor, weight sensor, powder level sensor, gas sensor, or humidity sensor. The gas sensor may sense any gas enumerated herein. The temperature sensor may comprise Bolometer, Bimetallic strip, calorimeter, Exhaust gas temperature gauge, Flame detection, Gardon gauge, Golay cell, Heat flux sensor, Infrared thermometer, Microbolometer, Microwave radiometer, Net radiometer, Quartz thermometer, Resistance temperature detector, Resistance thermometer, Silicon band gap temperature sensor, Special sensor microwave/imager, Temperature gauge, Thermistor, Thermocouple, Thermometer, Pyrometer, IR camera, or CCD camera (e.g., single line CCD camera). The temperature sensor may measure the temperature without contacting the material bed (e.g., non-contact measurements). The pyrometer may comprise a point pyrometer, or a multi-point pyrometer. The Infrared (IR) thermometer may comprise an IR camera. The pressure sensor may comprise Barograph, Barometer, Boost gauge, Bourdon gauge, hot filament ionization gauge, Ionization gauge, McLeod gauge, Oscillating U-tube, Permanent Downhole Gauge, Piezometer, Pirani gauge, Pressure sensor, Pressure gauge, tactile sensor, or Time pressure gauge. The position sensor may comprise Auxanometer, Capacitive displacement sensor, Capacitive sensing, Free fall sensor, Gravimeter, Gyroscopic sensor, Impact sensor, Inclinometer, Integrated circuit piezoelectric sensor, Laser rangefinder, Laser surface velocimeter, LIDAR, Linear encoder, Linear variable differential transformer (LVDT), Liquid capacitive inclinometers, Odometer, Photoelectric sensor, Piezoelectric accelerometer, Rate sensor, Rotary encoder, Rotary variable differential transformer, Selsyn, Shock detector, Shock data logger, Tilt sensor, Tachometer, Ultrasonic thickness gauge, Variable reluctance sensor, or Velocity receiver. The optical sensor may comprise a Charge-coupled device, Colorimeter, Contact image sensor, Electro-optical sensor, Infra-red sensor, Kinetic inductance detector, light emitting diode as light sensor, Light-addressable potentiometric sensor, Nichols radiometer, Fiber optic sensors, optical position sensor, photo detector, photodiode, photomultiplier tubes, phototransistor, photoelectric sensor, photoionization detector, photomultiplier, photo resistor, photo switch, phototube, scintillometer, Shack-Hartmann, single-photon avalanche diode, superconducting nanowire single-photon detector, transition edge sensor, visible light photon counter, or wave front sensor. The weight of the enclosure (e.g., container), or any components within the enclosure can be monitored by at least one weight sensor in or adjacent to the material. For example, a weight sensor can be situated at the bottom of the enclosure. The weight sensor can be situated between the bottom of the enclosure and the substrate. The weight sensor can be situated between the substrate and the base. The weight sensor can be situated between the bottom of the container and the base. The weight sensor can be situated between the bottom of the container and the top of the material bed. The weight sensor can comprise a pressure sensor. The weight sensor may comprise a spring scale, a hydraulic scale, a pneumatic scale, or a balance. At least a portion of the pressure sensor can be exposed on a bottom of the container. In some cases, the at least one weight sensor can comprise a button load cell. Alternatively, or additionally a sensor can be configured to monitor the weight of the material by monitoring a weight of a structure that contains the material (e.g., a material bed). One or more position sensors (e.g., height sensors) can measure the height of the material bed relative to the substrate. The position sensors can be optical sensors. The position sensors can determine a distance between one or more energy sources and a surface of the material bed. The surface of the material bed can be the upper surface of the material bed. For example, FIG. 1, 119 shows an example of an upper surface of the material bed 104.

In some embodiments, the 3D printer comprises one or more valves. The methods, systems and/or the apparatus described herein may comprise at least one valve. The valve may be shut or opened according to an input from the at least one sensor, or manually. The degree of valve opening or shutting may be regulated by the control system, for example, according to at least one input from at least one sensor. The systems and/or the apparatus described herein can include one or more valves, such as throttle valves.

In some embodiments, the 3D printer comprises one or more motors. The methods, systems and/or the apparatus described herein may comprise a motor. The motor may be controlled by the control system and/or manually. The apparatuses and/or systems described herein may include a system providing the material (e.g., powder material) to the material bed. The system for providing the material may be controlled by the control system, or manually. The motor may connect to a system providing the material (e.g., powder material) to the material bed. The system and/or apparatus of the present invention may comprise a material reservoir. The material may travel from the reservoir to the system and/or apparatus of the present invention may comprise a material reservoir. The material may travel from the reservoir to the system for providing the material to the material bed. The motor may alter (e.g., the position of) the substrate and/or to the base. The motor may alter (e.g., the position of) the elevator. The motor may alter an opening of the enclosure (e.g., its opening or closure). The motor may be a step motor or a servomotor. The methods, systems and/or the apparatus described herein may comprise a piston. The piston may be a trunk, crosshead, slipper, or deflector piston.

In some embodiments, the 3D printer comprises one or more nozzles. The systems and/or the apparatus described herein may comprise at least one nozzle. The nozzle may be regulated according to at least one input from at least one sensor. The nozzle may be controlled automatically or manually. The controller may control the nozzle. The nozzle may include jet (e.g., gas jet) nozzle, high velocity nozzle, propelling nozzle, magnetic nozzle, spray nozzle, vacuum nozzle, or shaping nozzle (e.g., a die). The nozzle can be a convergent or a divergent nozzle. The spray nozzle may comprise an atomizer nozzle, an air-aspirating nozzle, or a swirl nozzle.

In some embodiments, the 3D printer comprises one or more pumps. The systems and/or the apparatus described herein may comprise at least one pump. The pump may be regulated according to at least one input from at least one sensor. The pump may be controlled automatically or manually. The controller may control the pump. The one or more pumps may comprise a positive displacement pump. The positive displacement pump may comprise rotary-type positive displacement pump, reciprocating-type positive displacement pump, or linear-type positive displacement pump. The positive displacement pump may comprise rotary lobe pump, progressive cavity pump, rotary gear pump, piston pump, diaphragm pump, screw pump, gear pump, hydraulic pump, rotary vane pump, regenerative (peripheral) pump, peristaltic pump, rope pump or flexible impeller. Rotary positive displacement pump may comprise gear pump, screw pump, or rotary vane pump. The reciprocating pump comprises plunger pump, diaphragm pump, piston pumps displacement pumps, or radial piston pump. The pump may comprise a valve-less pump, steam pump, gravity pump, eductor-jet pump, mixed-flow pump, bellow pump, axial-flow pumps, radial-flow pump, velocity pump, hydraulic ram pump, impulse pump, rope pump, compressed-air-powered double-diaphragm pump, triplex-style plunger pump, plunger pump, peristaltic pump, roots-type pumps, progressing cavity pump, screw pump, or gear pump. In some examples, the systems and/or the apparatus described herein include one or more vacuum pumps selected from mechanical pumps, rotary vain pumps, turbomolecular pumps, ion pumps, cryopumps, and diffusion pumps. The one or more vacuum pumps may comprise Rotary vane pump, diaphragm pump, liquid ring pump, piston pump, scroll pump, screw pump, Wankel pump, external vane pump, roots blower, multistage Roots pump, Toepler pump, or Lobe pump. The one or more vacuum pumps may comprise momentum transfer pump, regenerative pump, entrapment pump, Venturi vacuum pump, or team ejector.

In some embodiments, the 3D printer comprises a communication technology. The systems, apparatuses, and/or parts thereof may comprise Bluetooth technology. systems, apparatuses, and/or parts thereof may comprise a communication port. The communication port may be a serial port or a parallel port. The communication port may be a Universal Serial Bus port (i.e., USB). The systems, apparatuses, and/or parts thereof may comprise USB ports. The USB can be micro or mini USB. The USB port may relate to device classes comprising 00h, 01h, 02h, 03h, 05h, 06h, 07h, 08h, 09h, 0Ah, 0Bh, 0Dh, 0Eh, 0Fh, 10h, 11h, DCh, E0h, EFh, FEh, or FFh. The surface identification mechanism may comprise a plug and/or a socket (e.g., electrical, AC power, DC power). The systems, apparatuses, and/or parts thereof may comprise an adapter (e.g., AC and/or DC power adapter). The systems, apparatuses, and/or parts thereof may comprise a power connector. The power connector can be an electrical power connector. The power connector may comprise a magnetically attached power connector. The power connector can be a dock connector. The connector can be a data and power connector. The connector may comprise pins. The connector may comprise at least 10, 15, 18, 20, 22, 24, 26, 28, 30, 40, 42, 45, 50, 55, 80, or 100 pins.

In some embodiments, the 3D printer comprises a controller. The controller may monitor and/or direct (e.g., physical) alteration of the operating conditions of the apparatuses, software, and/or methods described herein. The controller may be a manual or a non-manual controller. The controller may be an automatic controller. The controller may operate upon request. The controller may be a programmable controller. The controller may be programmed. The controller may comprise a processing unit (e.g., CPU or GPU). The controller may receive an input (e.g., from a sensor). The controller may deliver an output. The controller may comprise multiple controllers. The controller may receive multiple inputs. The controller may generate multiple outputs. The controller may be a single input single output controller (SISO) or a multiple input multiple output controller (MIMO). The controller may interpret the input signal received. The controller may acquire data from the one or more sensors. Acquire may comprise receive or extract. The data may comprise measurement, estimation, determination, generation, or any combination thereof. The controller may comprise feedback control. The controller may comprise feed-forward control. The control may comprise on-off control, proportional control, proportional-integral (PI) control, or proportional-integral-derivative (PID) control. The control may comprise open loop control, or closed loop control. The controller may comprise closed loop control. The controller may comprise open loop control. The controller may comprise a user interface. The user interface may comprise a keyboard, keypad, mouse, touch screen, microphone, speech recognition package, camera, imaging system, or any combination thereof. The outputs may include a display (e.g., screen), speaker, or printer. The controller may be any controller (e.g., a controller used in 3D printing) such as, for example, the controller disclosed in Provisional Patent Application Ser. No. 62/252,330 that was filed on Nov. 6, 2015, titled "APPARATUSES, SYSTEMS AND METHODS FOR THREE-DIMENSIONAL PRINTING," or in Provisional Patent Application Ser. No. 62/325,402 that was filed on Apr. 20, 2016, titled "METHODS, SYSTEMS, APPARATUSES, AND SOFTWARE FOR ACCURATE THREE-DIMENSIONAL PRINTING," both of which are incorporated herein by reference in their entirety.

Control may comprise regulate, modulate, adjust, maintain, alter, change, govern, manage, restrain, restrict, direct guide, oversee, manage, preserve, sustain, restrain, temper, or vary.

In some embodiments, the methods, systems, software and/or the apparatuses described herein comprise a control system. The control system can be in communication with one or more energy sources and/or energy (e.g., energy beams). The energy sources may be of the same type or of different types. For example, the energy sources can be both lasers, or a laser and an electron beam. For example, the control system may be in communication with the first energy and/or with the second energy. The control system may regulate the one or more energies (e.g., energy beams). The control system may regulate the energy supplied by the one or more energy sources. For example, the control system may regulate the energy supplied by a first energy beam and by a second energy beam, to the pre-transformed material within the material bed. The control system may regulate the position of the one or more energy beams. For example, the control system may regulate the position of the first energy beam and/or the position of the second energy beam.

In some embodiments, a plurality of energy beams is used to transform the pre-transformed material and for one or more 3D objects. The plurality of energy beams may be staggered (e.g., in a direction). The direction of may be along the direction of the gas flow, or at an angle relative to the direction of flow. The angle may be perpendicular, or an angle different than perpendicular. The plurality of energy beam may comprise 2, 3, 4, 5, 6, 7, 8, 9, or 10. The plurality of energy beams may form an array. At least two of the plurality of energy beams may be controlled independently of each other. At least two of the plurality of energy beams may be controlled in concert. At least two of the plurality of energy beams may translate independently of each other. At least two of the plurality of energy beams may translate in concert. At least two of the plurality of energy beams may be controlled by the same controller. At least two of the plurality of energy beams may be controlled by different controllers.

Figure 4:
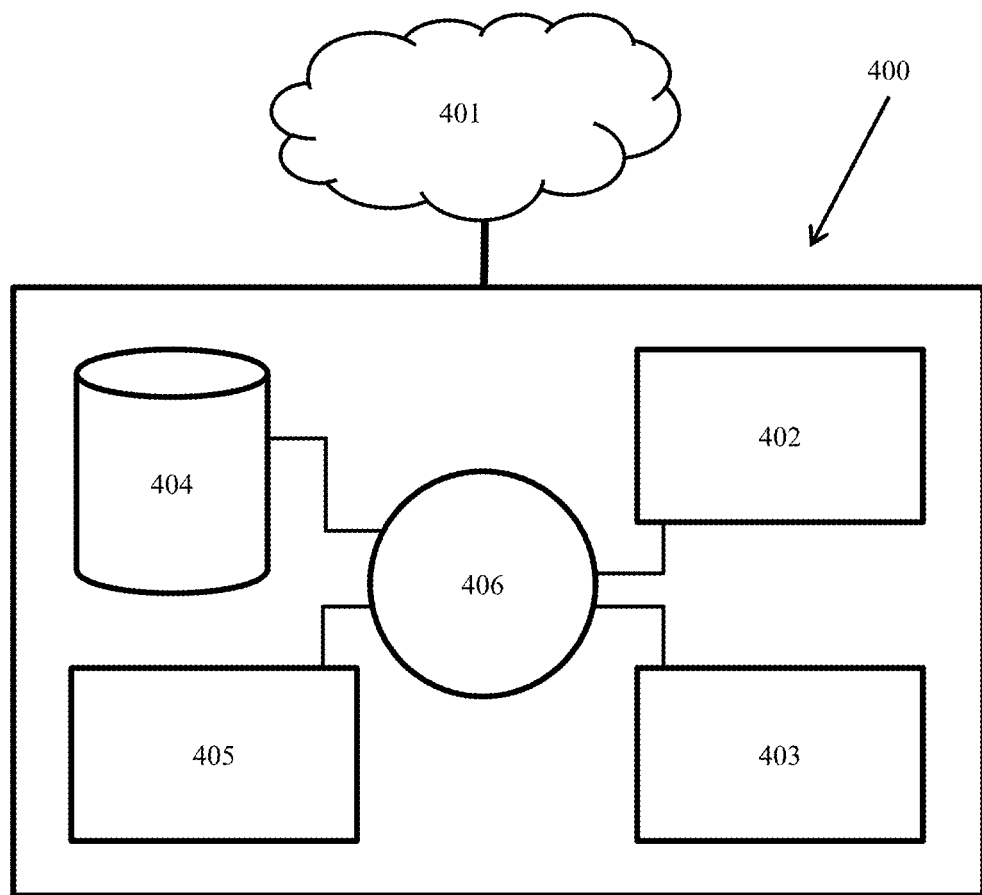
FIG. 4 schematically illustrates a computer control system that is programmed or otherwise configured to facilitate the formation of one or more 3D objects.

In some embodiments, the 3D printing system comprises a processor. The processor may be a processing unit. The controller may comprise a processing unit. The processing unit may be central. The processing unit may comprise a central processing unit (herein "CPU"). The controllers or control mechanisms (e.g., comprising a computer system) may be programmed to implement methods of the disclosure. The processor (e.g., 3D printer processor) may be programmed to implement methods of the disclosure. The controller may control at least one component of the systems and/or apparatuses disclosed herein. FIG. 4 is a schematic example of a computer system 400 that is programmed or otherwise configured to facilitate the formation of a 3D object according to the methods provided herein. The computer system 400 can control (e.g., direct, monitor, and/or regulate) various features of printing methods, apparatuses and systems of the present disclosure, such as, for example, control force, translation, heating, cooling and/or maintaining the temperature of a powder bed, process parameters (e.g., chamber pressure), scanning rate (e.g., of the energy beam and/or the platform), scanning route of the energy source, position and/or temperature of the cooling member(s), application of the amount of energy emitted to a selected location, or any combination thereof. The computer system 401 can be part of, or be in communication with, a 3D printing system or apparatus. The computer may be coupled to one or more mechanisms disclosed herein, and/or any parts thereof. For example, the computer may be coupled to one or more sensors, valves, switches, motors, pumps, scanners, optical components, or any combination thereof.

The computer system 400 can include a processing unit 406 (also "processor," "computer" and "computer processor" used herein). The computer system may include memory or memory location 402 (e.g., random-access memory, read-only memory, flash memory), electronic storage unit 404 (e.g., hard disk), communication interface 403 (e.g., network adapter) for communicating with one or more other systems, and peripheral devices 405, such as cache, other memory, data storage and/or electronic display adapters. The memory 402, storage unit 404, interface 403, and peripheral devices 405 are in communication with the processing unit 406 through a communication bus (solid lines), such as a motherboard. The storage unit can be a data storage unit (or data repository) for storing data. The computer system can be operatively coupled to a computer network ("network") 401 with the aid of the communication interface. The network can be the Internet, an internet and/or extranet, or an intranet and/or extranet that is in communication with the Internet. In some cases, the network is a telecommunication and/or data network. The network can include one or more computer servers, which can enable distributed computing, such as cloud computing. The network, in some cases with the aid of the computer system, can implement a peer-to-peer network, which may enable devices coupled to the computer system to behave as a client or a server.

The processing unit can execute a sequence of machine-readable instructions, which can be embodied in a program or software. The instructions may be stored in a memory location, such as the memory 602. The instructions can be directed to the processing unit, which can subsequently program or otherwise configure the processing unit to implement methods of the present disclosure. Examples of operations performed by the processing unit can include fetch, decode, execute, and write back. The processing unit may interpret and/or execute instructions. The processor may include a microprocessor, a data processor, a central processing unit (CPU), a graphical processing unit (GPU), a system-on-chip (SOC), a co-processor, a network processor, an application specific integrated circuit (ASIC), an application specific instruction-set processor (ASIPs), a controller, a programmable logic device (PLD), a chipset, a field programmable gate array (FPGA), or any combination thereof. The processing unit can be part of a circuit, such as an integrated circuit. One or more other components of the system 600 can be included in the circuit.

In some embodiments, the storage unit 404 stores files, such as drivers, libraries and saved programs. The storage unit can store user data (e.g., user preferences and user programs). In some cases, the computer system can include one or more additional data storage units that are external to the computer system, such as located on a remote server that is in communication with the computer system through an intranet or the Internet.

In some embodiments, the 3D printer comprises communicating through a network. The computer system can communicate with one or more remote computer systems through a network. For instance, the computer system can communicate with a remote computer system of a user (e.g., operator). Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. A user (e.g., client) can access the computer system via the network.

Methods as described herein can be implemented by way of machine (e.g., computer processor) executable code stored on an electronic storage location of the computer system, such as, for example, on the memory 402 or electronic storage unit 404. The machine executable or machine-readable code can be provided in the form of software. During use, the processor 406 can execute the code. In some cases, the code can be retrieved from the storage unit and stored on the memory for ready access by the processor. In some situations, the electronic storage unit can be precluded, and machine-executable instructions are stored on memory.

The code can be pre-compiled and configured for use with a machine have a processor adapted to execute the code, or can be compiled during runtime. The code can be supplied in a programming language that can be selected to enable the code to execute in a pre-compiled or as-compiled fashion.

In some instances, the processing unit includes one or more cores. The computer system may comprise a single core processor, multi core processor, or a plurality of processors for parallel processing. The processing unit may comprise one or more central processing unit (CPU) and/or a graphic processing unit (GPU). The multiple cores may be disposed in a physical unit (e.g., Central Processing Unit, or Graphic Processing Unit). The processing unit may include one or more processing units. The physical unit may be a single physical unit. The physical unit may be a die. The physical unit may comprise cache coherency circuitry. The multiple cores may be disposed in close proximity. The physical unit may comprise an integrated circuit chip. The integrated circuit chip may comprise one or more transistors. The integrated circuit chip may comprise at least about 0.2 billion transistors (BT), 0.5 BT, 1 BT, 2 BT, 3 BT, 5 BT, 6 BT, 7 BT, 8 BT, 9 BT, 10 BT, 15 BT, 20 BT, 25 BT, 30 BT, 40 BT, or 50 BT. The integrated circuit chip may comprise at most about 7 BT, 8 BT, 9 BT, 10 BT, 15 BT, 20 BT, 25 BT, 30 BT, 40 BT, 50 BT, 70 BT, or 100 BT. The integrated circuit chip may comprise any number of transistors between the afore-mentioned numbers (e.g., from about 0.2 BT to about 100 BT, from about 1 BT to about 8 BT, from about 8 BT to about 40 BT, or from about 40 BT to about 100 BT). The integrated circuit chip may have an area of at least about 50 mm$^2$, 60 mm$^2$, 70 mm$^2$, 80 mm$^2$, 90 mm$^2$, 100 mm$^2$, 200 mm$^2$, 300 mm$^2$, 400 mm$^2$, 500 mm$^2$, 600 mm$^2$, 700 mm$^2$, or 800 mm$^2$. The integrated circuit chip may have an area of at most about 50 mm$^2$, 60 mm$^2$, 70 mm$^2$, 80 mm$^2$, 90 mm$^2$, 100 mm$^2$, 200 mm$^2$, 300 mm$^2$, 400 mm$^2$, 500 mm$^2$, 600 mm$^2$, 700 mm$^2$, or 800 mm$^2$. The integrated circuit chip may have an area of any value between the afore-mentioned values (e.g., from about 50 mm$^2$ to about 800 mm$^2$, from about 50 mm$^2$ to about 500 mm$^2$, or from about 500 mm$^2$ to about 800 mm$^2$). The close proximity may allow substantial preservation of communication signals that travel between the cores. The close proximity may diminish communication signal degradation. A core as understood herein is a computing component having independent central processing capabilities. The computing system may comprise a multiplicity of cores, which may be disposed on a single computing component. The multiplicity of cores may include two or more independent central processing units. The independent central processing units may constitute a unit that read and execute program instructions. The independent central processing units may constitute parallel processing units. The parallel processing units may be cores and/or digital signal processing slices (DSP slices). The multiplicity of cores can be parallel cores. The multiplicity of DSP slices can be parallel DSP slices. The multiplicity of cores and/or DSP slices can function in parallel. The multiplicity of cores may include at least about 2, 10, 40, 100, 400, 1000, 2000, 3000, 4000, 5000, 6000, 7000, 8000, 9000, 10000, 11000, 12000, 13000, 14000 or 15000 cores. The multiplicity of cores may include at most about 1000, 2000, 3000, 4000, 5000, 6000, 7000, 8000, 9000, 10000, 11000, 12000, 13000, 14000, 15000, 20000, 30000, or 40000 cores. The multiplicity of cores may include cores of any number between the afore-mentioned numbers (e.g., from about 2 to about 40000, from about 2 to about 400, from about 400 to about 4000, from about 2000 to about 4000, from about 4000 to about 10000, from about 4000 to about 15000, or from about 15000 to about 40000 cores). In some processors (e.g., FPGA), the cores may be equivalent to multiple digital signal processor (DSP) slices (e.g., slices). The plurality of DSP slices may be equal to any of plurality core values mentioned herein. The processor may comprise low latency in data transfer (e.g., from one core to another). Latency may refer to the time delay between the cause and the effect of a physical change in the processor (e.g., a signal). Latency may refer to the time elapsed from the source (e.g., first core) sending a packet to the destination (e.g., second core) receiving it (also referred as two-point latency). One-point latency may refer to the time elapsed from the source (e.g., first core) sending a packet (e.g., signal) to the destination (e.g., second core) receiving it, and the designation sending a packet back to the source (e.g., the packet making a round trip). The latency may be sufficiently low to allow a high number of floating point operations per second (FLOPS). The number of FLOPS may be at least about 0.1 Tera FLOPS (T-FLOPS), 0.2 T-FLOPS, 0.25 T-FLOPS, 0.5 T-FLOPS, 0.75 T-FLOPS, 1 T-FLOPS, 2 T-FLOPS, 3 T-FLOPS, 5 T-FLOPS, 6 T-FLOPS, 7 T-FLOPS, 8 T-FLOPS, 9 T-FLOPS, or 10 T-FLOPS. The number of flops may be at most about 0.2 T-FLOPS, 0.25 T-FLOPS, 0.5 T-FLOPS, 0.75 T-FLOPS, 1 T-FLOPS, 2 T-FLOPS, 3 T-FLOPS, 5 T-FLOPS, 6 T-FLOPS, 7 T-FLOPS, 8 T-FLOPS, 9 T-FLOPS, 10 T-FLOPS, 20 T-FLOPS, 30 T-FLOPS, 50 T-FLOPS, 100 T-FLOPS, 1 P-FLOPS, 2 P-FLOPS, 3 P-FLOPS, 4 P-FLOPS, 5 P-FLOPS, 10 P-FLOPS, 50 P-FLOPS, 100 P-FLOPS, 1 EXA-FLOP, 2 EXA-FLOPS or 10 EXA-FLOPS. The number of FLOPS may be any value between the afore-mentioned values (e.g., from about 0.1 T-FLOP to about 10 EXA-FLOPS, from about 0.1 T-FLOPS to about 1 T-FLOPS, from about 1 T-FLOPS to about 4 T-FLOPS, from about 4 T-FLOPS to about 10 T-FLOPS, from about 1 T-FLOPS to about 10 T-FLOPS, or from about 10 T-FLOPS to about 30 T-FLOPS, from about 50 T-FLOPS to about 1 EXA-FLOP, or from about 0.1 T-FLOP to about 10 EXA-FLOPS). In some processors (e.g., FPGA), the operations per second may be measured as (e.g., Giga) multiply-accumulate operations per second (e.g., MACs or GMACs). The MACs value can be equal to any of the T-FLOPS values mentioned herein measured as Tera-MACs (T-MACs) instead of T-FLOPS respectively. The FLOPS can be measured according to a benchmark. The benchmark may be a HPC Challenge Benchmark. The benchmark may comprise mathematical operations (e.g., equation calculation such as linear equations), graphical operations (e.g., rendering), or encryption/decryption benchmark. The benchmark may comprise a High Performance UNPACK, matrix multiplication (e.g., DGEMM), sustained memory bandwidth to/from memory (e.g., STREAM), array transposing rate measurement (e.g., PTRANS), Random-access, rate of Fast Fourier Transform (e.g., on a large one-dimensional vector using the generalized Cooley-Tukey algorithm), or Communication Bandwidth and Latency (e.g., MPI-centric performance measurements based on the effective bandwidth/latency benchmark). UNPACK may refer to a software library for performing numerical linear algebra on a digital computer. DGEMM may refer to double precision general matrix multiplication. STREAM benchmark may refer to a synthetic benchmark designed to measure sustainable memory bandwidth (in MB/s) and a corresponding computation rate for four simple vector kernels (Copy, Scale, Add and Triad). PTRANS benchmark may refer to a rate measurement at which the system can transpose a large array (global). MPI refers to Message Passing Interface.

In some instances, the computer system includes hyper-threading technology. The computer system may include a chip processor with integrated transform, lighting, triangle setup, triangle clipping, rendering engine, or any combination thereof. The rendering engine may be capable of processing at least about 10 million polygons per second. The rendering engines may be capable of processing at least about 10 million calculations per second. As an example, the GPU may include a GPU by Nvidia, ATI Technologies, S3 Graphics, Advanced Micro Devices (AMD), or Matrox. The processing unit may be able to process algorithms comprising a matrix or a vector. The core may comprise a complex instruction set computing core (CISC), or reduced instruction set computing (RISC).

In some instances, the computer system includes an electronic chip that is reprogrammable (e.g., field programmable gate array (FPGA)). For example, the FPGA may comprise Tabula, Altera, or Xilinx FPGA. The electronic chips may comprise one or more programmable logic blocks (e.g., an array). The logic blocks may compute combinational functions, logic gates, or any combination thereof. The computer system may include custom hardware. The custom hardware may comprise an algorithm.

In some instances, the computer system includes configurable computing, partially reconfigurable computing, reconfigurable computing, or any combination thereof. The computer system may include a FPGA. The computer system may include an integrated circuit that performs the algorithm. For example, the reconfigurable computing system may comprise FPGA, CPU, GPU, or multi-core microprocessors. The reconfigurable computing system may comprise a High-Performance Reconfigurable Computing architecture (HPRC). The partially reconfigurable computing may include module-based partial reconfiguration, or difference-based partial reconfiguration. The FPGA may comprise configurable FPGA logic, and/or fixed-function hardware comprising multipliers, memories, microprocessor cores, first in-first out (FIFO) and/or error correcting code (ECC) logic, digital signal processing (DSP) blocks, peripheral Component interconnect express (PCI Express) controllers, ethernet media access control (MAC) blocks, or high-speed serial transceivers. DSP blocks can be DSP slices.

In some examples, the computing system includes an integrated circuit. The computing system may include an integrated circuit that performs the algorithm (e.g., control algorithm). The physical unit (e.g., the cache coherency circuitry within) may have a clock time of at least about 0.1 Gigabits per second (Gbit/s), 0.5 Gbit/s, 1 Gbit/s, 2 Gbit/s, 5 Gbit/s, 6 Gbit/s, 7 Gbit/s, 8 Gbit/s, 9 Gbit/s, 10 Gbit/s, or 50 Gbit/s. The physical unit may have a clock time of any value between the afore-mentioned values (e.g., from about 0.1 Gbit/s to about 50 Gbit/s, or from about 5 Gbit/s to about 10 Gbit/s). The physical unit may produce the algorithm output in at most about 0.1 microsecond (µs), 1 µs, 10 µs, 100 µs, or 1 millisecond (ms). The physical unit may produce the algorithm output in any time between the above mentioned times (e.g., from about 0.1 µs, to about 1 ms, from about 0.1 µs, to about 100 µs, or from about 0.1 µs to about 10 µs).

In some instances, the controller uses calculations, real time measurements, or any combination thereof to regulate the energy beam(s). The sensor (e.g., temperature and/or positional sensor) may provide a signal (e.g., input for the controller and/or processor) at a rate of at least about 0.1 KHz, 1 KHz, 10 KHz, 100 KHz, 1000 KHz, or 10000 KHz). The sensor may provide a signal at a rate between any of the above-mentioned rates (e.g., from about 0.1 KHz to about 10000 KHz, from about 0.1 KHz to about 1000 KHz, or from about 1000 KHz to about 10000 KHz). The memory bandwidth of the processing unit may be at least about 1 gigabytes per second (Gbytes/s), 10 Gbytes/s, 100 Gbytes/s, 200 Gbytes/s, 300 Gbytes/s, 400 Gbytes/s, 500 Gbytes/s, 600 Gbytes/s, 700 Gbytes/s, 800 Gbytes/s, 900 Gbytes/s, or 1000 Gbytes/s. The memory bandwidth of the processing unit may be at most about 1 gigabyte per second (Gbytes/s), 10 Gbytes/s, 100 Gbytes/s, 200 Gbytes/s, 300 Gbytes/s, 400 Gbytes/s, 500 Gbytes/s, 600 Gbytes/s, 700 Gbytes/s, 800 Gbytes/s, 900 Gbytes/s, or 1000 Gbytes/s. The memory bandwidth of the processing unit may have any value between the afore-mentioned values (e.g., from about 1 Gbytes/s to about 1000 Gbytes/s, from about 100 Gbytes/s to about 500 Gbytes/s, from about 500 Gbytes/s to about 1000 Gbytes/s, or from about 200 Gbytes/s to about 400 Gbytes/s). The sensor measurements may be real-time measurements. The real time measurements may be conducted during the 3D printing process. The real-time measurements may be in situ measurements in the 3D printing system and/or apparatus. the real time measurements may be during the formation of the 3D object. In some instances, the processing unit may use the signal obtained from the at least one sensor to provide a processing unit output, which output is provided by the processing system at a speed of at most about 100 min, 50 min, 25 min, 15 min, 10 min, 5 min, 1 min, 0.5 min (i.e., 30 sec), 15 sec, 10 sec, 5 sec, 1 sec, 0.5 sec, 0.25 sec, 0.2 sec, 0.1 sec, 80 milliseconds (msec), 50 msec, 10 msec, 5 msec, 1 msec, 80 microseconds (µsec), 50 µsec, 20 µsec, 10 µsec, 5 µsec, or 1 µsec. In some instances, the processing unit may use the signal obtained from the at least one sensor to provide a processing unit output, which output is provided at a speed of any value between the afore-mentioned values (e.g., from about 100 min to about 1 µsec, from about 100 min to about 10 min, from about 10 min to about 1 min, from about 5 min to about 0.5 min, from about 30 sec to about 0.1 sec, from about 0.1 sec to about 1 msec, from about 80 msec to about 10 µsec, from about 50 µsec to about 1 µsec, from about 20 µsec to about 1 µsec, or from about 10 µsec to about 1 µsec).

In some embodiments, the processing unit comprises an output. The processing unit output may comprise an evaluation of the temperature at a location, position at a location (e.g., vertical and/or horizontal), or a map of locations. The location may be on the target surface. The map may comprise a topological or temperature map. The temperature sensor may comprise a temperature imaging device (e.g., IR imaging device).

In some embodiments, the processing unit receives a signal from a sensor. The processing unit may use the signal obtained from the at least one sensor in an algorithm that is used in controlling the energy beam. The algorithm may comprise the path of the energy beam. In some instances, the algorithm may be used to alter the path of the energy beam on the target surface. The path may deviate from a cross section of a model corresponding to the desired 3D object. The processing unit may use the output in an algorithm that is used in determining the manner in which a model of the desired 3D object may be sliced. The processing unit may use the signal obtained from the at least one sensor in an algorithm that is used to configure one or more parameters and/or apparatuses relating to the 3D printing process. The parameters may comprise a characteristic of the energy beam. The parameters may comprise movement of the platform and/or material bed. The parameters may comprise relative movement of the energy beam and the material bed. In some instances, the energy beam, the platform (e.g., material bed disposed on the platform), or both may translate. Alternatively or additionally, the controller may use historical data for the control. Alternatively or additionally, the processing unit may use historical data in its one or more algorithms. The parameters may comprise the height of the layer of powder material disposed in the enclosure and/or the gap by which the cooling element (e.g., heat sink) is separated from the target surface. The target surface may be the exposed layer of the material bed.

Aspects of the systems, apparatuses, and/or methods provided herein, such as the computer system, can be embodied in programming (e.g., using a software). Various aspects of the technology may be thought of as "product," "object," or "articles of manufacture" typically in the form of machine (or processor) executable code and/or associated data that is carried on or embodied in a type of machine-readable medium. Machine-executable code can be stored on an electronic storage unit, such memory (e.g., read-only memory, random-access memory, flash memory) or a hard disk. The storage may comprise non-volatile storage media. "Storage" type media can include any or all of the tangible memory of the computers, processors or the like, or associated modules thereof, such as various semiconductor memories, tape drives, disk drives, external drives, and the like, which may provide non-transitory storage at any time for the software programming.

In some examples, the computer system comprises a memory. The memory may comprise a random-access memory (RAM), dynamic random access memory (DRAM), static random access memory (SRAM), synchronous dynamic random access memory (SDRAM), ferroelectric random access memory (FRAM), read only memory (ROM), programmable read only memory (PROM), erasable programmable read only memory (EPROM), electrically erasable programmable read only memory (EEPROM), a flash memory, or any combination thereof. The flash memory may comprise a negative-AND (NAND) or NOR logic gates. A NAND gate (negative-AND) may be a logic gate which produces an output which is false only if all its inputs are true. The output of the NAND gate may be complement to that of the AND gate. The storage may include a hard disk (e.g., a magnetic disk, an optical disk, a magneto-optic disk, a solid-state disk, etc.), a compact disc (CD), a digital versatile disc (DVD), a floppy disk, a cartridge, a magnetic tape, and/or another type of computer-readable medium, along with a corresponding drive.

All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

Hence, a machine-readable medium, such as computer-executable code, may take many forms, including but not limited to, a tangible storage medium, a carrier wave medium, or physical transmission medium. Non-volatile storage media include, for example, optical or magnetic disks, such as any of the storage devices in any computer(s) or the like, such as may be used to implement the databases. Volatile storage media can include dynamic memory, such as main memory of such a computer platform. Tangible transmission media can include coaxial cables, wire (e.g., copper wire), and/or fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, any other medium from which a computer may read programming code and/or data, or any combination thereof. The memory and/or storage may comprise a storing device external to and/or removable from device, such as a Universal Serial Bus (USB) memory stick, or/and a hard disk. Many of these forms of computer readable media may be involved in carrying one or more sequences of one or more instructions to a processor for execution.

In some instances, the computer system comprises an electronic display. The computer system can include or be in communication with an electronic display that comprises a user interface (UI) for providing, for example, a model design or graphical representation of a 3D object to be printed. Examples of UI's include, without limitation, a graphical user interface (GUI) and web-based user interface. The computer system can monitor and/or control various aspects of the 3D printing system. The control may be manual and/or programmed. The control may rely on feedback mechanisms (e.g., from the one or more sensors). The control may rely on historical data. The feedback mechanism may be pre-programmed. The feedback mechanisms may rely on input from sensors (described herein) that are connected to the control unit (i.e., control system or control mechanism e.g., computer) and/or processing unit. The computer system may store historical data concerning various aspects of the operation of the 3D printing system. The historical data may be retrieved at predetermined times and/or at a whim. The historical data may be accessed by an operator and/or by a user. The historical, sensor, and/or operative data may be provided in an output unit such as a display unit. The output unit (e.g., monitor) may output various parameters of the 3D printing system (as described herein) in real time or in a delayed time. The output unit may output the current 3D printed object, the ordered 3D printed object, or both. The output unit may output the printing progress of the 3D printed object. The output unit may output at least one of the total time, time remaining, and time expanded on printing the 3D object. The output unit may output (e.g., display, voice, and/or print) the status of sensors, their reading, and/or time for their calibration or maintenance. The output unit may output the type of material(s) used and various characteristics of the material(s) such as temperature and flowability of the pre-transformed material. The output unit may output the amount of oxygen, water, and pressure in the printing chamber (i.e., the chamber where the 3D object is being printed). The computer may generate a report comprising various parameters of the 3D printing system, method, and or objects at predetermined time(s), on a request (e.g., from an operator), and/or at a whim. The output unit may comprise a screen, printer, or speaker. The control system may provide a report. The report may comprise any items recited as optionally output by the output unit.

In some instances, the system and/or apparatus described herein (e.g., controller) and/or any of their components comprise an output and/or an input device. The input device may comprise a keyboard, touch pad, or microphone. The output device may be a sensory output device. The output device may include a visual, tactile, or audio device. The audio device may include a loudspeaker. The visual output device may include a screen and/or a printed hard copy (e.g., paper). The output device may include a printer. The input device may include a camera, a microphone, a keyboard, or a touch screen.

In some instances, the computer system includes a user interface. The computer system can include, or be in communication with, an electronic display unit that comprises a user interface (UI) for providing, for example, a model design or graphical representation of an object to be printed. Examples of UI's include a graphical user interface (GUI) and web-based user interface. The historical and/or operative data may be displayed on a display unit. The computer system may store historical data concerning various aspects of the operation of the cleaning system. The historical data may be retrieved at predetermined times and/or at a whim. The historical data may be accessed by an operator and/or by a user. The display unit (e.g., monitor) may display various parameters of the printing system (as described herein) in real time or in a delayed time. The display unit may display the desired printed 3D object (e.g., according to a model), the printed 3D object, real time display of the 3D object as it is being printed, or any combination thereof. The display unit may display the cleaning progress of the object, or various aspects thereof. The display unit may display at least one of the total time, time remaining, and time expanded on the cleaned object during the cleaning process. The display unit may display the status of sensors, their reading, and/or time for their calibration or maintenance. The display unit may display the type or types of material used and various characteristics of the material or materials such as temperature and flowability of the pre-transformed material. The display unit may display the amount of a certain gas in the chamber. The gas may comprise an oxidizing gas (e.g., oxygen), hydrogen, water vapor, or any of the gasses mentioned herein. The gas may comprise a reactive agent. The display unit may display the pressure in the chamber. The computer may generate a report comprising various parameters of the methods, objects, apparatuses, or systems described herein. The report may be generated at predetermined time(s), on a request (e.g., from an operator) or at a whim.

Methods, apparatuses, and/or systems of the present disclosure can be implemented by way of one or more algorithms. An algorithm can be implemented by way of software upon execution by one or more computer processors. For example, the processor can be programmed to calculate the path of the energy beam and/or the power per unit area emitted by the energy source (e.g., that should be provided to the material bed in order to achieve the desired result). Other control and/or algorithm examples may be found in provisional patent application No. 62/325,402, which is incorporated herein by reference in its entirety.

In some embodiments, the 3D printer comprises and/or communicates with a multiplicity of processors. The processors may form a network architecture. The 3D printer may comprise at least one processor (referred herein as the "3D printer processor"). The 3D printer may comprise a plurality of processors. At least two of the plurality of the 3D printer processors may interact with each other. At times, at least two of the plurality of the 3D printer processors may not interact with each other.

In some embodiments, a 3D printer processor interacts with at least one processor that acts as a 3D printer interface (also referred to herein as "machine interface processor"). The processor (e.g., machine interface processor) may be stationary or mobile. The processor may be a remote computer systems. The machine interface one or more processors may be connected to at least one 3D printer processor. The connection may be through a wire (e.g., cable) or be wireless (e.g., via Bluetooth technology). The machine interface may be hardwired to the 3D printer. The machine interface may directly connect to the 3D printer (e.g., to the 3D printer processor). The machine interface may indirectly connect to the 3D printer (e.g., through a server, or through wireless communication). The cable may comprise coaxial cable, shielded twisted cable pair, unshielded twisted cable pair, structured cable (e.g., used in structured cabling), or fiber-optic cable.

In some embodiments, the machine interface processor directs 3D print job production, 3D printer management, 3D printer monitoring, or any combination thereof. The machine interface processor may not be able to influence (e.g., direct, or be involved in) pre-print or 3D printing process development. The machine management may comprise controlling the 3D printer controller (e.g., directly or indirectly). The printer controller may direct start (e.g., initiation) of a 3D printing process, stopping a 3D printing process, maintenance of the 3D printer, clearing alarms (e.g., concerning safety features of the 3D printer).

In some embodiments, the machine interface processor allows monitoring of the 3D printing process (e.g., accessible remotely or locally). The machine interface processor may allow viewing a log of the 3D printing and status of the 3D printer at a certain time (e.g., 3D printer snapshot). The machine interface processor may allow to monitor one or more 3D printing parameters. The one or more printing parameters monitored by the machine interface processor can comprise 3D printer status (e.g., 3D printer is idle, preparing to 3D print, 3D printing, maintenance, fault, or offline), active 3D printing (e.g., including a build module number), status and/or position of build module(s), status of build module and processing chamber engagement, type and status of pre-transformed material used in the 3D printing (e.g., amount of pre-transformed material remaining in the reservoir), status of a filter, atmosphere status (e.g., pressure, gas level(s)), ventilator status, layer dispensing mechanism status (e.g., position, speed, rate of deposition, level of exposed layer of the material bed), status of the optical system (e.g., optical window, mirror), status of scanner, alarm, boot log, status change, safety events, motion control commands (e.g., of the energy beam, or of the layer dispensing mechanism), or printed 3D object status (e.g., what layer number is being printed), In some embodiments, the machine interface processor allows monitoring the 3D print job management. The 3D print job management may comprise status of each build module (e.g., atmosphere condition, position in the enclosure, position in a queue to go in the enclosure, position in a queue to engage with the processing chamber, position in queue for further processing, power levels of the energy beam, type of pre-transformed material loaded, 3D printing operation diagnostics, status of a filter. The machine interface processor (e.g., output device thereof) may allow viewing and/or editing any of the job management and/or one or more printing parameters. The machine interface processor may show the permission level given to the user (e.g., view, or edit). The machine interface processor may allow viewing and/or assigning a certain 3D object to a particular build module, prioritize 3D objects to be printed, pause 3D objects during 3D printing, delete 3D objects to be printed, select a certain 3D printer for a particular 3D printing job, insert and/or edit considerations for restarting a 3D printing job that was removed from 3D printer. The machine interface processor may allow initiating, pausing, and/or stopping a 3D printing job. The machine interface processor may output message notification (e.g., alarm), log (e.g., other than Excursion log or other default log), or any combination thereof.

In some embodiments, the 3D printer interacts with at least one server (e.g., print server). The 3D print server may be separate or interrelated in the 3D printer. One or more users may interact with the one or more 3D printing processors through one or more user processors (e.g., respectively). The interaction may be in parallel and/or sequentially. The users may be clients. The users may belong to entities that desire a 3D object to be printed, or entities who prepare the 3D object printing instructions. The one or more users may interact with the 3D printer (e.g., through the one or more processors of the 3D printer) directly and/or indirectly. Indirect interaction may be through the server. One or more users may be able to monitor one or more aspects of the 3D printing process. One or more users can monitor aspects of the 3D printing process through at least one connection (e.g., network connection). For example, one or more users can monitor aspects of the printing process through direct or indirect connection. Direct connection may be using a local area network (LAN), and/or a wide area network (WAN). The network may interconnect computers within a limited area (e.g., a building, campus, neighborhood). The limited area network may comprise Ethernet or Wi-Fi. The network may have its network equipment and interconnects locally managed. The network may cover a larger geographic distance than the limited area. The network may use telecommunication circuits and/or internet links. The network may comprise Internet Area Network (IAN), and/or the public switched telephone network (PSTN). The communication may comprise web communication. The aspect of the 3D printing process may comprise a 3D printing parameter, machine status, or sensor status. The 3D printing parameter may comprise hatch strategy, energy beam power, energy beam speed, energy beam focus, thickness of a layer (e.g., of hardened material or of pre-transformed material).

In some embodiments, a user develops at least one 3D printing instruction and directs the 3D printer (e.g., through communication with the 3D printer processor) to print in a desired manner according to the developed at least one 3D printing instruction. A user may or may not be able to control (e.g., locally or remotely) the 3D printer controller. For example, a client may not be able to control the 3D printing controller (e.g., maintenance of the 3D printer).

In some embodiments, the user (e.g., other than a client) processor may use real-time and/or historical 3D printing data. The 3D printing data may comprise metrology data, or temperature data. The user processor may comprise quality control. The quality control may use a statistical method (e.g., statistical process control (SPC)). The user processor may log excursion log, report when a signal deviates from the nominal level, or any combination thereof. The user processor may generate a configurable response. The configurable response may comprise a print/pause/stop command (e.g., automatically) to the 3D printer (e.g., to the 3D printing processor). The configurable response may be based on a user defined parameter, threshold, or any combination thereof. The configurable response may result in a user defined action. The user processor may control the 3D printing process and ensure that it operates at its full potential. For example, at its full potential, the 3D printing process may make a maximum number of 3D object with a minimum of waste and/or 3D printer down time. The SPC may comprise a control chart, design of experiments, and/or focus on continuous improvement.

In some embodiments, the fundamental length scale (e.g., the diameter, spherical equivalent diameter, diameter of a bounding circle, or largest of height, width, depth, and length; abbreviated herein as "FLS") of the printed 3D object or a portion thereof can be at least about 50 micrometers ($\mu m$), 80 $\mu m$, 100 $\mu m$, 120 $\mu m$, 150 $\mu m$, 170 $\mu m$, 200 $\mu m$, 230 $\mu m$, 250 $\mu m$, 270 $\mu m$, 300 $\mu m$, 400 $\mu m$, 500 $\mu m$, 600 $\mu m$, 700 $\mu m$, 800 $\mu m$, 1 mm, 1.5 mm, 2 mm, 3 mm, 5 mm, 1 cm, 1.5 cm, 2 cm, 10 cm, 20 cm, 30 cm, 40 cm, 50 cm, 60 cm, 70 cm, 80 cm, 90 cm, 1 m, 2 m, 3 m, 4 m, 5 m, 10 m, 50 m, 80 m, or 100 m. The FLS of the printed 3D object or a portion thereof can be at most about 150 $\mu m$, 170 $\mu m$, 200 $\mu m$, 230 $\mu m$, 250 $\mu m$, 270 $\mu m$, 300 $\mu m$, 400 $\mu m$, 500 $\mu m$, 600 $\mu m$, 700 $\mu m$, 800 $\mu m$, 1 mm, 1.5 mm, 2 mm, 3 mm, 5 mm, 1 cm, 1.5 cm, 2 cm, 10 cm, 20 cm, 30 cm, 40 cm, 50 cm, 60 cm, 70 cm, 80 cm, 90 cm, 1 m, 2 m, 3 m, 4 m, 5 m, 10 m, 50 m, 80 m, 100 m, 500 m, or 1000 m. The FLS of the printed 3D object or a portion thereof can any value between the afore-mentioned values (e.g., from about 50 $\mu m$ to about 1000 m, from about 500 $\mu m$ to about 100 m, from about 50 $\mu m$ to about 50 cm, or from about 50 cm to about 1000 m). In some cases, the FLS of the printed 3D object or a portion thereof may be in between any of the afore-mentioned FLS values. The portion of the 3D object may be a heated portion or disposed portion (e.g., tile).

In some embodiments, the layer of pre-transformed material (e.g., powder) is of a predetermined height (thickness). The layer of pre-transformed material can comprise the material prior to its transformation in the 3D printing process. The layer of pre-transformed material may have an upper surface that is substantially flat, leveled, or smooth. In some instances, the layer of pre-transformed material may have an upper surface that is not flat, leveled, or smooth. The layer of pre-transformed material may have an upper surface that is corrugated or uneven. The layer of pre-transformed material may have an average or mean (e.g., pre-determined) height. The height of the layer of pre-transformed material (e.g., powder) may be at least about 5 micrometers (µm), 10 µm, 20 µm, 30 µm, 40 µm, 50 µm, 60 µm, 70 µm, 80 µm, 90 µm, 100 µm, 200 µm, 300 µm, 400 µm, 500 µm, 600 µm, 700 µm, 800 µm, 900 µm, 1 mm, 2 mm, 3 mm, 4 mm, 5 mm, 6 mm, 7 mm, 8 mm, 9 mm, 10 mm, 20 mm, 30 mm, 40 mm, 50 mm, 60 mm, 70 mm, 80 mm, 90 mm, 100 mm, 200 mm, 300 mm, 400 mm, 500 mm, 600 mm, 700 mm, 800 mm, 900 mm, or 1000 mm. The height of the layer of pre-transformed material may be at most about 5 micrometers (µm), 10 µm, 20 µm, 30 µm, 40 µm, 50 µm, 60 µm, 70 µm, 80 µm, 90 µm, 100 µm, 200 µm, 300 µm, 400 µm, 500 µm, 600 µm, 700 µm, 800 µm, 900 µm, 1 mm, 2 mm, 3 mm, 4 mm, 5 mm, 6 mm, 7 mm, 8 mm, 9 mm, 10 mm, 20 mm, 30 mm, 40 mm, 50 mm, 60 mm, 70 mm, 80 mm, 90 mm, 100 mm, 200 mm, 300 mm, 400 mm, 500 mm, 600 mm, 700 mm, 800 mm, 900 mm, or 1000 mm. The height of the layer of pre-transformed material may be any number between the afore-mentioned heights (e.g., from about 5 µm to about 1000 mm, from about 5 µm to about 1 mm, from about 25 µm to about 1 mm, or from about 1 mm to about 1000 mm). The "height" of the layer of material (e.g., powder) may at times be referred to as the "thickness" of the layer of material. In some instances, the layer of hardened material may be a sheet of metal. The layer of hardened material may be fabricated using a 3D manufacturing methodology. Occasionally, the first layer of hardened material may be thicker than a subsequent layer of hardened material. The first layer of hardened material may be at least about 1.1 times, 1.2 times, 1.4 times, 1.6 times, 1.8 times, 2 times, 4 times, 6 times, 8 times, 10 times, 20 times, 30 times, 50 times, 100 times, 500 times, 1000 times, or thicker (higher) than the average (or mean) thickness of a subsequent layer of hardened material, the average thickens of an average subsequent layer of hardened material, or the average thickness of any of the subsequent layers of hardened material. The very first layer of hardened material formed in the material bed by 3D printing may be referred herein as the "bottom skin" layer.

In some instances, one or more intervening layers separate adjacent components from one another. For example, the one or more intervening layers can have a thickness of at most about 10 micrometers ("microns"), 1 micron, 500 nanometers ("nm"), 100 nm, 50 nm, 10 nm, or 1 nm. For example, the one or more intervening layers can have a thickness of at least about 10 micrometers ("microns"), 1 micron, 500 nanometers ("nm"), 100 nm, 50 nm, 10 nm, or 1 nm. In an example, a first layer is adjacent to a second layer when the first layer is in direct contact with the second layer. In another example, a first layer is adjacent to a second layer when the first layer is separated from the second layer by a third layer. In some instances, adjacent to may be 'above' or 'below.' Below can be in the direction of the gravitational force or towards the platform. Above can be in the direction opposite to the gravitational force or away from the platform.

In some embodiments, a projected energy beam heats a portion of the material bed. The projected energy beam may irradiate a portion of the material bed. The heat or irradiation of the portion of the material bed may generate debris (e.g., metal vapor, molten metal, plasma, etc.). The debris may be disposed in the enclosure (e.g., processing chamber). For example, the debris may be disposed in the atmosphere of the enclosure). For example, the debris may be disposed on one or more components within the enclosure. For example, the debris may be disposed on one or more internal surfaces (e.g., walls or optical window) of the enclosure. For example, the debris may float within the enclosure atmosphere. The debris (e.g., accumulation thereof) may cause damage to various components of the 3D printing system (e.g., the optical window). The enclosure may comprise a gas flow (e.g., mechanism) that allows displacement (e.g., removal) of the debris from a position in the enclosure atmosphere (e.g., from the entire enclosure atmosphere).

In some embodiments, the gas flow mechanism (also referred to herein as "gas flow director," "gas flow manager," "gas flow management system," or "gas flow management arrangement") comprises structures that at least partially dictate the flowing of gas across the (e.g., entire) enclosure and/or a portion of the enclosure. The gas flow mechanism can be used to at least partially control a characteristic of gas flow adjacent (e.g., over) the target surface and/or the platform. Over the target surface may comprise at most 2 cm, 5 cm, 10 cm, or 20 cm above the target surface (e.g., the exposed surface of the material bed). Target surface may refer to a surface that is a radiation target for the energy beam. The gas flow mechanism can include a gas inlet portion that at least partially controls the flow of gas entering into the enclosure. The gas flow mechanism can include a gas outlet portion that at least partially controls the flow of gas exiting the enclosure. The gas flow mechanism can be used to at least partially control a characteristic of gas flow adjacent to or within a recessed portion of the enclosure (e.g., to purge the recessed portion). The gas flow director can include the gas inlet portion, the gas outlet portion, features for purging a recessed portion of the enclosure, or any suitable combination thereof. The recessed portion may be at the ceiling of the enclosure. The recessed portion may be disposed at a wall of the enclosure opposing to the target surface. The gas may comprise an inert gas (e.g., nitrogen and/or argon). The gas may flow in bulk. The gas may flow in one or more streams. The gas may comprise a non-reacting (e.g., inert) gas. The gas may comprise an reactive agent depleted gas and/or water depleted gas. The flow of the gas may comprise flowing across at least a portion of the height (e.g., Y axis. See FIG. 8) of the enclosure. For example, the flow of the gas may comprise flowing across the entire height of the enclosure. The flow of the gas may comprise flowing across at least a portion of the depth (e.g., Z axis. See FIG. 8) of the enclosure. For example, the flow of the gas may comprise flowing across the entire depth of the enclosure. The flow of the gas may comprise flowing across at least a portion of the width (e.g., X axis. See FIG. 8) of the enclosure (e.g., also referred herein as the length of the enclosure). For example, the flow of the gas may comprise flowing across the entire width of the enclosure. The flow of gas may comprise flowing onto an internal surface of the optical window (e.g., facing the exposed surface of the material bed, e.g., FIG. 15, 1543). The area adjacent to the optical window may comprise one or more slots (e.g., a slot per optical window, or a single slot for all optical windows, or dispersed multiple slots across one or more optical windows), one or more channels, or a combination thereof. The flow of gas may comprise flowing through the one or more slots, channels, or a combination thereof, on to the internal surface of the optical window. The slot and/or channel may facilitate directing the flow of gas onto the internal surface of the optical window (e.g., 1543). For example, the gas flow may be optionally evacuated from an area adjacent (e.g., directly adjacent) to the one or more optical windows (e.g., from the 1541 side to the 1542 side of the optical window 1515). The flow of gas may reduce the amount of (e.g., prevent) powder, soot, and/or debris from adhering to the internal surface (e.g., 1543) of the one or more optical windows. The flow of gas may reduce the amount of (e.g., prevent) powder, soot, and/or debris from obstructing an optical path of the energy beam (e.g., 1501) that travels from the optical window to the exposed surface of the material bed (e.g., 1504). The flow of gas may be (e.g., substantially) lateral. The flow of gas may be (e.g., substantially) horizontal. The gas may flow along and/or towards the one or more optical windows. The gas may flow in a plurality of gas streams (e.g., FIG. 16, 1635). The gas streams may be spread across at least a portion of the (e.g., entire) height and/or depth of the enclosure. The gas streams may be evenly spread. The gas streams may not be evenly spread (e.g., across at least a portion of the enclosure height and/or depth). The gas streams may flow across at least a portion of the enclosure height and/or depth Across the enclosure, the gas streams may flow in the same direction. The same direction may comprise from the gas-inlet to the gas-outlet. The same direction may comprise from one edge of the enclosure to the opposite end). The same direction may comprise from the gas-inlet to the gas-outlet. The gas flow may flow laterally across at least a portion of the (e.g., height and/or depth of the) enclosure. The gas flow may flow laminarly across at least a portion of the (e.g., height and/or depth of the) enclosure. The at least a portion of the enclosure may comprise the processing cone (e.g., FIG. 15, 1530). In one embodiment, the gas streams may not flow in the same direction. In one embodiment, one or more gas streams may flow in the same direction and one or more gas streams may flow in the opposite direction. FIG. 16 shows an example simulation of gas streams at different velocities across the width and height area of the gas flow mechanism. The gas flow (e.g., in the at least one stream) may comprise a laminar flow. The gas flow may comprise flow in a constant velocity during at least a portion of the 3D printing. For example, the gas flow may comprise flow in a constant velocity during the operation of the energy beam (e.g., during the transformation of at least a portion of the material bed). Laminar flow may comprise fluid flow (e.g., gas flow) in (e.g., substantially) parallel layers. The gas flow may comprise flow in a varied velocity during at least a portion of the 3D printing. For example, the gas flow may comprise flow in a varied velocity during the operation of the energy beam (e.g., during the transformation of at least a portion of the material bed). The gas streams may comprise a turbulent flow. Turbulent flow may comprise (e.g., random, and/or irregular) fluctuations in pressure, magnitude, direction and/or flow velocity of the gas. Turbulent flow may comprise a chaotic flow. In some embodiments, the chaotic flow comprises circular, swirling, agitated, rough, irregular, disordered, disorganized, cyclonic, spiraling, vortex, or agitated movement of the gas. In some embodiments, the mixing comprises laminar, vertical, horizontal, or angular movement. The gas flow within at least two of the gas streams within the enclosure may be of a different velocity and/or density. The gas flow within at least two of the gas streams within the enclosure may be of the same magnitude. The gas flow within at least two of the gas streams within the enclosure may be of variable magnitude. The gas flow (e.g., of at least one gas stream) within the enclosure may be free of standing vortices. A standing vortex may be described as a vortex in which the axis of fluid rotation remains in (e.g., substantially) the same location, e.g., not transmitted with the rest of the flow. Turbulent flow of gas within the enclosure may generate a vortex that transmits with the rest of the flow, thus generating a gas flow without standing vortices. The gas flow mechanism may not comprise (i) recirculation of gas, (ii) gas flow stagnation, or (iii) static vortices, within the enclosure. For example, the gas flow mechanism may not comprise recirculation of gas within the enclosure. The gas flow (e.g., in the enclosure) may be continuous. Continuously may be during the operation of the 3D printer (e.g., before, during and/or after the 3D printing or a portion thereof). The gas stream(s) may be altered (e.g., reduced, or cease to flow) when the energy beam is not operating (e.g., to transform at least a portion of the material bed). Optionally, at least portion of the gas flow may be changed before, during or after dispensing mechanism performs dispensing. The alteration may be in velocity, gas stream trajectory, gas content, pressure, humidity content, oxidizing gas content, gas flow cross section (e.g., at full width half maximum). or any combination thereof. The velocity of the gas (e.g., in the enclosure) can be at least about 0.1 m/s, 0.2 m/s, 0.3 m/s, 0.5 m/s, 0.7 m/s, 0.8 m/s, 1 m/s, 2 m/s, 5 m/s, 10 m/s, 15 m/s, 20 m/s, 30 m/s or 50 m/s. The velocity of gas can be at most about 0.1 m/s, 0.2 m/s, 0.3 m/s, 0.5 m/s, 0.7 m/s, 0.8 m/s, 1 m/s, 2 m/s, 5 m/s, 10 m/s, 15 m/s, 20 m/s, 30 m/s or 50 m/s. The velocity of the gas (e.g., in the enclosure) can be between any of the afore-mentioned values (e.g., from about 0.1 m/s to about 50 m/s, from about 0.1 m/s to about 1 m/s, from about 2 m/s to about 20 m/s, from about 30 m/s to about 50 m/s, or from about 0.7 m/s to about 1 m/s). The velocity of the gas can be during at least a portion of the 3D printing. The velocity of the gas can refer to its flow velocity along any one of its components. The velocity of the gas can have a component along the width of the chamber (X direction, FIG. 8). The velocity of the gas can have a component along the height of the chamber (Y direction, FIG. 8). The velocity of the gas can have a component along the depth of the chamber (Z direction, FIG. 8).

In an example, a layer dispensing mechanism is reversibly parked in an isolatable ancillary chamber when it does not perform a layer dispensing operation. The energy beam may be projected on the material bed when the layer dispensing mechanism resides within the ancillary chamber (e.g., isolated from the processing chamber), and the gas flow may continue during operation of energy beam (i.e. lasing). The gas stream(s) may be altered (e.g., reduced, or cease to flow) when the layer dispensing mechanism performs a dispensing of a layer of material (e.g., and exits the ancillary chamber). The gas stream(s) may continue to flow when the layer dispensing mechanism performs a dispensing of a layer of material. Operation of the energy beam may comprise a dwell time of the energy beam.

Figure 15:
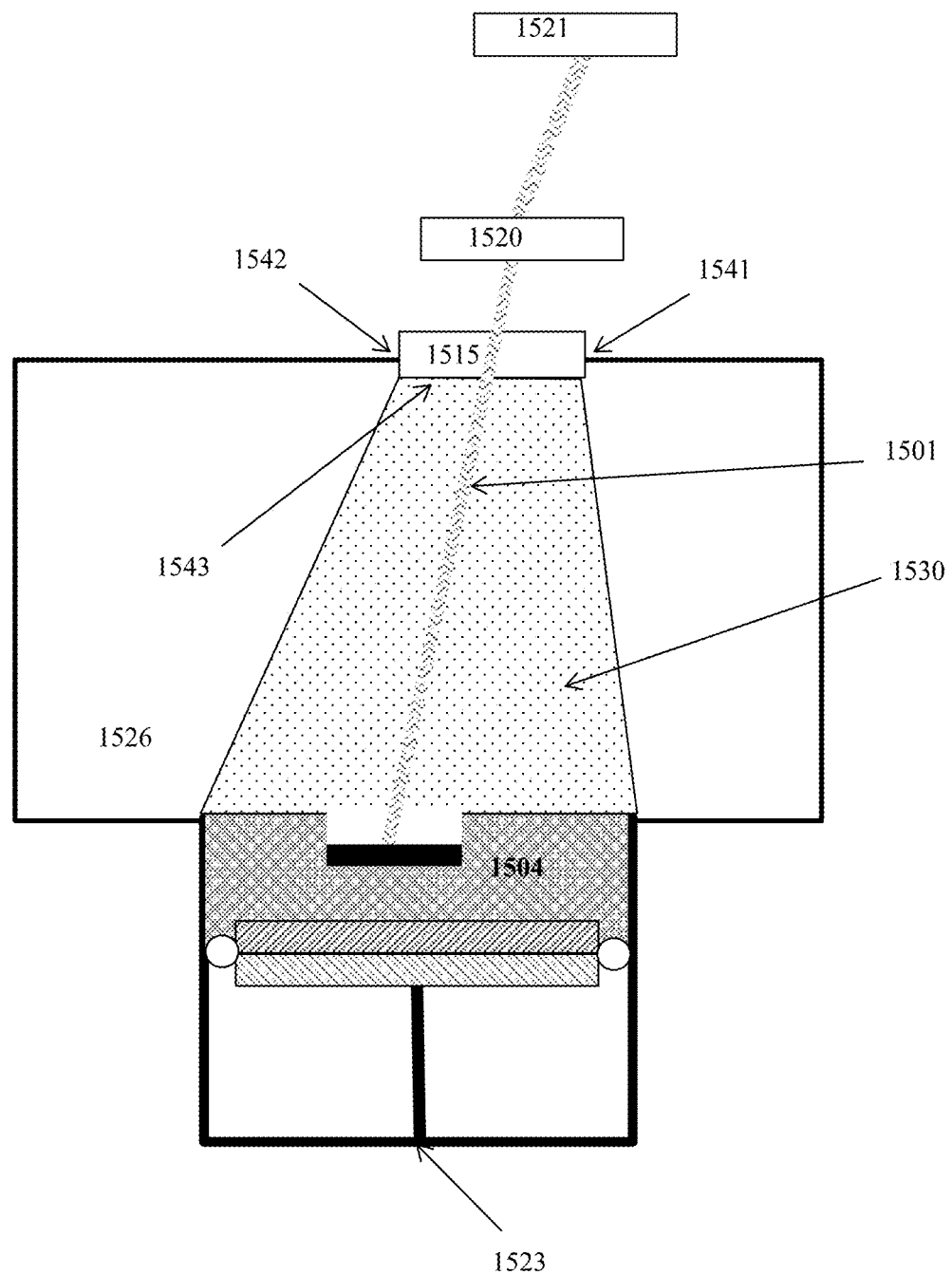
FIG. 15 schematically illustrates various 3D printer components.
Figure 16:
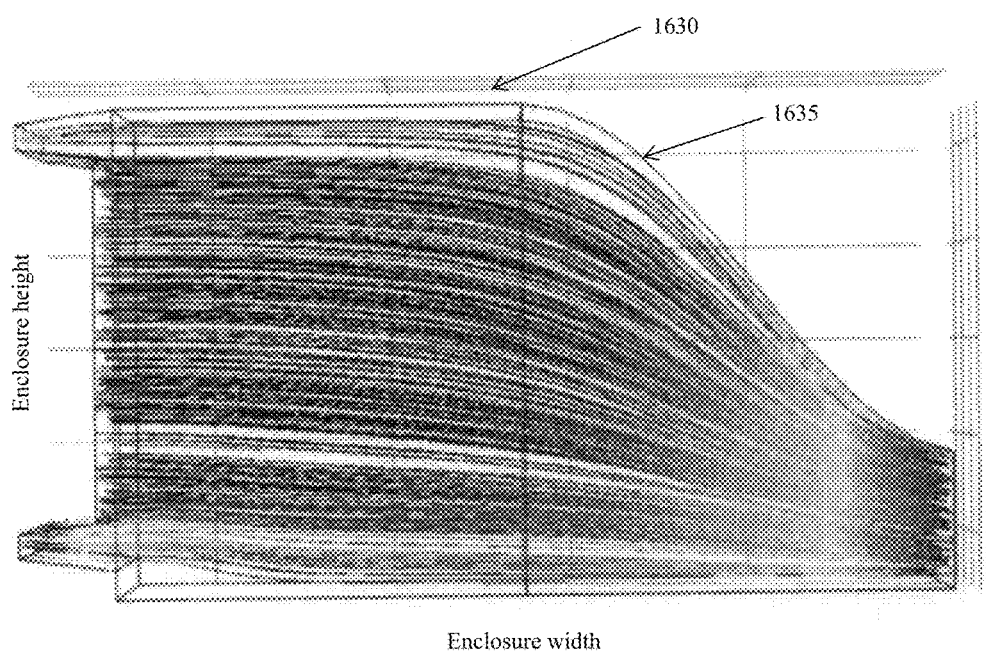
FIG. 16 schematically illustrates an example simulation of gas flow trajectories within across the height and width of an enclosure as part of the 3D printer.

In some instances, the gas flow mechanism comprises laminar a flow at least within the (e.g., atmospheric) area of the processing cone (e.g., above the platform, FIG. 15, 1530). The gas may flow in (e.g., substantial) at least two laminar streams while in the processing cone area. For example, the gas may flow in (e.g., substantially) laminar streams with in the processing cone. Across the enclosure (e.g., FIG. 15, 1526) height and/or depth, the gas streams may flow in the same direction (e.g., from one side of the processing cone to the opposite side of the processing cone). The flow across the depth and/or height of the processing cone may comprise a lateral flow. The gas may flow in a smooth (e.g., and continuous) manner at least within the processing cone area. The gas flow at least in the processing cone (e.g., in the processing chamber) may not comprise (i) recirculation of gas, (ii) gas flow stagnation, or (iii) static vortices, at least within the processing cone area. In the processing chamber, may comprise substantially in the entire processing chamber. Substantially is relative to the intended purpose of the 3D printer. For example, substantially in the entire processing chamber may exclude a volume of the processing chamber corner(s). The gas may flow from one side of the processing chamber to the other side of the processing chamber, which gas flow travels at least through the processing cone, and/or has a flow velocity direction that is always unidirectional (e.g., does not change in direction or becomes stagnant). The gas flow from one side of the processing chamber to the other side of the processing chamber. In some embodiments, the gas flow travels at least through the processing cone, has a flow velocity direction that is always positive (e.g., does not become negative or zero). The magnitude and/or direction of the flow velocity can differ along the depth (i.e., Z direction) or height (i.e., Y direction) of the enclosure. The magnitude of the flow velocity can differ along the width (i.e., X direction) of the enclosure. In some examples, the magnitude of the gas flow velocity along the depth, height and/or width of the enclosure may be (e.g., substantially) constant. In some examples, the direction of the gas flow velocity along the depth, height and/or width of the enclosure may be (e.g., substantially) constant. In some examples, the magnitude of the gas flow velocity along the depth, height and/or width of the enclosure may vary (e.g., linearly, or exponentially). The variation may be a time variation (e.g., during the 3D printing, such as during the operation of the energy beam). The variation may be a special variation (e.g., along the width, depth, and/or height of the enclosure). Along the enclosure comprises along the processing cone.

In some instances, the phrase "at least within the processing cone area of the enclosure" comprises at least within the atmospheric area above the platform (e.g., FIG. 15, 1530) and in the enclosure (e.g., FIG. 15, 1526). At least within the processing cone area of the enclosure may be disposed in the enclosure. In some instances, the enclosure may comprise a suction mechanism comprising a reduced pressure (e.g., vacuum duct). The low-pressure duct(s) may be disposed adjacent to the platform and/or exposed surface of the material bed within the processing cone area. The suction mechanism may at least remove a portion of debris (e.g., particulate material). The suction mechanism may be activated when the energy beam is and/or is not projected towards the material bed. The suction mechanism may be activated before, after, and/or during the 3D printing. The suction mechanism may be activated during at least a portion of the 3D printing. During at least a portion of the 3D printing may comprise during a transformation of a portion of the material bed, during the layer dispensing, or between the transformation and the layer dispensing. The suction mechanism may be activated at a time when the gas streams in the enclosure cease to flow.

In some examples, the gas flow mechanism comprises an inlet portion (e.g., FIG. 8, 840, 842, FIG. 9, 940, FIG. 12, 1235, FIG. 13, 1330), which can also be referred to as an inlet portion, gas inlet portion, gas inlet port, gas inlet portion, or other suitable term. The inlet portion may be connected to a side wall of the enclosure (e.g., FIG. 8, 873). The inlet portion (e.g., FIG. 12, 1235) may comprise one or more inlets (e.g., 1250). The side wall may be an internal side wall (e.g. FIG. 9, 926). The side wall may be a divider forming a processing chamber side wall (e.g., FIG. 12, 1236). The inlet portion may include one or more openings (e.g., FIG. 9, 955, FIG. 12, 1250, 1252, 1255, FIG. 11A, 1145, FIG. 11B, 1155) to facilitate gas flow into the enclosure (e.g., into the inlet portion). In some embodiments, the inlet portion may be separated from the processing chamber by an internal inlet (e.g., separation) wall (e.g., 1236). The aspect ratio of the internal inlet wall (e.g., 926) relative to an inlet opening (e.g., 955) can be at least about 500:1, 250:1, 200:1, 100:1, 50:1, 25:1 or 10:1. The aspect ratio of the internal inlet wall (e.g., 926) relative to an outlet opening (e.g., 955) can be at most about 500:1, 250:1, 200:1, 100:1, 50:1, 25:1 or 10:1. The aspect ratio of the internal inlet wall relative to an inlet opening can be between any of the afore-mentioned values (e.g., from about 500:1 to about 10:1, from about 500:1 to about 100:1, from about 100:1 to about 50:1, or from about 50:1 to about 10:1). In some embodiments, the inlet portion is separated from the processing chamber by a filter (e.g., HEPA filter). The filter may be one of the filters disclosed herein. In some embodiments, the outlet portion (e.g., 1240) may be separated from the processing chamber (e.g., 1226) by an internal outlet (e.g., separation) wall (e.g., 1237). The internal outlet wall and/or internal inlet wall may comprise an opening. The term "opening" may refer to the internal inlet wall opening, internal outlet wall opening, inlet opening, and/or outlet opening. Examples of internal wall openings can be seen in the examples in FIGS. 7A-7B and FIGS. 10A-10D. The openings may be (e.g., reversibly) coupled to at least one side wall of the inlet portion. For example, one or more openings may be coupled to the same side wall. The opening may be gas inlet opening that facilitate gas flow into the enclosure. The opening may be gas outlet opening that facilitate gas flow out of the enclosure. The multiple openings on the wall may be uniformly spaced horizontally, vertically and/or at an angle (e.g., 1250, 1252 and 1255). The multiple openings may not be uniformly spaced. The openings may run across the entire wall of the enclosure (e.g., height and/or depth thereof). For example, the openings may occupy a percentage of the enclosure height and/or depth (e.g., FIG. 10A). The percentage may be at least about 50%, 60%, 70%, 80%, 90%, 95%, 98% or 99% of the enclosure height and/or depth. The openings may run across any number between the afore-mentioned heights and/or depths of the enclosure wall (e.g., from about 50% to about 99%, from about 50% to about 70%, from about 70% to about 90%, or from about 90% to about 99%). The openings may be evenly or non-evenly spaced. For example, a greater concentration of openings may reside closer to the platform and/or exposed surface of the material bed (e.g., FIG. 7A, 751). For example, a lower concentration of openings may reside closer to the ceiling of the enclosure (e.g., FIG. 7A, 752). For example, a greater concentration of passable openings may reside closer to the platform and/or exposed surface of the material bed (e.g., FIG. 7B, 761). For example, a lower concentration of closed openings may reside closer to the ceiling of the enclosure (e.g., FIG. 7B, 762). In some examples, the openings may extend from an exposed surface of the material bed and/or platform, to the optical window. In some examples, the openings may extend from an exposed surface of the material bed and/or platform, to at least 50%, 60%, 70%, 80%, 90%, 95%, 98%, or 99% height of the enclosure. The openings extend from an exposed surface of the material bed and/or platform by any number between the afore-mentioned examples (e.g., from about 50% to about 99%, from about 50% to about 70%, from about 70% to about 90%, or from about 90% to about 99%). The opening may be oval (e.g., FIG. 10D, 1040). For example, the opening may be circular (e.g., FIG. 10A, 1010). The opening may be pipe shaped. A cross section of the opening may be any geometrical shape (e.g., hexagonal, rectangular, square, circular or triangle). A cross section of the openings may be random (e.g., FIG. 10D, 1041). An opening may be a slit (e.g., FIG. 7C, 711). The openings may comprise an array of openings (e.g., FIG. 10A). The openings may comprise a single file of openings (e.g., FIG. 10C, including opening 1030). The cross section of the openings may change its shape before, during, and/or after the 3D printing (or a portion thereof, e.g., during the operation of the energy beam). The cross-sectional shape of the openings can be controlled (e.g., manually and/or by a controller). The cross-sectional shape of the openings may be altered by the controller. The alteration may comprise an electronic, magnetic, temperature, audio, or optical signal. The alteration may be induced electronically, magnetically, by temperature alteration, audibly, optically, or by any combination thereof. The alteration of at least two openings (e.g., within the array of openings) may be collectively (e.g., simultaneously or sequentially) controlled. The alteration of at least two openings (e.g., within the array of openings) may be separately (e.g., individually) controlled. The percentage of void forming the opening may be controlled before, during, and/or after the 3D printing (or a portion thereof, e.g., during the operation of the energy beam). For example, at least an opening may be closed (e.g., a line of openings, a plurality of opening, or the entire array). FIG. 10D shows an example of a passable opening 1040 and a closed opening 1042. The opening may have any opening values disclosed herein. In some examples, the opening can comprise sizes of at least about 0.1 millimeter (mm), 0.2 mm, 0.5 mm, 1 mm, 2 mm, 5 mm, 10 mm, 20 mm, 30 mm, 40 mm, 50 mm, 60 mm, 70 mm, 80 mm, 90 mm, or 100 mm. The opening can comprise sizes of at most about 0.1 millimeter (mm), 0.2 mm, 0.5 mm, 1 mm, 2 mm, 5 mm, 10 mm, 20 mm, 30 mm, 40 mm, 50 mm, 60 mm, 70 mm, 80 mm, 90 mm, or 100 mm. The opening can comprise sizes between any of the opening sizes disclosed herein. For example, the opening can comprise sizes from about 0.1 mm to about 100 mm, from about 5 mm to about 50 mm, or from about 50 mm to about 100 mm.

Figure 12:
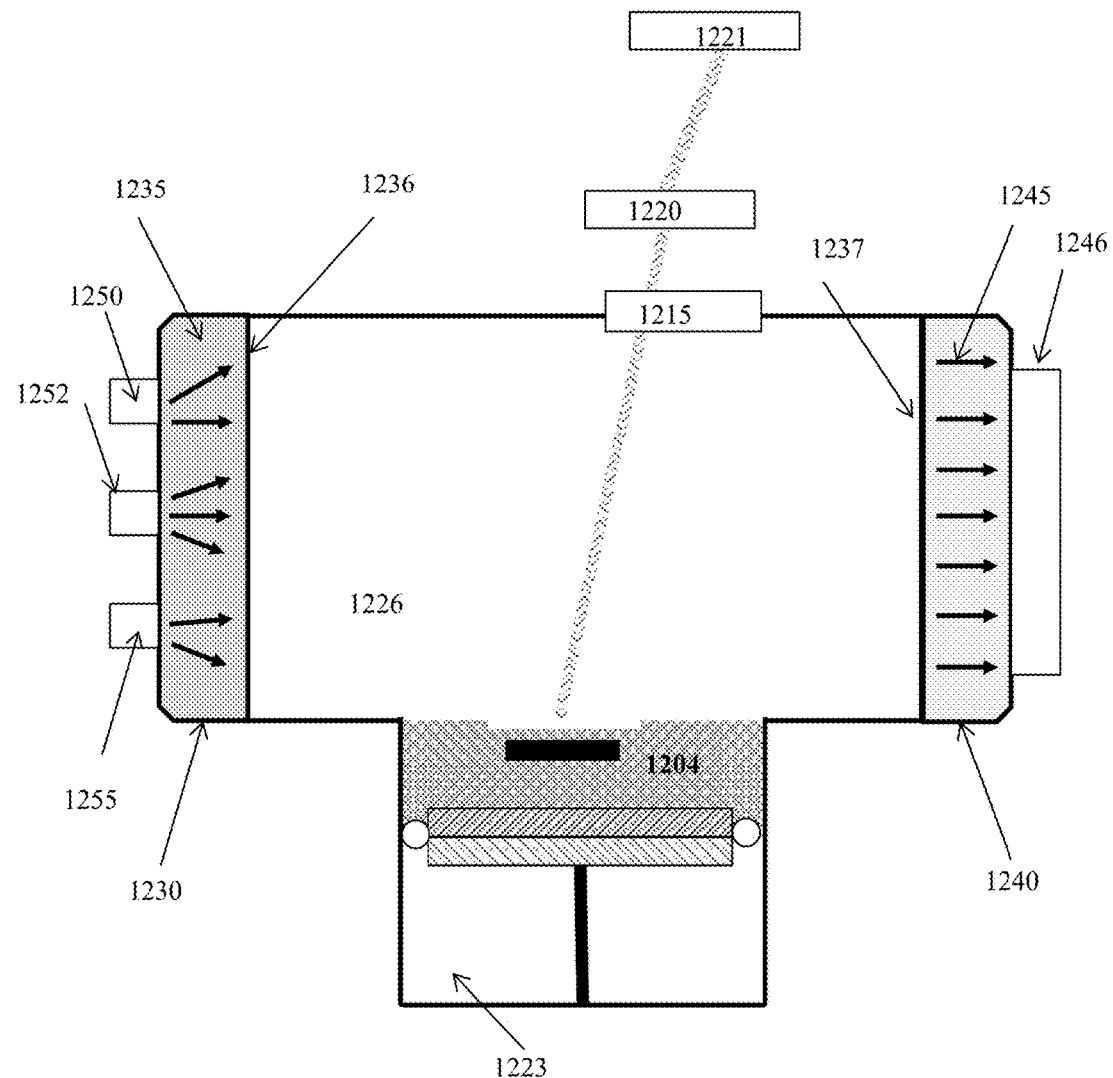
FIG. 12 schematically illustrates various 3D printer components.

In some examples, the inlet and/or outlet opening comprises a valve. In some examples, at least two openings may share the same valve. In some examples, at least two openings may have different valves. The valve may control the flow of gas through the inlet opening. Control the flow may comprise flow velocity, pressure, gas content (e.g., oxidizing gas content), humidity content, gas make up. The valve may be a mechanical, electrical, electro-mechanical, manually operable, controlled, or an automated valve. The valve may comprise a pressure relief, pressure release, pressure safety, safety relief, pilot-operated relief, low pressure safety, vacuum pressure safety, low and vacuum pressure safety, pressure vacuum release, snap acting, or a modulating valve. The valve may comply with the legal industry standards presiding the jurisdiction. The inlet and/or outlet portion may comprise one or more ledges. The ledge may control the amount and/or direction of gas flow into the enclosure (e.g., processing chamber). The ledge may be pivotable (e.g., along a set of points on the edge) before, after, and/or during the 3D printing (or a portion thereof. For example, during the operation of the energy beam). The ledge may be movable before, after, and/or during the 3D printing (or a portion thereof. E.g., during the operation of the energy beam). The ledge may be retractable before, after, and/or during the 3D printing (or a portion thereof. E.g., during the operation of the energy beam). The ledge may be controllable manually and/or automatically (e.g., using a controller). The control may be before, after, and/or during the 3D printing (or a portion thereof. E.g., during the operation of the energy beam). The amount and/or velocity of gas conveyed by the ledge may be controllable (e.g., in real time). The ledge may be closable so that a reduced amount of gas will flow into the enclosure (e.g., no gas will flow into the enclosure). The ledge may extend from one edge of the inlet and/or outlet opening space to the opposite edge of the inlet and/or outlet opening space respectively. FIG. 12, 1240 shows an example of an outlet opening space. The ledge may protrude from the gas inlets (e.g., 1250) towards the divider comprising the opening(s) (e.g., 1236). The ledge may protrude from the divider comprising the opening(s) (e.g., 1236) towards the gas outlet (e.g., 1246).

Figure 7:
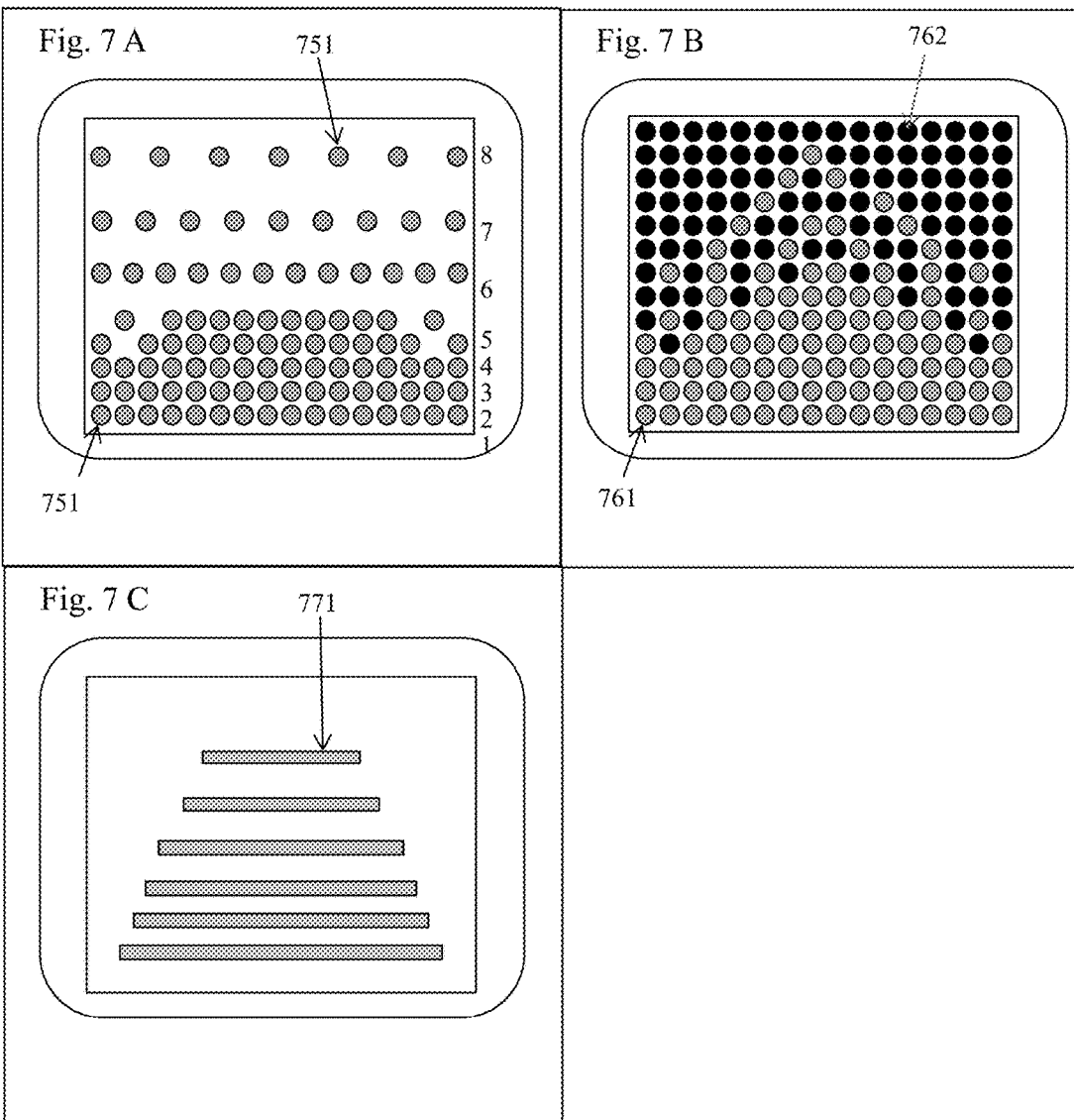
FIGS. 7A-7C schematically illustrates various 3D printer components.
Figure 10A:
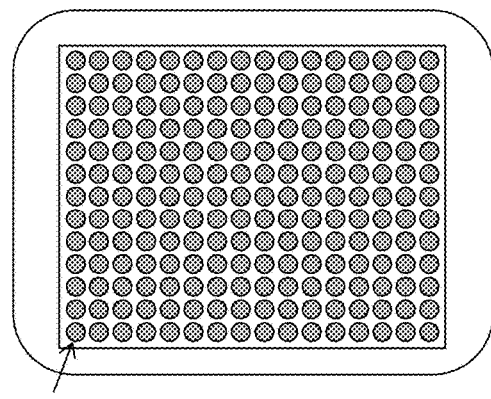
FIGS. 10A-10D schematically illustrates various 3D printer components.
Figure 10B:
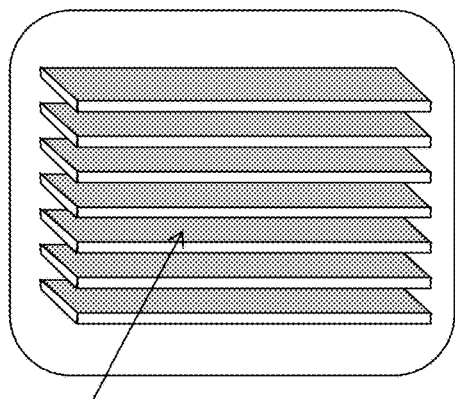
Figure 10C:
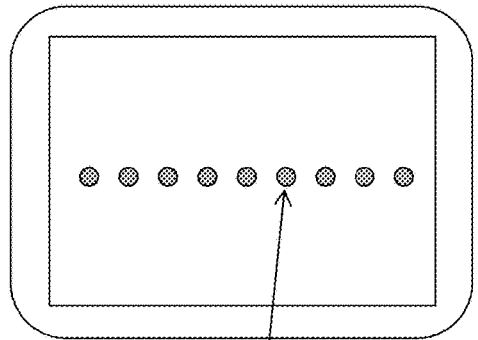
Figure 10D:
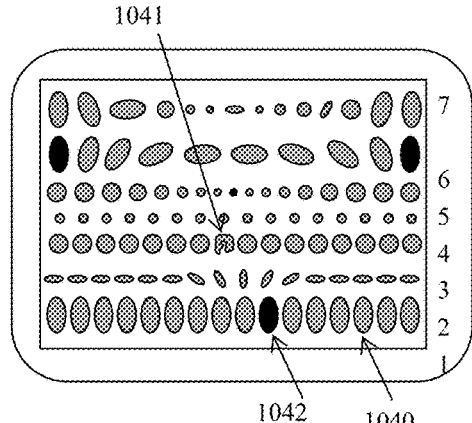

In some examples, the inlet portion comprises a perforated plate (a mesh, screen, e.g., FIG. 10A, FIG. 10C, FIG. 10D). The internal inlet wall and/or internal outlet wall may comprise the perforated plate. In some instances, the inlet portion may comprise more than one perforated plates. The multiple perforated plates may be stacked (e.g., vertically, horizontally, and/or at an angle). The multiple perforated plates may be stacked in parallel to each other. The perforated plate may comprise one or more perforations (e.g., FIG. 10A, 1010). The perforation may be an opening (e.g., as disclosed herein). The perforations may be uniformly spread across at least a portion (e.g., the entire) perforated plate. FIG. 10A shows an example of uniform perforation spread across the entire perforated plate. FIG. 7A shows an example of uniform perforation spread across a portion of the perforated plate (e.g. line numbers 1 to 3) The perforated plate may comprise a single file (e.g., row) of perforations (e.g., FIG. 10C). At times, the size of the perforations in the plate may be uniform (e.g., FIG. 10A). At times, the size of the perforations in the plate may not be uniform (e.g., FIG. 10D, row number 5). At times, the angle of the perforations in the plate may not be uniform (e.g., FIG. 10D, row number 2). At times, the angle of the perforations in the plate may not be uniform (e.g., FIG. 10D, row number 7 or 3). At times, the pass-ability of the perforations in the plate may not be uniform (e.g., FIG. 10D, row number 2, wherein a black perforation designates a closed perforation, and a gray perforation represents an open perforation). The size of the perforations may be controlled (e.g., as described herein re openings). For example, the perforations may be thermally controlled. The size of the perforations may contract with increase in surface temperature. The size of the perforations may expand with a decrease in temperature. The size of the openings (e.g., perforations) may be altered to control the amount and/or velocity of flow of gas through each opening. Altered may comprise increasing and/or decreasing the opening size.

In some examples, the inlet and/or outlet portion comprises one or more ledges (e.g., FIG. 10B, 1020). The ledges may be baffles. At times, the inlet and/or outlet portion may comprise a perforated plate or a ledge. At times, the inlet and/or outlet portion may comprise both a perforated plate and a ledge. The ledge may be movable. For example, the ledge may be movable before, during, and/or after the 3D printing. For example, the ledge may be movable during a portion of the 3D printing. During a portion of the 3D printing may comprise during the operation of the energy beam, or during the formation of a layer of hardened material. The ledge may be controlled manually and/or automatically. The ledge may direct one or more streams of gas to flow in a certain direction. The ledge may alter the amount and/or velocity of the gas stream. For example, the ledge may (e.g., substantially) prevent the gas flow through it by closing an opening. The ledge may laterally extend from one edge of the intermediate wall to an opposing wall away from the processing chamber. The opposing wall may comprise an inlet or outlet opening. The ledge and/or opening may be passive. The position (e.g., horizontal, vertical, and/or angular) of the ledges may be controlled (e.g., during at least a portion of the 3D printing). The position of the ledge may be altered to control the amount, velocity, and/or direction of flow of at least one gas through each ledge. Altered may comprise reducing gas flow (e.g., preventing). Altered may comprise allowing gas flow.

Figure 8:
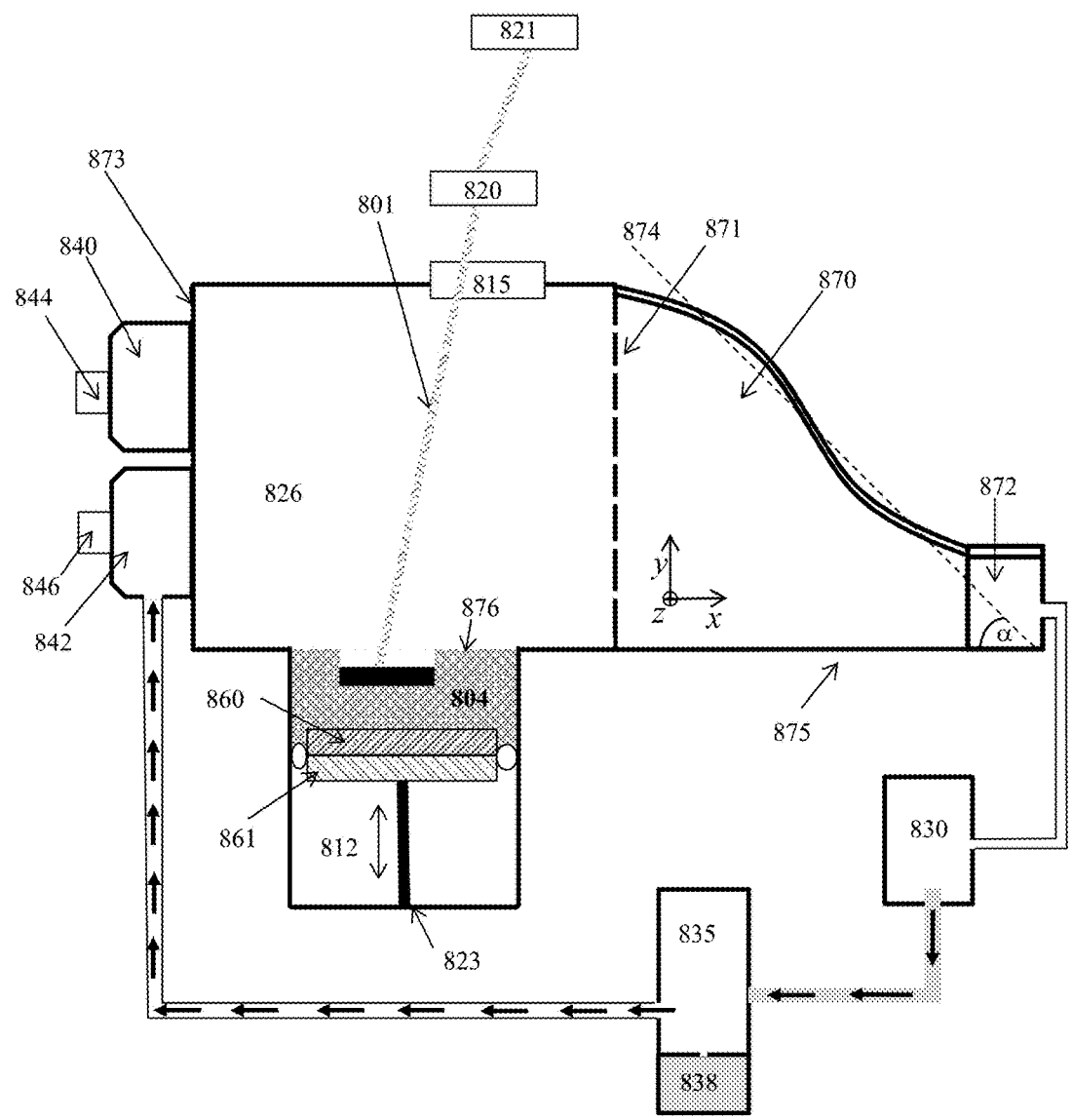
FIG. 8 schematically illustrates a side view of a 3D printer and its components.
Figure 9:
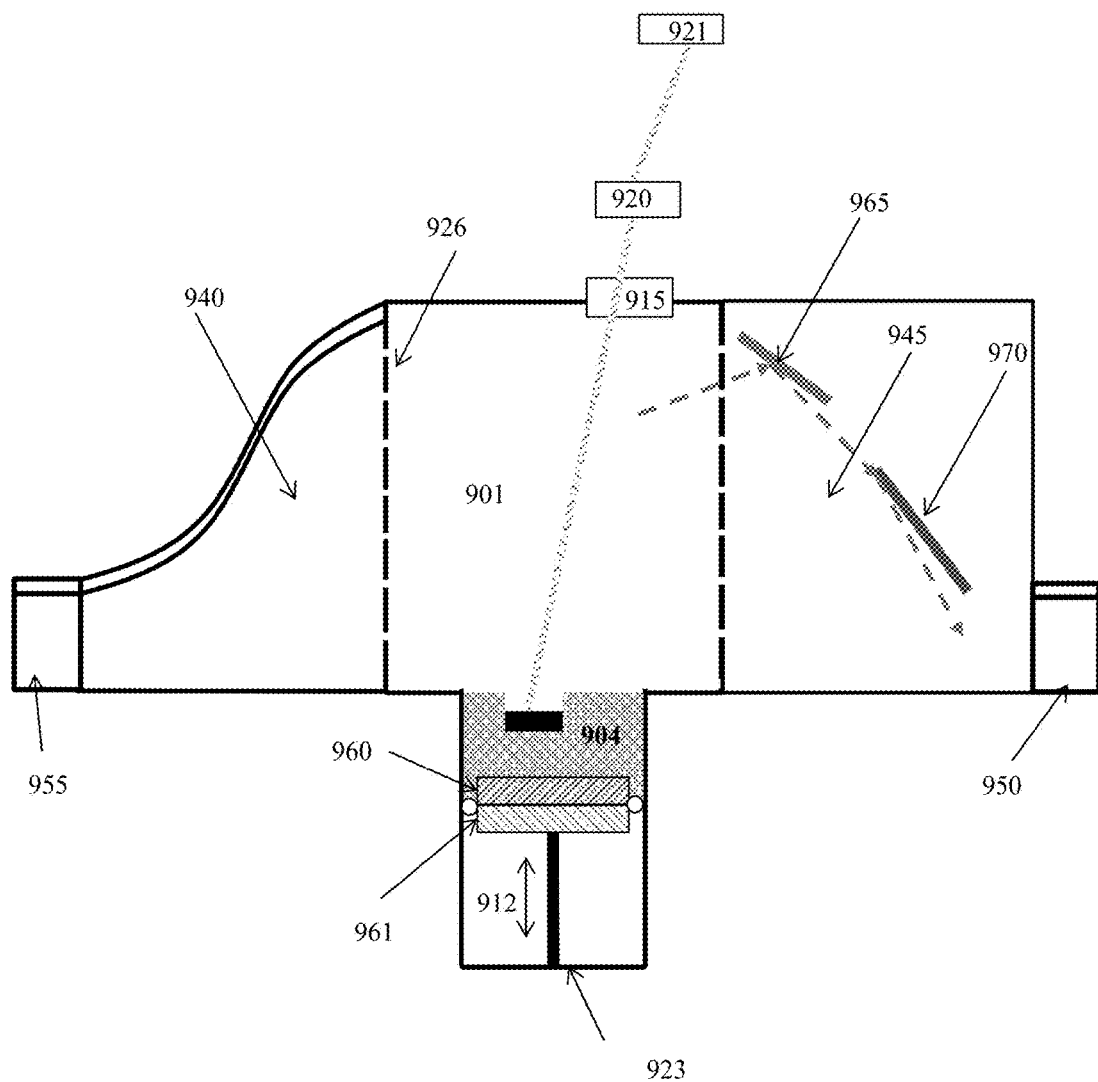
FIG. 9 schematically illustrates a side view of a 3D printer and its components.
Figure 13:
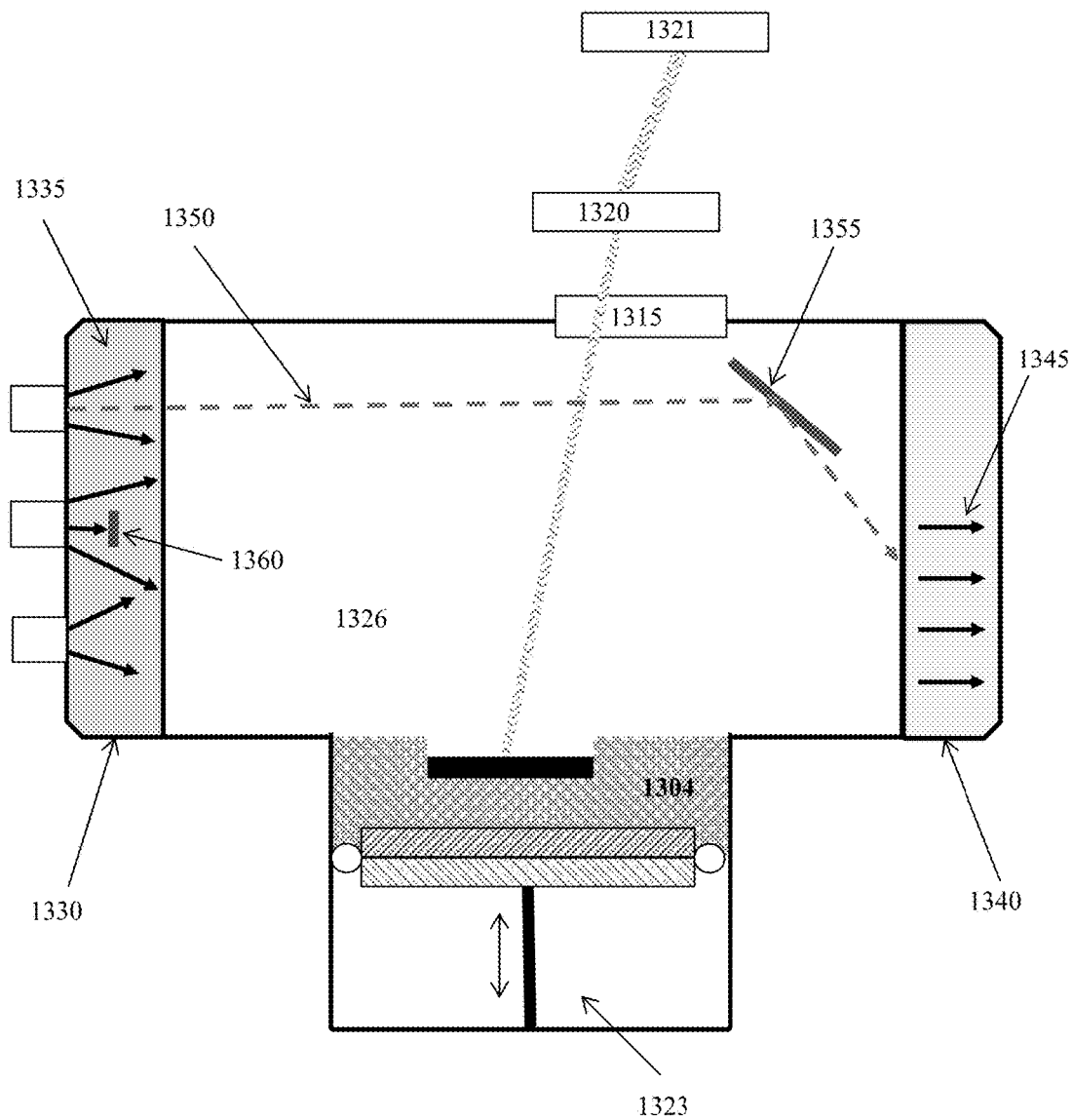
FIG. 13 schematically illustrates various 3D printer components.

In some instances, the inlet portion comprises a geometric shape (e.g., rectangular shape, square shape, circular shape, box shape). FIG. 8 shows an example of inlet portions, e.g., 840, 842. FIG. 12 and FIG. 13 show an example of an inlet portion, e.g., 1235, 1335. The inlet portion may be aerodynamically shaped (e.g., wind tunnel shape, tubular shape, rain drop shape, rocket shape). The aerodynamic shape may enable smooth flow of gas through the inlet portion. The aerodynamic shape may prevent the formation of standing vortices, cyclones, and/or stagnant gas. FIG. 9 shows an example of an inlet portion having an aerodynamic shape 940. The aerodynamic shape may initiate from at least one (e.g., narrow) opening (e.g., FIG. 9, 955) distant from the processing chamber (e.g., FIG. 9, 901). The acute angle of the average aerodynamic shape plane (e.g., FIG. 8, 874) relative to the floor of the processing chamber (e.g., 875, or the exposed surface of the material bed 876) can be at least about 20°, 30°, 40°, 42°, 45°, 50°, 60°, 70°, or 80°. The acute angle of the average aerodynamic shape plane relative to the floor of the processing chamber can be at most about, 20°, 30°, 40°, 42°, 45°, 50°, 60°, 70°, or 80°. The acute angle of the average aerodynamic shape plane shape relative to the floor of the processing chamber can be between any of the afore-mentioned values (e.g., from about 20° to about 80°, from about 20° to about 40°, from about 40° to about 60°, or from about 60° to about) 80°. The aerodynamic shape may comprise a pyramidal, or a conical 3D shape. The inlet portion may comprise one or more baffles (e.g., FIG. 13, 1360). A baffle, as understood herein, may be a device used to restrain and/or deflect the flow of gas. The baffle may be placed after an inlet opening (e.g., FIG. 13, 1360). The baffle may be placed within an inlet portion (e.g., FIG. 13, 1360). The baffle may be placed at a location within the processing chamber. The baffle may be placed at a location within the enclosure (e.g., FIG. 9, 965, 970). There may be one or more baffles within the enclosure. At least one surface of the baffle may be smooth, or rough. The baffle may comprise indentations. The indentations may form a pattern. The indentation may facilitate directing the gas flow. The baffle may comprise one or more openings (e.g., as disclosed herein). For example, the size of the perforations may be uniform or non-uniform. For example, the size of the perforations may be controlled. The baffle may be a deflector. The deflector may be a gas (e.g., wind) deflector. The deflector may aid in directing the glow of gas. The deflector may redirect the flow of gas. The deflector may be a screen. The deflector may be a shield.

In some instances, the gas flow mechanism comprises an outlet portion (e.g., FIG. 8, 870, FIG. 9, 945, FIG. 12, 1245, FIG. 13, 1345), which can also be referred to as an outlet portion, gas outlet port volume, gas outlet volume, gas outlet portion, or other suitable term. The gas outlet portion may have similar structure and/or apparatuses to the gas inlet portion. The outlet portion may be connected (e.g., reversibly) to a side wall of the enclosure. For example, the outlet portion may be connected (e.g., reversibly) to a first side wall that opposes a second side wall that is coupled to the inlet area. The outlet portion can include one or more outlet openings (e.g., FIG. 9, 950). The one or more outlet openings may be coupled (e.g., reversibly) to at least one side wall of the outlet portion. The multiple openings may or may not be uniformly spaced. The outlet openings may run across the entire wall of the enclosure (e.g., horizontally, vertically, and/or at an angle). For example, the outlet openings may occupy a percentage of the enclosure height and/or depth. The percentage may be at least about 50%, 60%, 70%, 80%, 90% or 95% of the enclosure height and/or depth. The outlet openings may be evenly or non-evenly spaced. The openings may run across any number between the afore-mentioned heights and/or depths of the enclosure wall (e.g., from about 50% to about 99%, from about 50% to about 70%, from about 70% to about 90%, or from about 90% to about 99%). For example, a greater concentration of outlets may reside closer to the platform and/or exposed surface of the material bed. For example, a lower concentration of outlet openings may reside closer to the ceiling of the enclosure. In some examples, the outlet openings may extend from an exposed surface of the material bed and/or the platform to the optical window. In some examples, the outlet openings may extend from an exposed surface of the material bed and/or platform to at least about 50%, 60%, 70%, 80%, 90% 95%, 98%, or 99% height and/or depth of the enclosure. The openings extend from an exposed surface of the material bed and/or platform by any number between the afore-mentioned examples (e.g., from about 50% to about 99%, from about 50% to about 70%, from about 70% to about 90%, or from about 90% to about 99%). The outlet opening may be any opening disclosed herein.

Figure 11A:
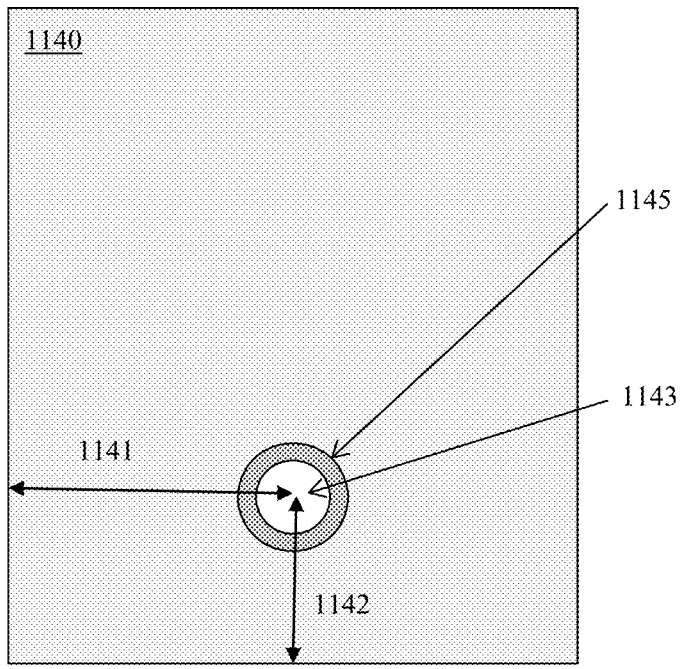
FIGS. 11A-11B schematically illustrates various 3D printer components.
Figure 11B:
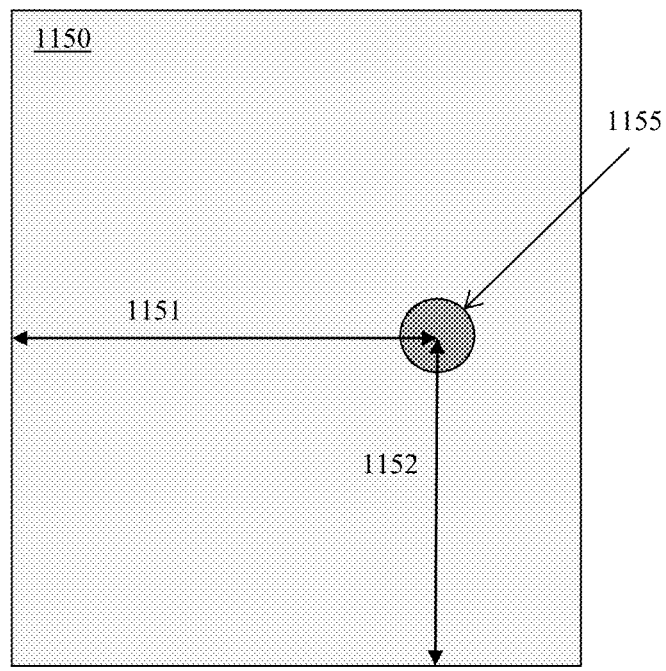

In some instances, the center of the inlet opening and/or outlet opening are disposed in an enclosure wall (e.g., side wall, e.g., FIG. 8, 873) in a position. That position can be of at least about 1%, 2%, 5%, 10%, 20%, 25%, 30%, 35%, 40%, 45%, 50%, 55%, or 60% of the enclosure side wall relative to the bottom of the processing chamber (e.g., comprising the exposed surface of the material bed and/or platform), wherein the percentage is along the Y direction (wall height). That position can be of at most about 1%, 2%, 5%, 10%, 20%, 25%, 30%, 35%, 40%, 45%, 50%, 55%, or 60% of the enclosure side wall relative to the bottom of the processing chamber (e.g., comprising the exposed surface of the material bed and/or platform) wherein the percentage is along the Y direction (wall height). That position can be between any of the afore-mentioned values the enclosure side wall relative to the bottom of the processing chamber (e.g., from about 1% to about 60%, from about 1% to about 25%, from about 30% to about 45%, or from about 45% to about 60% from the material bed). That position can be of at least about 1%, 2%, 5%, 10%, 20%, 25%, 30%, 35%, 40%, 45%, 50%, 55%, or 60% of the enclosure wall relative to a frontal wall of the processing chamber (e.g., perpendicular to the bottom of the processing chamber and to the enclosure sidewall), wherein the percentage is along the Z direction (wall depth). That position can be of at most about 1%, 2%, 5%, 10%, 20%, 25%, 30%, 35%, 40%, 45%, 50%, 55%, or 60% of the enclosure wall relative to a frontal wall of the processing chamber (e.g., perpendicular to the bottom of the processing chamber and to the enclosure side wall), wherein the percentage is along the Z direction (wall depth). That position can be between any of the afore-mentioned values the enclosure side wall relative to the frontal wall of the processing chamber (e.g., from about 1% to about 60%, from about 1% to about 25%, from about 30% to about 45%, or from about 45% to about 60% from the material bed). FIG. 11A shows an example of a side enclosure wall 1140 comprising an opening 1145 that is partially obstructed by a baffle 1143. A center of the opening 1145 is disposed at about 25% of the enclosure side wall height 1142 relative to the bottom of the processing chamber, and at about 50% depth 1141 from a frontal enclosure wall. FIG. 11B shows an example of a side enclosure wall 1150 comprising an unobstructed opening 1155. A center of the opening 1155 is disposed at about 50% of the enclosure side wall height 1152 relative to the bottom of the processing chamber, and at about 75% depth 1151 from a frontal enclosure wall.

In some instances, the outlet portion comprises one or more ledges. The ledge may be any ledge disclosed herein. The ledge may be (e.g., laterally) extending from one edge of the outlet portion (e.g., comprising the outlet opening, e.g., 872) to the opposite edge of the outlet portion (e.g., to the internal outlet wall, e.g., 871). The outlet portion may comprise an internal outlet wall (e.g., 871). The internal outlet wall may be any internal wall described herein. The aspect ratio of the internal outlet wall relative to an outlet opening (e.g., 872) can be at least about 500:1, 250:1, 200:1, 100:1, 50:1, 25:1 or 10:1. The aspect ratio of the internal outlet wall relative to an outlet opening (e.g., 872) can be at most about 500:1, 250:1, 200:1, 100:1, 50:1, 25:1 or 10:1. The aspect ratio of the internal outlet wall relative to an outlet opening can be between any of the afore-mentioned values (e.g., from about 500:1 to about 10:1, from about 500:1 to about 100:1, from about 100:1 to about 50:1, or from about 50:1 to about 10:1). The internal outlet wall may comprise a perforated plate. The perforated plate may be any perforated plate described herein. In some instances, the outlet portion may comprise more than one perforated plate. The multiple perforated plates may be stacked (e.g., vertically, horizontally and/or at an angle). The multiple perforated plates may be stacked parallel to each other. The perforations may be any perforation disclosed herein. The plurality of perforated plates may comprise 2, 3, 4, 5, 6, 7, 8, 9, or 10 perforated plates (e.g., through which the gas flows prior to entry into the processing chamber). The perforated plate may be heated and/or cooled. The temperature of the gas flow may be regulated using the perforated plate. For example, the perforated plate(s) may be operatively coupled to a heat exchanger and/or heat source. The collective respective cross sectional area of the holes in the perforated plates can be the (e.g., substantially) same as the respective cross sectional collective areas of the gas entrance openings. This may facilitate maintaining the same speed in (i) the processing cone and in (ii) the entrance to the gas tunnel. In some embodiments, the speed along the (e.g., entire) height of the processing chamber and/or cone is (e.g., substantially) constant. At times, the speed along the (e.g., entire) height of the processing chamber and/or cone may vary. For example, the speed may vary gradually or non-gradually (e.g., using one or more horizontal partitions). The perforated plate can comprise space filling polygonal openings (e.g., having hexagonal, or rectangular cross section). The perforated plate(s) may comprise a separator, diffuser, and/or collimator (e.g., having a cross section of a geometric shape as described herein). The collimator may comprise an aligning passage (e.g., channel). The polygons can be any polygons describe herein as suitable. The space filling polygon arrangement may be planar (e.g., in a single plane). The space filling polygon arrangement may comprise a tessellation. The tessellation may comprise a (e.g., symmetric) polygon. The tessellation may comprise an equilateral polygon. The tessellation may comprise a triangle, tetragon (e.g., quadrilateral), or hexagon. The tetragon may comprise a concave or convex tetragon. The tetragon may comprise a rectangle. The rectangle may comprise a square. The perforated plate and/or cross section of the collimator (e.g., aligning passage(s)) may comprise an oval. The oval may comprise a circle. The cross-section of the aligning passage and/or perforated plate hole may be a square, rectangle, triangle, pentagon, hexagon, heptagon, octagon, nonagon, octagon, circle, icosahedron, or any combination thereof.

In some instances, a cross section of the outlet portion is of a geometric shape (e.g., rectangular shape, square shape, circular shape, box shape). FIG. 12 and FIG. 13 show an example of an outlet portion, e.g., 1240, 1340. The outlet portion may be aerodynamically shaped (e.g., wind tunnel shape, tubular shape, rain drop shape, rocket shape). FIG. 8 shows an example of an aerodynamic (e.g., wind tunnel) shaped outlet portion, e.g., 870. The aerodynamic shape may enable smooth flow of gas through the outlet portion. The outlet portion can have a cross-section shape that tapers toward an outlet opening (e.g., 872). The aerodynamic shape may converge into at least one (E.g., narrow) opening before exiting the enclosure. The aerodynamic shape may facilitate decrease in (e.g., elimination of) gas recirculation, static vortices and/or stagnated flow of gas, at least within the processing cone (e.g., within the enclosure).

In some instances, the outlet portion comprises one or more baffles (e.g., FIG. 9, 965, 970). The baffle may be placed between the outlet opening and the processing chamber. The baffle may be placed within an outlet portion. There may be one or more baffles within the outlet portion. The baffle may be any baffle disclosed herein.

In some instances, the gas flow mechanism is coupled to a recycling mechanism. The recycling mechanism may comprise a closed loop system. The recycling mechanism may collect the gas from the outlet portion (e.g., 870) and/or from the outlet opening (e.g., 872). The recycling mechanism may filter the gas. The recycling mechanism may inject the gas into the enclosure. For example, the recycling mechanism may inject the gas into the inlet opening (e.g., 955), inlet portion (e.g., 940), and/or processing chamber (e.g., 901). The injection may be direct or indirect. At least a portion of the recycling may be performed before, after, and/or during the 3D printing. At least a portion of the recycling may be continuous (e.g., during at least a portion of the 3D printing). The recycling mechanism may comprise a filtering mechanism (e.g., FIG. 8, 830, FIG. 14, 1460). The recycling mechanism may comprise a device configured to remove the debris (e.g., particulate material) from the gas. The removal may be using a filter, screen, perforated-plate, or any combination thereof. The removal may be using a charge such as a magnetic and/or electrical charge. For example, the removal may comprise using an electrostatic gas filter. The filtering mechanism may comprise a filter (e.g., polymer, HEPA, polyester, paper, mesh, or electrostatic gas filter). The filter may enable a gas to flow through it. The filter may prevent the debris from flowing through it. The filtering mechanism may allow gas to flow through. The filtering mechanism may separate the gas from debris (such as particulate material, and/or soot) behind. The filtering mechanism may comprise a filter, an outlet opening, inlet opening, canister, channel, sensor, or valve. The filtering mechanism may comprise a pressure difference mechanism to filter gas from the debris. The filtering mechanism may comprise a gas removal mechanism (e.g., vacuum, or gas channel). The suction mechanism may comprise a filter. The recycling and/or suction mechanism may facilitate (e.g., evacuate and/or channel) a flow of the gas from the outlet opening to the inlet portion (e.g., through the inlet opening). At times, the gas from the outlet opening may be conveyed via the filtering mechanism (e.g., using positive or negative pressure, for example, using a gas pump). The filtering mechanism may be continuously operational during at least a portion of the 3D printing (e.g., during the operation of the energy beam, during formation of a layer of hardened material, during deposition of a layer of pre-transformed material, during the printing of the 3D object). The filtering mechanism may be controlled (e.g., before, after, and/or during at least a portion of the 3D printing). The control may be manual and/or automatic. The filtering mechanism may comprise a paper, mesh, or an electrostatic filter. The filtering mechanism may include one or more sensors (e.g. optical, pressure). The sensors may detect incoming gas into the filtering mechanism. The sensors may detect debris in the filter. The sensors may detect clogging of the filter. The filtering mechanism may be done in batches and/or continuously. The filtering mechanism may operation during at least a portion of the 3D printing. The recycling mechanism and/or suction mechanism may release the gas into the filtering mechanism in batches. The release of gas may be timed. The recycling mechanism may comprise a pump. The filtering mechanism may be operatively coupled (e.g., connected) to the pump (e.g., FIG. 8, 835, FIG. 14, 1450). The pump may receive a filtered gas from the filtering mechanism. The pump may be coupled to a variable frequency drive. The variable frequency drive may allow controlling the gas flow rate from the pump (e.g., into the enclosure). At times, the gas flow rate may be dynamically (e.g., real time) controlled. The control may be manual and/or automatic. The recycling mechanism may comprise a re-conditioning system. The re-conditioning system may recondition the gas (e.g., remove any reactive species such as oxidizing gas, or water) The re-conditioned gas may be recycled and used in the 3D printing. Recycling may comprise transporting the gas to the processing chamber. Recycling may comprise transporting the gas to the inlet portion. Recycling may comprise transporting the gas within the enclosure (e.g., FIG. 14, 1440, FIG. 1, 100). In some instances, the re-conditioning mechanism may re-condition the separated pre-transformed material that may be residual from the filtering mechanism. The residual material may be filtered and/or collected in a separate container (e.g., FIG. 8, 838). The re-conditioned material may be recycled and used in the 3D printing. Recycling may comprise transporting the material to the layer dispensing system. The recycling may be continuous and/or in batches during at least a portion of the 3D printing.

In some embodiments, the recycling mechanism may be coupled to a sieve (e.g., filter). In some embodiments, gas material may be sieved before recycling and/or 3D printing. Sieving may comprise passing a gas borne material (e.g., liquid or particulate) through a sieve. The sieving may comprise passing the gas borne material using a flow of the gas, through a cyclonic separator. Sieving may comprise classifying the gas borne material. Classifying may comprise gas classifying. Gas classifying may comprise air-classifying. Gas classifying may include transporting a material (e.g., particulate material) through a channel. A first set of gas flow carrying particulate material of various types (e.g., cross sections, or weights) may flow horizontally from a first horizontal side of the channel to a second horizontal side of the channel. A second set of gas flow may flow vertically from a first vertical side of the channel to a second vertical side. The second vertical side of the channel may comprise material collectors (e.g., bins). As the particulate material flows from the first horizontal direction to the second horizontal direction, the particulate material interacts with the vertical flow set, and gets deflected from their horizontal flow course to a vertical flow course. The particulate material may travel to the material collectors, depending on their size and/or weight, such that the lighter and smaller particles collect in the first collator, and the heaviest and largest particles collect at the last collector. Blowing of gas (e.g., air) may allow classification of the particulate material according to the size and/or weight. The material may be conditioned before use (e.g., re-use) within the enclosure. The material may be conditioned before, or after recycling. Examples of gas classification system can be found in PCT patent application serial number PCT/US17/39422 filed on Jun. 27, 2017 and titled "THREE-DIMENSIONAL PRINTING AND THREE-DIMENSIONAL PRINTERS," which is incorporated herein by reference in its entirety.

Figure 17:
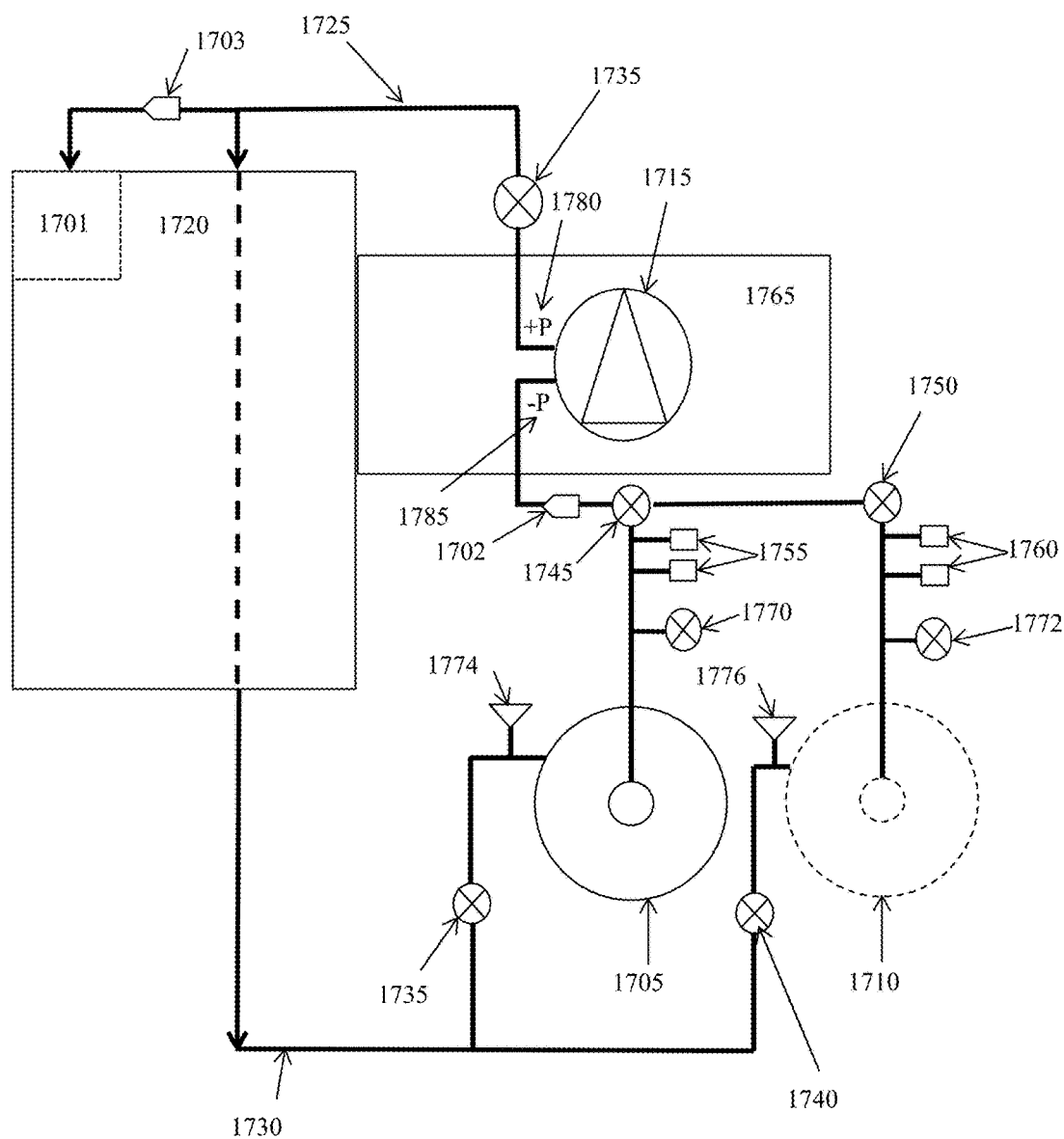
FIG. 17 schematically illustrates top view of components of a 3D printer.

In some embodiments, a filtering mechanism may be operatively coupled to at least one component of the layer dispensing mechanism, the pump (e.g., pressurizing pump), an ancillary chamber and/or the processing chamber. The filtering mechanism may be operatively coupled to the gas flow mechanism. For example, the filtering mechanism may be operatively coupled (e.g., physically coupled) to the gas conveying channel of the gas flow mechanism. Physically coupled may comprise flowably coupled to allow at least flow of a gas (e.g., and gas borne material). Operatively coupled may include fluid communication (e.g., a fluid connection, and/or a fluid conveying channel). Fluid communication may include a connection that allows a gas, liquid, and/or solid (e.g., particulate material) to flow through the connection. The filtering mechanism may be operatively coupled to an outlet portion of the processing chamber. A gas comprising gas-borne materials (e.g., debris, soot, reactive species, and/or pre-transformed material) may flow through the filtering mechanism. The filtering mechanism may be configured to facilitate separation of the gas-borne materials from gas. The filtering mechanism may comprise one or more filters or pumps. The one or more filters may comprise crude filters or fine filters (e.g., HEPA filters). The one or filters may be disposed before a pump and/or after a pump. FIG. 17 shows an example of a filtering mechanism comprising two filters 1705 and 1702 disposed before the pump 1715, and a filter 1703 disposed after the pump, wherein before and after is relative to the direction of gas flow into the processing chamber 1720. The filtering mechanism may be (e.g., further) facilitate flow of gas into the processing chamber through an inlet portion. FIG. 17 schematically shows an example of a filtering mechanism. The filtering mechanism may be operatively coupled to a processing chamber (e.g., 1720), and/or to an ancillary chamber (e.g., 1765) through one or more gas conveying channels (e.g., 1725, or, 1730) and/or through one or more valves (e.g., 1735, 1740, 1745, 1750, 1770, 1772, 1774, 1776, and/or 1735). The valves may be controlled. The control may be manual and/or automatic. The control may be before, after, and/or during the 3D printing. The valve may facilitate engagement and/or disengagement of one or more segments of the 3D printer (e.g., one or more segments of the gas flow mechanism). For example, the valve (e.g., 1745, 1735, 1750, 1740) may facilitate engagement and/or disengagement of a filtering mechanism with the pump and/or the processing chamber. The valve may facilitate insertion of gas into one or more segments of the 3D printer. For example, the valve (e.g., 1770, 1772) may facilitate insertion of gas into the filtering mechanism. The valve may facilitate discharge of gas from one or more segments of the 3D printer. For example, the valve (e.g., 1774, 1776) may facilitate discharge of a gas from the filtering mechanism. One or more sensors, (e.g., 1755, 1760) may sense a condition and/or a physical property (e.g., atmosphere, pressure, filtering mechanism presence (e.g., when one or more filters is present), gas flow, amount of gas borne material, and/or mass flow) within the one or more segments of the 3D printer (e.g., the filtering mechanism). The filtering mechanism may be operatively coupled to a pump (e.g., 1715). The pump may induce gas flow in one or more segments of the 3D printer. For example, the pump may induce gas flow (e.g., gas circulation) within the processing chamber and/or the filtering mechanism. In some embodiments, the filtering mechanism is configured to provide filtered gas to an optical window purging system (e.g., 1701), examples of which are described herein.

In some embodiments, the filtering mechanism comprises one or more canisters (e.g., 1705, 1710). The canister may comprise a uniform or a non-uniform shape. The canister may comprise a geometrical shape (e.g., a cylinder, sphere, rectangular, and/or circular). The canister may comprise a 3D shape. The canister may have an internal and/or external 3D shape. The internal shape may be the same or different as the external 3D shape of the canister. The canister may have a uniform or a non-uniform internal 3D shape. The 3D shape may comprise a cuboid (e.g., cube), a tetrahedron, a polyhedron (e.g., primary parallelohedron), at least a portion of an ellipse (e.g., circle), a cone, a triangular prism, hexagonal prism, cube, truncated octahedron, or gyrobifastigium, a pentagonal pyramid, or a cylinder. The polyhedron may be a prism (e.g., hexagonal prism), or octahedron (e.g., truncated octahedron). A vertical cross section (e.g., side cross section) of the 3D shape may comprise a circle, triangle, rectangle (e.g., square, e.g., 1820, 1825), pentagon, hexagon, octagon, or any other polygon. The vertical cross section may be of an amorphous shape. The polygon may comprise at least 3, 4, 5, 6, 7, 8, 9, or 10 faces. The polygon may comprise at least 3, 4, 5, 6, 7, 8, 9, or 10 vertices. The cross-section may comprise a convex polygon. The polygon may be a closed polygon. The polygon may be equilateral, equiangular, regular convex, cyclic, tangential, edge-transitive, rectilinear, or any combination thereof. For example, the (e.g., vertical) cross-section of the 3D shape may comprise a square, rectangle, triangle, pentagon, hexagon, heptagon, octagon, nonagon, octagon, circle, or icosahedron. The canister may be replaceable, removable, exchangeable, and/or modular. The canister may be removed, replaced, and/or exchanged before, during, and/or after 3D printing. Removing, replacing, and/or exchanging may be done manually and/or automatically (e.g., using at least one controller, controlled, and/or semi-automatic). The canister may comprise a material that facilitates entrapment of the gas borne material and/or internal 3D printer gas (e.g., inert gas). The canister may comprise a material that facilitates impermeability of an external gas (e.g., air, oxidizing gas, water, and/or humidity) into the canister. External may include an atmosphere on the exterior of the canister. The canister may comprise a material that facilitates minimal gas and/or liquid leaks. The material of the canister may facilitate adherence to safety standard prevailing in the jurisdiction, for example, by limiting the oxidizing gas and/or humidity concentration in the canister (e.g., during and/or after the filtering process). The limit may be based on the standard in the jurisdiction. Example standards may include combustion and/or ignition related standard, fire related standard (e.g., American Society for Testing and Materials International (ASTM), Occupational Safety and Health Administration (OSHA), Hazard Communication Standard (HCS), Material Safety Data Sheet (MSDS), and/or National Fire Protection Association (NFPA)). In some embodiments, the canister may comprise a partition (e.g., a wall) between one or more internal surfaces (e.g., solid material surface). The partition may form a gap (e.g., a void). The gap may be between a first internal surface and a second internal surface of the canister. The gap may be filled with a gas. The gap may be filled with a material different than the material of the internal surface of the canister (e.g., a liquid, semi-solid, and/or solid material). The gas may comprise an atmosphere. The atmosphere of the gap may facilitate maintaining the atmosphere of the canister to (e.g., substantially) prevent an atmospheric leak (e.g., permeation of gas such as an oxidizing gas, reactive agent, and/or water). The atmosphere of the gap may be different than the atmosphere of the canister interior. The canister may facilitate containing gas-borne material (e.g., debris, soot, pre-transformed material, and/or reactive species), for example, in an atmosphere that does not react with the gas borne material. The gas-borne material may be deposited within the canister (e.g., adhering to a filter) as a result of filtering the gas (e.g., of flowing the gas) from the processing chamber. The canister (e.g., a surface of the canister) may be operatively coupled (e.g., fluidly connect) to one or more valves. The valve may allow a flow of gas into and/or out of the canister. The canister may comprise an entrance opening and an exit opening. The exit opening and the entrance opening may be in opposing sides of the canister. In some embodiments, the exit opening and the entrance opening to the canister may be disposed on non-opposing sides of the canister, for example, on adjacent sides of the canister. The valve may connect the canister to a processing chamber, a member of the layer dispenser, an ancillary chamber, a control system, and/or a pump. The valve may be any valve disclosed herein.

In some embodiments, the canister comprises a filter (e.g., a sieve, screen, a perforated plate and/or baffle). The filter may be configured to separate the gas-borne material from the gas. The filter may be located within an interior of the canister. The filter may be disposed adjacent to (or connected, and/or operatively coupled to) one or more internal surfaces (e.g., walls) of the canister. The filter may comprise a material that facilitates maintenance of an atmosphere within the canister. For example, the filter may not expel the reactive agent (or precursors thereof). For example, the filter may not expel an oxidizing gas and/or humidity (or precursors thereof). Example filters include a composite material, a fiber media, a paper pulp, a fiber gas, polymer, HEPA, polyester, paper, mesh, polymeric, or electrostatic gas filter. At times, the filter may be cleaned. Cleaning may be done before, during, and/or after 3D printing. Cleaning may comprise isolating the canister from the 3D printer (e.g., from the gas flow mechanism). Cleaning may include drenching (e.g., with water, liquid, and/or gas). The liquid may comprise a hydrophilic and/or hydrophobic substance and/or solution. The hydrophilic substance may comprise water. The hydrophobic substance may comprise oil. Cleaning may require removal of the canister comprising the filter. In some embodiments, the cleaning may be performed without removal of the canister comprising the filter. In some embodiments, cleaning may require removal of the filter from the 3D printer and/or from the canister. In some embodiments, the cleaning may be performed without removal of the filter from the canister.

In some embodiments, the canister comprises an inlet portion and/or an outlet portion. The inlet portion and/or outlet portion may facilitate reconditioning (e.g., cleaning) of the filter. The inlet portion may be located adjacent to a top surface of the canister. Top may be in a direction away from the platform and/or against the gravitation center. The inlet may comprise an inlet channel (e.g., pipe, tube, and/or canal). The inlet may allow insertion of a cleaning material. The inlet channel may extend to a location adjacent to a surface (e.g., top) of the filter. The outlet portion may be in an opposite side of the canister where the inlet is located. The outlet may be located on a side of the inlet that is different from the side opposing the inlet. In some embodiments, the outlet does not oppose the inlet. For example, the outlet may not directly oppose the inlet. For example, the outlet may be located adjacent to a side surface of the canister. Adjacent to a side surface may comprise in a direction perpendicular and/or at an angle to the inlet. If the inlet is disposed along a vertical line (e.g., along the gravitational vector), the outlet may be disposed at an angle relative to the vertical line. The outlet portion may be at an acute angle at least about 1°, 2°, 5°, 10°, 20°, 30°, 40°, 45°, 50°, 60°, 70°, 80°, or 90° with respect to the vertical line. The outlet portion may be at an acute angle at most about 1°, 2°, 5°, 10°, 20°, 30°, 40°, 45°, 50°, 60°, 70°, 80°, or 90° with respect to the vertical line. The outlet portion may be at an acute angle between any of the afore-mentioned acute angle values with respect to the vertical line, for example, from about 1° to 90°, or from about 1° to about 30°, from about 30° to about 60°, or from about 60° to about 90°. The outlet portion may facilitate reconditioning (e.g., refurbishing) of the filter, for example, by separation of the gas borne material that adheres to the filter during the filtering operation (e.g., during gas circulation through the canister). The separation may be facilitated by a cleansing material comprising a gas and/or a liquid. The cleansing material may be a non-reactive, and/or inert to the gas-borne material. For example, the outlet portion may facilitate cleansing of the filter, for example, by flowing off gas borne material that is adheres to (e.g., collected on/in) the filter. The outlet portion may comprise an outlet channel. The outlet channel may facilitate the flow of the gas borne material from the filter to an area (e.g., collection area) outside the canister.

In some embodiments, the filtering mechanism comprises one or more valves (e.g., flow, stopper, pressure, engaging, dis-engaging, and/or control valve). The valve may allow gas, liquid, and/or solid to (e.g., controllably) flow through. The solid may comprise a particulate material. The valve may allow gas, liquid, and/or solid to (e.g., controllably) prevent from flowing through. Examples of valves include a pressure relief, pressure release, pressure safety, safety relief, pilot-operated relief, low pressure safety, vacuum pressure safety, low and vacuum pressure safety, pressure vacuum release, snap acting, pinch, metering, flapper, needle, check, control, solenoid, flow control, butterfly, ball, piston, plug, popping, rotary, manual, or modulating valve.

In some embodiments, the filtering mechanism comprises one or more sensors (e.g., presence, mass flow, pressure, temperature, atmosphere, humidity, oxidizing gas, gas, flow, velocity, material density, detection, clogging detection, and/or level sensor). The sensor may sense the level of reactive gas. The reactive gas may comprise oxygen, water, carbon dioxide, or nitrogen. The reactive gas may react with the material used or produced during the 3D printing. The material produced during the 3D printing may comprise debris, or soot. The material used for the 3D printing may comprise a particulate material (e.g., powder). The sensor may detect at least one characteristic of the gas that flows through a filter within the canister. The at least one gas characteristic may comprise gas type, reactive gas level, temperature, pressure, or flow rate. The sensor may detect a presence of a canister in the gas flow mechanism. The sensor may detect a presence of a filter in the filtering mechanism (e.g., in the canister). The sensor may detect at least one gas characteristic of an atmosphere within the canister. The at least one characteristic of the atmosphere may comprise gas type, reactive gas level, temperature, pressure or flow rate. The sensor may send a signal to one or more controllers operatively coupled to the filtering mechanism. The sensors may detect a state of at least one component of the filtering mechanism, for example, a level of clogging of the filter, the number of canisters present in the gas flow mechanism (as part of the filtering mechanism), the number of canisters engaged and/or disengaged from the gas flow mechanism, and/or the number of canister in use. The controller may adjust one or more physical properties (e.g., flow of gas, pressure, velocity, temperature, reactive agent level, and/or atmosphere) of the filtering mechanism (e.g., based on a sensor signal). The controller may adjust a flow of gas in the gas flow mechanism (e.g., based on the amount of clogging within the filter in the canister). For example, the controller may adjust a flow of gas in the filtering mechanism and/or the processing chamber (e.g., based on the amount of clogging within the filter in the canister). The controller may adjust the flow of gas to maintain a desired and/or requested gas flow velocity and/or acceleration. The control may be performed before, after, and/or during 3D printing. The control may be manual and/or automatic.

In some embodiments, the filtering mechanism comprises one or more indicators (e.g., visual, sound, and/or tactile). The indicator may alert one or more human senses (e.g., sound, visual, tactile, oral, and/or olfactory). The indicators may be a part of a user interface, and/or touchscreen. The indicator may comprise an optical signal. The indicators may reflect a state of the filtering mechanism. The state of the filtering mechanism may include sensing a signal from one or more sensors. Example states of the filtering mechanism may include an a safe to use, ready to use, in operation, unsafe to use, safe to change filter, and/or unsafe to change filter. The safety indicators may correspond to the safety standards in the jurisdiction.

Figure 18:
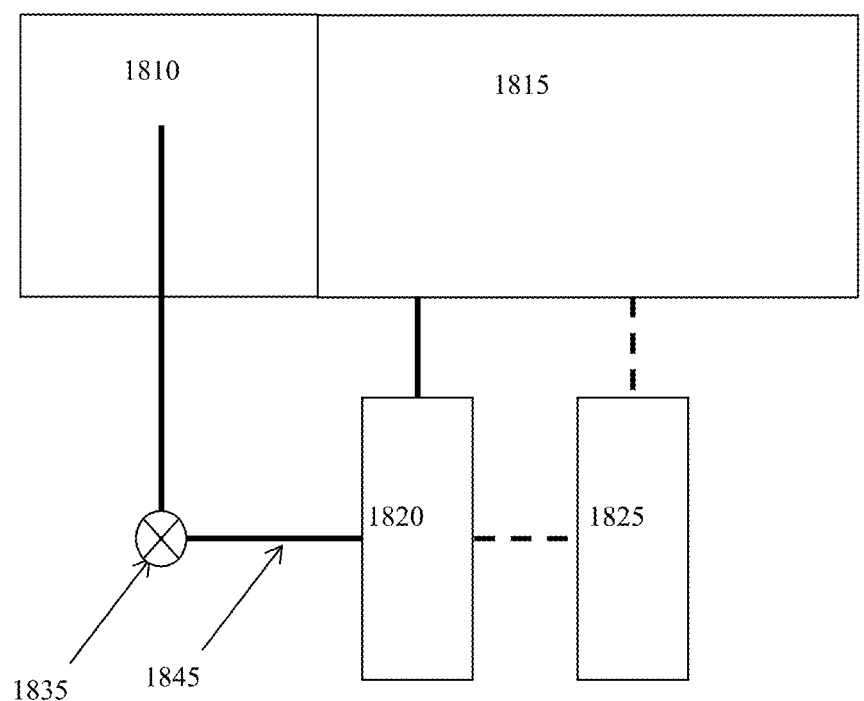
FIG. 18 schematically illustrates a side view of components of a 3D printer.

In some embodiments, the 3D printing system comprises multiple (e.g., two) filtering mechanisms. FIG. 18 schematically shows an example of two filtering mechanisms (e.g., 1820, 1825) operatively coupled to the ancillary chamber (e.g., 1815). The one or more filtering mechanism may be operatively coupled to the processing chamber (e.g., 1810) (e.g., via a gas conveying channel 1845). At times, a first filtering mechanism may be coupled to the processing chamber. At times, a second filtering mechanism may be coupled to the processing chamber. At times, multiple (e.g., two, three, four, and/or five) filtering mechanisms may be coupled to the processing chamber. The gas conveying channel may comprise a valve (e.g., 1835). The valve may facilitate reversibly connecting the first filtering mechanism and/or the second filtering mechanism to the processing chamber (e.g., during, before and/or after the 3D printing). A filtering mechanism may comprise one or more (e.g., two) canisters (e.g., 1820 and 1825). At times, a first canister may be coupled to the processing chamber. At times, a second canister may be coupled to the processing chamber. At times, the plurality (e.g., two, three, four, and/or five) of canisters may be coupled to the processing chamber. The multiple filtering mechanisms may facilitate a continuous filtering of the gas that flows within at least the processing chamber (e.g., the gas that flows within the gas circulation mechanism comprising the processing chamber, ancillary chamber, a component of the layer dispenser or a pump), which continuous filtering is before, after and/or during the 3D printing. The plurality of filtering mechanisms may facilitate an exchange of at least one filter during the continuous filtering of the gas that flows within at least a portion of the gas circulation system (e.g., the processing chamber), which continuous filtering is before, after and/or during the 3D printing. The canisters may facilitate maintaining a requested amount of a physical property of gas within the processing chamber and/or ancillary chamber. The requested amount of the physical property of the gas may be pre-determined and/or constant. The physical property of the gas may comprise a density, velocity, type, and/or acceleration. The physical property of the gas may comprise an amount (e.g., contamination) of a reactive agent in the gas. The reactive agent may comprise an oxidizing agent. The multiple filtering mechanisms may facilitate maintaining a constant and/or diminished amount of gas-borne material in the processing chamber and/or ancillary chamber. In some embodiments, the continuous filtering may comprise alternating filtering from a first filtering mechanism and a second filtering mechanism. For example, the continuous filtering may comprise alternating the gas flow from flowing through a first canister (comprising a first filter) to flowing through a second canister (comprising a second filter). Alternating may comprise switching filtering from a first filtering mechanism to a second filtering mechanism. Switching may be done before, during, and/or after 3D printing. Switching may be controlled (e.g., manually or automatically using a controller). Alternating may comprise dis-engaging a first filtering mechanism (e.g., comprising the canister, valve, channel, sensor, or filter). Alternating may comprise engaging a second filtering mechanism (e.g., comprising the canister, valve, channel, sensor, or filter). Alternating may comprise controlling one or more valves. Alternating may comprise detecting a status of the first filtering mechanism and/or second filtering mechanism, for example, by reading signals from one or more sensors. The alternating process may comprise (i) sensing a physical property (e.g., clogging, gas velocity, rate of gas flow, direction of gas flow, rate of mass flow, direction of mass flow, temperature, reactive agent level, and/or gas pressure) of flowing gas within a first filtering mechanism, (ii) sensing a presence of a second filtering mechanism (e.g., using a presence sensor), (iii) sensing an atmosphere and/or a physical property (e.g., reactive agent, pressure, humidity and/or temperature) of the second filtering mechanism, (iv) determining that the second filtering mechanism may be present, and optionally that the condition of the second filtering mechanism matches an expected condition, (v) engaging the second filtering mechanism with the processing chamber, ancillary chamber, and/or a component of the layer dispenser, (vi) optionally, dis-engaging the first filtering mechanism from the processing chamber, ancillary chamber and/or a component of the layer dispenser, and (vii) reconditioning the first filtering mechanism (e.g., cleaning and/or replacing the first filter thereof). Operations (i)-(vii) may be performed in any order and/or sequence, for example, sequentially. At least two of operations (i)-(vii) may be performed in parallel. At least two of operations (i)-(vii) may be performed sequentially. Reconditioning the first filtering mechanism may comprise removing the filter from the canister within the filtering mechanism. Reconditioning the first filtering mechanism may comprise drenching the filter within the canister. Drenching may comprise inserting a cleaning material (e.g., liquid, gas, semi-solid, and/or any other cleaning medium) into the filter. Drenching may be performed before, after, or during removal of the filter from the canister. Drenching may be performed before, after, or during the 3D printing. Replacing the first filtering mechanism may be performed when the second filter mechanism is in operation (e.g., during the 3D printing). Replacing may comprise replacing a canister. Replacing may comprise replacing a filter. Engaging and/or dis-engaging the filtering mechanism may comprise opening and/or closing one or more valves. Engaging and/or dis-engaging the filtering mechanism may be performed manually and/or automated (e.g., controlled). Engaging and/or dis-engaging the plurality of filtering mechanisms (e.g., plurality of canisters and/or filters) may be performed sequentially and/or in parallel. Operations (iv) and (vii) may be performed sequentially or in parallel.

FIGS. 19A-19B show examples of alternating filtering operation between a first filtering mechanism and a second filtering mechanism. FIG. 19A shows an example of connecting a first filtering mechanism (e.g., 1905) to the processing chamber (e.g., 1950) and the pump (e.g., 1955). Connecting may comprise engaging the first filtering mechanism to the processing chamber and/or the pump via one or more valves. Connecting the first filtering mechanism may comprise dis-engaging the second filtering mechanism (e.g., 1910) from the processing chamber and/or pump, via one or more valves. Engaging may comprise opening (denoted by a circle comprising an "X" in FIG. 19A) one or more gas flow valves (e.g., 1925, 1915). Opening of valves may allow gas (e.g., unfiltered gas, and/or gas comprising gas-borne material) to flow from the processing chamber into the first filtering mechanism. Dis-engaging may comprise closing (denoted by a black circle in the FIG. 19A) one or more valves (e.g., 1920, 1930). The closed valves may isolate the second filtering mechanism from the gas flow mechanism. At times, the first filtering mechanism and/or the second filtering mechanism may be purged. Purging may include inserting a gas into the first filtering mechanism (e.g., into the filter canister) through at least one valve (e.g., 1942) and/or into the second filtering mechanism through at least one valve (e.g., 1944). Purging may include discharging a gas from the first filtering mechanism through at least one valve (e.g., 1946) and/or from the second filtering mechanism through at least one valve (e.g., 1948). Purging the first filtering mechanism may be done before engaging the first filtering mechanism with the gas flow mechanism (e.g., comprising the processing chamber and/or ancillary chamber). Purging the second filtering mechanism may be done after dis-engaging the second filtering mechanism with the gas flow mechanism. In some examples, purging the first filtering mechanism and the second filtering mechanism may be done simultaneously. In some examples, purging the first filtering mechanism and the second filtering mechanism may be done sequentially. In some examples, the second filtering mechanism may be purged (e.g., simultaneously) when the first filtering mechanism in engaged and/or in operation as part of the gas flow mechanism. When the first filtering mechanism is engaged, the gas (e.g., filtered gas from the first filtering mechanism) may be circulated in the processing chamber and/or ancillary chamber (e.g., 1927). When the first filtering mechanism may be engaged, the gas (e.g., unfiltered gas and/or gas comprising gas-borne material from the processing chamber) may be circulated into the first filter canister. In some examples, the first filtering mechanism may be connected to the pump (e.g., 1955). The pump may be disposed adjacent to the ancillary chamber, for example, below or above the ancillary chamber. The pump may induce a flow of gas into the processing chamber and/or the first filtering mechanism. When the first filtering mechanism may be engaged, one or more sensors (e.g., 1935, 1940) may control (e.g., detect and/or monitor) a state of the first filtering mechanism. For example, a clogging sensor may monitor the amount of gas-borne material collected by the first filter. At least one reactive agent sensor (e.g., oxygen sensor and/or humidity sensor) may monitor the amount of reactive agent within at least one component of the first filtering mechanism. The filtering may be switched to a second filtering mechanism on detection (e.g., on detection of a filter full condition, and/or on reaching a pre-determined level of reactive agent(s)) of in-operable condition of the first filtering mechanism. The in-operable conditions may be pre-determined.

FIG. 19B shows an example of switching filtering mechanism for filtering the gas, and may follow FIG. 19A in operating sequence respectively. The switching may be performed (i) when at least a portion of the first filter within the first filtering mechanism (e.g., 1960) may be clogged or may be determined as unsafe to use (e.g., according to a sensor, 1990), (ii) when the second filtering mechanism (e.g., 1965) may be present and determined as safe to use (e.g., according to a sensor, 1995), (iii) after a predetermined amount of time, and/or (iv) after a predetermined amount of gas flowing through the filtering mechanism. Switching may comprise purging the second filtering mechanism, e.g., before engaging it with at least one component of the gas flow mechanism. Switching may comprise engaging the second filtering mechanism with at least one component of the gas flow mechanism (e.g., processing chamber). Engaging may comprise opening (denoted by a circle comprising "X" in FIG. 19B) one or more valves (e.g., 1975, 1985). Switching may comprise dis-engaging the first filtering mechanism. Dis-engaging may comprise closing (denoted by a black circle in FIG. 19B) one or more valves (e.g., 1970, 1980). The engaging of first filtering mechanism and dis-engaging of second filtering mechanism may be done simultaneously (e.g., in parallel) or sequentially. The engaging of the second filtering mechanism facilitates a non-interrupted filtering of gas within the gas flow mechanism (e.g., through the processing chamber and/or the ancillary chamber), e.g., during the 3D printing. At least one component of the second filtering mechanism (e.g., the filter) may be monitored. The engaging and/or dis-engaging of first filtering mechanism and the second filtering mechanism may be performed alternatingly to facilitate the non-interrupted filtering of gas that flow out of (e.g., expelled from) the processing chamber (e.g., during the 3D printing). The dis-engaged first filtering mechanism may be removed, replaced, cleaned, refurbished, and/or exchanged. In some examples, the dis-engaged first filtering mechanism may be purged (e.g., using a non-reactive, and/or inert gas). Purging the first filtering mechanism may comprise inserting a (non-reactive) gas into the first filtering mechanism through at least one valve (e.g., 1962). The inserted gas should not react with the gas-borne material to exceed combustion and/or ignition (e.g., below combustible and/or ignition standards in the jurisdiction). The gas borne material may be collected onto the filter in the filtering mechanism. Purging the first filtering mechanism may comprise discharging a (non-reactive) gas from the first filtering mechanism through at least one valve (e.g., 1972). The non-reactive gas may be a Nobel gas. In some embodiments, the filtering mechanisms are configured to provide filtered gas to an optical window purging system (e.g., 1901 and 1981), examples of which are described herein. In some embodiments, the filtering mechanisms include fine filters (e.g., 1902, 1903, 1982 and 1983). The fine filters may comprise HEPA filters.

In some embodiments, the filtering mechanism is operatively coupled to a pump. The pump may facilitate flow of gas (e.g., filtered gas) into the processing chamber and/or through the gas flow mechanism. The pump may facilitate recycling of gas (e.g., filtered gas) into the processing chamber and/or through the filter mechanism(s). The pump may control a property of gas flow (e.g., rate of flow, velocity of gas, and/or pressure of gas). At times, the pump may control a property of the gas-borne material (e.g., velocity, acceleration thereof in at least one component of the gas flow mechanism). The pump may be located adjacent to the filtering mechanism, ancillary chamber, and/or the processing chamber. The pump may be located below, above, and/or adjacent to a side of the ancillary chamber. The pump may be located below, above, and/or adjacent to a side of the processing chamber. The pump may facilitate maintaining a gas pressure within at least a portion of a gas flow mechanism of the 3D printer. The gas flow mechanism may comprise the processing chamber, the ancillary chamber, the build module, the first filtering mechanism, and/or the second filtering mechanism. The gas pressure may be controlled (e.g., to limit an ingress of atmosphere into at least one component of the gas flow mechanism). Controlling may comprise limiting occurrence of a negative pressure with respect to the ambient pressure, in at least one section of the gas flow mechanism. For example, controlling may comprise preventing formation of a negative pressure (with respect to the ambient pressure) in at least one section of the gas flow mechanism. For example, controlling may comprise preventing formation of a negative pressure (with respect to the ambient pressure) in the gas flow mechanism. The at least one section of the gas flow mechanism may comprise an area enclosing the pump (e.g., behind the pump relative to a direction of the gas flow). Controlling may comprise raising pressure (e.g., the pressure of the recirculating gas in the gas flow mechanism) within the gas recirculation system. The pressure may be raised such that there may be (e.g., substantially) no negative pressure within the gas flow mechanism, with respect to the ambient pressure. For example, the pressure in the area enclosing the pump may be at a positive pressure with respect to the ambient pressure, and the pressure within the gas recirculation system may be above the pressure in the area enclosing the pump (e.g., the area just behind the pump). At times, the gas flow pressure within the processing chamber and the pressure directly adjacent to the pump, may be different. The raised pressure may be at least about 1 psi, 2 psi, 3 psi, 4 psi, 5 psi, 6 psi, 7 psi, 8 psi, 9 psi, or 10 psi above the ambient pressure. The raised pressure may be any value between the afore-mentioned values, for example, from about 1 psi to about 10 psi, or from about 1 psi to about 5 psi. The raised pressure may be the pressure directly adjacent to the pump (e.g., behind the pump). The raised pressure may be the average pressure in the gas flow mechanism.

In some embodiments, a flow of a reactive agent (e.g., a reactive gas, such as an oxidizing gas) can cause the gas-borne material to react violently (e.g., react in a hazardous, dangerous, and/or perilous manner with respect to personnel and/or equipment). The violent reaction may comprise combustion, ignition, flaring, fuming, burning, bursting, explosion, eruption, or flaming. The violent reaction may be exothermic. The violent reaction may be difficult to contain and/or control once it initiates. The violent reaction may be thermogenic. The violent reaction may exert heat. The violent reaction may comprise oxidation. The 3D printing system may comprise purging. Purging may (e.g., substantially) reduce the likelihood (e.g., prevent) that the gas-borne material violently reacts (e.g., during the 3D printing). Purging may comprise evacuation of a gas (e.g., comprising the reactive agent) from one or more segments (e.g., a processing chamber, an ancillary chamber, a build module, and/or a filtering mechanism) of the 3D printing system. Purging may comprise evacuation of a gas (e.g., comprising a reactive agent) from one or more segments of the gas flow mechanism. A segment may include a compartment (e.g., processing chamber, ancillary chamber, a build module, and/or a filtering mechanism) and/or a channel (e.g., a gas conveying channel, and/or a pre-transformed material conveying channel). Purging may be performed on an individual (e.g., isolatable) segment of the 3D printing system. The isolatable segments may be physically isolated from the gas flow mechanism. The isolatable segments may be fluidly isolated from the gas flow mechanism (e.g., by shutting one or more valves). Purging may be performed on selectable segments of the 3D printing system. Purging may be performed on all segments of the 3D printing system. Purging may be performed individually and/or collectively. Purging of at least two segments may be performed in parallel. Purging of at least two segments may be performed sequentially. Purging may comprise exchanging large quantities of gas in a short amount of time.

In some embodiments, the reactive agent (e.g., oxygen) flows into the gas flow mechanism at a maximal rate (e.g., during the 3D printing). For example, the reactive agent may flow into the gas flow mechanism at a rate of at most about $5*10^{-2}$ liters per minute (L/min), $10^{-2}$ L/min, $5*10^{-3}$ L/min, $10^{-3}$ L/min, $5*10^{-4}$ L/min, $5*10^{-4}$ L/min, $5*10^{-5}$ L/min, $10^{-5}$ L/min, or $5*10^{-6}$ L/min. The reactive agent may flow into the gas flow mechanism any rate between the aforementioned rates (e.g., from about $5*10^{-2}$ L/min to about $5*10^{-6}$ L/min, or from about $10^{-3}$ L/min to about $10^{-5}$ L/min).

In some embodiments, the likelihood of the violent reaction is a combination of the velocity of gas, gas temperature, gas pressure, concentration of the reactive agent, concentration of the gas-borne material, or any combination thereof. In an example, in an elevated level of the reactive agent in the one or more segments (at a temperature and pressure), the purging may comprise slow gas flow (e.g., excluding use of a pump). When the reactive species and/or gas-borne material is lowered below a threshold value (at the temperature and pressure), purging may comprise faster gas flow (e.g., using a pump that facilitates the faster flow of the gas). The slow gas flow may reduce the likelihood (e.g., prevent) a violent reaction of the reactive agent with the gas-borne material (when the reactive agent and/or gas-borne material concentration is height). In reduced levels of the reactive agent and/or gas-borne material (e.g., in the temperature and pressure), faster gas flow velocity may be (e.g., substantially) safe to use as the chance of a violent reaction of the reactive agent with the gas-borne material is lowered. Purging can be performed (i) without engaging the pump, (ii) while engaging the pump, (iii) or any combination thereof. When at most a desired low level of the reactive agent is present in the gas flow mechanism, purging ceases, and the gas flow mechanism engages in a maintenance mode. In some embodiments, at most a desired low level of the reactive agent is present, and purging is not required. In some embodiments, purging is initiated after the maintenance mode is engaged, for example, when the level of the reactive agent and/or gas-borne material exceeds a minimum level (e.g., that increases the chance for the violent reaction). In some embodiments, the gas flow mechanism may switch between the purging mode(s) and maintenance mode, depending on the level of the gas-borne material and/or reactive agent.

In some embodiments, purging includes (i) operating a pump in a purging mode, termed herein as a "pump purge mode", (ii) without operation of a pump, termed herein as a "no pump purge mode", and/or (iii) maintaining a predetermined pressure value, reactive agent concentration, and/or gas-borne material concentration in the gas flow mechanism, termed herein as a "maintenance mode." Purging may be performed in the one or more segments of the gas flow mechanism (independently and/or collectively) in the pump purge mode and/or the no-pump purge mode. Purging may be performed independently in at least two segments of the gas flow mechanism in the pump purge mode and/or the no-pump purge mode. Purging may be performed collectively in at least two segments of the gas flow mechanism in the pump purge mode and/or the no-pump purge mode. The pump purge mode may include purging of one or more selectable segments of the gas flow mechanism that are operatively (e.g., fluidly) coupled to the pump. In some embodiments, a designated pump is operatively coupled to a segment of the gas flow mechanism. For example, a first designated pump may be operatively coupled to a first segment of the gas flow mechanism, and a second designated pump may be operatively coupled to a second segment of the gas flow mechanism. In some examples, the 3D printing system may comprise a (e.g., pressure) maintenance mode. The maintenance may include maintaining a (e.g., pre-determined) pressure level within one or more segments of the gas flow mechanism. The pressure maintenance mode may comprise light purging. In some embodiments, the stream of gas evacuated in the light purging comprises a lower rate of gas evacuation as compares to the pump/no-pump purging modes. For example, the gas evacuation in the light purging comprises expelling the gas from the gas flow mechanism through a valve having a small opening (e.g., an opening having a small cross section), as compared to the valves used in the pump/no-pump purge modes. For example, the (e.g., inert) gas entrance in the light purging comprises flowing-in the (e.g., inert) gas from (e.g., from an external source) through a valve having a small opening (e.g., an opening having a small cross section), as compared to the valves used in the pump/no-pump purge modes. The light purging comprises fine tuning of the gas pressure and/or content in at least one section of the gas flow mechanism. In some examples, the maintenance mode excludes purging. The pressure maintenance mode may comprise lowering (e.g., by evacuating) a concentration of a reactive agent and/or gas-borne material from the one or more segments of the gas flow mechanism. Atmospheric exchange (e.g., evacuation of contaminated gas, and entrance of the requested (e.g., inert) gas) may be continuous during the operation of the mode. The atmospheric exchange may be performed at one or more intervals of time. The atmospheric exchange may be performed for a predetermined amount of time. The atmospheric exchange may be performed until a predetermined amount of reactive agent is evacuated from the one or more segments of the gas flow mechanism (e.g., as measured by rate of gas evacuation). The atmospheric exchange may refer to entrance of requested (e.g., inert) gas and evacuation of the reactive agent, from at least a segment of the gas flow mechanism. The purging modes may be switched before, after, and/or during 3D printing. The purging modes may comprise (i) pump purge mode, (ii) no-pump purge mode, and/or (iii) pressure maintenance mode. Switching may comprise switching from a first mode to a second mode (e.g., comprising switching the position of one or more valves and/or the operation status of the pump). Switching may depend on a first threshold value and/or a second threshold value of a level of the reactive agent (e.g., oxidizing gas level). For examples, switching from a first mode to a second mode may depend on the first threshold value of the reactive agent in at least a section of the gas flow mechanism. Switching from the second mode to the first mode may depend on the second threshold value of the reactive agent in at least a section of the gas flow mechanism. In some examples, the first threshold value and the second threshold value may be (e.g., substantially) the same value. In some examples, the first threshold value and the second threshold value may be different (e.g., forming a hysteresis). The first threshold value may be lower than the second threshold value. The second threshold value may be lower than the first threshold value. Switching may be done manually and/or automatically. For example, switching between the modes may be controlled (e.g., using a controller, and/or processing element). Switching may comprise (i) monitoring a level of the reactive agent, gas-borne material, gas flow velocity, pressure, and/or temperature within one or more segments of the 3D printing system, (ii) comparing the level with a predetermined first threshold value and/or second threshold value of the level, and (iii) switching from a first mode to a second mode, based on the comparison result. For example, switching may comprise (i) monitoring a level of the reactive agent, within one or more segments of the 3D printing system, (ii) comparing the reactive agent level with a predetermined first threshold value and/or second threshold value, and (iii) switching from a first mode to a second mode, based on the comparison result. The first threshold value and/or second threshold value may include a range of values from the first threshold value to the second threshold value. The first threshold value and/or second threshold value may be at least about 1 parts per million (i.e., ppm), 10 ppm, 20 ppm, 30 ppm, 40 ppm, 50 ppm, 60 ppm, 70 ppm, 80 ppm, 90 ppm, 100 ppm, 110 ppm, 120 ppm, 150 ppm, 200 ppm, 300 ppm, 400 ppm, 500 ppm, 600 ppm, 700 ppm, 800 ppm, 900 ppm, 1000 ppm, 1100 ppm, 1200 ppm, 1500 ppm, 2000 ppm, 2100 ppm, 2200 ppm, 2500 ppm, 2700 ppm, 3000 ppm, 3100 ppm, 3200 ppm, 3500 ppm, 3700 ppm, 4000 ppm, 4100 ppm, 4200 ppm, 4500 ppm, 5000 ppm, 6000 ppm, 6500 ppm, 7000 ppm, 8000 ppm, 9000 ppm, or, 10,000 ppm. The first threshold value and/or second threshold value may be at most about 10 ppm, 20 ppm, 30 ppm, 40 ppm, 50 ppm, 60 ppm, 70 ppm, 80 ppm, 90 ppm, 100 ppm, 110 ppm, 120 ppm, 150 ppm, 200 ppm, 300 ppm, 400 ppm, 500 ppm, 600 ppm, 700 ppm, 800 ppm, 900 ppm, 1000 ppm, 1100 ppm, 1200 ppm, 1500 ppm, 2000 ppm, 2100 ppm, 2200 ppm, 2500 ppm, 2700 ppm, 3000 ppm, 3100 ppm, 3200 ppm, 3500 ppm, 3700 ppm, 4000 ppm, 4100 ppm, 4200 ppm, 4500 ppm, 5000 ppm, 6000 ppm, 6500 ppm, 7000 ppm, 8000 ppm, 9000 ppm, or, 10,000 ppm. The first threshold value and/or second threshold value may be a range between any of the afore-mentioned values, for example, from about 1 ppm to about 10,000 ppm, from about 3000 ppm to about 5000 ppm, from about 300 ppm to about 500 ppm, from about 1 ppm to about 300 ppm, from about 1 ppm to about 500 ppm, from about 10 ppm to about 200 ppm, from about 500 ppm to about 3000 ppm, or from about 5000 ppm to about 10000 ppm. In some examples, the first reactive agent threshold value for switching from a no-pump purge mode to a pump purge mode, is higher than the second reactive agent threshold value for switching from a pump purge mode to a maintenance mode. Higher may be by 0.25, 0.5, 1, 1.25, 1.5, 1.75, 2, 2.25, 2.5, 2.75, 3, 3.25, 3.5, 3.75, or 4 orders of magnitude.

In some embodiments, the no-pump purge mode and/or pump purge mode comprises performing independent purging. Independent purging may include performing purging on one or more independent (e.g., isolatable) segments (e.g., a processing chamber, and/or a filtering mechanism) of the 3D printing system. A segment may be operatively coupled to a pump (e.g., in the pump purge mode). A segment may not be coupled to a pump (e.g., in the no-pump purge mode). The no-pump purge mode may be facilitated by the velocity of the requested gas that is inserted (e.g., flushed) into the at least one segment. In some embodiments, the inserted gas causes the contaminated gas (e.g., comprising the reactive agent) to expel from the at least one segment (e.g., through a valve, e.g., a vent valve). One or more isolated segments of the 3D printing system may be purged in parallel to (e.g., simultaneously with) each other. One or more isolated segments of the 3D printing system may be purged sequentially (e.g., first segment may be purged after a second segment in sequence). One or more (e.g., isolated) segments of the 3D printing system may be purged individually (e.g., neither simultaneously, nor in a sequence), simultaneously, sequentially, or any combination thereof. Purging a segment may comprise controlling (e.g., reducing, lowering, and/or maintaining) a level of a reactive agent, gas velocity, temperature, pressure, and/or gas-borne material, such that the reactive agent level may be within a pre-determined (e.g., configurable) threshold value, within the segment. For example, purging a segment may comprise controlling (e.g., reducing, lowering, and/or maintaining) a level of a reactive agent (e.g., oxidizing gas) such that the reactive agent level may be within a pre-determined (e.g., configurable) threshold value, within the segment. The pre-determined threshold value may comply with at least one safety standard in the jurisdiction (e.g., NFPA). The pre-determined threshold value may be within a safe value for gas circulation (e.g., at a velocity, temperature, and/or pressure), for example, as specified in one or more safety standards in the jurisdiction. Purging may comprise insertion of a low reactive gas (e.g., inert gas, e.g., argon) into at least a portion of the segment. Purging may comprise discharging a gas (e.g., comprising a reactive gas agent, for example, an oxidizing gas) from at least a portion of the segment. Insertion and/or discharge of gas may comprise using one or more valves in the segment. Purging may comprise having at least one incoming (e.g., requested) gas through an opened inlet valve and at least one outgoing gas through an opened outlet valve. The requested gas may be from an external source, e.g., a gas cylinder. For example, a gas purge inlet valve may be opened to facilitate insertion of the requested gas into the segment. A gas purge outlet (e.g., vent) valve may be opened to facilitate discharge of (e.g., contaminated) gas from the segment. The gas purge inlet valve and/or gas purge outlet (e.g., vent) valve may be operated manually and/or automatically (e.g., controlled). The gas purge inlet valve and/or gas purge outlet valve may be any valve described herein. The one or more valves may be operatively (e.g., fluidly) coupled to the segment. One or more valves may be closed to facilitate independent and/or isolated purging of at least one segment. For example, one or more valves of the non-selected segments (e.g., the segment that is not selected for purging) may be closed. For example, to facilitate purging of a first filtering mechanism, one or more valves of a second filtering mechanism and/or processing chamber may be closed. Purging may include controlling (e.g., monitoring, sensing) a reactive agent level, gas temperature, gas pressure, and/or gas velocity within the isolated segment. Purging may include insertion and/or discharge of gas until the reactive agent level within the segment reaches a pre-determined threshold value. For example, independent purging may be performed until an oxidizing gas level reaches a first threshold value (e.g., 3000 ppm). The first threshold value may be configurable before, during, and/or after 3D printing. Independent purging may be done before, and/or after 3D printing, for example, after a 3D printing of at least one 3D object, between 3D printing cycles of 3D objects, and/or between a pre-transformed material layer dispensing when building a 3D object. Independent purging may be done during the 3D printing, for example, the independent purging mode may be entered into from a collective purging mode, when the gas level within one or more segments in the collective purge mode rises above the pre-determined threshold value for the one or more segments. In some examples, the pump may not be in operation during the independent purging mode (e.g., purging of independent/isolated segments). The pump may not be in operation to (e.g., substantially) prevent violent reaction (e.g., ignition) of reactive (e.g., inflammable) gas-borne material within one or more independent/isolated segments of the 3D printing system.

In some embodiments, the no-pump purge mode and/or pump purge mode comprises performing collective purging. Collective purging may include purging a plurality of segments (e.g., two, three, four, and/or five) within the 3D printing system together. The plurality of segments may be operatively (e.g., fluidly) coupled to the pump. A first segment may be operatively coupled to a second segment (e.g., through the pump, valve, and/or a channel). Collective purging may include opening one or more valves for (fluidly) connecting one or more segments (e.g., opening one or more valves for the processing chamber and one or more valves for the filtering mechanism) to the pump. Opening of one or more valves may be done (e.g., controlled) manually and/or automatically. Collective purging may include selecting one or more segments for purging. For example, a first filtering mechanism and a second filtering mechanism may be selected for collective purging, and a processing chamber may not be selected for purging. For example, the first filtering mechanism and the processing chamber may be selected for collective purging, and the second filtering mechanism may not be selected for purging. In some embodiments, the pump (e.g., a blower) is coupled to the purged sections and is in operation when performing collective purging. In some embodiments, the pump (e.g., a blower) is not coupled to the purged sections and/or is not in operation when performing collective purging. The engagement of the pump may depend on the temperature, pressure, velocity, gas-borne material concentration, and/or reactive species concentration, of the gas in the segments. In some embodiments, the purging and/or maintenance may be done before the 3D printing (e.g., to ready the 3D printer for 3D printing). The pump may induce a gas circulation within a gas circulation loop of the gas flow mechanism. A gas recirculation loop may comprise conveyance (e.g., flow) of a gas (e.g., filtered and/or clean) gas into at least a portion of the processing chamber. The gas circulation loop may comprise conveyance of gas from the filtering and/or recycling mechanism into at least a portion of the processing chamber. The gas recirculation loop may comprise conveyance of gas (e.g., unfiltered gas including gas borne material) from the processing chamber into the filtering and/or recycling mechanism. The conveyance of the gas may be induced by the pump and/or by influx of a requested (e.g., inert) gas into the gas flow mechanism.

In some embodiments, purging may comprise maintaining a pressure level of reactive agent (e.g., an oxidizing gas), and/or gas-borne material. Pressure may be maintained at a pre-determined (e.g., configurable) level and/or within a pre-determined (e.g., configurable) range. Pressure maintenance may comprise maintaining the same pressure in one or more selected segments (e.g., within an error value of at most 20%, 10%, 5%, or 1%). Pressure maintenance may comprise maintaining the same pressure in all segments that may be operatively coupled to the pump (e.g., within an error value of at most 20%, 10%, 5%, or 1%). Pressure maintenance may comprise maintaining different pressure (e.g., within an error value of at most 20%, 10%, 5%, or 1%) within different segments. Pressure maintenance may be performed during 3D printing (e.g., when transforming the pre-transformed material, and/or irradiating with an energy beam). Pressure maintenance may comprise controlling reactive agent level within one or more segments during at least a portion of 3D printing (e.g., during operation of the energy beam). Pressure maintenance may comprise controlling one or more valves (e.g., a modulating valve). A modulating valve may be operatively coupled to a segment of the 3D printing system. Pressure maintenance may include facilitating a finer control of gas flow into the segment (e.g., during maintenance mode). The modulating valve may facilitate control of conveyance (e.g., insertion, amount, and/or flow rate) of gas into at least a segment of the gas flow mechanism. The modulation valve may have a smaller cross section (e.g., diameter) than a purge valve (e.g., gas purge inlet valve and/or a gas purge outlet valve). The inlet modulation valve may facilitate slow mass flow of gas into the gas flow mechanism as compared to a mass flow through a gas purge inlet valve. The outlet modulation valve may facilitate slow mass flow of gas from the gas flow mechanism as compared to a mass flow through a gas purge outlet valve. The modulation valve (e.g., outlet and/or inlet) may facilitate pressure maintenance within at least a portion of a segment of the 3D printing system, that may be operatively coupled to the pump. Pressure maintenance may include controlling the pressure in real-time. Real time may be during at least a portion of 3D printing (e.g., during irradiation, planarization of an exposed surface of the material bed, dispensing pre-transformed material, recycling, filter exchange, and/or pre-transformed material conveyance). In some examples, during and/or after pressure maintenance mode, gas may be circulated until occurrence of a predetermined threshold value of a physical property (e.g., time, and/or temperature), or a signal (e.g., end of a 3D printing cycle).

Figure 20:
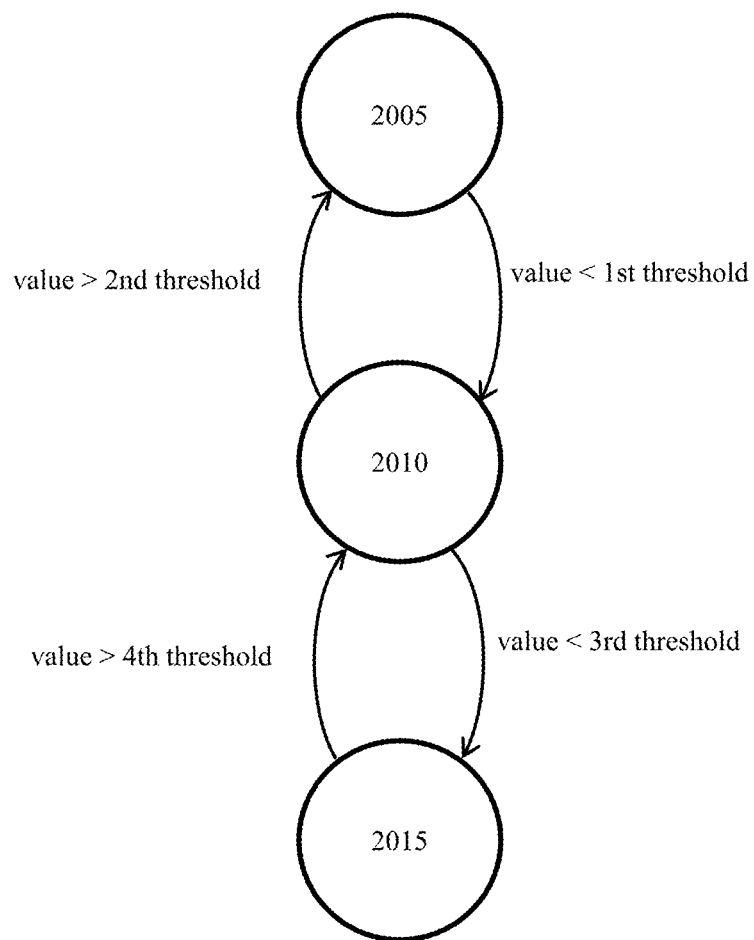
FIG. 20 schematically illustrates various modes of operation of components of a 3D printer.

In some embodiments, purging may comprise maintaining a reactive agent level (e.g., an oxidizing gas level) at a pre-determined level and/or between a pre-determined range (e.g., between a first threshold value and a second threshold value, e.g., that form a hysteresis). The pre-determined level and/or range may be for a plurality of segments (e.g., two, three, and/or all) within the gas flow mechanism of the 3D printing system. The pre-determined level and/or range may be of an individual (e.g., isolatable) segment of the gas flow mechanism. The pre-determined level and/or range configured for a segment. The operation modes of the gas flow mechanism may be switched based on the pre-determined level and/or range. FIG. 20 shows an example of switching between the modes based on pre-determined threshold levels. For example, the first operation mode (e.g., 2005) may be initially performed, when the reactive agent level is above a first threshold value. The first mode may comprise no-pump purge mode or independent purging. The second operation mode (e.g., 2010) may be initiated when the reactive agent level is at or below the first threshold value. The mode may be switched back from the second mode to the first mode when the reactive agent level exceeds a second threshold value. The second mode may comprise collective purging or pump purge mode. The third operation mode (e.g., 2015) may be initiated when the reactive agent level is at or below a third threshold value. The third mode may comprise the maintenance mode. The third operation mode may be entered into from the second operation mode. The third operation mode may be switched back to a second operation mode when the reactive agent level exceeds a fourth threshold value. The second threshold value can be above the first threshold value. The fourth threshold value can be above the third threshold value. The second threshold value can be above: the third threshold value and the fourth threshold value. The first threshold value can be above: the third threshold value and the fourth threshold value.

In some embodiments, a segment is operatively coupled to one or more valves. The valve may facilitate adequate (e.g., minimal) use of gas within one or more segments of the 3D printing system. The valve may facilitate flow of gas through the valve (e.g., FIG. 14, 1410, 1420, and/or 1462), connection of one or more segments, and/or disconnection of one or more segments. The valve may facilitate insertion of a (e.g., requested) gas into a segment of the gas flow mechanism (e.g., a gas purge inlet valve, FIG. 14, 1455, 1465, and/or 1430,). The valve may facilitate discharge of a (e.g., contaminated) gas from the segment (e.g., a gas purge vent valve, FIG. 14, 1475, and/or 1435). The valve may facilitate controlling a physical property (e.g., atmosphere, pressure, temperature and/or reactive agent level) within the segment, for example, using a modulating valve (e.g., outlet modulating valve 1445, and/or inlet modulating valve 1425). At least two valves in the gas flow mechanism may have a different cross-section. At least two valves in the gas flow mechanism may have the same cross section. The valves may be manually and/or automatically controlled. The valves may be controlled based on a signal from one or more sensors and/or controller. Valves may be controlled (e.g., opened, closed and/or adjusted) before, during, and/or after the 3D printing.

In some embodiments, one or more segments of the gas flow mechanism may be operatively (e.g., physically and/or flowably) coupled to the processing chamber. The coupling may be direct and/or indirect. The coupling may be through a channel (e.g., through a gas conveying and/or a material conveying channel). Examples of indirect coupling include through an atmosphere in the segment. For example, an atmosphere of the processing chamber may be coupled to an opening in at least one component of a layer dispensing mechanism (e.g., recoater), the layer dispensing mechanism may be in turn coupled to a pre-transformed material conveyance system, e.g., that comprises a bulk reservoir. The pre-transformed material conveyance system may be any pre-transformed material conveyance system such as, for example, the one described in Provisional Patent Application Ser. No. 62/471,222 filed Mar. 14, 2017, titled "OPERATION OF THREE-DIMENSIONAL PRINTER COMPONENTS," which is entirely incorporated herein by reference. A material removal mechanism opening may be opened into the processing chamber atmosphere. For example, a material dispenser exit opening may be opened to the processing chamber atmosphere and thus fluidly connect the material conveyance mechanism to the gas flow mechanism. The one or more segments may include a segment that comprises a gas-borne material. A reactive agent (e.g., reactive species such as an oxidizing gas) within the at least one segment of the gas flow mechanism (e.g., filtering mechanism) may be operatively coupled (e.g., fluidly connected and/or shared) with the pre-transformed material conveyance system. The flow of gas-borne material within one or more segments of the 3D printing system may violently react with the reactive agent. To reduce the likelihood of (e.g., prevent) the violent reaction (e.g., to ensure safety of the 3D printing system and/or personnel), purging may be performed within the one or more segments of the gas flow mechanism.

In some embodiments, material is ejected to the atmosphere of the processing chamber and/or processing cone during at least a portion of the 3D printing. At least a portion of the ejected material may be included in the gas-borne material. At least some of the ejected material may be returned to the material bed. For example, at least about 1%, 5%, 10%, 20%, 30%, 50%, or 80% of the ejected material may be returned to the material bed (e.g., after being recycled, e.g., reconditioned and/or separated). For example, at most about 5%, 10%, 20%, 30%, 50%, or 90% of the ejected material may be returned to the material bed (e.g., after being recycled, e.g., reconditioned and/or separated). The ejected material that is returned to the material bed may be between any of the aforementioned values (e.g., from about 1% to about 90%, from about 5% to about 80%, or from about 5% to about 30%).

In some embodiments, (e.g., substantially) all the volume of the processing cone (e.g., FIG. 15, 1530), is exchanged during a 3D printing cycle at least once. The volume may comprise the atmosphere. In some embodiments, (e.g., substantially) all the volume of the processing chamber (e.g., FIG. 8, 826), is exchanged during a 3D printing cycle at least once. Substantially all the volume may be at least about 70%, 80%, 90%, 95%, 95%, or 99% of the total volume (percentages are volume per volume). Substantially all the volume may be any value between the afore-mentioned values (e.g., from about 70% to about 99%, from about 80% to about 99%, or from about 90% to about 99%). At times, the volume exchanged during a 3D printing cycle may be exchanged at least 1 time ("*"), 2*, 3*, 4*, 5*, 6*, 7*, 8*, 9*, or 10*. The volume (e.g., atmosphere) may be exchanged any number of times between the afore mentioned number of times (e.g., from 1* to 10*, from 1* to 5*, or from 1* to 3*).

In some embodiments, the gas flows at a speed in the processing cone and/or processing chamber. The gas flow may be from one end of the processing chamber to its opposing end. The gas flow may be from one end of the processing cone to its opposing end. The gas may flow laterally. At least a portion of the gas flow may be horizontal. At least a portion of the gas flow may be laminar. The (e.g., average or mean) speed of the gas flow may be at least about 10 millimeters per second (mm/sec), 20 mm/sec, 50 mm/sec, 80 mm/sec, 100 mm/sec, 200 mm/sec, 400 mm/sec, or 500 mm/sec. The (e.g., average or mean) speed of the gas flow may be at most about 20 mm/sec, 50 mm/sec, 80 mm/sec, 100 mm/sec, 200 mm/sec, 4000 mm/sec, or 600 mm/sec. The (e.g., average or mean) speed of the gas flow may be at any value between the afore-mentioned values (e.g., from about 10 mm/sec to about 600 mm/sec, from about 10 mm/sec to about 300 mm/sec, or from about 50 mm/sec to about 200 mm/sec).

In some instances, the atmosphere (e.g., comprising a gas) is exchanged (e.g., during the 3D printing or a portion thereof). Exchanged may comprise changing the position of one or more atmospheric components (e.g., gas and/or debris). In some examples, the time it takes for an atmospheric component to leave the processing cone and/or chamber is at most about 1 second, 2 sec, 5 sec, 8 sec, 10 sec, 15 sec, 20 sec, 30 sec, 50 sec, 1 min, 5 min, 10 min, or 30 min. In some examples, the time it takes for an atmospheric component to leave the processing cone and/or chamber is of any time values between the afore-mentioned values (e.g., from about 1 sec to about 30 min, from about 1 sec to about 30 sec, from about 1 sec to about 15 sec, or from about 5 sec to about 1 min). In some embodiments, the gaseous atmosphere is flowing during at least a portion of the 3D printing. The gaseous atmosphere may flow at a rate of at least about 10 cubic feet per minute (CFM), 20 CFM, 30 CFM, 50 CFM, 80 CFM, 100 CFM, 300 CFM, 500 CFM, 800 CFM, 1000 CFM, or 3000 CFM. The gaseous atmosphere may flow at a rate between any of the afore-mentioned rates (e.g., from about 10 CFM to about 3000 CFM, from about 10 CFM to about 1000 CFM, or from about 100 CFM to about 500 CFM). The gaseous atmosphere may be translated by a pump (e.g., a blower).

In some examples, the processing cone and/or processing chamber is devoid of standing vortices, and/or turbulence that are larger than a threshold value. For example, the processing cone and/or processing chamber may be devoid of standing vortices, and/or turbulence that have a FLS of at least about 0.25 millimeter (mm), 0.5 mm, 1 mm, 2 mm, 5 mm, 10 mm, 15 mm, 20 mm, or 50 mm. The processing cone may be devoid of standing vortices, and/or turbulence that have a FLS greater than any value between the afore-mentioned values (e.g., from about 0.25 mm to about 50 mm, from about 0.5 mm to about 20 mm, or from about 1 mm to about 20 mm). In some embodiments, the processing chamber and/or processing cone may be (e.g., substantially) devoid of standing vortices and/or turbulence. The standing vortex may be horizontal, angular, and/or angled.

In some embodiments, a non-gaseous material is disposed in the atmosphere. The material may be debris (e.g., soot), or pre-transformed material (e.g., powder). The material may be dispersed in the atmosphere of the processing chamber and/or cone. The debris may be ejected to the atmosphere of the processing chamber and/or cone during at least a portion of the 3D printing. In some embodiments, most of the material that is ejected during the 3D printing is evacuated by the gas flow. Most of the evacuated material may be at least about 70%, 80%, 90%, 95%, 98%, or 99% of the total material (percentages are volume per volume). Substantially all the material may be any value between the afore-mentioned values (e.g., from about 70% to about 99%, from about 80% to about 99%, or from about 90% to about 99%).

In some embodiments, during at least a portion of the 3D printing, pre-transformed material is transformed (e.g., using an energy beam). The transformed material may transfer to the atmosphere of the processing cone and/or processing chamber (e.g., as debris and/or plasma). At times, at least a portion of the material that transfers to the atmosphere may have a (e.g., average or mean) FLS of at most about 20 micrometers (μm), 15 μm, 10 μm, 8 μm, 5 μm, 4 μm, 3 μm, 2 μm, 1 μm, or 0.5 μm. At least a portion of the material that transfers to the atmosphere may have a (e.g., average or mean) FLS of any value between the afore-mentioned values (e.g., from about 15 μm to about 15 μm, from about 15 μm to about 15 μm, from about 15 μm to about 15 μm, from about 15 μm to about 15 μm). The portion of the material that transfers to the atmosphere having the above-mentioned (e.g., average or mean) FLS, may be at least about 70%, 80%, 90%, or 95% of the total material that transfers to the atmosphere (e.g., debris ejected by the vaporization of the transformed material, e.g., using the energy beam). The portion of the material that transfers to the atmosphere may be carried by the gas flow.

In some embodiments, the atmosphere of the processing cone and/or chamber comprises debris and/or particulate material. The debris and/or particulate material may be at most 100 ppm, 50 ppm, 10 ppm, 5 ppm, 1 ppm, 500 ppb, 250 ppb, 150 ppb, 100 ppb, or 50 ppb of the volume of the processing cone and/or chamber (calculated weight per weight). The debris and/or particulate material may be a portion of the volume of the processing cone and/or chamber (calculated weight per weight) between any of the afore-mentioned values (e.g., from about 100 ppm to about 50 ppb, from about 10 ppm to about 50 ppb, from about 5 ppm to about 50 ppb, or from 1 ppm to about 50 ppb).

In some embodiments, particulate material and/or debris is ejected into the atmosphere of the processing chamber and/or processing cone during at least a portion of the 3D printing. In some embodiments, at least a portion of the ejected material (comprising debris and/or particulate material) remains in the processing cone and/or processing chamber for at least about 0.1 second (sec), 0.2 sec, 0.5 sec, 1 sec, 5 sec, 10 sec, 30 sec, 50 sec, or 80 sec. In some embodiments, the at least a portion of the ejected material remains in the processing cone and/or processing chamber for any time period between the above-mentioned time periods (e.g., from about 0.1 sec to about 80 sec, from about 0.5 sec to about 10 sec, from about 0.1 sec to about 5 sec, or from about 0.1 sec to about 10 sec). The at least a portion of the ejected material that remains in the processing chamber and/or cone (e.g., for the above-mentioned time (periods)) may be at most about 0.001%, 0.005%, 0.01%, 0.05%, 0.1%, 0.5%, or 1% of the total ejected material (calculated either volume per volume or weight per weight).

In some embodiments, the gas flow mechanism comprises one or more sensors (e.g., FIGS. 14, 1470, 1480, 1485, 1490, 1495, 1415 and 1416). The sensor may (e.g., continuously) operate during at least a portion of the 3D printing process. The sensor may be controlled (e.g., manually and/or automatically). For example, the sensor may be activated and/or de-activated by a controller. The sensor may be placed between the enclosure and the recycling system. The sensor may be placed within the enclosure. The sensor may be placed between the inlet portion and the processing chamber. The sensor may be placed between the outlet portion and the processing chamber. The sensor may comprise pressure sensors, position sensors, velocity sensors, optical sensors, mass flow sensors, gas flow sensors, motion sensors, thermal sensors, pressure transducers, or any other sensor mentioned herein.

In some embodiments, the controller is operatively coupled to any system, mechanism, or apparatus disclosed herein (or any of their components). The term "operatively coupled" or "operatively connected" refers to a first mechanism that is coupled (or connected) to a second mechanism to allow the intended operation of the second and/or first mechanism.

In some embodiments, the gas flow mechanism includes a controller (e.g., a variable frequency driver) to control the gas flow rate. The gas flow mechanism may sense the rate of gas flow and/or the rate of mass flow. Gas flow sensors may comprise sensing the volumetric flow of gas. Mass flow sensors may comprise sensing the mass flow of gas. Based on the sensed rate, the controller may direct the inlet portion and/or outlet portion to alter the amount of gas flow. The alteration of the gas flow may comprise (i) closing an opening at least in part, (ii) reshaping the opening, (iii) changing a position of a ledge, or (iv) changing a position of a baffle. The magnitude and/or velocity of gas may be controlled. Based on the sensed rate of velocity and/or magnitude of the sensed gas, the velocity and/or magnitude of gas that exits the recycling mechanism may be altered. Altered may comprise increasing the gas velocity. Altered may comprise decreasing the gas velocity. Altered may comprise statically setting the velocity of the gas. Altered may comprise dynamically changing the velocity of the gas (e.g., based on a sensed gas value). The dynamic change may comprise a closed loop control. The dynamic change may comprise a feedback loop control. The dynamic change may comprise comparison to a target value. Altered may comprise statically setting the magnitude of gas. Altered may comprise dynamically changing the magnitude of gas.

In some embodiments, the gas flow mechanism comprises a sensor (e.g., optical sensor) that senses a composition of gas. The sensor may be operatively coupled to a gas filtering mechanism. The sensor may sense impurities (e.g., oxygen, water) within the gas. The sensor may sense reactive species (e.g., oxidizing gas, water) within the gas. The gas may be reconditioned based on the sensed impurities.

In some embodiments, the gas flow mechanism comprises at least one sensor that senses the amount of debris in the enclosure. For example, the sensor may be an optical sensor. For example, the sensor may be a plasma. The sensor may be a spectroscopic sensor. The sensor may be operatively coupled to the pump and/or to the valve. A controller may control the velocity of at least one gas stream (e.g., within the multiplicity of incoming gas streams to the processing chamber). The control may take into account a signal from the sensor. For example, when the enclosure contains a large amount of debris, the controller may direct a stronger flow of the gas at least into the processing cone (e.g., into the enclosure). For example, when the enclosure contains a small amount of debris, the controller may direct a softer flow of the gas at least into the processing cone (e.g., into the enclosure). The at least one sensor may sense a debris in a portion of the enclosure (e.g., in the processing cone). The at least one sensor may comprise a plurality of sensors. A controller may individually control the velocity of at least two of a plurality of gas streams (e.g., within the multiplicity of incoming gas streams to the chamber). A controller may collectively control the velocity of at least two of a plurality of gas streams (e.g., within the multiplicity of incoming gas streams to the chamber). At times, at least two gas streams are controlled by separate controllers (e.g., that makeup a control system). At times, at least two gas streams are controlled by the same controller. The control may take into account a signal from the sensor which provides information on the concentration, type, and/or location of the debris at least in the processing cone (e.g., in the processing chamber). For example, the processing cone may contain a large amount of debris in a first enclosure atmosphere location and a small amount of debris in a second enclosure atmosphere location, the controller may direct a stronger flow of the gas to the first location and a softer stream of gas to the second location. The first and second atmosphere locations may differ in their horizontal and/or vertical position.

In some embodiments, the controller adjusts the relative flow of the individual gas streams based on a debris in a particular position in at least the atmosphere of the processing chamber (e.g., in the enclosure). For example, when the enclosure contains debris that slows down the flow of a gas stream, the controller may direct an increase of the flow of that gas stream (e.g., to that position), and/or slowing down the gas flow in adjacent gas streams (e.g., to direct the debris towards that adjacent gas streams). For example, when the enclosure contains debris that absorbs and/or deflects the energy beam that is directed towards the material bed (e.g., FIG. 8, 801), the controller may direct an increase of the flow of that gas stream (e.g., to that position), and/or slow down the gas flow in adjacent gas streams (e.g., to direct the debris towards that adjacent gas streams).

Figure 14:
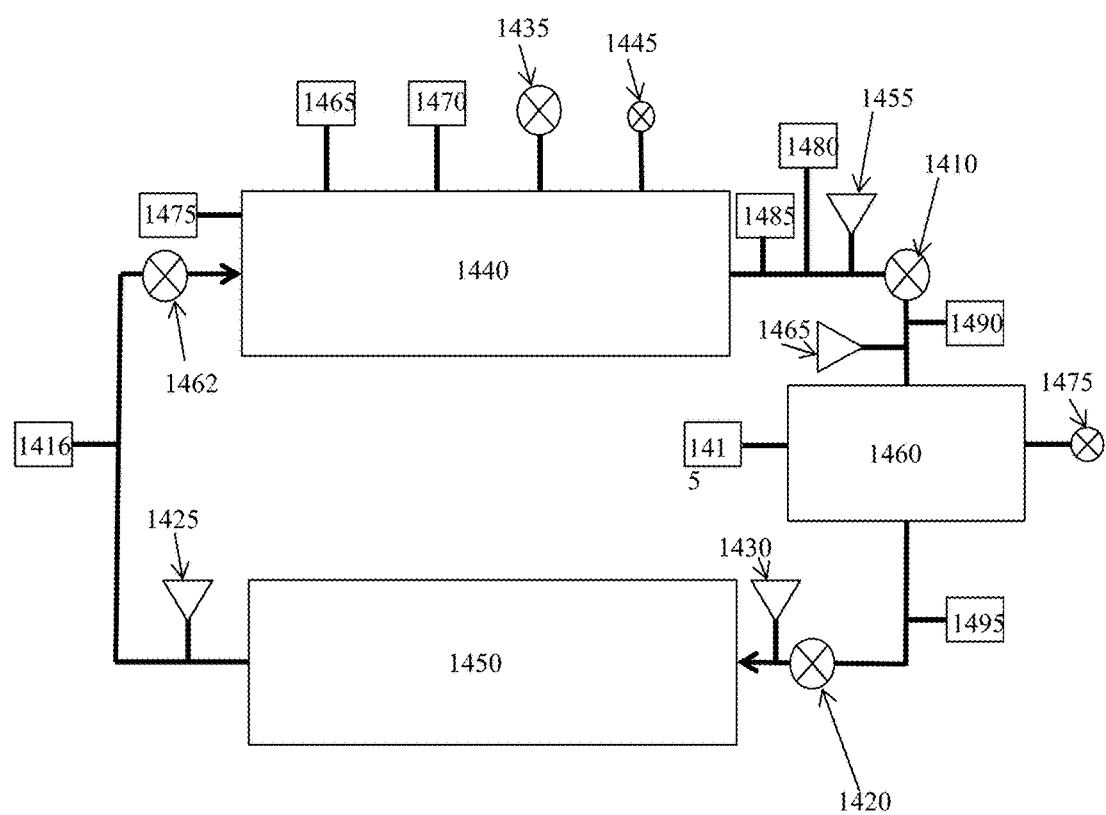
FIG. 14 schematically illustrates a block diagram of various 3D printer components.

In some embodiments, the gas flow mechanism comprises one or more valves and/or gas apertures (e.g., gas opening-ports). The valve and/or a gas aperture may be disposed adjacent to the recycling system. The valve and/or a gas aperture may be disposed adjacent to the pump. The valve and/or a gas aperture may be disposed between the processing chamber and the recycling system. The valve and/or a gas aperture may be disposed adjacent to the inlet portion. The valve and/or a gas aperture may be disposed adjacent to the outlet portion. FIG. 14 shows an example of valves (e.g., 1410, 1420). The gas may travel (e.g., enter and/or exit) through the valve. The valve may control the amount, and/or direction of gas flow through it. The valve may control if a gas does or does not flow through it. For example, the gas may enter or exit the build module, processing chamber, and/or enclosure through the valve. The valves may control (e.g., regulate) the flow of gas to and/or from a compartment. The compartment may comprise the enclosure, pump or the recycling mechanism. The valves may be a pneumatic control valves. The valves may isolate the filter from the enclosure and/or pump. Examples of valves comprise butterfly valve, relief valve, ball valve, needle valve, solenoid valve, leak valve, pressure gauge, or a gas inlet. The valve may comprise any valve disclosed herein. The valve may be controlled manually and/or electronically (e.g., by a controller). The control of the valve may be during at least a portion of the 3D printing.

In some cases, a 3D printing system includes features that cooperate with or compensate for certain flow dynamics of gas within an enclosure. At times, a power density of an energy beam that reaches a target surface can be altered (e.g., reduced) due to being absorbed by and/or reflected from gas-borne debris (e.g., soot) that is generated during a 3D printing. The target surface may comprise an exposed surface of a material bed, or an exposed surface of a 3D object. The gas-borne debris may deposit onto at least one surface within the enclosure (such as surfaces of an optical window) which deposited debris can reduce a power density of the energy beam that reaches the target surface. Providing a gas flow across the target surface (an exposed (e.g., top) surface of a material bed) may be used to alter (e.g., lessen) a concentration of the debris within at least a portion of the processing chamber during, before, and/or after a 3D printing (e.g., in a controlled manner).

Figure 21:
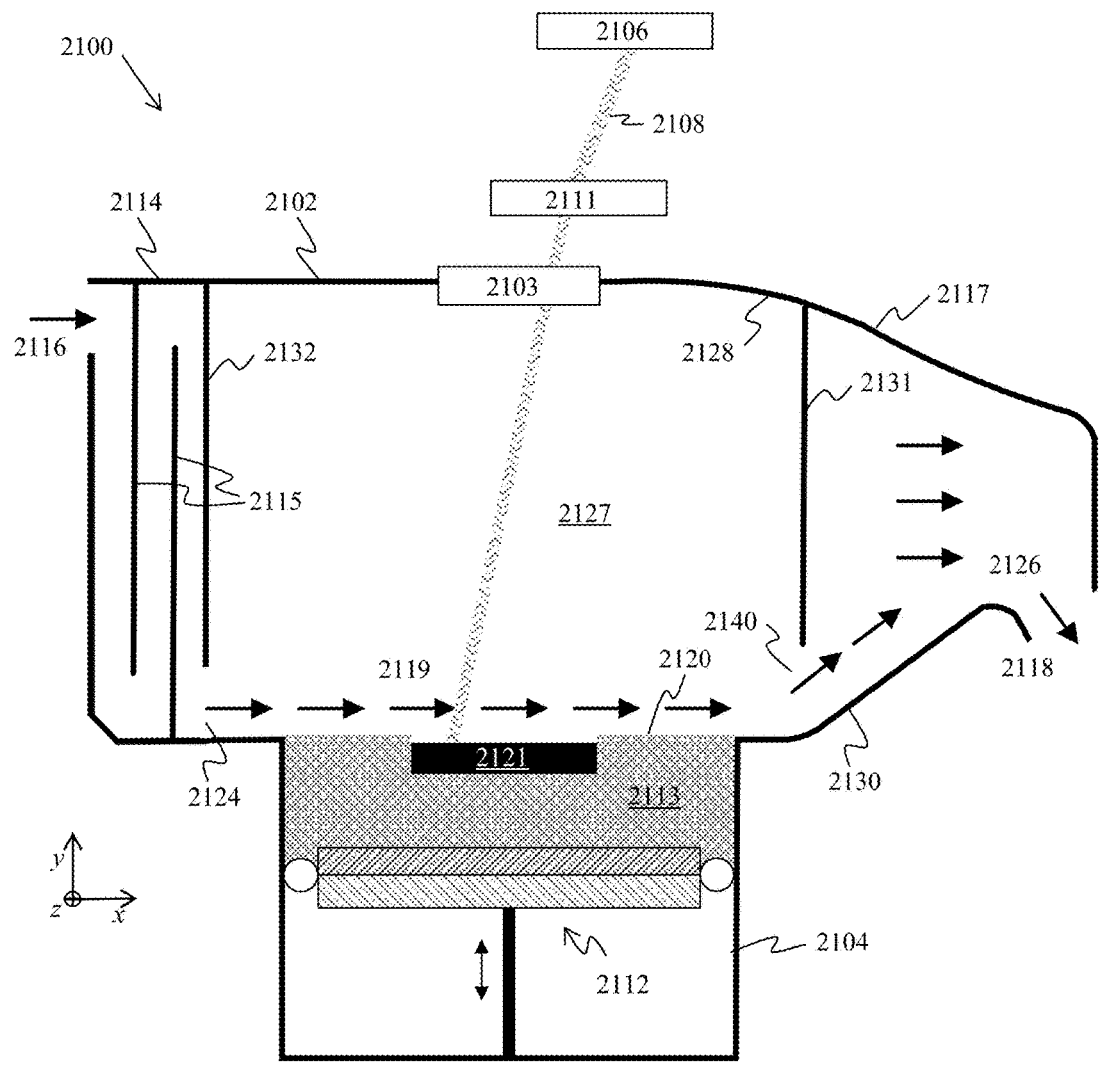
FIG. 21 schematically illustrates a side view of a 3D printer and its components.

In some embodiments, the processing chamber and build module are reversibly separable components (e.g., can reversibly and/or controllably engage and disengage) while, in other embodiments, the processing chamber and build module are portions of an inseparable single unit. The processing chamber and the build module can combine to form an enclosure for 3D printing. The 3D printer can comprise a build module that includes a platform. In some embodiments, the platform is configured to support and move material bed, which is comprised of pre-transformed material (e.g., metal powder). The energy source can be configured to generate an energy beam, which can be used to transform a pre-transformed material (e.g., of material bed, or a material bed that flows towards the platform) to a transformed material. In some embodiments, an optical mechanism is used to control the energy beam (e.g., control the trajectory of energy beam 2108 in processing chamber 2102). FIG. 21 shows an example of a 3D printer 2100 which includes features for controlling gas flow. The 3D printer 2100 includes a processing chamber 2102, build module 2104 and a material bed 2113 disposed above a platform 2112, and a 3D object 2121 disposed in the material bed. The 3D printer 2100 is operatively coupled to an energy source 2106 that generates an energy beam 2108, which energy beam is directed by an optical mechanism 2111 towards the material bed and/or a target surface (e.g., of the 3D of the 3D object 2121), which energy beam travels through an optical window 2103 and an atmosphere of the main internal space 2127 (also referred to herein as the "main internal portion of the processing chamber") of the processing chamber 2102.

In some embodiments, the 3D printer comprises gas flow in the processing chamber. The gas flow can be before, after, and/or during the 3D printing. The gas flow can be controlled manually and/or automatically. The automatic control may comprise using one or more controllers, e.g., as described herein.

In some embodiments, the processing chamber is operatively coupled (e.g., physically connected) or may comprise a gas inlet portion (which may also be referred to herein as "inlet portion", "entrance portion" or "first portion"). In some embodiments, the gas inlet portion is operatively coupled to (e.g., physically connected) or may comprise (e.g., is an integral part of) the processing chamber. The gas inlet portion may be configured to facilitate gas flow therethrough. The gas inlet portion may comprise a gas inlet port (which may also be referred to herein as "inlet port", "entrance port", "first inlet port", "first entrance port") and/or a gas outlet port (which may also be referred to herein as "outlet port", "exit port", "first outlet port" or "first exit port"). In some examples, the processing chamber may be operatively coupled to the gas inlet portion (e.g., mainly or only) through the gas outlet port of the gas inlet portion. The gas inlet portion may be configured to enclose the gas. The gas inlet portion may comprise a 3D (e.g., geometric) shape. The gas inlet portion may enclose an internal space. The gas inlet portion may be configured to reduce an ambient atmosphere from entering the gas inlet portion (e.g., at least during the 3D printing). The gas inlet portion may comprise a positive pressure (e.g., above an ambient pressure), e.g., before, after and/or during the 3D printing. The pressure within the gas inlet portion may be controlled (e.g., automatically and/or manually) before, after, and/or during the 3D printing. The gas inlet portion may comprise one or more channels and/or baffles. The channels may be formed using the one or more baffles. The one or more baffles may contact (e.g., border) one or more walls of the gas inlet portion. The inlet portion (e.g., channels within) may facilitate a gas flow therethrough. For example, the channels and/or baffles may facilitate altering a behavior of (i) the gas that flows therethrough and/or (i) the gas that is expelled from the gas inlet portion. For example, the (e.g., 3D) shape of the gas inlet portion may facilitate altering the behavior of the (i) gas that flows therethrough and/or (i) the gas that is expelled from the gas inlet portion. For example, the (e.g., 3D) shape of the gas inlet port and/or gas outlet port of the gas inlet portion may facilitate altering the behavior of the (i) the gas that flows therethrough and/or (i) the gas that is expelled from the gas inlet portion. The gas may enter the gas inlet portion through its gas inlet port, and exit the gas inlet portion through its gas outlet port. The gas may enter the processing chamber (e.g., or the main portion of the processing chamber) and flow over (and/or on) a target surface (e.g., an exposed surface of the material bed and/or the 3D object). In some embodiments, the gas inlet portion (e.g., its 3D shape, channel(s), baffle(s), inlet port(s), and/or outlet port(s)) is configured to provide a uniform flow of gas that is substantially parallel (e.g., parallel) to the target surface. In some embodiments, the gas inlet portion (and/or any component thereof) is configured to direct the flow of gas in a first direction (e.g., x direction), and/or alter (e.g., reduce) a flow of gas in a second direction (e.g., y direction). The first direction may be different than the second direction. The first direction may be (e.g., substantially) orthogonal to the first direction (e.g., x direction). Altering the gas flow may comprise altering the velocity, direction, laminarity, turbulence, cross sectional shape, and/or cross-sectional area of the gas flow. The cross section may be in a direction orthogonal to the direction of the gas flow. In some embodiments, the gas inlet portion is configured to provide a (e.g., substantially) uniform flow of gas that is directed toward a target surface. In some embodiments, the gas inlet portion is configured to provide a (e.g., substantially) uniform flow of gas that is directed away from a target surface. In some embodiments, the gas inlet portion is configured to provide a (e.g., substantially) uniform flow of gas that is directed tangential or parallel to the target surface. In some embodiments, the gas inlet portion is configured to provide a flow of gas above a target surface.

The gas may exit the processing chamber through a gas outlet portion (also referred to herein as the "outlet portion" or "second portion"). In some embodiments, the gas outlet portion is operatively coupled (e.g., physically connected) or may comprise (e.g., is an integral of) the processing chamber. The gas outlet portion may be configured to facilitate gas flow therethrough. The gas outlet portion may comprise a gas inlet port (also referred to herein as "inlet port" or "second inlet port") and/or a gas outlet port (also referred to herein as "outlet port" or "second outlet port"). The gas may enter the gas outlet portion through its gas inlet port, and exit the gas outlet portion through its gas outlet port. In some examples, the processing chamber may be operatively coupled to the gas outlet portion (e.g., mainly or only) through the gas inlet port of the gas outlet portion. The gas outlet portion may be configured to enclose the gas. The gas outlet portion may comprise a 3D (e.g., geometric) shape. The gas outlet portion may enclose an internal space. The gas outlet portion may be configured to reduce an ambient atmosphere from entering the gas inlet portion (e.g., at least during the printing). The gas outlet portion may comprise a positive pressure (e.g., above an ambient pressure), e.g., before, after and/or during the 3D printing. The pressure within the gas outlet portion may be controlled (e.g., automatically and/or manually) before, after, and/or during the 3D printing. The gas outlet portion may comprise one or more channels and/or baffles. In some embodiments, the gas outlet portion is clear of channels and/or baffles. The gas outlet portion may facilitate a gas flow therethrough (e.g., channel gas flow within). For example, the gas outlet portion can have channels, baffles, and/or a 3D shape that can facilitate altering and/or preserving a behavior of the gas that flows therethrough. The gas outlet portion can include features that reduces an occurrence of at least some the gas that enters the gas outlet portion (e.g., exiting the processing chamber or the main portion of the processing chamber) from returning to at least an area occupied by the processing cone, which may otherwise generate standing vortices at least in the region (e.g., volume) occupied by the processing cone or generating turbulence at least in the region occupied by the processing cone (e.g., in the main portion of the processing chamber), or any combination thereof. In some embodiments, features of the gas outlet portion (e.g., its 3D shape, channel(s), baffle(s), its inlet port(s), and/or its outlet port(s)) are configured to provide a flow of gas that is (e.g., substantially) free of turbulence, standing vortices, and/or back flow. In some embodiments, the features of the gas outlet portion (and/or an combination thereof) are configured to direct the flow of gas towards the outlet port of the gas outlet portion. In some embodiments, the gas outlet portion is configured to alter the gas flow as it flows therethrough. Altering the gas flow may comprise altering the velocity, direction, laminarity, turbulence, cross sectional shape, and/or cross-sectional area of the gas flow. The cross section of the gas outlet portion may vary in order to efficiently direct gas out of its outlet port. For example, the gas outlet port may direct some of the flow of gas in a direction orthogonal to a main direction of the gas flow. In some embodiments, the gas outlet portion is configured to provide a (e.g., substantially) non-turbulent flow of gas that is directed towards its outlet port and/or away from the processing chamber (e.g., the processing cone). The gas outlet portion may be separated from a main internal portion of the processing chamber by a wall (e.g., comprising an opening). The gas outlet portion can have a tapered shape (aerodynamic shape). An internal surface of the processing chamber can include a curvature (e.g., facilitating an aerodynamic shape). As the gas exits the outlet port of the gas outlet portion, the aerodynamic shape can be configured (e.g., designed) to (i) concentrate the gas flow, (ii) lessen back flow, (iii) lessen generation of turbulence, (iv) lessen generation of standing vortices, or (v) any combination thereof. Reducing the turbulence, standing vortices, and/or back flow is at least within the area confined by the processing cone.

FIG. 21 shows an example of a gas flow route, which gas enters through inlet port 2116 of gas inlet portion 2114 (e.g., along the direction of the arrow above numeral 2116), exits the gas inlet portion 2114 through outlet port 2124 into the main internal portion 2127 of the processing chamber 2102, flows over (and/or on) surface 2120 of the material bed 2113 and/or 3D object 2121 in a general direction 2119, enters the gas outlet portion 2117 through an inlet port 2130, and exits the gas outlet portion through outlet port 2118. FIG. 21 shows an example of an internal surface 2128 of the processing chamber. The gas inlet portion (e.g., 2114) can be separated from the main internal portion (e.g., 2127) of the processing chamber by a wall (e.g., 2132), also referred to as a first wall. The gas outlet portion (e.g., 2117) can be separated from the main internal portion (e.g., 2127) of the processing chamber by a wall (e.g., 2131), also referred to as a second wall. In some cases, the gas flows through one or more openings (e.g., slit(s)) (e.g., 2140) within the wall. In some embodiments, the size of one or more openings is adjustable (e.g., able to be made larger and/or smaller). The adjusting can change a flow of the gas entering the outlet portion. The adjusting can be accomplished using, for example, one or more adjustable valves. In some cases, the gas outlet portion and main internal portion are not separated by a wall. In the example shown in FIG. 21, the inlet portion comprises baffles 2115 that form a (e.g., winding) channel. In the example shown in FIG. 21, the outlet portion is devoid of baffles. The general direction of gas flow shown in the example of FIG. 21, is illustrated by arrows e.g., next to numerals 2116, 2119, and 2126.

The gas may flow at least in the processing cone (e.g., in the processing chamber) in a prescribed velocity (e.g., range of velocities), as described herein. The gas may flow at least in the path of the energy beam through the processing chamber. The velocity may be high enough to remove gas-borne debris from the processing chamber atmosphere (e.g., atmosphere of 2127) and low enough such that the pre-transformed material in the material bed will (e.g., substantially) remain in the material bed and/or not become (e.g., substantially) gas-borne, at least (i) in the area occupied by the processing cone and/or (ii) above target surface of material bed. In some embodiments, the gas flow has a velocity of at least about 0.1 meters per second (m/s), 0.5 m/s, 1 m/s, 5 m/s, 10 m/s, 20 m/s, 50 m/s, 100 m/s, 200 m/s, 400 m/s, 500 m/s, 750 m/s, or 1000 m/s. In some embodiments, the velocity of gas flow above the target surface ranges between any of the above-referenced velocities, as suitable (e.g., from about 0.1 m/s to about 5 m/s, from about 5 m/s to about 20 m/s, from about 5 m/s to about 100 m/s, from about 100 m/s to about 1000 m/s, from about 0.01 m/s to about 1000 m/s, etc.).

In some embodiments, one or more characteristics of gas-borne debris are measured (e.g., in situ and/or in real time, e.g., during the 3D printing). For example, the debris may flow with a velocity at least in the processing cone (e.g., in the processing chamber). The debris velocity can be measured using any suitable device(s). For example, a device that articulates a triangulation measurement method. The device may comprise one or more sensors. The one or more sensors may comprise an optical sensor (e.g., a digital camera device, a single pixel detector, a detector that detects a range of wavelengths, a single wavelength detector, or a spectrometer). The one or more sensors may be configured to measure the one or more energy beams (or their respective reflections). For example, a plurality of energy beams (e.g., two or more lasers) can be directed in a region within the processing cone (e.g., within the processing chamber). The one or more sensors may be operatively coupled to the plurality of energy beams (e.g., respectively). In some examples, one sensor is coupled to at least two energy beams. In some examples, at least two of the energy beams are each coupled to its own (different) sensor. In some embodiments, at least one, two, or three of the plurality of energy beams are stationary during the measurement. The radiation of the energy beam may comprise continuous or discontinuous (e.g., pulsing) radiation. In some embodiments, at least one, two, or three of the plurality of energy beams are moving during the measurement. The movement of the at least one of the plurality of energy beams may comprise linear or curved movement. The movement of the at least one of the plurality of energy beams may comprise continuous or discontinuous (e.g., pulsing) movement. The movement may be along a (e.g., predetermined) path. The movement velocity may comprise a constant or varying velocity. In some examples, a first beam and a second beam may travel in the processing chamber (e.g., atmosphere thereof) towards a target surface. For example, during the measurement, the first energy beam can be stationary at a position, while the second energy beam can be move along a trajectory (e.g., in a circular motion) in the vicinity (e.g., around) that position. The first and/or second energy may interact and/or react with a debris during the measurement. The interaction may comprise reflectance, absorbance, or a photochemical reaction. The interaction may induce a change in that energy beam (e.g., or to its reflection). For example, a change in intensity, direction, and/or wavelength of the energy beam. The one or more sensor may sense (e.g., a difference in) a signal from the first energy beam (or its reflection) and a signal from the second energy beam (or its reflection). The sensed signals may be compared to each other (e.g., using a processor) and produce a result. For example, the first energy beam (or its reflection) may be compared with the second energy beam (or its reflection) and produce a result. The processor and the one or more sensors may be used to determine an amount (e.g., via density or concentration measurement(s)) and/or a velocity of debris particles within, for example, a processing cone of the energy beam. A detection system (e.g., comprising the one or more sensors) can detect at least one difference in the optical property(ies) of each of the plurality of energy beams, to determine a velocity and/or material properties of debris in that position and/or that vicinity. The optical properties may be corresponding to a reflectance, or absorbance of an energy beam that interacts with the (e.g., moving) debris. The optical properties may comprise intensity, wavelength, etc. Examples of various detectors and components thereof are disclosed, for example, in PCT patent application published as WO/2016/094827, which is incorporated herein by reference in its entirety.

In some embodiments, the gas inlet portion comprises one or more gas-flow structures that are configured to form a (e.g., uniform) gas flow above the target surface (e.g., the exposed surface of the material bed). The flowing gas may have a volume. The flow of gas through the 3D printer may divided to one or more flow sections. In a section of its flow in the 3D printer, the volume of the flowing gas may be (i) constant, (ii) expand, or (iii) contract, as a function of the distance in a first direction (e.g., X direction in FIG. 21). In a section of its flow in the 3D printer, the volume of the flowing gas may be (i) constant, (ii) expand, or (iii) contract, as a function of the distance in a second direction (e.g., Y direction in FIG. 21). In a section of its flow in the 3D printer, the volume of the flowing gas may be (i) constant, (ii) expand, or (iii) contract, as a function of the distance in a third direction (e.g., Z direction in FIG. 21). The first direction may be from the entry of the gas to the 3D printer to the exit of the gas from the 3D printer. The second and/or third direction may be perpendicular to the first direction. The second direction may be perpendicular to the third direction. The volume defined by the gas flow may comprise a cross section (e.g., in a direction perpendicular to the direction of gas flow from the gas inlet port to the gas outlet port, and/or in the first direction), which cross section has a FLS. In some embodiments, the gas-flow structure (e.g., gas channel structure) may define a path that is configured to facilitate expansion of a gas flow from a first FLS of the gas flow to a larger second FLS of the gas flow in the third direction (e.g., Z axis in FIG. 21) while the gas flow advances along the first direction (e.g., X axis). The expansion may be to a FLS which equals at least the width of the target surface (e.g., width of the platform and/or exposed surface of the powder bed). In some embodiments, the gas-flow structure may define a path that is configured to facilitate expansion of a gas flow from a first FLS of the gas flow to a larger second FLS of the gas flow in the second direction (e.g., Y axis) while the gas flow advances along the first direction (e.g., X axis). The expansion may be to a FLS which reduces debris return to the target surface at least during the operation of the energy beam as part of the 3D printing. Reduces debris return may be to a degree that is harmful to the 3D printing process. The flowing gas may form a gas barrier (e.g., blanket) above the target surface. In some embodiments, the expansion of the gas flow may be facilitated and/or limited by (i) the internal gas flow structure and/or (ii) the outlet opening port structure. The gas-flow structure may include structural features within the gas inlet portion, the gas outlet portion, or both. In some embodiments, the gas inlet portion of the enclosure (e.g., of the processing chamber) includes a channel (e.g., straight or winding) configured to facilitate the gas flow therein (e.g., gas flow expansion (e.g., homogenous expansion)) in at least one dimension. The channel may comprise a straight section. The channel may comprise a curved section. In some embodiments, the gas flow structure (e.g., within the gas inlet portion) expands and shapes a gas flow volume in order to form a (e.g., substantially) planar shaped sheet (which can also be referred to as a layer or blanket) of gas over a target surface. The gas-flow structure may comprise one or more baffles that form one or more walls that guide and at least partially define the channel. The gas-flow structure may be an integral part of the processing chamber, or can be controllably and/or reversibly engaged with the processing chamber. The flow of gas above the target surface may form, in the main portion of the processing chamber, an area of faster gas flow that is adjacent to the target surface, and slower gas flow in an area that is further away from the target surface.

In some embodiments, the gas inlet portion comprises one or more baffles which alter the velocity, direction, and/or volume of the gas as it flows along the baffles. For example, the baffles can slow down and expand the gas flow that enters from a gas inlet port. The baffles may include one or more walls (which can also be referred to as partitions, separators, barriers, or dividers) which can collectively form one or more channels that facilitate (e.g., guide) the gas flow (e.g., in a continuous manner) from the inlet port to the outlet port of the gas inlet portion. The channel can be a covered channel. In some embodiments, the gas inlet port corresponds to an opening, or a number of openings, within a wall of the gas inlet portion. The gas inlet port can be operationally coupled to one or more gas sources, which may or may not be operationally coupled to a gas recycling system, e.g., as described herein. The baffles may include at least one surface (e.g., wall surface) that is different (e.g., (e.g., substantially) non-parallel) to the target surface and/or the surface (e.g., support surface) of the platform. After entering the gas inlet port, the gas can move (e.g., and expand) in at least one direction (e.g., in X, Y, and/or Z direction) as it moves toward a main portion of the enclosure (e.g., of the processing chamber). In some cases, the gas moves and expands in accordance with at least one plane (e.g., in XY, YZ, and/or XZ planes). In some embodiments, the baffles within the gas inlet portion directs the direction(s) of gas flow. In some embodiments, walls of the baffles are particularly oriented with respect to a direction of gas flow at the gas inlet port. In some embodiments, the baffles are vertically oriented such that surfaces of the baffles are (e.g., substantially) perpendicular with respect to a direction of gas flow at the gas inlet port, thereby reducing the flow of gas in along a plane (e.g., a YZ plane). In this way, the baffles can be configured to increase certain directional components (e.g., X, Y and/or Z components) of the gas flow within the gas inlet portion. In some embodiments, walls of the baffles are horizontally oriented with respect to a direction of gas flow at the gas inlet port. In some embodiments, the baffles are (e.g., substantially) parallel with respect to a direction of gas flow at the gas inlet port, thereby reducing the flow of gas along a plane (e.g., a XZ plane). In some cases, surfaces of the baffles are at (e.g., substantially) non-perpendicular or (e.g., substantially) non-parallel with respect to the direction of gas flow at the gas inlet port, thereby reducing the flow of gas along one or more planes (e.g., XY, YZ and/or XZ) to some degree.

The baffles can be oriented so as to reduce a gas expansion in a direction toward a material bed (e.g., in the X direction). For example, in FIG. 21, baffles 2115 are oriented (e.g., substantially) perpendicular with respect to the inflow (in the direction of the arrow above numeral 2116) of gas at inlet 2116. The baffles can be configured to spread the flow of gas (e.g., homogenously) as it flows within the gas inlet portion to provide an evenly distributed flow of gas (e.g., as it exits the inlet portion 2114 and forms gas flow 2119) over a target surface (e.g., an exposed surface of the material bed). The baffles and/or gas flow (e.g., gas pressure, etc.) at the gas inlet portion, may be configured and/or adjusted to facilitate a gas flow over a surface (e.g., 2120) of a material bed (e.g., 2113) in a way that minimally alters the surface of the material bed. The baffles and/or gas flow at the gas inlet portion may be configured and/or adjusted to facilitate a gas flow trajectory, velocity, chemical makeup, or temperature of the gas flow. For example, the trajectory and/or velocity of the gas flow that is expelled from the inlet portion (e.g., comprising the baffle(s)), may minimally alter the target surface. For example, a temperature of the baffle(s) may adjust (e.g., heat or cool) during passage of the gas flow adjacent thereto. For example, a temperature of the gas flow may adjust (e.g., heat or cool) during its passage through the aligning structure. The geometry, temperature, and/or chemical characteristics of the channel (e.g., defined by baffles 2115) may be adjustable. The adjustment may be before, after, and/or during at least a portion of a 3D printing operation (e.g., during a period when the energy beam 2108 irradiates material bed 2113, or when no energy beam irradiates a material bed 2113). The adjustment may be controlled manually and/or automatically (e.g., using a controller). In some embodiments, the baffles are exchangeable, movable, expandable, and/or contractible. In some cases, the baffles are heated and/or cooled. In some embodiments, the baffles comprise a desiccant (e.g., molecular sieves or silica). The desiccant may be covalently bound, or adhered, to the baffles. The desiccant may be embedded in a matrix that is casted onto surfaces of the baffles. In some cases, the channel formed by the baffles may be operatively coupled to one or more sensors (e.g., humidity, temperature, and/or oxygen sensors) for measuring characteristics of the gas flow within the gas inlet portion. The channel may be operatively coupled to one or more sensors (not shown). The one or more sensors may comprise humidity, temperature, or oxygen sensors.

Figure 22:
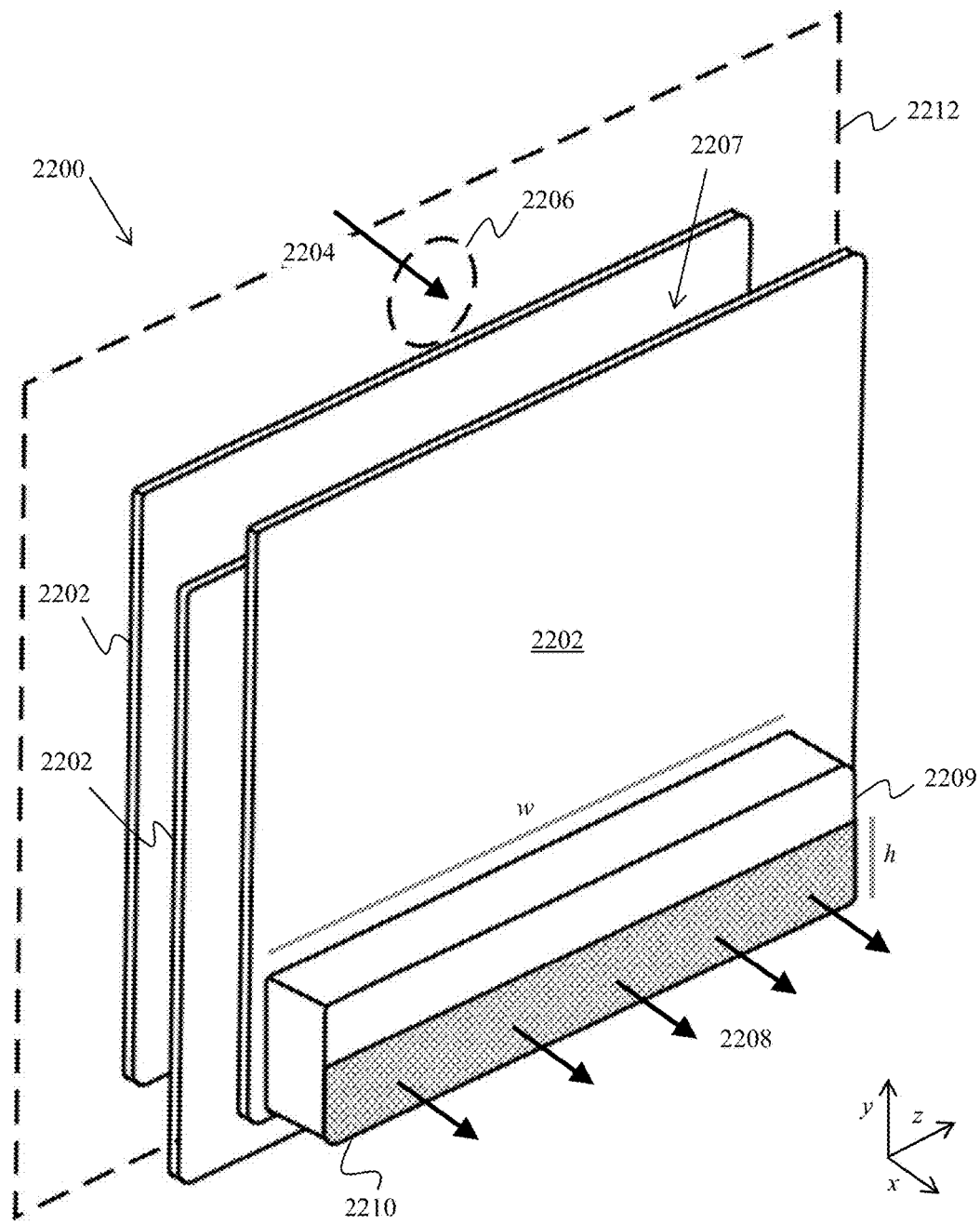
FIG. 22 schematically illustrates a perspective view of a component of a 3D printer.

The orientation of the baffles can alter the flow of gas within the channel (e.g., formed by gaps between surfaces of the baffles). For example, the baffles can be configured to reduce a velocity and/or turbulence of the gas flow, e.g., by their relative orientation and/or surface makeup (e.g., roughness). In some embodiments, at least one of a plurality of gaps between baffles can be adjustable (e.g., before, after, and/or during at least a portion of a 3D printing operation; e.g., which adjustment can be controlled by manually and/or automatically by adjusting the position of one or more baffles. FIG. 22 shows an example of a perspective view of parts of a gas inlet portion 2200. The gas inlet portion 2200 of FIG. 22 may correspond to gas inlet portion 2114 of FIG. 21. Gas inlet portion 2200 includes baffles 2202 that direct gas flow 2204 coming in from inlet port 2206 (which can be located in wall 2212 of gas inlet portion 2200 and/or in an enclosure wall of the 3D printing system), and expanding along an X direction toward outlet port 2210. The outlet port may comprise of one or more holes (e.g., a perforated plate). For example, gas flow 2204 can flow through gaps 2207 between baffles 2202 before exiting outlet port 2210. The gaps 2207 can correspond to parts of a channel through which gas flows within gas inlet portion 2200. Surfaces of at least two of baffles 2202 (e.g., all the baffles 2202) can be arranged substantially perpendicular (e.g., perpendicular) with respect to the direction of inflow of gas 2204 at inlet 2206 (e.g., substantially parallel (e.g., parallel) to the YZ plane, or substantially perpendicular (e.g., perpendicular) to the XY plane), and/or with respect to each other. The respective arrangement of the baffles may be for restricting gas flow along the X direction and/or distribute expansion of gas 2208 along the Y and/or Z directions. Such expansion of the gas flow (e.g., along the Z direction) can provide a homogenous (e.g., and at times laminar) gas flow over the target surface. The flow of gas in the channel may alter (e.g., reduce) a velocity and/or turbulence of the gas flow 2208. In some embodiments, at least two of the baffles 2202 (e.g., all the baffles 2202) are arranged parallel with respect to each other. In some embodiments (not shown), at least two of the baffles (e.g., all the baffles) are arranged in orientations that are non-parallel to each other. In some embodiments (not shown), at least two of the baffles (e.g., all the baffles) are arranged parallel with respect to the YZ plane and or the XY plane. In some embodiments (not shown), at least two of the baffles (e.g., all the baffles) are arranged in a non-perpendicular or a non-parallel angle (e.g., planar or compound) with respect to each other and/or to the XY, YZ and/or XZ planes.

The size, shape, and number of baffles can vary depending on a number of factors such as gas flow velocity and/or design constraints. The outlet port (e.g., 2210) can restrict gas flow along to Y direction so as to provide a planar-shaped flow of gas (e.g., 2208) as it exits outlet port. In this way, the gas inlet portion can provide a sheet or blanket of gas over a target surface. In some cases, the outlet port corresponds to an elongated opening in accordance with a (e.g., substantially) planar shape over a target surface (e.g., elongated with respect to Z axis in FIG. 22). For example, the outlet port 2210 can have a greater width than height (e.g., greater width w than height h in FIG. 22). In some embodiments, a width (e.g., w in FIG. 22) is in accordance with an FLS (e.g., diameter or width) of the target surface (e.g., an exposed surface the material bed). In some embodiments, the width is greater or less than a FLS (e.g., diameter or width) of an exposed surface the material bed. In some embodiments, width-to-height ratio (e.g., w/h) is at least about 1, 1.5, 2, 5, 10, 15, 20, or 50. In some cases, the outlet port is within an outlet port section (which may be referred to as an "gas outlet port section", "gas exit port section" or "exit port section" herein) of the gas inlet portion. In some cases, the outlet port section corresponds to a subsection of the gas inlet portion having an elongated shape in accordance with an elongated shaped outlet port. The outlet port section located at a location of the gas inlet portion proximate to the target surface. FIG. 22 shows an example of an outlet port section 2209, which includes and outlet port 2210, in accordance with some embodiments. Outlet port section 2209 (and gas exit port 2210) can be located at a portion (e.g., the bottom) of the inlet portion 2200 (i.e., near to a material bed). The degree of expansion or compression of a gas within the gas inlet portion can be characterized by a ratio of a size (e.g., cross section area) of the inlet port (e.g., 2206) of the gas inlet portion relative to a size (e.g., cross section area) of the outlet port (e.g., 2210) of the gas inlet portion. In some embodiments, a cross sectional area of gas flow expands or compresses by at least a prescribed degree by the time it exits the outlet port of the gas inlet portion. In some embodiments, the cross sectional area of outlet port (e.g., 2210) is at least about 5%, 10%, 15%, 20%, 25%, or 30% greater than the cross sectional area of the inlet port (e.g., 2206) of the gas inlet portion (e.g., 2200).

In some embodiments, the flow dynamics of the gas as it exits a gas inlet portion and directed over a target surface, is controlled. For example, a turbulence of the flow of gas (e.g., 2208) from the gas exit port (e.g., 2210) can be reduced using a flow aligning structure (also referred to herein as flow aligner). The flow alignment structure can be more proximate to the platform than the baffle(s). The flow alignment structure can be more proximate to the outlet port (e.g., 2210) of the gas inlet portion than the baffle(s). The flow alignment structure can direct gas within the gas inlet portion toward the outlet port or include the outlet port. In some embodiments, the flow aligning structure is part of (e.g., within) an outlet port section (e.g., 2209) of the gas inlet portion. The outlet port section can have an elongated shape (e.g., in accordance with an elongated shape of the outlet port. FIGS. 32A and 32B show examples of perspective views of flow aligning structures 3200 and 3220, respectively, in accordance with some embodiments. The flow aligning structure (e.g., 3200 or 3220) can include flow aligning walls (e.g., 3202 or 3222) (which can be referred to as walls, partitions, separators, dividers, or other suitable term), which walls can at least partially define flow aligning passages (e.g., 3204 or 3224) that are configured to allow gas to flow therethrough. The flow aligning passages can be referred to as channels, tunnels, elongated holes, elongated openings, conduit, pipe, tube, or other suitable term. The flow aligning passages can run lengthwise in accordance with a flow gas (e.g., in the X direction in FIGS. 21, 22, 32A, and 32B) such that flow aligning walls (e.g., 3202 or 3222) can reduce gas flow widthwise and/or height-wise (e.g., in Y and Z directions in FIGS. 21,22, 32A, and 32B), thereby channeling gas flow along their lengthwise direction (e.g., in the X direction of FIGS. 21,22, 32A, and 32B (e.g., direction 3206 or 3226 respectively)). The walls of the flow aligning structure can align different portions of the flow gas in accordance with a desired direction (e.g., X direction). The length of the flow aligning structure (e.g., l in each of FIGS. 32A and 32B) can vary. In some embodiments, length of the flow aligning structure (e.g., comprising the flow aligning channels) is in accordance with a length of the gas exit port (e.g., 2209 of FIG. 22). In some embodiments, a height (e.g., designated "h" in FIG. 22) of the flow aligning structure (e.g., as measured from a top of the target surface (e.g., material bed) to a top of the flow aligning structure) is at most about 5" (inches), 4", 3", 2", 1", or 0.5". In some embodiments, the height of the flow aligning structure ranges between any of the afore-mentioned heights (e.g., between 0.5" and 5", between 0.5" and 3", or between 3" and 5"). The number and shape of the channels of the flow aligning structure can vary. In some embodiments, flow aligning passage has a polygonal (e.g., hexagonal) cross sections (e.g., as shown in the example of FIG. 32A). The polygon may be a space filling polygon. The flow aligning passage may comprise a prism, a cone, or a cylinder. The prism may comprise a polygonal cross section (e.g., any polygon described herein). The flow aligning passages can (i) have a cross section that facilitates, and/or (ii) can be packed in, a space-saving configuration that maximizes the cross-sectional area of flow aligning passages (e.g., in a direction perpendicular to the direction of flow). In some embodiments, the flow aligning passage may have a round cross section (e.g., as shown in FIG. 32B, 3226), thereby forming flow aligning passage having corresponding round cross sections (e.g., a cylindrical shaped passage)—which may be packed in a space saving configuration (e.g., cubic closed packed, a.k.a., face-centered cubic configuration). In some embodiments, a ratio of the total cross sectional area of flow aligning passages is at least about 80%, 85%, 90%, 94%, 95%, 96%, 98, or 99% of a respective total cross sectional area of the flow aligning structure (e.g., which includes the thicknesses of the flow aligning walls). It should be noted, that the flow aligning structures described herein is not limited to honeycomb shaped or cylindrical shaped flow aligning walls and/or passages. That is, the flow aligning structures can have flow aligning walls and/or passages having any suitable 3D shape or combination of shapes (e.g., polyhedron, prism, cone (e.g., having an elliptical base, e.g., circular base), cylinder (e.g., right elliptical cone, e.g., right circular cone), pyramid (e.g., having a polygonal base), or any combination thereof). For example, the flow aligning walls and/or passages can have any suitable 3D or cross-sectional shape described herein with reference to FIGS. 10A-10D. Furthermore, flow aligning structures described herein can have any suitable number of passages (e.g., channels), and walls having any suitable thickness. In some embodiments, the flow aligning structure comprises a substantially two-dimensional structure that amounts to a mesh structure or plate that includes perforations (i.e., a perforated plate) for allowing gas to flow therethrough. In some embodiments, more than one flow aligning structure is used in combination.

The one or more channels in the aligning structure may be configured and/or adjusted to facilitate a gas flow trajectory (e.g., alignment), velocity, chemical makeup, or temperature of the gas flow. The velocity and/or trajectory may of the gas flow expelled from the aligning structure may minimally alter the target surface. For example, a temperature of the one or more channels may adjust (e.g., heat or cool) during passing of the gas flow adjacent thereto. For example, a temperature of the gas flow may adjust (e.g., heat or cool) during its passage through the aligning structure. The adjustment may be before, after, and/or during at least a portion of a 3D printing operation (e.g., during a period when the energy beam irradiates material bed, or when no energy beam irradiates a material bed). The adjustment may be controlled manually and/or automatically (e.g., using a controller). In some embodiments, one or more channels in the aligning structure are exchangeable, movable, expandable, and/or contractible. In some cases, the one or more channels are heated and/or cooled. In some embodiments, the one or more channels comprise a desiccant (e.g., molecular sieves or silica). The desiccant may be covalently bound, or adhered, to an interior surface of the one or more channels. The desiccant may be embedded in a matrix that is casted onto the internal surface of the one or more channels. In some cases, the one or more channels may be operatively coupled to one or more sensors (e.g., humidity, temperature, and/or oxygen sensors) for measuring characteristics of the gas flow within the aligning structure. The one or more channels may be operatively coupled to one or more sensors. The one or more sensors may comprise humidity, temperature, or oxygen sensors.

Figure 28:
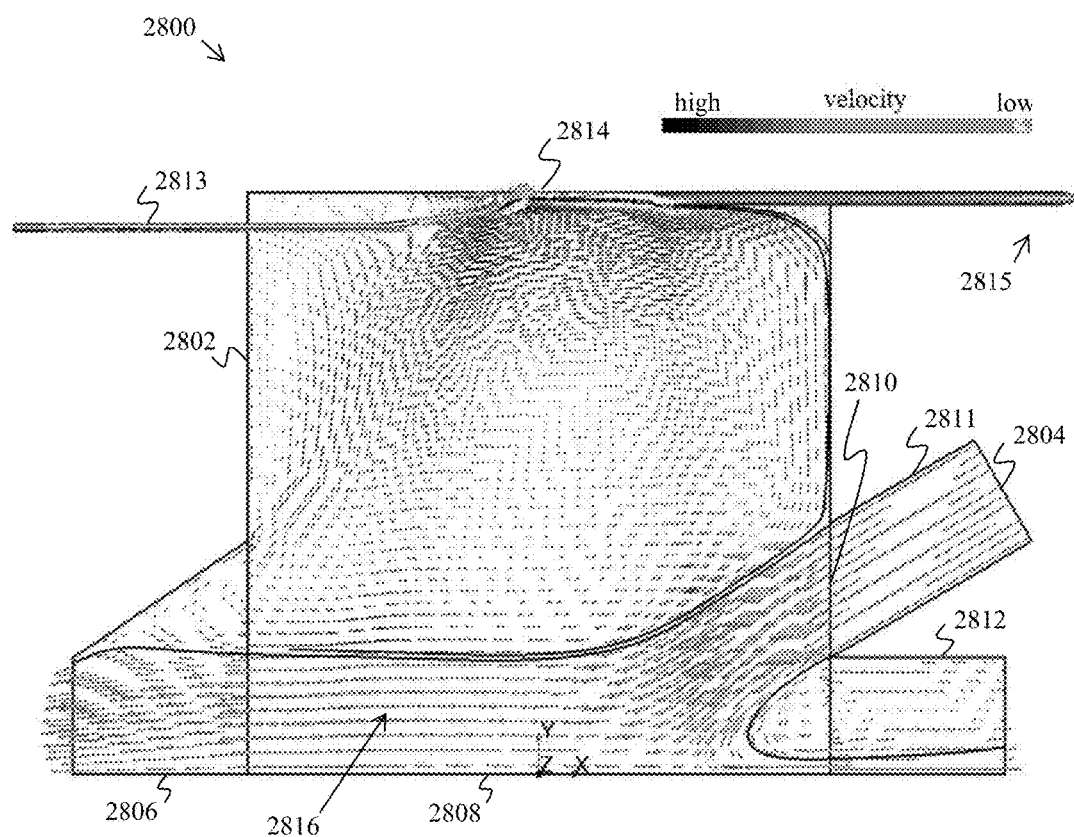
FIG. 28 schematically illustrates a side view of 3D printer components.

In some embodiments, the gas inlet portion of a 3D printing system has features that control the direction of flow of gas with respect to the target surface and/or optical window. For example, the flow of gas from the gas inlet portion can be directed parallel to, or angled toward or away from the target surface. FIG. 28 shows an example of a gas flow model 2800 indicating gas flow within an enclosure for an inlet portion that angles airflow toward a target surface in accordance with some embodiments; an enclosure 2802 having a gas inlet 2804 directing gas flow 2810 towards the target surface 2808, two gas outlets 2812 and 2806, a volume having cross section 2816 in which the gas (mainly) flows above the target surface 2808; a gas inlet 2813 directing gas flow towards the optical window 2814 that exits the enclosure from a gas outlet 2815. In the example shown in FIG. 28, gas flow model 2800 indicates the directionality (flow lines) and velocity (flow line darkness) of gas flow within an enclosure 2802. The flow of gas can enter an enclosure via gas a gas inlet portion and exit the enclosure via at least one gas outlet portion. The as inlet portion can be configured to direct the flow of gas to form a blanket above the target surface. This can be accomplished, for example, by positioning a gas entry port a distance above the target surface (e.g., in Y direction) and/or providing a directing passage (e.g., having angled walls e.g., 2811) that are angled toward the target surface. The directing passage may be configured to facilitate a (e.g., laminar, or non-turbulent) directional gas flow above (e.g., and (e.g., substantially) parallel to) the target surface that flows from one side of the enclosure to an opposing side of the enclosure. In some embodiments, the gas inlet port is at a different vertical position that the gas outlet port, which outlet and inlet ports are disposed at opposing side of the enclosure. In some embodiments, the gas inlet port is more vertically distant from the target surface (e.g., or bottom of the enclosure) than the gas outlet port. In some cases, this configuration can provide some advantages over having the inlet port at the same vertical distance from the target surface (e.g., or from the bottom of the enclosure) as the gas outlet, which outlet and inlet ports are disposed at opposing side of the enclosure. In some cases, this configuration can provide some advantages over having the inlet port that directly faces the outlet port, which outlet and inlet ports are disposed at opposing side of the enclosure. The gas flow toward the target surface can, in some embodiments, mitigate a reduction in flow velocity over the target surface due to the expansion of the gas during flow. In some cases, directing the gas flow initially toward a target surface can create a more confined flow path over the target surface, thereby sustaining some of the flow velocity. A shown in the example of FIG. 28, the directionality of flow lines over the target surface can be (e.g., substantially) linear, indicating regular velocity (e.g., substantially no turbulence) and a (e.g., substantially) uniform (e.g., laminar) flow. The velocity of gas flow toward and over the target surface can be within ranges described herein. In some embodiments, a backflow gas outlet portion (e.g., 2812) is positioned proximate to the gas inlet portion (e.g., 2804). The backflow gas outlet portion may facilitate (i) removal of backflow of gas from the enclosure (e.g., 2802) and/or (ii) reduce likelihood of turbulence and/or standing vortices at least in the area above the target surface. In some cases, the backflow outlet is operationally coupled to a vacuum source (e.g., pump) to pull the backflow of gas (e.g., and maintaining in the enclosure pressure at ambient pressure or at above ambient pressure). For example, using a light vacuum force. In some embodiments, an optical window purge gas flow (e.g., 2813) can be used to reduce an amount of debris (e.g., from particles of the material bed) from reaching the optical window (e.g., 2814), which will be described in detail herein.

Figure 30A:
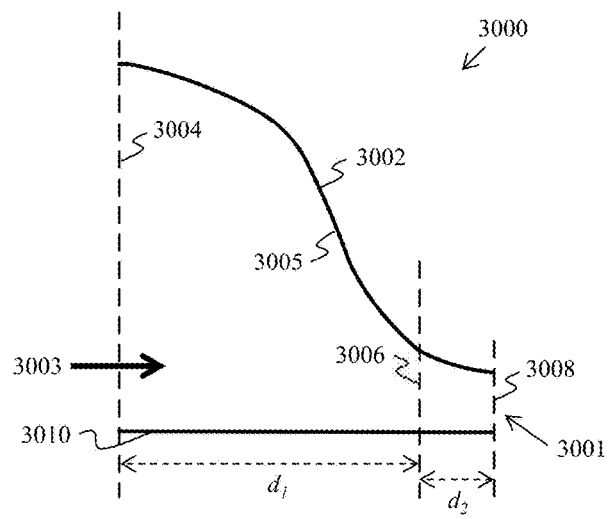
FIGS. 30A-30D schematically illustrate various cross sections of one or more 3D printer components.

In some embodiments, the gas outlet portion (e.g., gas outlet portion 2117 of FIG. 21) can include features that facilitate a smooth outlet of gas from the processing chamber of the 3D printing system. FIGS. 30A-30D show schematic views of an example gas outlet portion 3000 in accordance with some embodiments. FIG. 30A shows an example of a schematic side view of gas outlet portion 3000, which channels a gas flow 3003 away from a processing chamber (not shown) to outlet port 3001. The gas outlet portion can narrow a (e.g., vertical) cross section of the gas flow from the inlet port of the channel to the outlet port of the channel in a gradual manner. The gradual manner may comprise an aerodynamic manner. The gradual manner may reduce likelihood of standing vortices and/or turbulence at least above the target surface and in the processing cone. The gradual manner may reduce likelihood of debris return to the target surface at least during the operation of the energy beam (e.g., as part of the 3D printing). For example, the gas outlet portion can narrow from a first cross section area (e.g., as indicated by first section line 3004) to a second cross section area (e.g., as indicated by second section line 3006) to a third cross section area (e.g., as indicated by second section line 3008). A tapered shape of the gas outlet portion can be configured to converge the flow toward the outlet port (e.g., 3001). The gas outlet portion can have features that reduce an amount of gas flow turbulence during the convergence, thereby reducing the occurrence of backflow back into the processing chamber (e.g., opposite direction of gas flow 3003). For example, in some embodiments, at least a portion of the wall (e.g., 3002) (also referred to herein as a side) of the gas outlet portion has a continuous curved interior surface (e.g., 3005) to facilitate the smooth flow of gas (e.g., aerodynamic shape). In some embodiments, one side (e.g., top) of the gas outlet portion tapers more than an opposing (e.g., bottom) side. For example, a cross-section shape of one side (e.g., 3002) (e.g., top) can be characterized as having a greater slope than that of a cross-section of the opposing side (e.g., 3010) (e.g., bottom). A bottom side of the gas outlet portion can be more proximate to the platform than the top side.

Figure 30B:
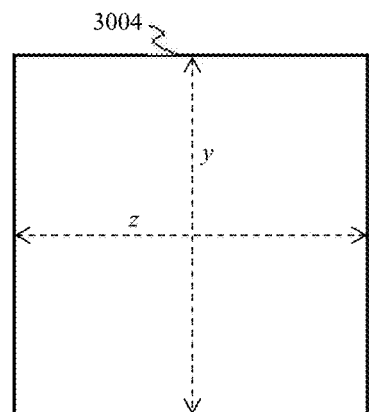
Figure 30C:
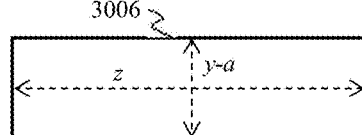
Figure 30D:
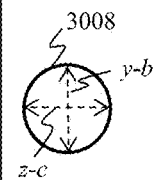

In some embodiments, the cross section of the gas outlet portion is reduced in a prescribed manner. For example, FIGS. 30B-30D show examples of various schematic cross section views of an example gas outlet portion 3000 at first 3004, second 3006, and third 3008 section lines. At a first cross section (e.g., 3004) near the processing chamber, the gas outlet portion can have a first shape (e.g., a polygonal shape (e.g., square or rectangle) characterized as having a first area (e.g., yz)). In some embodiments, the shape and size of the first cross section (e.g., 3004) is in accordance with a size and shape of a cross section of the processing chamber (e.g., the same or substantially the same). At a second cross section (e.g., 3006) nearer to the outlet port (e.g., 3001) can have a height (e.g., y dimension) that is reduced (e.g., by a) compared to the first cross section, thereby reducing an area of a cross section of the gas outlet portion to a second area (e.g., (y−a)z)). This area reduction can occur smoothly (e.g., continuously) over a first distance (e.g., d1). At a third cross section (e.g., 3008), the height (e.g., y dimension) and width (e.g., z dimension) of gas outlet portion is reduced (e.g., by b) over a second distance (e.g., d2), thereby reducing an area of the cross section of the gas outlet portion to a third area (e.g., (y−b)(z−c)). In some embodiments, the third cross section of the gas outlet portion can be modified to a round shape—thus, the y−b and z−c dimensions can be the same and each correspond to a diameter. In some embodiments, the gas outlet portion is comprised of different pieces. For example, a first piece can comprise walls that taper from the first cross section to the second cross section, and a second piece can comprise walls that taper from the second cross section to the third cross section. In some cases, a step-wise transition from a polygonal cross section (e.g., square or rectangle) to a cross section comprising a curvature (e.g., circle or oval) can reduce the occurrence of turbulence, standing vortices, and/or backflow near the target surface. For example, the second cross section shape can have the same number of sides as the first cross section shape, while the change to a round shape at the cross section can occur less proximate to the processing chamber. In some embodiments, the bulk of the reduction in cross section area occurs from the transition between the first cross section and the second cross section. In some embodiments, the third cross section area is at most about 20%, 15%, 10%, 5%, 3%, 2%, 1%, or 0.5% of the first cross section area. In some embodiments, the third cross section area relative to the first cross section area ranges between one or more of the above-referenced percentages (e.g., from 0.5% to 20%, from 1% to 5%, from 2% to 5%, from 2% to 20%, from 10% to 20%, etc.). In some embodiments, the third cross section area is at least about 50%, 55%, 60%, 65%, 70%, 75%, 80%, 85%, 90%, 95%, or 99% relative to the first cross section area. In some embodiments, the third cross section area relative to the first cross section area ranges between one or more of the above-referenced percentages (e.g., from 50% to 90%, from 80% to 99%, from 80% to 95%, from 60% to 90%, from 85% to 99%, etc.). In some embodiments, the first and third distances is at least about 0.1 cm, 0.5 cm, 1 cm, 5 cm, 100 cm, 500 cm, 750 cm, or 1000 cm.

Figure 31:
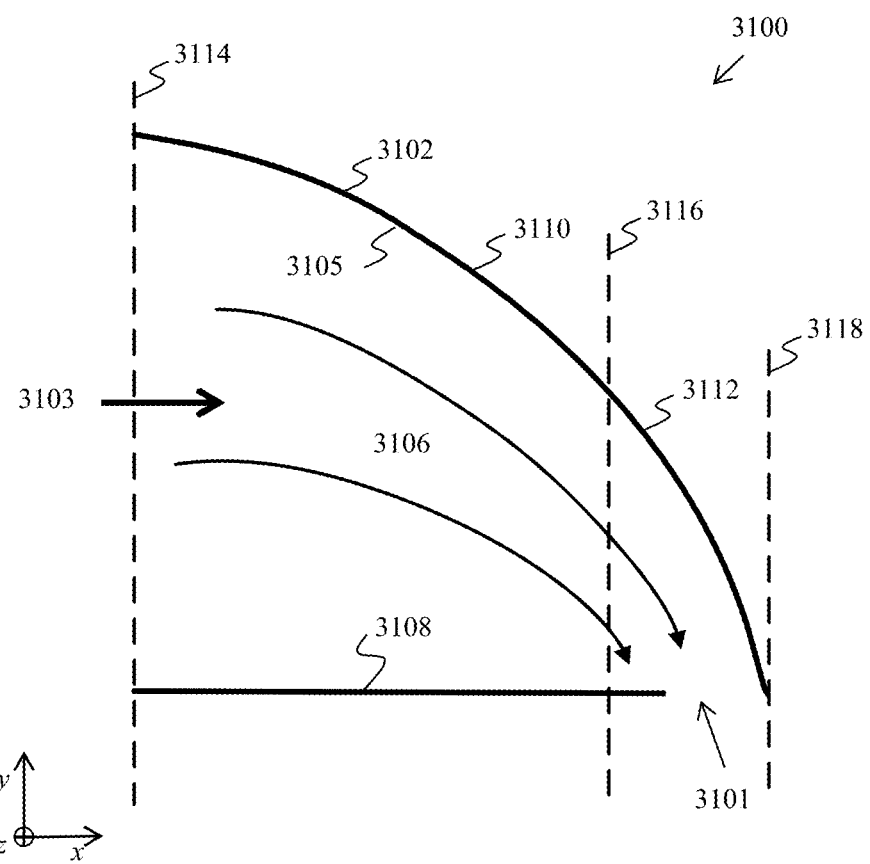
FIG. 31 schematically illustrates a side view of a component of a 3D printer.

In some embodiments, the outlet of the gas outlet portion is configured to promote a vertical (e.g., downward) directional component of gas flow as the gas exits the enclosure of a 3D printing system. FIG. 31 shows a schematic side view of an example gas outlet portion 3100 in accordance with some embodiments, having a gas outlet portion having a wall 3102, a first interior surface 3105, a second interior surface 3108, an inlet port 3103, and outlet port 3101, and a gas flow 3106. The gas outlet portion can include a wall, which includes a first interior surface (e.g., top surface) and a second interior surface (e.g., bottom surface). In some embodiments, the first interior surface comprising a curvature. The first interior surface can be a continuously curved shape. The first interior surface may be configured to (e.g., smoothly) guide the gas flow in a direction away from a processing chamber of the 3D printing system and/or towards the outlet port (e.g., 3101). The first interior surface can comprise a curvature so as to increase a vertical direction component (e.g., in accordance with they in FIG. 31 (e.g., downward)) of the gas flow, toward the outlet port. The outlet port can correspond to an opening that is operatively coupled to a pump. The pump may be part of a gas recycling system (e.g., as described herein). The outlet port can be positioned within or as part of the second interior surface (e.g., bottom surface) of the wall of the gas outlet portion. The outlet port position may be configured (e.g., positioned) to promote a continuous vertical direction component (e.g., in they direction in FIG. 31) (e.g., downward) of the air flow within the gas outlet portion. In some embodiments, a first section (e.g., 3102) of the gas outlet portion can comprise walls that tapers from a first cross section (e.g., 3114) area to a second cross section (e.g., 3116) area, and a second piece (e.g., 3112) of the gas outlet portion can comprise walls that taper from the second cross section (e.g., 3116) area to a third cross section (e.g., 3118) area. In some cases, the transition is in a step-wise fashion, e.g., from a polygonal cross section (e.g., square or rectangle) to a curved shaped cross section (e.g., circle or oval), such as described herein with reference to FIG. 30. In some cases, the first piece and the second piece combine to a form wall (e.g., 3102) that combine to form a continuously curved interior surface (e.g., 3105).

Figure 23:
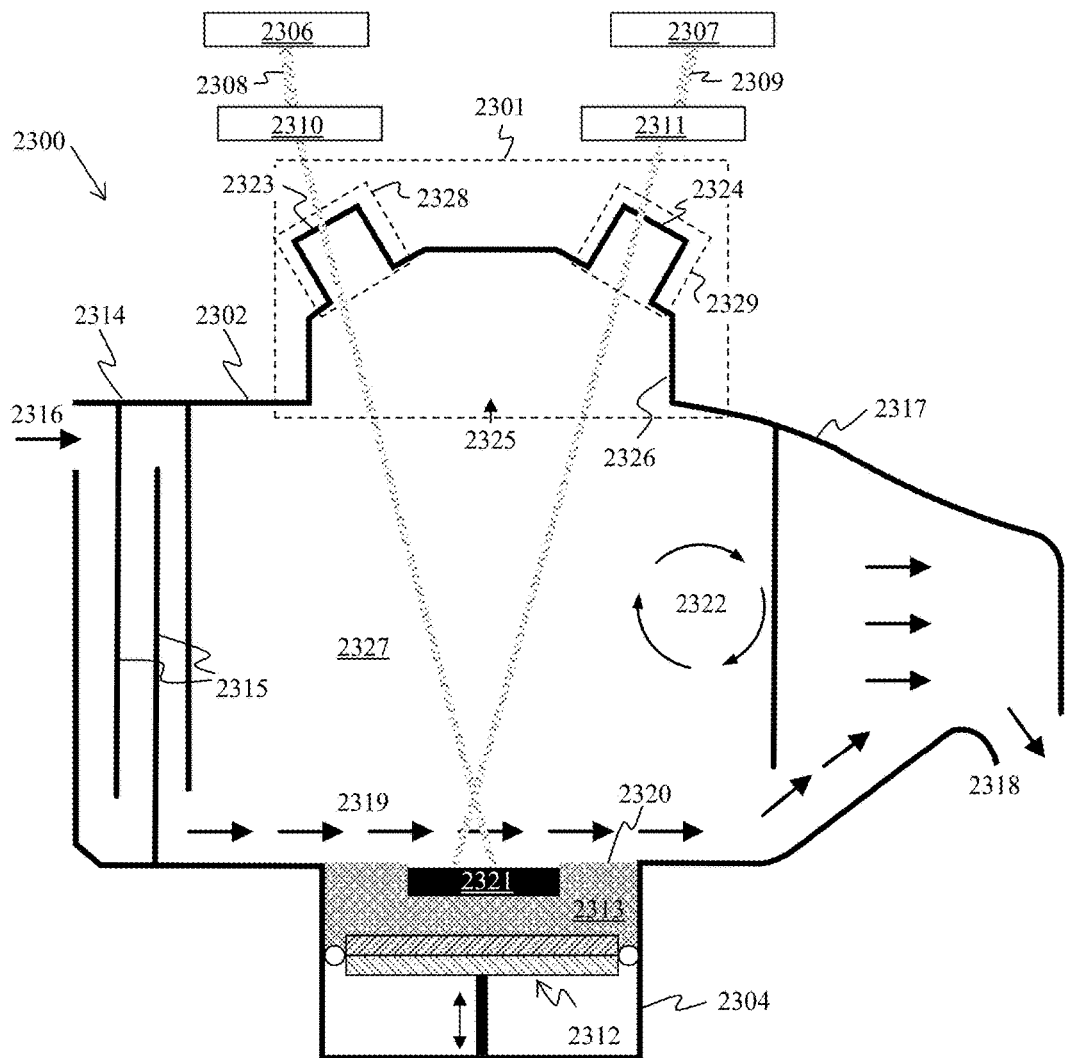
FIG. 23 schematically illustrates a side view of a 3D printer and its components.

As described herein, gas-borne debris (e.g., soot or powder) may be present in a processing chamber during a 3D printing operation. In some cases, the gas-borne debris can interfere with the efficacy of the energy beam (e.g., laser or electron beam) used to transform pre-transformed material of a material bed. For example, the gas-borne debris can encroach an area near a window (sometimes referred to as an optical window) through the energy beam passes into the processing chamber, and/or can deposit on an internal surface of the window. The debris can attenuate the power density of the energy beam as it travels in towards the target surface. In some embodiments, the 3D printing systems described herein include structures and/or mechanisms to reduce an amount of gas-borne debris near one or more optical windows and/or adhere thereto. FIG. 23 shows a schematic view example of a 3D printing system 2300 having a recessed optical window area in accordance with some embodiments. 3D printing system 2300 includes processing chamber 2302, which together with build module 2304 form an enclosure for enclosing material bed 2313 and facilitate the 3D printing process using the energy beams 2308 and 2309 generated by energy sources 2306 and 2307 respectively, which energy beams travel through optical windows 2323 and 2334 towards the target surface 2320 through an interior 2327 of the processing chamber, to facilitate formation of the 3D object 2321. In the example shown in FIG. 23, the processing chamber comprises an inlet portion 2314 having an inlet port 2316, baffles 2315, and an outlet port through which gas 2319 flows above the target surface 2320 to the outlet portion 2314, and exits through the outlet port 2318 of the outlet portion 2317. In some cases, the inlet portion and/or the outlet portion can include one or more filters (e.g., HEPA filters), as described herein. The filter(s) may be coupled to a wall of the enclosure. The filter(s) may control an amount of gas flow (e.g., 2319). In some embodiments, the filter includes a screen (e.g., separating the inlet portion and/or the outlet portion from the processing chamber).

The 3D printing system can include at least two energy beam sources: a first energy beam source and a second energy beam source which are each configured to generate corresponding energy beams. Optical mechanisms can be used to control aspects of the energy beams (e.g., their translation). For example, the optical mechanisms can control the trajectories of the respective energy beams through respective optical windows (which can also be referred to as windows), into the processing chamber, and to a target surface. In some embodiments, the first and second energy sources are configured to generate energy beams. The energy beams may be different in at least one energy beam characteristics. The energy beams may be the same in at least one energy beam characteristics. In some embodiments, the first and second energy beams are used together (e.g., sequentially and/or in parallel) during printing of a single layer of transformed material. In some embodiments, the first energy beam can be used to form a first layer of transformed material and second energy beam can be used to form a second layer of transformed material that is different than the first layer. FIG. 23 shows an example of optical mechanisms 2310 and 2311 (e.g., scanners), and optical windows 2323 and 2334 that are each disposed within its own recessed portion, e.g. 2328 and 2324 respectively. In the example shown in FIG. 23, the optical windows are disposed in a first recess portion 2325 having a recessed chamber wall 2326 that defines a cavity 2325, the optical windows 2323 is disposed in a second recess portion 2328 (also referred to herein as "window holder"), and the optical window 2324 is disposed in a second recess portion 2329 (also referred to herein as "window holder"). FIG. 23 shows an example of an optionally backflow current 2333 in the processing chamber interior volume 2327.

In some embodiments, the optical window is situated within a (e.g., first) recessed portion that is coupled to, or is part of the processing chamber. The recessed portion can include a recessed chamber wall that at least partially defines a cavity (e.g., a volume). In some embodiments, one or more optical windows are disposed within the recessed portion (e.g., within the walls of the cavity). In some embodiments, the optical window can be further recessed from the cavity (e.g., by an additionally recessed portion, e.g., by a second recessed portion). The recessed portion may be disposed between the windows and the target surface. For example, the processing chamber can have a recessed wall (e.g., ceiling). The recessed portion (e.g., first and/or second) may be operatively coupled (e.g., connected) to the processing chamber. The connection may be reversible. The optical window and/or recessed portion may be exchangeable. In some embodiments, the recessed chamber wall is integral with other walls of processing chamber (e.g., forming a continuous chamber wall). The recessed portion may be an integral part of the processing chamber. In some embodiments, the recessed chamber wall is a non-integral portion (e.g., a separable piece) of the processing chamber. The recessed chamber wall can at least partially surround the cavity to facilitate reduction in an amount of gas flow from entering therein (e.g., from the interior of the processing chamber (e.g., 2327) and/or from the gas flowing above the target surface (e.g., 2319)). For example, some amount of gas backflow (e.g., circulating gas flow), turbulence, and/or standing vortex can develop (e.g., adjacent to the gas outlet portion), which may include gas-borne material. The gas-borne material may include pre-transformed material (e.g., powder) and/or debris (e.g., as a result of transforming a pre-transformed material to a transformed material (e.g., soot)). The recessed chamber wall of the recessed portion can shield the cavity, and thereby shield the windows, from at least a portion of the backflow, turbulence, and/or standing vortex. The recessed chamber wall of the recessed portion can reduce an amount of gas-borne material (e.g., debris) from entering the cavity of the recessed portion, and/or accumulate on (and/or adhere to) the optical window(s). The recessed portion can at least, in part, shield the windows from gas-borne material (e.g., debris (e.g., soot)) and/or gas(es) (e.g., oxidative gases) within the enclosure from depositing on the windows or otherwise negatively affecting (e.g., reducing intensity) of the energy beam(s).

Figure 24:
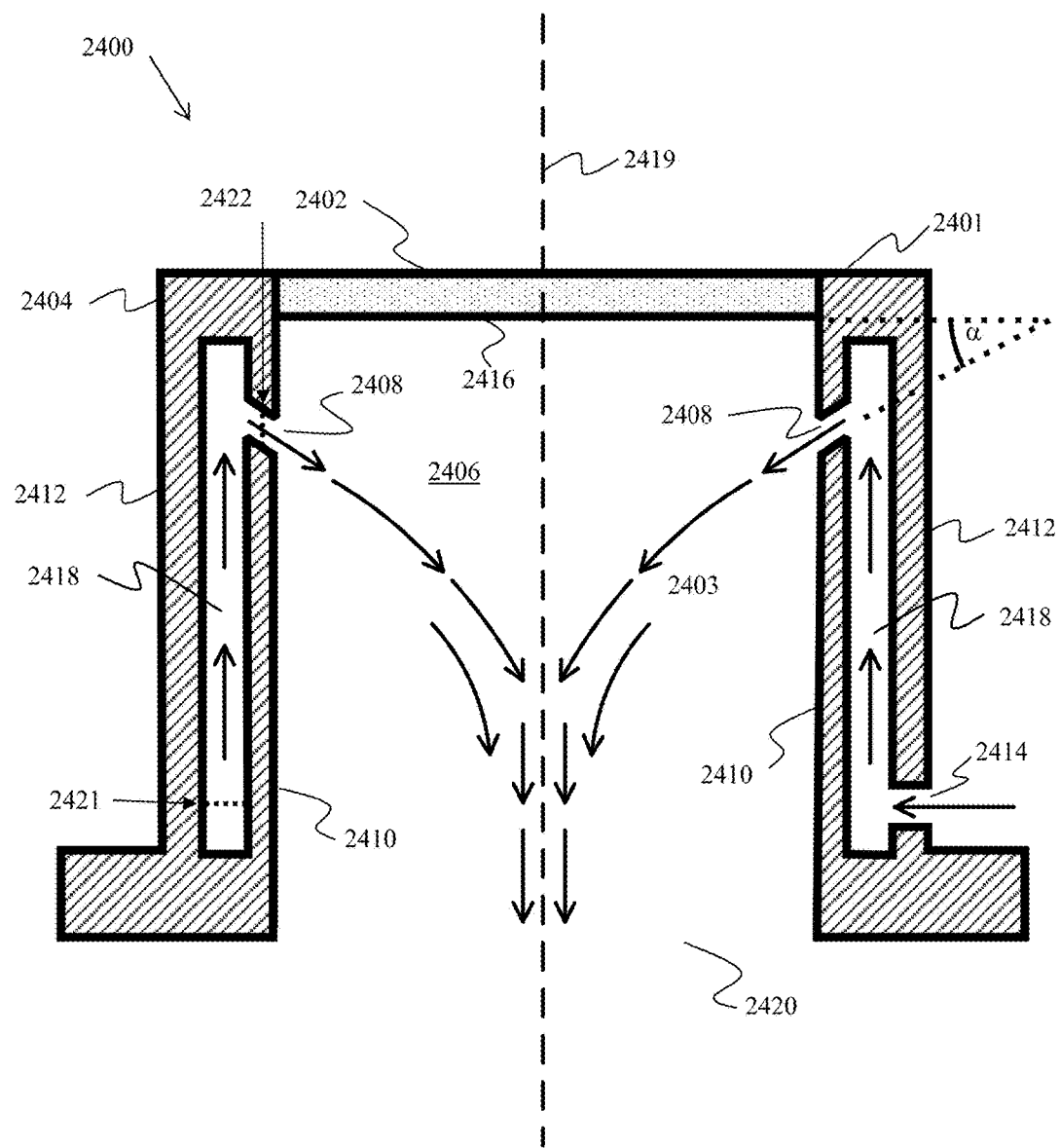
FIG. 24 schematically illustrates a side view of a component of a 3D printer.
Figure 27A:
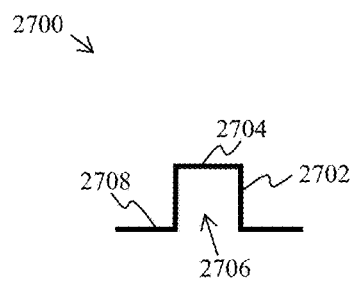
FIGS. 27A-27F schematically illustrate side views of components of one or more 3D printers.
Figure 27D:
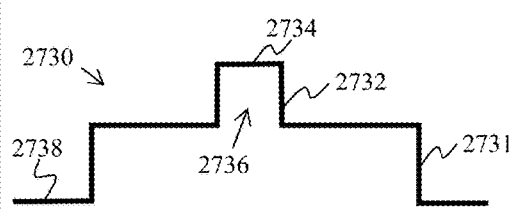
Figure 27B:
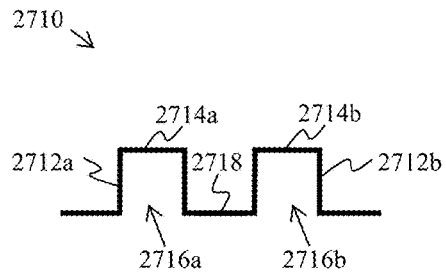
Figure 27E:
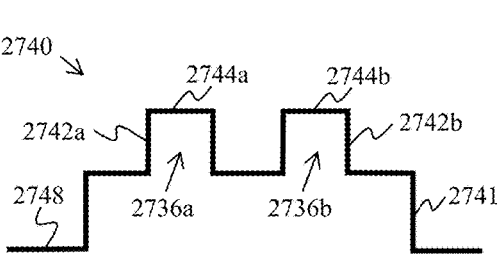
Figure 27C:
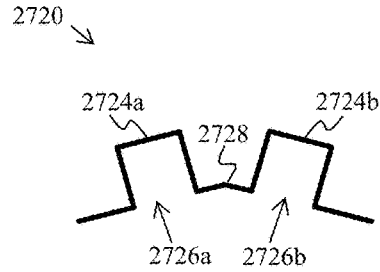

In some embodiments, the window(s) of a 3D printing system are disposed (e.g., directly) along the wall(s) of a recessed portion (See e.g., FIGS. 27A-27C). In some embodiments, the window(s) are disposed in and further recessed within one or more secondary recessed portions. In the example shown in in FIG. 23, second recessed portions 2328 and 2329 support and further separate windows 2323 and 2324, respectively, with respect to the target surface. In some embodiments, the walls of the window holders are integral with the recessed chamber wall. In some embodiments, the walls of window holders are non-integral portions of the processing chamber wall (e.g., separable from the recessed chamber wall). FIG. 24 shows an example of a cross section view of a window holder portion 2400 in accordance with some embodiments. Window holder 2400 can correspond to one or both of window holders 2328 and 2329 in FIG. 23. Window holder 2400 further recesses window 2402 with respect to a main portion of an enclosure (e.g., enclosure 2302 of FIG. 23). This recess may reduce (e.g., prevent) the gas-borne material (e.g., pre-transformed material (e.g., powder) and/or debris) from flowing adjacent to, adhere to, and/or accumulate on the window 2402 (e.g., on its interior surface 2416).

In some embodiments, printing the 3D object comprises formation of debris. The debris may accumulate on the sides of the enclosure and/or on the (e.g., optical) window. The accumulation on the window may reduce transmittance of the energy beam therethrough. For example, the energy beam may scatter from the debris and/or absorb in the debris that is accumulated on the window (e.g., during the printing). In some cases, the amount of gas-borne material that accumulates on the window(s) is reduced to (e.g., substantially) negligible amounts (e.g., insubstantial amount). The effectiveness of the recessed window holders with gas flow purging can be quantified by conducting an energy beam stress test. The Energy beam stress test can include measuring a peak intensity reduction (abbreviated herein as "PIR") of the energy beam (e.g., laser beam). The PIR can be quantified as a ratio of the peak intensity of a spot irradiated by the energy beam on a target surface at various times (e.g., on the footprint of the energy beam at the target surface). The (e.g., two) various times can be at the beginning and at the end of a 3D printing operation (e.g., where one or more layers of pre-transformed material are transformed). The peak intensity of the footprint can correspond to the peak intensity used to transform a pre-transformed material to a transformed material (e.g., to form the 3D object). The PIR can be calculated using the following equation 1:

$$PIR = \frac{\text{Spot peak intensity}}{\text{average}[\text{Spot peak intensity}(N - N_{av} + 1:N)]}$$

where N is the number of measurements and $N_{av}$ is the number of measurement points that are averaged. In some embodiments, the gas flow can result in an insubstantial (e.g., (substantially) undetectable) amount of debris affecting the peak intensity of the energy beam on the target surface (e.g., exposed surface of the material bed). The peak intensity of the energy beam may be (e.g., substantially) unchanged (e.g., not reduced) after transformation of at least about 1, 500, 1000, 2,000, 5,000 or 10,000 layers of pre-transformed material. The layer may have a FLS that corresponds to the FLS of the platform, e.g., as disclosed herein. The peak intensity of the energy beam can be (e.g., substantially) unchanged after transformation of any number of layers of pre-transformed material between any of the aforementioned number (e.g., from 1 layer to 10,000 layers, from 1 layer to 2,000 layers, or from 2,000 layers to 10,000 layers). The peak intensity of the energy beam may be (e.g., substantially) unchanged (e.g., not reduced) after transformation of at least about 3.4 milliliters, 1.7 liters, 3.4 liters, 6.8 liters, 17 liters or 34 liters of pre-transformed material, respectively. The peak intensity of the energy beam can be (e.g., substantially) unchanged after transformation of any volume between any of the afore-mentioned volumes of pre-transformed material (e.g., from about 3.4 milliliters to about 34 liters, from about 3.4 milliliters to about 6.8 liters, or from about 6.8 liters to about 10,000 liters). In some embodiments, the 3D printing system lacking a gas purging of the window (e.g., as disclosed herein) may experience significant reduction in peak intensity of the energy beam (e.g., due to accumulation of debris at the window) experienced at the target surface. For example, after printing about 3.4 liters of transformed material (e.g., that may correspond to about 1000 layers of the 3D object) as part of the 3D object (e.g., by transforming a pre-transformed material to a transformed material and subsequently accumulating debris on the window), the beam intensity experienced at the target surface will be reduced to about 1% of the initial beam intensity experienced by the target surface (e.g., when the window was clean). This is compared to a (e.g., substantially) undetectable reduction in PIR using a gas purging window, e.g., as disclosed herein, over the same number of layers.

The window holders can include a top portion (e.g., FIG. 4, 2401) that supports the window (e.g., 2402), and side walls (e.g., 2404) that define a volume (e.g., 2406). The window can be made of any suitable material configured to allow at least a portion of an energy beam to pass therethrough. The material can be (e.g., substantially) transparent to at least a portion of the wavelengths of the energy beam. The portion may be at least 50%, 60%, 70%, 80%, or 90% of the wavelengths. In some cases, the window is comprised of an optical material having high thermal conductivity, e.g., as having any value of high thermal conductivity disclosed herein. For example, a suitable material having a thermal conductivity of at least (e.g., about) 1.5 W/m° C. (Watts per meter per degree Celsius) 2 W/m° C., 2.5 W/m° C., 3 W/m° C., 3.5 W/m° C., 4 W/m° C., 4.5 W/m° C., 5 W/m° C., 5.5 W/m° C., 6 W/m° C., 7 W/m° C., 8 W/m° C. 9 W/m° C., 10 W/m° C., or 20 W/m° C., at 300 K (Kelvin). The material can have a thermal conductivity ranging between any of the afore-mentioned values (e.g., from about 1.5 W/m° C. to about 20 W/m° C., from about 1.5 W/m° C. to about 5 W/m° C., or from about 5 W/m° C. to about 20 W/m° C. In some embodiments, the high thermally conductivity material comprises sapphire, crystal quartz, zinc selenide (ZnSe), magnesium fluoride ($MgF_2$), or calcium fluoride ($CaF_2$). In some embodiments, the optical window comprises fused silica. In some embodiments, the optical window comprises a material having a higher thermal conductivity than that of fused silica (i.e., about 1.38 W/m° C.). In some cases, one or more lenses are used instead of, or in combination with, window 2402, which one or more lenses can focus the energy beam. In some cases, the lens(es) are made of one or more of the materials listed herein for the optical window. Some materials may have birefringent properties that make them less suitable for lens(es) (but still may be suitable for windows). For example, in some embodiments, those materials having significantly different coefficients of thermal expansion depending on crystal orientation may not be as suitable for lens(es) (e.g., magnesium fluoride ($MgF_2$), calcium fluoride ($CaF_2$), and sapphire).

The window can have any suitable cross-sectional shape (e.g., elliptical, round, square, rectangular). The window holder (e.g., 2400) can include a purging system configured to direct a flow of gas within the volume (e.g., 2406). The side walls (e.g., FIG. 24, 2404) of the window holder (e.g., 2400) can include a gas outlet opening (e.g., 2408) that can introduce a flow (e.g., 2403) of gas (e.g., non-reactive gas (e.g., argon, nitrogen, etc.)) into the volume (e.g., 2406) at least partially defined by the window holder. This flow of gas can push away debris that approaches an entrance (e.g., 2420) of the window holder. In this way, this flow of gas can be referred to as purging flow of gas that purges the volume between the window and the target surface (e.g., in front of the window) of debris. The side walls (e.g., 2404) can include an inner wall (e.g., 2410) that includes the outlet opening (also referred to herein as an outlet) (e.g., 2408), and an outer wall (e.g., 2412) that includes an inlet opening (also referred herein as an inlet) (e.g., 2414). The outlet opening can comprise a slit (or a plurality of slits), a hole (or a plurality of holes), a perforated plate, mesh, or any other suitable configuration of openings, apertures, and/or holes. The inner wall may be separated from the outer wall to form a passage (e.g., 2418) through which gas can pass from the inlet to the outlet (e.g., as depicted by arrows in the passage FIG. 24, 2418). The passage may comprise one or more baffles. The passage may be devoid of baffles. In some embodiments, the outlet runs around a circumference of inner wall (e.g., 2410) (e.g., is an annular-shaped slit). In some embodiments, the inlet runs around a circumference of inner wall (e.g., 2410) (e.g., is an annular-shaped slit). The outlet can be configured to direct the flow of gas in a direction away from the window (e.g., and towards the target surface). For example, the (e.g., slit-shaped) outlet can be angled in a way that directs the flow toward a main region of the processing chamber, e.g., angled downwards as it opens towards the main volume. The outlet may comprise a nozzle. The outlet may be devoid of a nozzle. In some embodiments, the direction away from the window is at an (e.g., substantially) acute angle (e.g., a in FIG. 24) with respect to the internal window surface (e.g., 2416). A direction away from the window can be, for example, a direction towards the entrance (e.g., 2420) of the window holder, towards the target surface and/or towards the platform of the 3D printing system. Put another way, a direction away from the window includes a vector of flow of gas that is non-tangential and/or non-parallel to the internal window surface (e.g., 2416). In some embodiments, the flow of gas comes from opposing sides of the inner wall (e.g., 2410), and converge toward a central axis (e.g., 2419) (e.g., have a convergence vector with a cone-like-shape). The influx of gas into the interior of the window holder can originate a single (e.g., annular) outlet or from a plurality of outlets (e.g., arranged along two or more opposing inner walls of the window holder). In some embodiments, the inner wall and the outer wall of the window holder define a passage in which gas can flow through (e.g., 2418). The passage may be a plenum. Gas can pass from an inlet opening (e.g., 2414) of the outer wall, through the passage, and through outlet opening (e.g., 2408) to the inner volume (e.g., 2406) of the window holder. In some embodiments, a ratio of an area of a cross-section of the passage (e.g., plenum) to an area of a cross-section of the outlet is at least a prescribed ratio to provide a flow of gas with high enough pressure and/or velocity to purge the volume (where the cross-sections of each of the plenum and the inlet are perpendicular to the flow of gas within each (e.g., per arrows within plenum 2418 and within inlet 2408). In particular, the flow of gas within the window holder can experience a pressure loss due to turbulence and/or friction of the gas along the internal surfaces of the passage. There may be a ratio between the cross section of the gas passing through the passage, and the one passing through the outlet. The ratio can be a perpendicular cross section area (e.g., 2421) of the passage (e.g., 2218) with respect to the direction of gas flow in the passage; to a perpendicular cross section area (e.g., 2422) of the outlet opening (e.g., 2208) with respect to a direction of gas flow in the outlet opening. In some embodiments, this ratio is at most about 15:1, 12:1, 11:1, 10:1, 9:1, 8:1 or less. The perpendicular cross section area 2421 of 2218 with respect to the direction of gas flow can be a horizontal cross section of the passage. The perpendicular cross section area of the gas outlet with respect to a direction of gas flow can be a vertical cross section of the outlet. In some embodiments, at least two of the plurality of outlets and/or inlets are different. In some embodiments, at least two of the plurality of outlets and/or inlets are the same.

A window holder for supporting a window and/or at least partially shielding a window from debris can have any suitable shape (e.g., cylindrical, polyhedron, e.g., prism). For example, the window may have a first cross-sectional shape, and the window holder may have the same or a different second cross sectional shape as the window. The first and/or second cross-sectional shapes may be a geometric shape (e.g., any polygon described herein). The first and/or second cross-sectional shapes may comprise a straight line or a curved line. The first and/or second cross-sectional shapes may comprise a random shape. FIGS. 26A-26E show cross section views of window holders having different exemplary shapes and features in accordance with some embodiments.

Figure 26A:
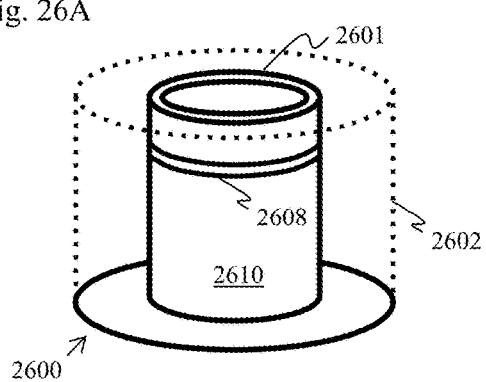
FIGS. 26A-26E schematically illustrate side views of components of one or more 3D printers.
Figure 26D:
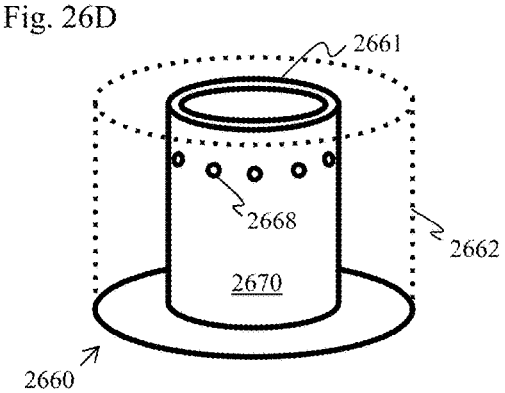
Figure 26B:
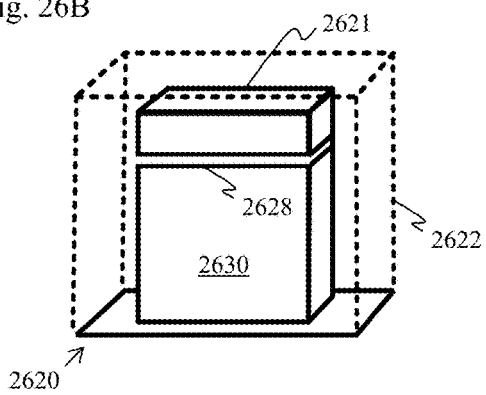
Figure 26E:
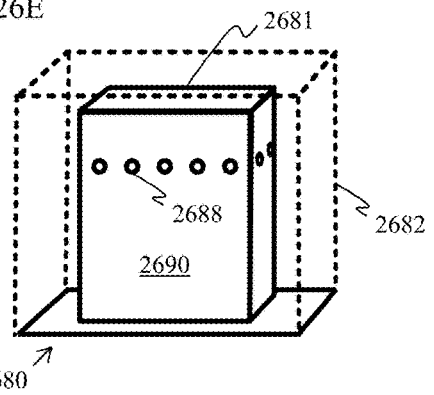
Figure 26C:
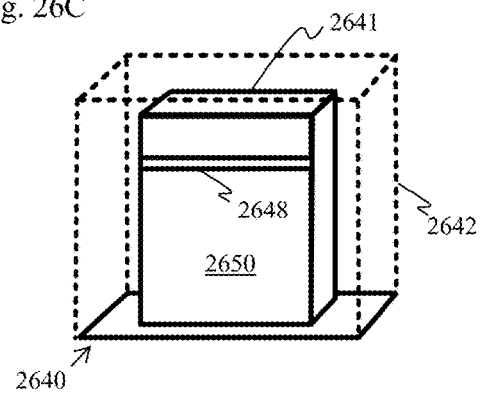

The window holder can have a cylindrical cross-sectional shape, such as shown in the example window holder 2600 in FIG. 26A. The window holder can include a top portion (e.g., 2601 that) can be configured to support a round window. The window holder can include an inner wall (e.g., 2610) that includes the outlet (e.g., 2608), and an outer wall (e.g., indicated with dashed lines 2602) that includes an inlet opening. The inner wall can define a volume into which gas enters through the outlet. As shown in the example of FIG. 26A, the inlet can correspond to an annular-shaped slit within the inner wall. FIG. 26B shows an example window holder 2620, indicating that the window holder can have a polygonal cross-sectional shape (e.g., rectangular prism), which includes a top portion (e.g., 2621) that can be configured to support a rectangular or square cross-sectional shaped window. The window holder can include an inner wall (e.g., 2630) that includes the outlet (e.g., 2628), and an outer wall (e.g., indicated with dashed lines 2622) that can include an inlet. The inner wall can define a volume that gas enters via the outlet, which can correspond to a continuous slit through all sides of the inner wall (e.g., 2630). The cylindrical window holder may hold a polygonal window. The polyhedron window holder may hold an elliptical (e.g., circular) window. FIG. 26C shows a window holder 2640, indicating that the window holder can have a polygonal cross-sectional shape (e.g., as part of a rectangular prism), which includes a top portion (e.g., 2641) that can be configured to support a rectangular or square cross-sectional shaped window. The window holder can include an inner wall (e.g., 2650) that includes the gas outlet (e.g., 2648), and an outer wall (e.g., indicated with dashed lines 2642) that includes the gas inlet. The inner wall can define a volume that gas enters via the outlet (e.g., 2648), which can correspond to multiple slits within one or more sides (e.g., opposing sides) of the inner wall. FIG. 26D shows an example window holder 2660, indicating that the window holder can have a cylindrical cross-sectional shape, which includes a top portion (e.g., 2661) that can be configured to support a round cross-sectional shaped window. The window holder (e.g., 2660) can include an inner wall (e.g., 2670) that includes the gas outlet (e.g., 2668), and an outer wall (e.g., indicated with dashed lines 2662) that includes the gas inlet. The inner wall can define a volume that gas enters via the outlet (e.g., 2668), which can correspond to a multiple holes within the inner wall. FIG. 26E shows an example window holder 2680, indicating that the window holder can have a polygonal cross-sectional shape (e.g., as part of a rectangular prism), which includes a top portion (e.g., 2681) that can be configured to support a rectangular or square cross-sectional shaped window. The window holder can include an inner wall (e.g., 2690) that includes the outlets (e.g., 2688), and an outer wall (e.g., (indicated with dashed lines 2682) that includes an inlet. The inner wall (e.g., 2690) can define a volume that gas enters via the outlets (e.g., 2688), which can correspond to a plurality of holes within one or more sides of the inner wall. Features of FIGS. 26A-26D can be combined, where suitable. For example, an inner wall can include slit(s) and hole(s). A cylindrical cross-sectional shaped window holder can be configured to support a rectangular or square cross-sectional shaped window, or vice versa. It should be noted that the embodiments shown in FIGS. 26A-26D are shown for illustrative purposes and do not limit the scope (e.g., shape, size, features) in accordance with embodiments as described herein. The inlet (e.g., gas inlet) can comprise a plurality of gas inlets. The outlet (e.g., gas outlet) can comprise a plurality of outlets.

Figure 27F:
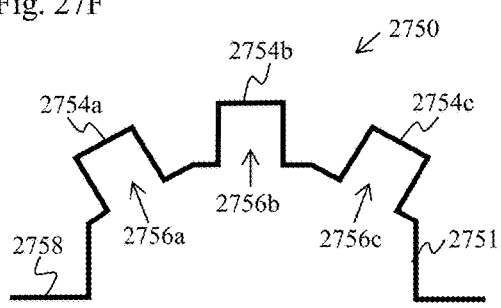

An optical window of a 3D printing system can have one or more window holders, which may or may not be further recessed with respect to a main portion of an enclosure. To illustrate, FIGS. 27A-27F show schematic example cross section views of various embodiments of optical window portions (e.g., analogous to FIG. 23, 2325) as part of one or more 3D printing systems in accordance with some embodiments. FIG. 27A shows an example of an optical window portion 2700, which indicates that the optical window portion includes a window holder 2702 that supports the window 2704 and defines a volume 2706 that is recessed with respect to a wall (e.g., 2708) of an enclosure. The wall can be a ceiling of the enclosure. FIG. 27B shows an example of an optical window portion 2710 that includes two window holders 2712a and 2712b that support windows 2714a and 2714b respectively, and that define volumes 2716a and 2716b (respectively) that are recessed with respect to a wall 2718 of an enclosure. FIG. 27C shows an example of an optical window portion 2720 that includes window holders 2722a and 2722b that support windows 2724a and 2724b (respectively), and that define volumes 2726a and 2726b (respectively) that are recessed with respect to a wall 2728 of an enclosure. FIG. 27D shows an example of an optical window portion 2730 that can include a window holder 2732 that supports the window 2734 and that defines a volume 2736. The window holder (e.g., 2732) can be further recessed with respect to the wall (e.g., 2738) of an enclosure by a recessed portion (e.g., 2731). FIG. 27E shows an example of an optical window portion 2740 that includes at least two window holders 2742a and 2742b that support windows 2744a and 2744b (respectively), and that can define volumes 2746a and 2746b. The at least two window holders can be further recessed with respect to a wall (e.g., 2728) of an enclosure by a recessed portion (e.g., 2741). FIG. 27F shows an example of optical window portion 2750 that includes three window holders 2752a, 2752b, and 2752c that support windows 2754a, 2754b and 2754c (respectively), and that define volumes 2756a, 2756b and 2756c (respectively); which three window holders are further recessed with respect to a wall 2728 of an enclosure by a recessed portion 2751.

In some cases, the window holders are in an arrangement with respect to the energy source(s), a flow of gas within the enclosure, and/or an opening of the enclosure. FIGS. 39A-39C illustrate top views of various example printing systems. FIG. 39A show enclosure 3900, which includes processing chamber 3902, gas inlet portion 3904, gas outlet portion 3906 and an optional ancillary chamber 3908. The window holders (e.g., 3910 and 3912) can be aligned (e.g., in accordance with line 3919) that is (e.g., substantially) aligned (e.g., parallel) with a direction (e.g., 3918) of a flow of gas through the enclosure (e.g., above a target surface and/or platform in the processing chamber). An opening (e.g., 3916) to the enclosure (e.g., processing chamber) may provide access to the three-dimensional part, the material bed, and/or the platform within the processing chamber. The opening may be used by an operator or a robot. The window holders may be coupled to energy source(s) and/or associated optics and controllers. In some embodiments, the window holders (and associated equipment) are arranged provide easy access to the opening. In some cases, the window holders are (e.g., substantially) aligned (e.g., parallel) with the opening. FIG. 39B show enclosure 3920, which includes processing chamber 3922, gas inlet portion 3924, gas outlet portion 3926 and an optional ancillary chamber 3928. The window holders (e.g., 3930 and 3932) can be aligned (e.g., in accordance with line 3939) (e.g., substantially) orthogonally (e.g., perpendicularly) with a direction (e.g., 3938) of a flow of gas through the enclosure. In some cases, the window holders are aligned (e.g., substantially) orthogonally (e.g., perpendicularly) with the opening (e.g., 3936). FIG. 39C show enclosure 3940, which includes processing chamber 3942, gas inlet portion 3944, gas outlet portion 3946 and an optional ancillary chamber 3948. The window holders (e.g., 3950 and 3952) can be aligned (e.g., in accordance with line 3959) at an angle (e.g., non-parallel and non-orthogonal) with respect to a direction (e.g., 3958) of a flow of gas through the enclosure. In some cases, the window holders are aligned at an angle (e.g., non-parallel and non-orthogonal) with respect to the opening (e.g., 3956). The example embodiments shown in FIGS. 27A-27F and 39A-39C do not limit the scope and number of possible embodiments described herein. That is the optical window portions described herein can include any suitable number and arrangement of windows, window holders, recessed portions, etc., which can each have any suitable shape and size.

In some embodiments, the direction of the purging gas flow for a window can depend on a number of factors, including structural features of the enclosure, gas flow velocity and gas flow dynamics. In some embodiments, the purging flow of gas in front of a window (e.g., between the window and the target surface) is primarily in one direction, i.e., unidirectional (e.g., flowing from one side of the optical window to an opposing side of the optical window). In some embodiments, the purging flow of gas in front of a window has a primary component in one direction. In some embodiments, the purging flow of gas in front of a window is has a primary component in one direction that changes to a primary component in a second direction (e.g., with the one direction and second direction forming an angle, e.g., 90 degrees angle). The angle can be acute, obtuse, or right angle. In some embodiments, the purging flow of gas in front of a window converges below the window (e.g., between the window and the target surface). In some embodiments, the purging flow of gas in front of a window comprises (i) a flow component in a direction towards the target surface or (ii) a flow component in a direction parallel to the window. In some embodiments, the purging flow of gas in front of a window flows (i) parallel to the window, (ii) perpendicular to the window, (iii) in a direction different than parallel to the window, (iv) in a direction different than perpendicular to the window, or (v) any combination or permutation thereof. In some embodiments, gas flowing from a plurality positions, flows towards a conversion point and/or line. At least two positions of the plurality oppose each other in space (e.g., the gas flowing from the at least two positions has opposing flow components). FIGS. 29A and 29B show schematic side views of example 3D printing systems having features for purging a volume in front of a window using a substantially unidirectional (e.g., unidirectional) flow component in accordance with some embodiments. In some embodiments, the flow of purging gas (e.g., 2918) is directed from a purge inlet (e.g., 2912) to a purge outlet (e.g., 2914), which can be parallel to an internal surface optical of the window (e.g., 2916). This configuration can provide a "blanket" of gas in front of the window. An additional (e.g., primary) flow of gas (e.g., 2903) can flow over the target surface (e.g., 2908) from the gas inlet portion (e.g., 2904) to the gas outlet portion (e.g., 2906). This can optionally cause a gas flow recirculation path (e.g., 2905) within the enclosure (e.g., 2902). In order to alleviate such occurrence, the flow of purging gas (e.g., 2918) can be in a direction opposite the primary flow of gas for better flow efficiency. In some embodiments, the purge outlet is operatively coupled to a vacuum pump to assist the flow of gas toward purge outlet (in which case, the purge inlet may or may not be coupled to a pressurized gas source). The enclosure (e.g., 2922 in FIG. 29B) can include a recessed region (e.g., 2927) (e.g., recessed portion (e.g., FIG. 23, 2301) or window housing (e.g., FIG. 23, 2323 or 2324)). The flow of purging gas (e.g., 2928) can be directed from the purge inlet (e.g., 2934) to the purge outlet (e.g., 2932). The flow of purging gas can be parallel to an internal surface of window (e.g., 2936). The primary flow of gas (e.g., 2923) can flow over the target surface (e.g., 2928) from the gas inlet portion (e.g., 2924) to the gas outlet portion (e.g., 2926). This can cause an optional gas flow recirculation path (e.g., 2925) within the enclosure (e.g., 2922). Components of the gas flow recirculation path can reverse direction near the recessed region (e.g., as shown in FIG. 29B). In such a flow architecture, the flow of purging gas can be in the same direction as the primary flow of gas for better flow efficiency. In some embodiments, the purge outlet is coupled to a vacuum source to assist the flow of gas toward the purge outlet (in which case, the gas purge inlet may or may not be coupled to a pressurized gas source). In some embodiments, the gas flow purge is directed away from or toward the window (e.g., instead of parallel to the window). In some embodiments, the pressure in the enclosure may be regulated to maintain a pressure at or above ambient pressure (e.g., albeit the coupling to a pressurized source and/or vacuum source).

In some embodiments, the inner walls of the window holder (e.g., FIG. 23, 2329) are angled with respect to the window and/or with respect to each other. In some embodiments, the inner walls of the window are parallel to each other and/or perpendicular to the optical window. FIG. 38A shows a cross section view of an example window holder 3800. The window holder can have side walls (e.g., 3804) that recesses at least one window (e.g., 3802) and that can at least partially facilitate shielding the at least one window from gas-borne debris that may be moving within a main portion of an enclosure (e.g., enclosure 2302 of FIG. 23). The recess may be with respect to a wall of the enclosure (e.g., a ceiling, e.g., FIG. 23, 2302) to which the recess portion (e.g., 2301) is coupled to. The wall(s) of the window holder can include an inner portion (e.g., 3810) that can include the outlet (e.g., 3808). The inlet and/or the outlet can correspond to a slit (or a plurality of slits), a hole (or a plurality of holes), a perforated plate, mesh, or any other suitable configuration of openings, apertures, and/or holes, as described herein. The slit can be an annular slit. The outer portion (e.g., 3812) of the wall(s) can include at least one inlet (e.g., 3814). The walls can include at least one passage (also referred to herein as a channel) (e.g., 3818) through which gas can pass from the inlet opening to the outlet opening (e.g., as depicted by arrows in the passage FIG.

38A). The outlet can be configured to direct the flow of gas within the inner volume (e.g., 3806) (also referred to as volume, cavity, or region) of the window holder in a direction away from the window (e.g., and towards the target surface). In some embodiments, the inner wall (e.g., 3810) is at an angle (e.g., a (alpha)) with respect to an inner surface (e.g., 3803) of the window. In some embodiments the angle (alpha) is acute. In some embodiments, the angle alpha is obtuse. In some embodiments, the angle alpha is a right angle. In some embodiments, the angle is (e.g., substantially) at least about 10°, 20°, 30°, 40°, 45°, 50°, 60°, 70°, 80°, 90°, 85°, 90°, 95°, 100°, 110°, 125°, 150°, or 170°, or 180°. In some embodiments, the angle is at most about 10°, 20°, 30°, 40°, 45°, 50°, 60°, 70°, 80°, 90°, 85°, 90°, 95°, 100°, 110°, 125°, 150°, or 170°, or 180°. The angle can range between any of the afore-mentioned degrees (e.g., from about 10 to about 90, from about 20 to about 90, from about 45 to about 125, from about 85° to about 180°, from about 85° to about 110°, from about 110° to about 180°, or from about 90° to about) 170°. FIG. 38A shows an example in which the angle alpha between the inner surface of the window 3803 and the inner wall 3810, is obtuse. The insert 3890 in FIG. 38A shows an example in which the angle alpha between the inner surface of the window 3891 and the inner wall 3892, is acute. Insert 3890 shows an optional alternate geometry of a wall (e.g., 3810) with respect to the window. In some embodiments, two or more inner walls form an acute angle with the inner surface of the window. In some embodiments, two or more walls form an obtuse angle with the inner surface of the window (e.g., 3810 with 3803). In some cases, the window holder is configured to provide a gas flow having a downward flow component. Downward may be towards the platform and/or target surface. Downward may be in a direction away from the internal surface (e.g., 3803) of the optical window (e.g., 3802). Downward may be toward the main portion of the enclosure. The downward flow component may be at a predetermined distance (e.g., 3820) from the internal surface of the window or greater. The downward flow component can comprise a vertical flow component. In some embodiments, the window holder is configured to operate using a pre-determined pressure of gas flow. In some embodiments, the pressure is at least about 5 mm/sec (millimeters per second), 10 mm/sec, 20 mm/sec, 50 mm/sec, 100 mm/sec, or 200 mm/sec. In some embodiments, the flow (e.g., within the window holder) is at a speed of at most about 500 mm/sec, 300 mm/sec, 200 mm/sec, 100 mm/sec, or 50 mm/sec. The gas flow speed can range between any of the afore-mentioned speeds (e.g., from about 5 mm/sec to about 500 mm/sec, from about 5 mm/sec to about 100 mm/sec, or from about 100 mm/sec to about 500 mm/sec). In some embodiments, at least one window holder (e.g., 3821) comprises a ring, bracket, and/or clamp that can be used to facilitate coupling of the window to the side walls. In some embodiments, the window holder accommodates one or more fasteners (e.g., screws, bolts, pins, adhesives, tapes). For example, the window holder can include holes (e.g., threaded holes), recesses, protrusions, or ledges. An outer surface (e.g., 3822) of the window can be non-flush (e.g., recessed or proud) with respect to an outer surface (e.g., 3824) of the window holder. The outer surface of the window can be flush (e.g., (e.g., substantially) parallel) with an outer surface of the window holder. In some embodiments, the window holder includes one or more sensors (e.g., 3825) that is/are configured to detect the presence of and/or an amount of material (e.g., debris) in a proximity of the window holder and/or the window. At least one of the sensor(s) can be positioned within the wall (e.g., 3812) and/or within the inner volume (e.g., 3806) of the window holder and/or processing chamber. The sensor(s) can be positioned outside of the inner volume of the window holder. For example, at least one of the sensor(s) can be positioned outside the wall (e.g., 3812) and/or outside the inner volume (e.g., 3806) of the window holder and/or processing chamber.

In some cases, at least one optical window (e.g., 115) and/or its window holder is at least partially incorporated (directly or indirectly) in a wall of the enclosure. In some cases, the optical window and/or window holder is at least partially incorporated in (the wall of) a recessed portion of an enclosure. FIG. 38B shows an example of a cross section view of a recessed portion 3850 of an enclosure (e.g., 3852). The walls (e.g., 3853) of the recessed portion can at least partially define the cavity (e.g., 3856) (also referred to as a volume or region). The recessed portion can be integrally formed with the enclosure. The recessed portion can be coupled (e.g., detachably coupled) with the enclosure. The one or more window holders (e.g., 3854) can be positioned within one or more walls (e.g., top wall 3855) of the recessed portion. For example, the window holder(s) can be positioned within openings of the wall(s) of the recessed portion configured to accommodate the window holder(s). In some cases, the wall(s) of the recessed portion have one or more channels (e.g., 3862) (also referred to as tunnels or passages) for gas to travel to the window holder(s). The channel(s) can be operationally coupled to the inlets of the window holder(s). The channel(s) can be operationally coupled to one or gas sources and/or one or more pumps, e.g., as described herein. The channel(s) can provide a passage for the flow of gas to reach the inlet of the window holder(s) to purge the region adjacent the window(s) of material (e.g., debris). In some embodiments, the recessed portion accommodates one or more sensors (e.g., 3858). The sensor(s) can be any suitable type of sensor (e.g., camera or detector), e.g., as described herein. The sensor(s) can be used to detect any suitable input(s) (e.g., light or temperature). In some embodiments, the sensor(s) is/are used to detect input parameters(s) from the processing chamber (e.g., at or near the target surface (e.g., exposed surface of the material bed)). In some cases, the sensor(s) is/are used to detect gas-borne material (e.g., pre-transformed material, debris, gas contaminants, gas components, and/or reactive species) within the cavity and/or within a main volume of the enclosure (e.g., of the processing chamber). In some embodiments, the sensor(s) is/are configured to sense in a direction (e.g., 3860) toward the target surface. In some embodiments, the sensor(s) are used to determine a height and/or uniformity of the target surface (e.g., exposed surface of the material bed), for example, as described in International Patent Application number PCT/US17/18191 filed on Feb. 16, 2017, titled "ACCURATE THREE-DIMENSIONAL PRINTING," European Patent Application number EP 17156707.6 filed on Feb. 17, 2017, titled "ACCURATE THREE-DIMENSIONAL PRINTING," U.S. Patent Application Publication number 2017/0239891 A1, or International Patent Application number PCT/US15/65297 filed Dec. 11, 2015, titled "FEEDBACK CONTROL SYSTEMS FOR THREE-DIMENSIONAL PRINTING", each of which is entirely incorporated herein by reference.

Figure 25:
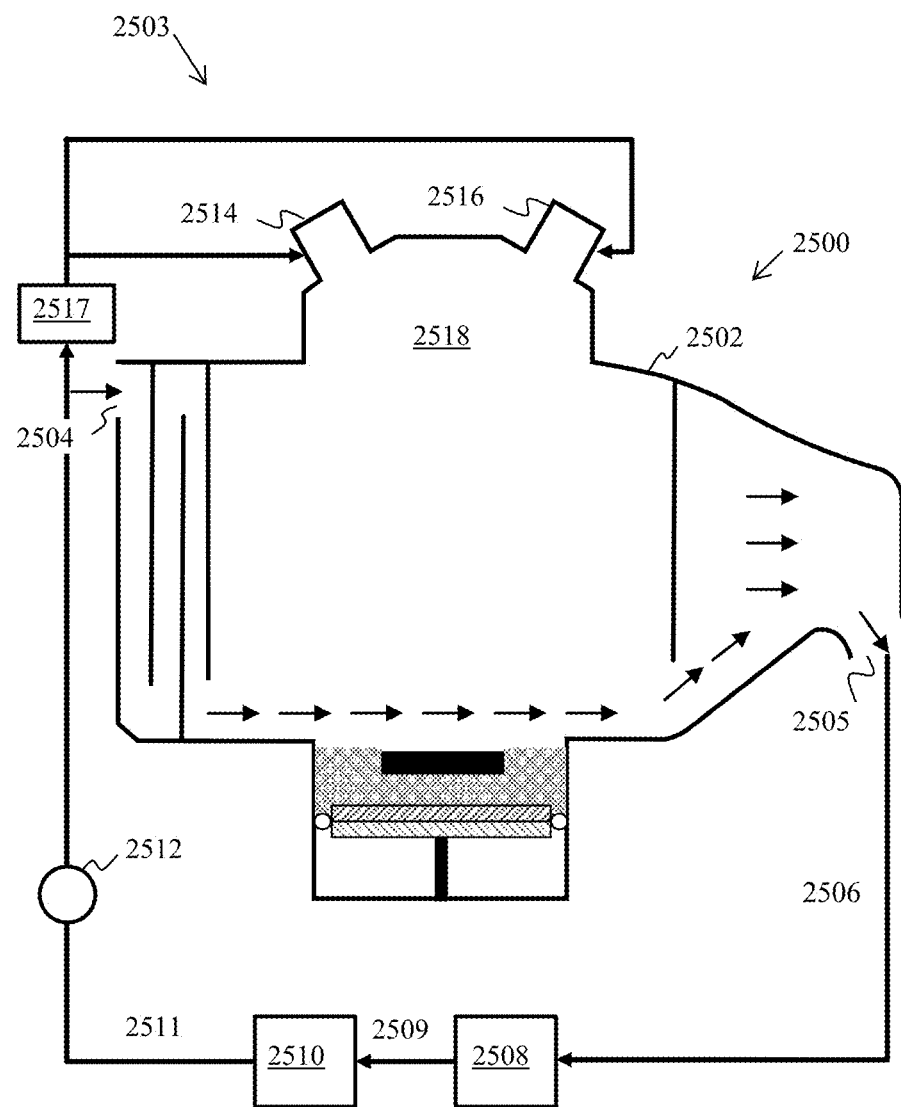
FIG. 25 schematically illustrates a side view of a component of a 3D printer.

In some embodiments, a 3D printing system includes, or is operationally couple to, one or more gas recycling systems. FIG. 25 shows a schematic side view of an example 3D printing system 2500 that is coupled to a gas recycling system 2503 in accordance with some embodiments. 3D printing system 2500 includes processing chamber 2502, which includes gas inlet 2504 and gas outlet 2505. The gas recycling system (e.g., 2503) of a 3D printing system can be configured to recirculate the flow of gas from the gas outlet (e.g., 2505) back into the processing chamber (e.g., 2502) via the gas inlet (e.g., 2504). Gas flow (e.g., 2506) exiting the gas outlet can include solid and/or gaseous contaminants such as debris (e.g., soot, particles). In some embodiments, a filtration system (e.g., 2508) filters out at least some of the solid and/or gaseous contaminants, thereby providing a clean gas (e.g., 2509) (e.g., cleaner than gas flow 2506). The filtration system can include one or more filters. The filters may comprise HEPA filters or chemical filters. The clean gas (e.g., 2509) exiting the filtration system can be under relatively low pressure, and therefore can be directed through a pump (e.g., 2510) to regulate (e.g., increase) its relative pressure prior to entry to the processing chamber. Clean gas (e.g., 2511) with a regulated pressure that exits the pump can be directed through one or more sensors (e.g., 2512). The one or more sensors may comprise a flow meter, which can measure the flow (e.g., pressure) of the pressurized clean gas. The one or more sensors may comprise temperature, humidity, or oxygen sensors. In some cases, the clean gas can have an ambient pressure or higher. The higher pressure may provide a positive pressure within processing chamber (see example values of positive pressure described herein). A first portion of the clean gas can be directed through an inlet (e.g., 2504) of a gas inlet portion of the enclosure, while a second portion of the clean gas can be directed to first and/or second window holders (e.g., 2514 and 2516) that provide gas purging of optical window areas, as described herein. That is, the gas recycling system can provide clean gas to provide a primary gas flow for the 3D printing system, as well as a secondary gas flow (e.g., window purging). In some embodiments, the pressurized clean gas is further filtered through a filter (e.g., 2517 (e.g., one or more HEPA filters)) prior to reaching one or both of the window holders. In some embodiments, the one or more filters (e.g., as part of filters 2517 and/or filtration system 2508) are configured to filter out particles having nanometer-scale (e.g., about 10 to 500 nm) diameters. In some embodiments, the gas recycling system alternatively or additionally provides clean gas to a recessed portion (e.g., 2518) of the enclosure.

As described herein, the gas inlet portion of the 3D printing system can include flow aligning structures that align (e.g., straighten) the flow of gas as it exits the gas inlet portion and/or enters the processing chamber. In some embodiments, the flow aligning structure is not limited to being within an outlet port section (e.g., 2209 in FIG. 22). To illustrate, FIGS. 33A-33E show schematic cross section views of various examples of enclosures having different gas inlet portion configurations in accordance with some embodiments. FIG. 33A shows an example of enclosure 3300 having processing chamber 3302 (including opening 3305, e.g., for a material bed), gas inlet portion 3304 (including inlet ports 3301), and gas outlet portion 3306 having an outlet port 3303. FIG. 33A shows an example of a gas inlet portion that include multiple flow aligning walls that can define multiple flow aligning passages (e.g., 3304) and multiple corresponding inlet ports (e.g., 3301) having tapered shapes (e.g., having polygonal cross sections near the processing chamber and round or elliptical cross sections at the outlet port). FIG. 33B shows an example of enclosure 3320 having processing chamber 3322 (including opening 3325, e.g., for a material bed), gas inlet portion 3324a and 3324b (including inlet ports 3321a and 3321b respectively), and gas outlet portion 3326 having an outlet port 3323. FIG. 33B shows that a gas inlet portion can include multiple flow aligning sections (e.g., 3324a and 3324b), each having multiple walls that can define multiple flow aligning passages and multiple corresponding inlet ports (e.g., 3321a and 3321b). FIG. 33C shows an example of an enclosure 3340 having processing chamber 3342 (including opening 3345, e.g., for a material bed), gas inlet portion 3344 (including inlet ports 3341), and gas outlet portion 3346 having an outlet port 3343. FIG. 33C shows that a gas inlet portion (e.g., 3344) can include multiple flow aligning walls that can define multiple flow aligning passages and multiple corresponding inlet ports (e.g., 3341). FIG. 33D shows an example of enclosure 3360 having processing chamber 3362 (including opening 3365, e.g., for a material bed), gas inlet portion 3364 (including inlet ports 3311), and gas outlet portion 3366 (including outlet port 3363). FIG. 33D shows that a gas inlet portion (e.g., 3364) can include multiple flow aligning walls that can define multiple flow aligning passages and multiple corresponding inlet ports (e.g., 3361) having tapered cone shapes. FIG. 33E shows an example of enclosure 3380 having processing chamber 3382 (including opening 3385, e.g., for a material bed), gas inlet portion 3384a and 3384b (including inlet ports 3381a and 3381b respectively), and gas outlet portion 3386 having outlet port 3383. FIG. 33E shows that a gas inlet portion can include multiple flow aligning sections (e.g., 3384a and 3384b), each having multiple walls that can define multiple flow aligning passages, each having multiple corresponding inlet ports (e.g., 3381a and 3381b). The example embodiments shown in FIGS. 33A-33E do not limit the scope and number of possible embodiments described herein. That is the gas inlet portions described herein can include any suitable number and arrangement of flow aligning sections, flow aligning walls, flow aligning passages, inlet ports, etc., which can each have any suitable shape and size.

It should be noted that the various embodiments of structures, features, and mechanisms of 3D printing systems described herein can be combined in any suitable arrangement. For example, a gas inlet portion can include features that direct gas flow toward a target surface, e.g., a surface of a material bed (e.g., FIG. 28); as well as gas flow channeling structures such as baffles (e.g., FIG. 22) and/or flow straighteners (e.g., FIG. 32) described herein. As another example, a unidirectional window purging system (e.g., FIGS. 29A and/or 29B) can be combined in any suitable way with a window recessed portion and/or a window housing (e.g., FIGS. 23, 24, 26A-26E, and/or 27A-27F). As another example, gas outlet portions (e.g., FIGS. 30A-30D and/or 31) can be combined in any suitable way with any feature of a gas inlet portion (e.g., FIGS. 22, 28, 29A-29B, and/or 32). That is, the various advantages provided by individual structures, features, and mechanisms described herein can be combined an any suitable way within a 3D printing system.

At times, at least one component of the optical system may be coated (e.g., by accumulation of debris). The coating may absorb light and/or heat the component. In some embodiments, at least a portion of the beam path may be enclosed in a casing. The casing may form a channel for the energy beam to travel therethrough. The beam path may comprise a path originating from the energy source to the processing chamber (e.g., to the optical window, inclusive), or any portion thereof. The beam path may comprise a path originating from emergence of the generated energy beam to the atmosphere, and ending at the processing chamber (e.g., ending at the optical window, inclusive), or any portion thereof. Emergence of the energy beam to the atmosphere may be emerging from the energy source collimator (e.g., fiber). The casing may comprise one or more walls. Enclosure of the beam path may reduce debris from affecting the beam as it travels through the path. The enclosed beam path may be purged with at least one gas (e.g., any gas disclosed herein; which can be referred to as a purging gas or purging gas flow). For example, the gas may comprise Clean Dry Air, filtered Air, Argon, or Nitrogen. The gas may be inert. The gas may be non-reactive. At least one component of the optical system (e.g., mirror or lens) may be cooled. The cooling may be active (e.g., using circulating coolant) or passive (e.g., using heat sink). The casing may have at least one gas inlet and at least one gas inlet. In some embodiments, the casing may comprise a plurality of gas outlets. In some embodiments, the one or more walls of the casing may be leaky (e.g., allow escape of some of the purging gas flow therein via one or more openings, cracks, an/or apertures). The casing may comprise a seal. The seal may be leaky, e.g., allow gas lo leak therethrough. The purging of the casing may be before, after, and/or during the 3D printing. The purging may be controlled (e.g., manually and/or automatically). The automatic control may comprise one or more controllers.

In some embodiments, the layer forming apparatus (also referred to herein as a material dispensing mechanism, layer dispenser, or layer forming device) can travel in a direction relative to a flow of gas within the enclosure. The layer forming apparatus can be used to form one or more (e.g., substantially) planar shaped layers of pre-transformed material (e.g., as part of the material bed). In some embodiments, a printing system includes one layer forming apparatus. In some embodiments, a printing system includes multiple layer forming apparatuses. As described herein a layer forming apparatus can include one or more components, such as at least one material dispenser, at least one leveler, and/or at least one material remover. FIGS. 34A and 34B show side and elevation schematic views, respectively, of example layer forming apparatuses. The layer forming apparatus can be configured to form a (e.g., substantially) planar shaped layer(s) of (e.g., pre-transformed) material. FIG. 34A shows an example of a layer forming apparatus (e.g., 3400) that includes a material dispenser (e.g., 3402), a leveler (e.g., 3403) and a material remover (e.g., 3404). The material dispenser can be configured to dispense (e.g., pre-transformed) material (e.g., 3401), which may be disposed therein (e.g., within a cavity of the material dispenser). In some embodiments, the leveler (e.g., comprising a blade (e.g., 3405)) can be disposed between the material dispenser and the material remover. The layer forming apparatus can be configured to traverse (e.g., translate) in one (e.g., first) direction (e.g., 3406) and/or another (e.g., second) direction (e.g., 3407). The first and second directions can be opposite directions. In some embodiments, the layer forming apparatus is configured to move in one (e.g., first) direction (e.g., 3406) when the material dispenses (e.g., pre-transformed) material, and in another (e.g., second) direction (e.g., 3407) when the leveler levels the exposed surface (e.g., 3408) of the material bed (e.g., 3409) and/or when the material remover removes (e.g., via suction) at least a portion of material bed. The layer forming apparatus can traverse in a direction that is (e.g., substantially) parallel to a surface (e.g., top surface) of the platform and/or the target surface. The layer forming apparatus can provide a uniformly thick layer and condition an exposed surface of (e.g., level) the material bed prior to, for example, directing an energy beam at the material bed for forming a 3D object (e.g., 3410). In some configurations, at least one component of the layer forming apparatus may be connected to at least one shaft (e.g., 3411). For example, one or more of the components of the layer forming apparatus may be coupled with (e.g., connected to) the at least one shaft. The shaft may be operatively coupled (e.g., connected) to a translating component (e.g., 3413). The at least one shaft may be operatively coupled (e.g., connected) to one or more actuators. The one or more actuators may facilitate (e.g., linear) motion of the shaft (e.g., to and from the processing chamber, and/or to and from the ancillary chamber). The translating component may comprise the actuator. The linear motion may be in a direction that is (e.g., substantially) parallel to a surface (e.g., top surface) of a platform (e.g., 3412), e.g., that supports the material bed. The linear motion may be in a direction that is not (e.g., substantially) parallel to the surface of the platform. The linear motion may comprise a component (e.g., be in a) direction that is (e.g., substantially) perpendicular to a direction of movement (e.g., FIG. 1, 112) of the platform (e.g., in accordance with an elevator (e.g., FIG. 1, 105) a build module (e.g., FIG. 1, 123)). The linear motion may be in a direction that is not (e.g., substantially) perpendicular to a direction of movement of the platform. The actuator may include a motor. For example, the translating component may be a motor that facilitates linear motion (e.g., of the shaft and/or of at least one component of the layer forming mechanism). The motor may be any motor described herein. In some embodiments, at least two of the material dispensing, leveling, and material removal is performed synchronously (e.g., in the same translation cycle). Synchronously may be within a single translation cycle. A translation cycle may include translating the layer forming apparatus laterally from one (e.g., first) side of a (e.g., processing) chamber to another (e.g., second) side of the (e.g., chamber. A translation cycle may include translating the layer forming apparatus laterally from one (e.g., first) end of the material bed to another (e.g., second) end of the material bed. An end of a material bed may be a position on the periphery of the material bed. In some embodiments, at least one of the components of the layer forming apparatus is configured to move in a secondary (e.g., smaller amplitude) motion in addition to or instead of the translating motion. For example, the one of the components of the layer forming apparatus may be configured to vibrate, stutter, oscillate, jitter, fluctuate, pulsate, and/or flutter during the translating. In some cases, the secondary motion facilitates the forming mechanism (e.g., material dispensing, leveling and/or material removing) of at least one of the components. FIG. 34B schematically depicts a (e.g., bottom) view of an example of a layer forming apparatus (e.g., 3420) showing a material dispenser (e.g., 3422), a leveler (e.g., 3423) and a material remover (e.g., 3424). In some embodiments, the layer forming apparatus has an elongated shape (e.g., greater length (e.g., 3436) than width (e.g., 3438)). In some embodiments, the material dispenser, leveler and material remover are integrated as a unit (e.g., one piece). In some embodiments, two of the material dispenser, leveler and material remover are part of a first unit and the other of the material dispenser, leveler and material remover is part of a second unit. For example, the material remover and the leveler may be part of the first unit and the material dispenser can be part of the second unit. In some embodiments, each of the material dispenser, leveler and material remover are part of different respective units (e.g., first, second and third pieces). The units may be (e.g., detachably) coupled with each other. The material dispenser can include one or more openings (e.g., 3426) where (e.g., pre-transformed) material can travel through to the material bed. The leveler can include one or more blades (e.g., 3428) that may contact and planarize the material bed. The blade(s) of the leveler can have an elongated edge. The material remover and include one or more openings (e.g., 3430) where (e.g., pre-transformed) material can enter from the material bed (e.g., propelled by an attractive force from the material remover (e.g., vacuum)). In some cases, each of the one or more material dispenser openings (e.g., 3426) and/or the one or more material remover openings (e.g., 3430) can be elongated (e.g., slit). The one or more material dispenser and/or material remover openings and have any suitable shape, e.g., have any suitable cross section shape (e.g., elliptical, round, irregular, polygonal (e.g., rectangular, square, triangular, hexagonal)). As described herein, the layer forming apparatus can be configured to traverse (e.g., translate) in one (e.g., first) direction (e.g., 3432) and/or another (e.g., second) direction (e.g., 3434).

In some embodiments, the one or more controllers may control the operation of the one or more components of the layer forming mechanism. For example, the controller may turn on a component of the layer forming mechanism (e.g., the material dispensing mechanism), for example, when the separator (e.g., door) between the ancillary chamber and the processing chamber is open. The one or more controllers may control movement of one or more components of the layer forming apparatus. For example, a first controller may control translation of the layer forming apparatus (e.g., including one or more of the material dispenser, leveler, and material remover) (e.g., 3406 and/or 3407). A second controller may control secondary movement (e.g., vibration) of one or more of the material dispenser, leveler, and material remover. A third controller may control functioning of one or more of the component (e.g., control dispensing of material from the material dispenser, control movement of the leveler (e.g., blade), and/or control the attractive force (e.g., vacuum) of the material remover). At times, the first controller, second controller, and the third controller are the same controller. At times, at least two of the first controller, second controller, and the third controller are different controllers. The controller may control the operation of the vibration mechanism. For example, the vibration mechanism may be turned on when the material dispensing system may be in operation, or when the material levelling system may be in operation. In some embodiments, the vibration mechanism is turned off when the material removal system may be in operation. The control may be before, during, and/or after the three-dimensional printing.

Figure 35:
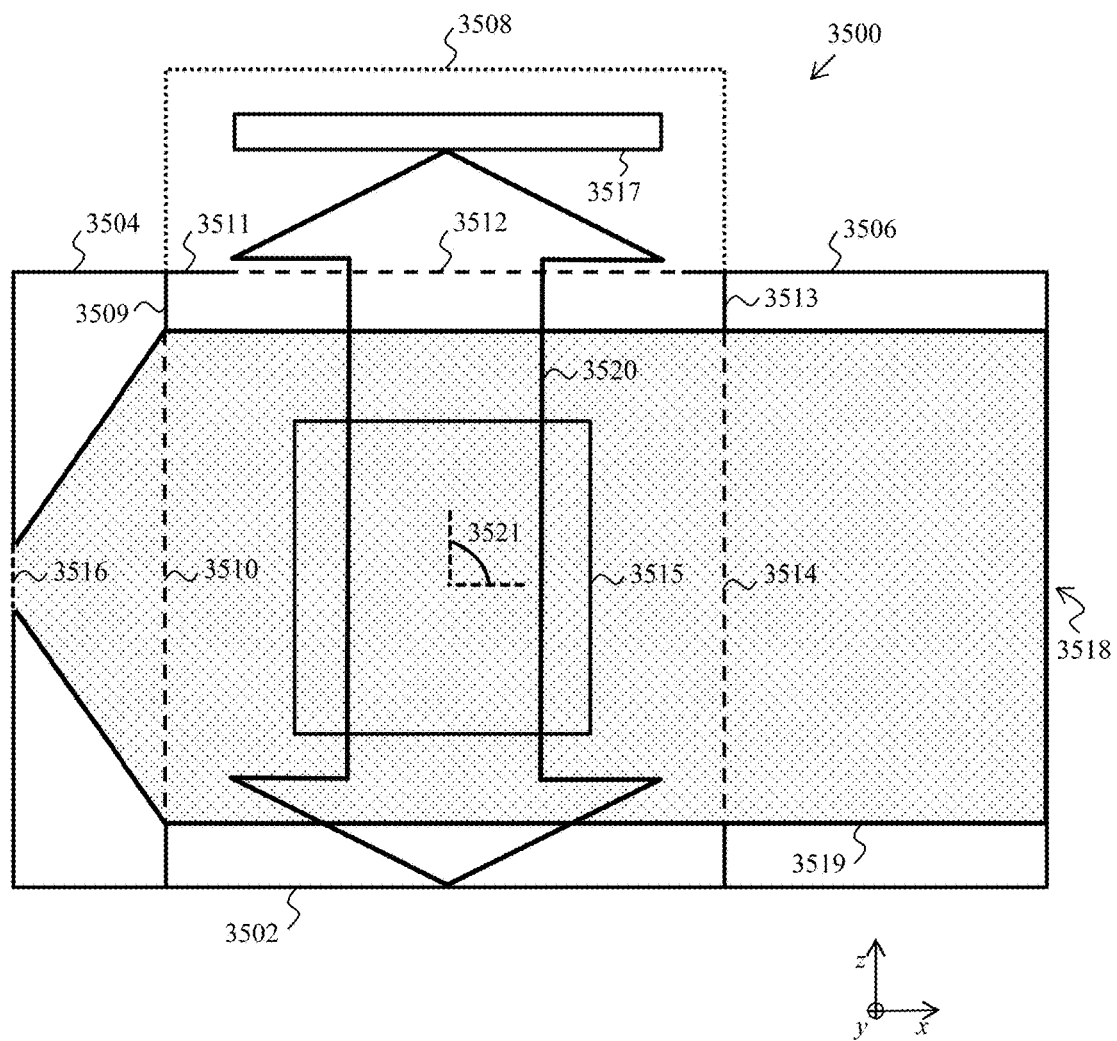
FIG. 35 schematically illustrates a top view of an enclosure of a 3D printer.

In some cases, the layer forming apparatus is configured to traverse in a direction that is (e.g., substantially) different than or (e.g., substantially) the same as a direction of a flow of gas within the enclosure. For example, the gas flow director (also referred to herein as a gas flow mechanism, a gas flow management system, or a gas flow management arrangement) can be configured to direct a flow of gas in a direction adjacent (e.g., (e.g., substantially) parallel) to (e.g., a top surface of) the platform. The gas flow mechanism can direct a flow of gas from one side of the enclosure to its opposing side of the enclosure. The flow of gas may be (e.g., substantially) uniform (e.g., laminar). The gas flow director can be configured to control at least one of a trajectory, a velocity, and/or a uniformity of the flow of gas. The gas flow director can include one or more valves that control a velocity and/or pressure of the flow of gas within the enclosure. The gas flow director can include the gas inlet portion, the gas outlet portion, or any suitable combination thereof. As described herein, the gas inlet portion can include an (e.g., elongated) opening that imparts a (e.g., substantially) planar shape to the flow of gas, e.g., an overall planar shape of the gas flow, which flow can be adjacent to the target surface. The gas inlet portion can include at least one baffle that may change a gas flow direction within the gas inlet portion (e.g., to a third direction different than the first and/or second directions). The gas inlet portion can include at least one alignment structure that aligns portions of a gas flow within the gas inlet portion (e.g., in accordance with the direction of gas flow adjacent the target surface and/or the platform). In some cases, the enclosure is operatively coupled to, or comprises, the gas inlet portion and/or the gas outlet portion. As described herein, the gas inlet portion and/or the gas outlet portion can be fixedly coupled (e.g., integrally formed) with the enclosure or detachably coupled with the enclosure. The flow management apparatus is configured to direct the flow of gas over the platform. FIG. 35 shows a plan view (e.g., top section view) of an example 3D printing system. The enclosure (e.g., 3500) of the 3D printing system can be operatively coupled to, or comprise, a processing chamber (e.g., 3502), a gas inlet portion (e.g., 3504), a gas outlet portion (e.g., 3506), and/or an optional ancillary chamber (e.g., 3508). The processing chamber may be separated from the inlet portion by a (e.g., first) separator (e.g., 3409), which can include a wall and/or opening (e.g., 3510) that can be closeable by a gate (also referred to as a door). The processing chamber may be separated from the ancillary chamber by a (e.g., second) separator (e.g., 3411), which can include a wall and/or opening (e.g., 3512) that can be closeable by a gate (also referred to as a door). The processing chamber may be separated from the outlet portion by a (e.g., third) separator (e.g., 3413), which can include a wall and/or opening (e.g., 3514) that can be closeable by a gate (also referred to as a door). The one or more of the openings (e.g., 3510, 3512 or 3514) may be sealably closed (e.g., gas tight seal) or may be closed in a way that allows at least partial mixing of atmospheres of. The processing chamber can accommodate at least a portion of the platform (e.g., 3515) that may support the material bed and/or the 3D object during a printing operation. The processing chamber can include one or more optical windows. The processing chamber can include one or more recessed portions. The gas inlet portion can include one or more inlet ports (e.g., 3516), one or more baffles (e.g., FIG. 22, FIG. 23 (3215)), and/or one or more flow aligning structures (e.g., FIGS. 32A-32B or 33A-33E), e.g., as described herein. In some cases, the gas inlet portion is configured to direct a flow of gas toward the target surface and/or the plate (e.g., FIG. 28 or 29A-29B). The ancillary chamber can accommodate a layer forming apparatus (e.g., 3517). The outlet portion may have an aerodynamic shape (e.g., FIGS. 30A-30D or 31) and/or can include one or more outlet ports (e.g., 3518).

Figure 36:
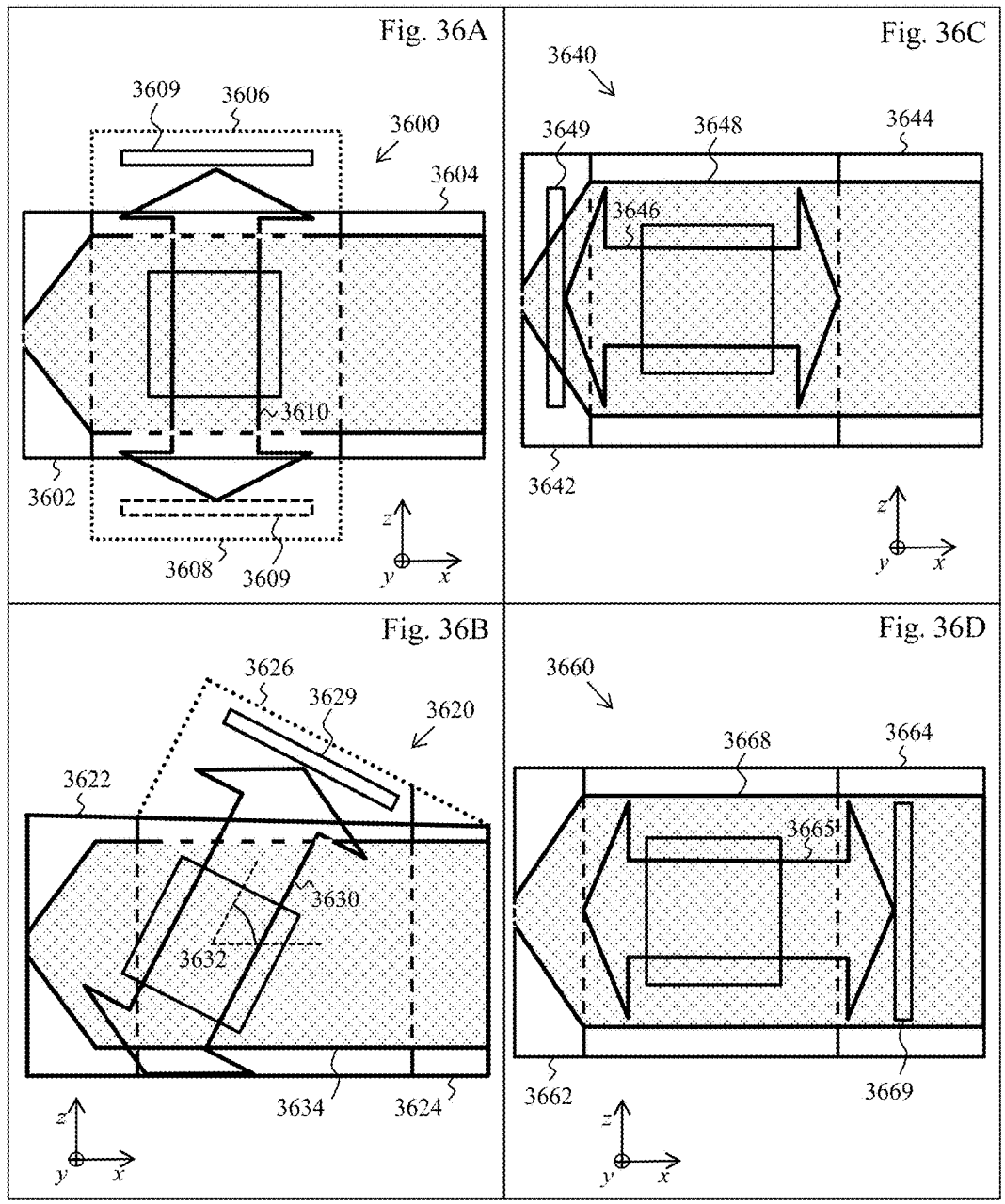
FIGS. 36A-36D schematically illustrate top views of enclosures of various 3D printers.

The gas flow director can direct a flow of gas (e.g., 3519) in one or more (e.g., prescribed) directions relative to one or more directions of travel (e.g., 3520) of the layer forming apparatus or any of its components. In some embodiments, the layer forming apparatus (or any of its components) traverses in a first direction (e.g., across a portion of the processing chamber) and the gas flows in the processing chamber in a second direction. The first direction may be the same as the second direction. The first direction may be different from the second direction. The first direction may be (e.g., substantially) parallel to the second direction. The first direction may non-parallel to second direction. The first direction may be opposite to the second direction. The first direction may have a direction component that opposes the second direction. The first direction may have a direction component that is the same as the second direction. FIG. 35 shows a direction (e.g., z direction) of travel of the layer forming apparatus that is (e.g., substantially) non-parallel to the direction (e.g., x direction) of the flow of gas (e.g., in accordance with angle 3521). In some embodiments, the direction of travel of the layer forming apparatus is (e.g., substantially) orthogonal with respect to the direction of gas flow (e.g., angle 3521 is (e.g., about) 90 degrees). FIG. 36A shows an example of a printing system with an enclosure 3600 having a gas inlet portion 3602, a gas outlet portion 3604, and multiple optional ancillary chambers 3606 and 3608. The ancillary chamber(s) can each be configured to accommodate one or more layer forming apparatuses (e.g., 3609). The one or more layer forming apparatuses may transit (e.g., 3610) (e.g., between two or more ancillary chambers). For example, the one or more layer forming apparatuses can be housed in one ancillary chamber prior to a layer forming operation, and be housed in another ancillary chamber after the layer forming operation (e.g., prior to and/or after a transformation operation (e.g., using an energy beam)). In some embodiments, the system includes one layer forming apparatus that transits among the multiple ancillary chambers. In some embodiments, the system includes multiple layer forming apparatuses (or components thereof) that transit among multiple ancillary chambers. FIG. 36B shows an example of a printing system with an enclosure 3620 having a gas inlet portion 3622, a gas outlet portion 3624, and an optional ancillary chamber 3626. The ancillary chamber can be configured such that one or more layer forming apparatuses (e.g., 3629) travels in one or more directions (e.g., 3630) that is/are at an angle (e.g., 3632) with respect to the direction (e.g., 3634) of the flow of gas. In some embodiments, the angle (e.g., 3632) is not (e.g., substantially) 90 degrees (e.g., orthogonal) and/or not (e.g., substantially) zero (e.g., parallel). FIG. 36C shows an example of a printing system with an enclosure 3640 having a gas inlet portion 3642 and a gas outlet portion 3644. The layer forming apparatus (e.g., 3649) can be housed in the gas inlet portion or in an optional ancillary chamber that is adjacent (e.g., below, above, or lateral to) the gas inlet portion. The layer forming apparatus can transit in one or more directions (e.g., 3646) that is/are (e.g., substantially) parallel with respect to the direction (e.g., 3648) of gas flow. FIG. 36D shows an example of a printing system with an enclosure 3660 having a gas inlet portion 3662 and a gas outlet portion 3664. The layer forming apparatus (e.g., 3669) can be housed within the gas outlet portion or within an optional ancillary chamber that is adjacent (e.g., below, above, or lateral to) the gas outlet portion. The layer forming apparatus can transit in one or more directions (e.g., 3665) that is/are (e.g., substantially) parallel with respect to the direction (e.g., 3668) of gas flow.

Figure 37:
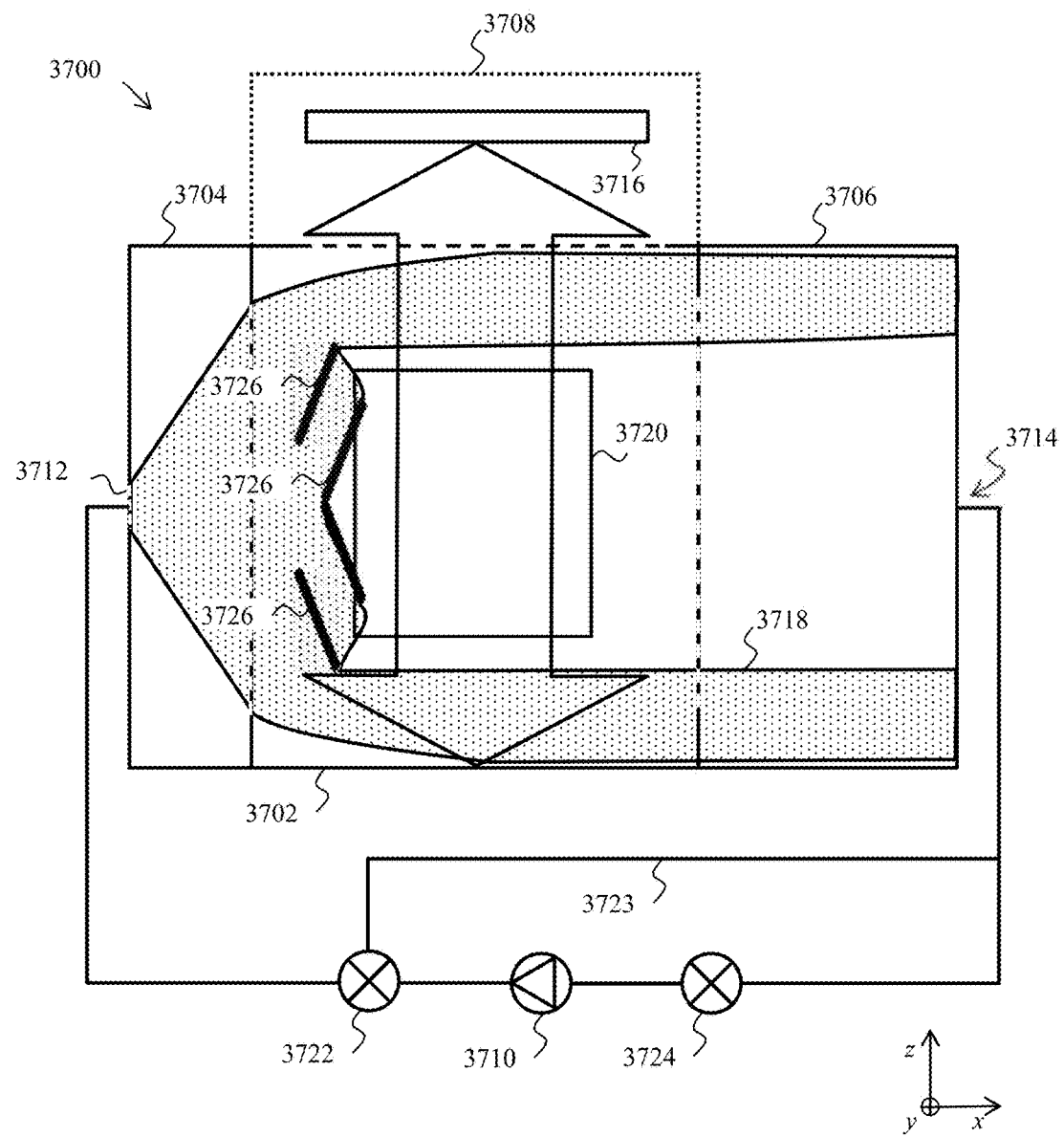
FIG. 37 schematically illustrates a top view of an enclosure of a 3D printer.

In some cases, the flow of gas and movement (e.g., translation) of the layer forming apparatus are operationally coupled. Operational coupling may be used to change (e.g., decrease or increase) an amount of turbulence of material (e.g., of pre-transformed material (e.g., powder) and/or debris) within and/or around the material bed. Characteristics (e.g., shape, velocity, uniformity, volume, and/or timing) of the flow of gas adjacent the target surface and/or platform can be adjusted based on movement and/or location of the layer forming apparatus. For example, the gas flow director can be configured to direct the flow of gas adjacent to the target surface and/or the platform when the layer forming apparatus is or is not traversing adjacent the target surface and/or the platform. The gas flow director can be configured to direct the flow of gas adjacent to the target surface and/or the platform at least partially based on an amount of debris (e.g., as detected by one or more sensors (e.g., within the processing chamber)). Characteristics (e.g., shape, velocity, uniformity, volume, chemical contents, and/or timing) of the flow of gas adjacent the target surface and/or platform can be adjusted based on movement and/or location of the layer forming apparatus. Movement (e.g., translation) and location of the layer forming apparatus can be adjusted based on characteristics of the flow of gas. For example, the flow management apparatus can direct the flow of gas adjacent the target surface and/or platform (i) while the layer forming apparatus is forming the layer of pre-transformed material, (ii) while the layer forming apparatus is in the ancillary chamber, or (iii) any combination thereof. In some cases, the flow management apparatus can direct the flow of gas away from the target surface and/or platform while the layer forming apparatus forms the layer of pre-transformed material. Away from the platform can be towards a position outside and/or inside of the enclosure. Away from the platform can be toward a surface other than the target surface and/or platform. In some cases, the flow management apparatus can lower the velocity of (e.g., turn off) the flow of gas, e.g.: while the layer forming apparatus forms the layer of pre-transformed material, and/or while the transforming energy beam is not operational (e.g., not transforming). As described herein, the system can include one or more controllers to control the layer forming apparatus and/or gas flow. FIG. 37 shows an example of a plan view (e.g., top section view) of an example 3D printing system. The enclosure (e.g., 3700) of the 3D printing system can be operatively coupled to, or comprise, a processing chamber (e.g., 3702), a gas inlet portion (e.g., 3704), a gas outlet portion (e.g., 3706), and/or an optional ancillary chamber (e.g., 3708). One or more pumps (e.g., 3710) can be used to increase a pressure (velocity) of gas entering the gas inlet port (e.g., 3712). In some cases, the system is configured to recirculate gas from gas outlet port (e.g., 3714), through the one or more pumps, and back through the gas inlet port. In some embodiments, the gas recirculation is part of a (e.g., pre-transformed) material recirculation system as described herein. In some embodiments, the velocity of the flow of gas (e.g., 3718) within the enclosure and/or adjacent (e.g., over) the target surface and/or the platform (e.g., 3720) is modified during one or more operations of the layer forming apparatus (e.g., 3716). For example, the flow of gas can be at a first velocity adjacent (e.g., over) the target surface and/or the platform during a transformation operation (e.g., during exposure of the target surface to an energy beam), and changed (e.g., altered, e.g., reduced or increased) to a second velocity during a time that the layer forming apparatus is forming a layer on the platform. The reduction can be to a (e.g., substantially) zero velocity. The reduction can be a diminished flow velocity, or to lack of flow. In some cases, the velocity change can reduce or increase a chaotic gas flow (e.g., turbulence) within and/or around the material bed. The second velocity can be less than the first velocity. The second velocity can be greater than the first velocity. In some embodiments, the change in velocity involves changing among two or more velocities (e.g., first, second, third, fourth, or fifth velocities). In some cases, the velocity change is accomplished by modifying an operation of the one or more pumps (e.g., 3710). For example, the one or more pumps can be turned off/on, and/or sped up or down. In some cases, the velocity change is accomplished using one or more flow diverters (e.g., 3726) within the enclosure (e.g., within the processing chamber). The flow diverters can be (e.g., modular and/or movable) baffle(s). The flow diverter(s) can include a surface that directs the flow of gas away from the target surface and/or the platform. In some cases, the velocity change involves modifying an operation of one or more valves (e.g., 3722 and/or 3724). The one or more valves can constrict the flow of gas, obstruct the flow of gas, divert the flow of gas, or any suitable combination thereof. The valve(s) can include any suitable type of valve(s), e.g., as described herein. In some embodiments, one or more downstream valves (e.g., 3722) is disposed downstream of the one or more pumps. The one or more downstream valves may divert (e.g., 3723) all or a portion of the flow of gas (e.g., the entire flow of gas) toward the gas outlet port. The diverted flow of gas can flow through a gas recycling system (e.g., to one or more filter systems). In some embodiments, one or more upstream valves (e.g., 3724) are disposed upstream of the one or more pumps, e.g., to control the flow of gas to the pump(s). Changing the velocity and/or direction of the flow of gas can include using any suitable combination of valves, flow diverters, and/or pump adjustments. The change may be controlled, e.g., manually and/or automatically (e.g., using one or more controllers).

EXAMPLES

The following are illustrative and non-limiting examples of methods of the present disclosure.

Example 1

Peak intensity reduction (PIR) measurements were made on a 3D printer as disclosed herein with and without a gas purge window holder. The 3D printer comprises a 28 cm by 28 cm by 30 cm container at ambient temperature, Inconel 718 powder of average particle size 35 µm was deposited in a container to form a powder bed. A laser beam having a power setting of 500 Watts was used, with a period of time between measurements of about 1000 msec. Table 1 below shows a comparison of PIR data calculated using Equation 1 described herein. The data was collected after transformation of 1, 500, 1000, 2,000, 5,000 and 10,000 layers of Inconel 718 powder. The volume of pre-transformed material that is transformed per layer was about 3.4 milliliters (e.g., about 3.4 liters per 1000 layers).

TABLE 1

| Layer number | PIR with purge | PIR without purge |
|---|---|---|
| 1 | 0.92 | 0.92 |
| 500 | 0.92 | 0.75 |
| 1000 | 0.92 | 0.5 |
| 2000 | 0.92 | 0.3 |
| 5000 | 0.92 | 0.15 |
| 10000 | 0.92 | 0.1 |

Table 1 indicates a comparison between peak intensity of the energy beam experienced at the target surface, as a function of the number of layers of pre-transformed material printed (i) when there is gas purge adjacent to the window ("PIR with purge" in Table 1), and (ii) when there is no gas purge adjacent to the window ("PIR without purge" in Table 1). Table 1 indicates that the PIR of a 3D printing system devoid of gas purging of the window is reduced to about 82% of its original peak intensity (as experienced at the target surface) after transforming 500 layers, to about 54% of its original peak intensity after transforming 1000 layers, to about 33% of its original peak intensity after transforming 2000 layers, to about 16% of its original peak intensity after transforming 5000 layers, and to about 1% of its original peak intensity after transforming 1000 layers of the 718 Inconel powder. As a comparison, when the gas is purging the window in the 3D printing system, a (e.g., substantially) undetectable reduction in PIR is experienced at the target surface after forming the respective number of layers. The experimental parameter and their respective values are delineated in Table 2

TABLE 2

| Parameter | Value |
|---|---|
| $N_{sf}$—Number of measurement performed | 60 |
| $N_{av}$—Number of measurement points to average out | 5 |
| $\Delta T_{sf}$—time interval between measurements | 1000 msec |
| $P_{sf}$—Power setting of the laser | 500 W |

While preferred embodiments of the present invention have been shown and described herein, it will be obvious to those skilled in the art that such embodiments are provided by way of example only. It is not intended that the invention be limited by the specific examples provided within the specification. While the invention has been described with reference to the afore-mentioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations, or relative proportions set forth herein which depend upon a variety of conditions and variables. It should be understood that various alternatives to the embodiments of the invention described herein might be employed in practicing the invention. It is therefore contemplated that the invention shall also cover any such alternatives, modifications, variations, or equivalents. It is intended that the following claims define the scope of the invention and that methods and structures within the scope of these claims and their equivalents be covered thereby.

What is claimed is:
1. A system for printing a three-dimensional object, the system comprising:
   an energy source configured to generate an energy beam for transforming a pre-transformed material to a transformed material as at least a portion of the three-dimensional object;
   a platform configured to support the three-dimensional object during printing; and
   an enclosure configured to enclose at least a portion the platform, which enclosure comprises:
   (i) a first wall;
   (ii) at least one window configured to allow the energy beam to pass through;
   (iii) a region recessed in the first wall, which region comprises the at least one window; and
   (iv) a second wall that at least partially separates the region from the first wall, which at least one window and second wall at least partially define a volume of the region.
2. The system of claim 1, wherein the second wall is configured to facilitate at least partial shielding of an interior surface of the at least one window from a gas-borne material in the enclosure.
3. The system of claim 1, wherein the at least one window is a plurality of windows.

4. The system of claim 1, further comprising a purging system configured to direct a flow of gas away from the at least one window, wherein the purging system is operatively coupled to the region.

5. The system of claim 4, wherein the purging system comprises one or more channels that are operatively coupled to the second wall.

6. The system of claim 3, wherein windows of the plurality of windows are arranged in a non-parallel alignment relative to a direction of flow of gas above the platform.

7. The system of claim 1, wherein the at least one window is disposed in at least one window holder that comprises a purging system configured to direct a flow of gas in the region.

8. The system of claim 1, wherein the second wall at least partially encloses a volume of the region.

9. The system of claim 1, wherein the at least one window comprises a material having a thermal conductivity higher than that of fused silica.

10. The system of claim 9, wherein the material is substantially transparent to the energy beam with respect to at least one wavelength of the energy beam.

11. The system of claim 1, wherein the at least one window comprises at least one member selected from the group consisting of sapphire, zinc selenide (ZnSe), magnesium fluoride ($MgF_2$), and calcium fluoride ($CaF_2$).

12. The system of claim 1, wherein at least one window comprises a material having a thermal conductivity of at least 5 Watts per meter per degrees Celsius (W/(m*°C)) at 300 Kelvin.

13. The system of claim 1, wherein during printing of the three-dimensional object, the region comprises one or more sensors configured to detect one or more input parameters within the enclosure.

14. The system of claim 1, further comprising at least one sensor configured to detect a gas-borne material.

15. The system of claim 14, wherein the at least one sensor is operatively coupled to the at least one window and/or the region.

16. The system of claim 1, wherein during printing of the three-dimensional object, the enclosure is configured to maintain an internal atmosphere at a positive pressure.

17. The system of claim 1, wherein the region comprises (i) a first sub-region and (ii) a second sub-region that is disposed further way from the first wall as compared to the first sub-region, wherein the at least one window is disposed in the second sub-region.

18. The system of claim 17, wherein the second sub-region comprises a purging system configured to direct a flow of gas away from the at least one window, wherein the purging system is operatively coupled to the region.

19. The system of claim 18, wherein the purging system comprises one or more channels operatively coupled to the region.

20. The system of claim 17, wherein the at least one window is arranged in a non-parallel alignment relative to a direction of flow of gas above the platform.

21. The system of claim 17, wherein the at least one window is a plurality of windows, wherein the second sub-region comprises a plurality of window holders disposed in the second sub-region, which plurality of window holders are operatively coupled to the plurality of windows.

22. The system of claim 21, wherein the plurality of windows are arranged in a non-parallel alignment with respect to the platform.

23. The system of claim 21, wherein at least one of the plurality of window holders comprises a purging system configured to direct a flow of gas away from the at least one window operatively coupled to at least one of the plurality of window holders, wherein the purging system is operatively coupled to the at least one of the plurality of window holders.

24. The system of claim 23, wherein the purging system comprises one or more channels operatively coupled to the at least one of the plurality of window holders.

* * * * *